United States Patent [19]

Belady et al.

[11] 3,921,153

[45] Nov. 18, 1975

[54] SYSTEM AND METHOD FOR EVALUATING PAGING BEHAVIOR

[75] Inventors: Laszlo A. Belady, Yorktown Heights; Robert I. Roth, Briarcliff Manor, both of N.Y.

[73] Assignee: International Business Machines Corporation, Armonk, N.Y.

[22] Filed: Aug. 2, 1973

[21] Appl. No.: 385,222

[52] U.S. Cl. .......... 340/172.5; 340/172.5

[51] Int. Cl.[2] .......... G06F 13/00

[58] Field of Search .......... 340/172.5; 444/1

[56] References Cited

UNITED STATES PATENTS

| | | | |
|---|---|---|---|
| 3,541,529 | 11/1970 | Nelson | 340/172.5 |
| 3,577,185 | 5/1971 | Belady | 340/172.5 |
| 3,588,839 | 6/1971 | Belady et al. | 340/172.5 |

*Primary Examiner*—Raulfe B. Zache

*Attorney, Agent, or Firm*—Isidore Match; Roy R. Schlemmer

[57] ABSTRACT

The system and method disclosed herein effect the determination of the minimum memory capacities for the pages of a page reference.

9 Claims, 104 Drawing Figures

SYSTEM AND METHOD FOR EVALUATING PAGING BEHAVIOR

CROSS-REFERENCE TO RELATED APPLICATION

Application of Laszlo A. Belady and Frank P. Palermo, for "System and Method for Evaluating Paging Behavior," Ser. No. 385,223, filed Aug. 2, 1973, and assigned to the IBM Corporation.

BACKGROUND OF THE INVENTION

This invention relates to data processing systems wherein the operating systems operate on the concept of virtual memory. More particularly, it relates to apparatus for managing and evaluating such memories in an operating environment.

In recent years, several types of data processing apparatus operate based upon the concept of a virtual memory, such memory employing a combination of a smaller high speed main storage, and a larger and relatively slower secondary storage. The virtual memory makes use of the secondary storage by giving it virtual addresses above the limits of the main storage. The operating system in a virtual memory machine operates as if the secondary storage is as an extension of the high speed main storage by the use of "paging." By "paging," there is meant the bringing of a page of information in secondary storage into main storage at the time that it is required.

Concomitantly with the development of virtual memories which employ a demand paging technique, there have been developed replacement algorithms which are utilized to determine which page is to be removed from main storage and placed back into secondary storage if main storage overflows. Such replacement algorithms have utilized various criteria for determining the choice of page removal, examples of such criteria being first-in first-out (FIFO), least recently used (LRU) and others. In a demand paging type of system, frequently a page which is required is not available in main storage; such unavailability being termed a "page fault."

Quite early in the development of virtual machines employing paging, and replacement algorithms for use in such virtual machines, it was recognized that given a program by its reference string and the size of the main memory, it is useful to know the minimum number of page faults necessary to run the program for evaluating memory configurations and/or algorithms. The minimum number of page faults divided by the number of faults generated by a replacement algorithm is then defined as the efficiency of this particular algorithm. Efficiencies have since been extensively measured and found to vary widely between about 0.15 and 1.0, an approximate average being about 0.4.

To determine the minimum number of page faults, there have been developed the so-called MIN algorithm and the OPT algorithm. The MIN algorithm is described in the publication of L. A. Belady, "A Study of Replacement Algorithms for Virtual Storage Computers," IBM Systems Journal, Vol. 5, No. 2, June 1966. This algorithm enables the continuous processing of the reference string and, given a fixed memory size, computes a single minimum value by constructing, with necessary and variable delay, the memory states and their transitions. The disadvantage presented by this MIN algorithm is that it works for a single memory size at a time.

To overcome this disadvantage, the OPT algorithm was developed, the latter algorithm is described in the publication of R. L. Mattson, J. Gecsei, D. R. Slutz, and I. L. Traiger, "Evaluation Techniques for Storage Hierarchies," IBM Systems Journal, Vol. 9, No. 2, June 1970. This OPT algorithm computes the minimum page fault count for the entire range of memory sizes substantially concurrently. The disadvantage presented in the use of the OPT algorithm is that it requires repetitious look-ahead which then has to be eliminated by a pre-processing first pass. This first pass is the construction of the LRU (least recently used) distance string, usually performed in the reverse order. The resulting sequence is subsequently processed by the OPT algorithm to compute its distance string, i.e., the sequence of minimum capacity memories.

In considering the foregoing described MIN and OPT algorithms, it has been found that both are useful in given situations. Thus, the MIN algorithm is a simple, continuous and efficient technique when only a single memory size is of interest and may be frequently employed in compilers for register allocation. Such use is described in the publication of F. R. A. Hopgood, "Compiling Techniques," MacDonald: London, 1970; pp. 96–99, and the publication of D. Gries, "Compiler Construction for Digital Computers," John Wiley and Sons, New York 1972. The OPT algorithm, however, is more elaborate, and requires larger amounts of recorded information but it is efficacious in that it directly provides information as to the entire space-time behavior of the program. Consequently, the OPT algorithm is extensively employed to evaluate storage hierarchy configurations.

However, neither of the MIN or OPT algorithms can be used as an on-line device in an operational environment. Their effect on replacement algorithms is therefore only indirect and through the increased insight that they teach relative to program behavior.

Further developments in this area are exemplified by the publication of L. P. Horwitz, R. M. Karp, R. E. Miller and S, Winograd, "Index Register Allocation," Journal of the ACM, Vol. 13, No. 1, January 1966, wherein there is provided an elegant solution to the general problem of index register allocation. Also, in U.S. Pat. No. 3,577,185 of L. A. Belady, "On-Line System for Measuring the Efficiency of Replacement Algorithms," issued May 4, 1971, and assigned to the IBM Corporation, there is described an on-line device for calculating approximate values for the minimum page fault count.

However, all of the prior art, as outlined hereinabove in the development of techniques for determining the minimum number of page faults, suffer from various disadvantages such as applicability in a particular type of environment, need for repetitious look-ahead, complexity, or inability to be employed in an on-line environment.

Accordingly, it is an important object of this invention to provide apparatus and a method for determining the behavior of replacement algorithms in a virtual memory system, specifically the minimum number of page faults, which is simple as compared to prior art techniques for accomplishing the same purpose, which can be employed with small amounts of information recorded or stored during processing, and which can be used on-line.

It is a further object to provide an apparatus and method in accordance with the preceding object wherein the need for providing for look-ahead is eliminated.

It is a further object to provide an apparatus and method in accordance with the preceding objects which enables the study of program structures in an operating environment.

SUMMARY OF THE INVENTION

In accordance with the invention, there is provided a system for use in data processing apparatus, which is operated as a paging machine and wherein a program is considered as a page reference string, for determining the minimum memory capacities for the pages of the string. The data processing apparatus includes means for maintaining a first list of the names of the pages of the program, the first list being ordered in accordance with a least recently used criterion (LRU) and being constituted by the names of the pages and integers respectively having one of the different discrete values of 1 to $n$ respectively associated with each of the page names according to the above-mentioned criterion, $n$ being equal to the total number of pages in the program. The system comprises means for maintaining a second list of page names, the second list being constituted by an ordered sequence of 1 to nth addresses, each of the addresses respectively having one of the different discrete values of 1 to $n$, there being located at each of the addresses, an integer, C, from which the minimum memory capacity (MMC) of the page can be detemined, each of the integers in the second list having a different discrete value of 1 to $n$. The system further includes means for determining the minimum memory capacity (MMC) of a given reference page which comprises means responsive to the referencing of a given page for dividing the second list into a first group of addresses having the values of 1 to $(l-1)$ and a second group of addresses having the values of $l$ to $n$ respectively wherein $l$ is equal to the value of the LRU integer associated with the reference page in the first list. The minimum memory capacity determining means further include means for incrementing respective addresses 2 to $(l-1)$ in the first group by 1, i.e., of 3 to $l$, and means for ascertaining the address, $k$, in the second group whereat there is present the lowest value minimum memory capacity integer. The minimum memory capacity determining means also includes means for marking the series of addresses in the second group which are included in the subgroup containing addresses $l$, $(l+1)$, . . . , $(k-1)$ which have the following values, viz. $(l+a)$, $(l+b)$, $(l+c)$, . . . , up to address $(k-1)$, if necessary, wherein $(l+a)$ has the smallest address value greater than $l$, such that $C(l+a) < C(l)$, wherein $(l+b)$ has the smallest address value greater than $(l+a)$ such that $C(l+b) < C(l+a)$, etc., wherein $C(i)$ is the integer at address i. The minimum memory capacity determining means also comprises means for generating the smallest missing number in the group of numbers comprising 2 to $C_{max}+1$) wherein $C_{max}$ is the largest value integer C at addresses 2 to $(l-1)$, such generated smallest missing number being the minimum memory capacity of the reference page. There are further included in the MMC determining means, means for assigning the address value of 2 to the generated smallest missing number, and means for assigning to each of the series of the marked addresses the value of the next address in the series, the highest value address in the series being assigned the value of $k$, the integer originally at address, $k$, being discarded.

Also, in accordance with the invention, there is provided a method for use in data processing apparatus, which is operated as a paging machine wherein a program is considered as a page reference string, for determining the minimum memory capacities for the pages of the string. The data processing apparatus which is utilized in the method includes means for maintaining a first list of the names of the pages of the program which is ordered in accordance with a least recently used criterion, such first list being constituted by the names of the pages and integers respectively having one of different discrete values of 1 to $n$ respectively associated with each of the names according to the least recently used criterion (LRU), wherein n is equal to the total number of the pages in the program. The method comprises the maintaining of a second list of the names of the pages, such second list being constituted by an ordered sequence of n addresses, each of the addresses respectively having one of the different discrete values of 1 to $n$, there being located at each of the addresses a different one of the page names and an integer, C, from which the minimum memory capacity (MMC) of the page can be determined, each of the integers in the second list having respective different discrete values of 1 to $n$. The method further includes the step of determining the minimum memory capacity of a given reference page, this step comprising the substeps of, in response to the referencing of a given page, dividing the second list into a first group of addresses having the values of 1 to $(l-1)$ respectively and a second group of addresses having the value $l$ to $n$ respectively wherein $l$ is equal to the value of the LRU integer associated with the referenced page in the first list, incrementing the addresses 2 to $(l-1)$ in the first group by 1 whereby they have the respective values 3 to $l$ and ascertaining the address, $k$, in the second group whereat there is present the lowest value minimum memory capacity integer. The step for determining the minimum memory capacity further includes the substeps of marking the series of addresses in the second group which are included in the addresses $l$, $(l+1)$, . . . , $(k-1)$ which have the following values $(l+a)$, $(l+b)$, $(l+c)$, . . . , up to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b)$, $< C(l)$, etc., wherein $C(i)$ is the value of the integer C at location $i$, generating the smallest missing number in the group of integers included in the group 2 to $(C_{max}+1)$ wherein $C_{max}$ is the greatest value integer, C, at address positions 2 to $(l-1)$, the generated smallest missing number being the minimum memory capacity of the referenced page. The minimum memory capacity determining step also includes the substeps of assigning the address value of 2 to the aforementioned generated smallest missing number, and the assigning to each of the series of the marked addresses of the second group, the value of the next address in this series, the highest value address in the series being assigned the value of $k$. The integer originally at address $k$ is discarded.

The foregoing and other objects, features and advantages of the invention will be apparent from the following more particular description of the preferred embodiment of the invention, as illustrated in the accompanying drawings.

DESCRIPTION OF A PREFERRED EMBODIMENT

Figure 1:
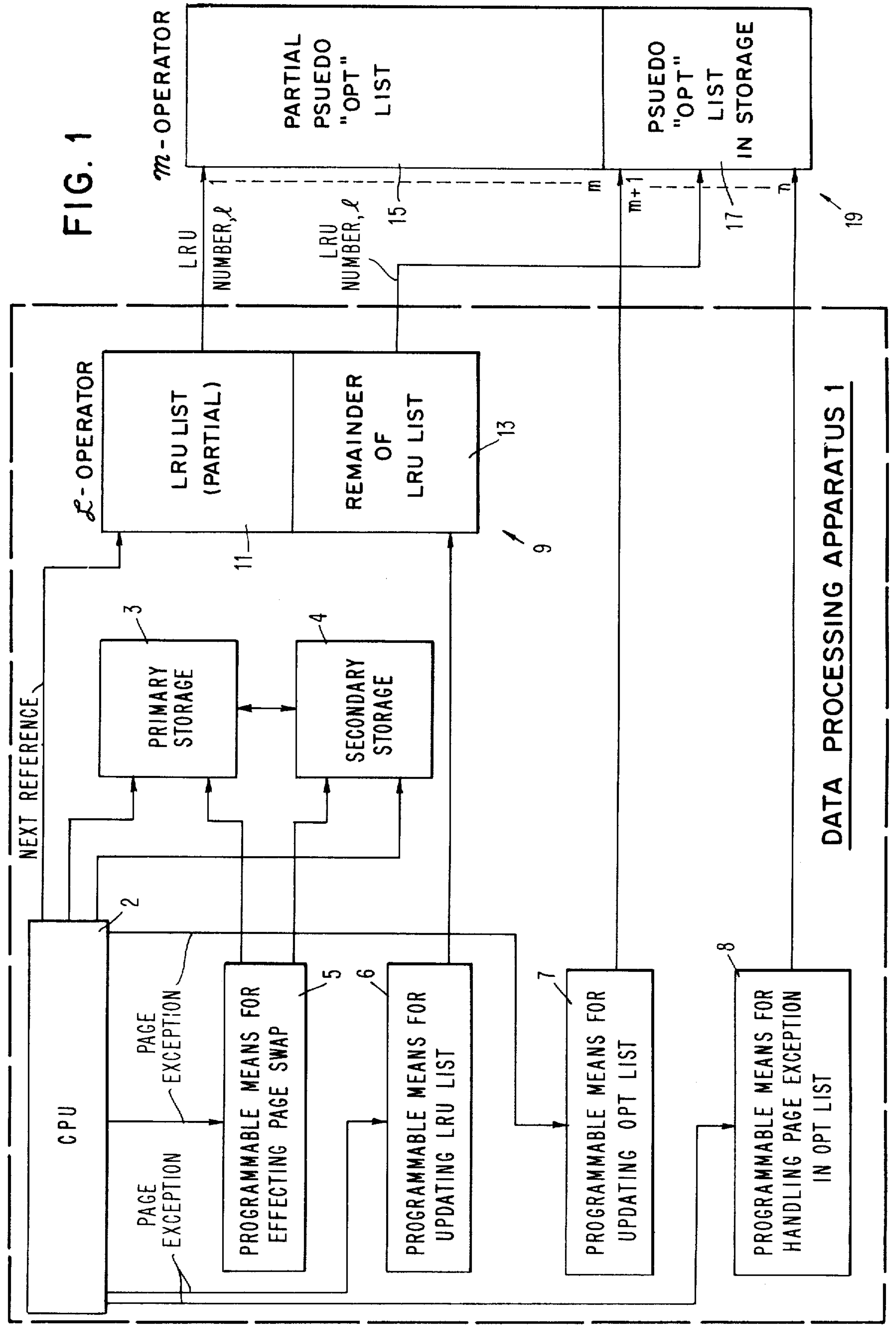
FIG. 1 is a block diagram which conceptually depicts the invention.

In the description of the invention which ensues, let there first be considered a program represented by its page reference string R. For any replacement algorithm, such string is the input. As far as the output is concerned, the above-mentioned MIN algorithm, for a given memory size, produces a single value, i.e., the least count of page faults required to run a program. The OPT algorithm mentioned hereinabove uses the input string R first to produce the LRU (least recently used) stack distance sequence and then uses this new sequence as input for the process which actually extracts the sequence of so-called minimum stack distances. In this connection, reference is made to the above-mentioned Mattson et al. publication for the definition of the term "stack." Thereby, each element of string R, i.e., the original input, becomes associated with a stack distance. Since an optimum stack distance is essentially the minimum memory size which is associated with a reference such that no page-fault is induced, the minimum number of faults for any fixed memory size is computable from the distance string. In this connection, reference is made to the above-mentioned Mattson et al publication wherein such computation is described. In the invention described herein, there is not provided an explicit stack in the sense that it evolved in the Mattson publication. The output string is termed the sequence of minimum memory capacities (MMC).

Heretofore, the ultimate purpose of optimum stack construction for the evaluation of memory hierarchies has been to produce the MMC-string. In this regard, the so-called "hit ratios," i.e., the normalized page fault counts, as a function of memory size, are directly computable from the MMC. Thereby, voluminous recording of the MMC-string can be avoided.

As will be further appreciated in the description of the invention hereinbelow, at any point in the page reference string R, the MMC value associated with the current reference is uniquely a function of the previous references whereby look-ahead is unnecessary and, consequently, can be eliminated.

At this point in the description of the invention, to provide necessary background material therefor, there is described as much as is necessary of the MIN algorithm as set forth in the above-mentioned L. A, Belady publication in the IBM Systems Journal, June 1966. The conceptual framework of this algorithm is a two-dimensional matrix of markings in which there is a row associated with each individual page. The set of construction rules of the matrix, for a given memory size p and reference string R, is as follows:

Let it be assumed that the next reference in page reference string R is to page $\alpha$ and the rightmost non-empty column is t-1. Then:

If a row $\alpha$ is empty, mark $(\alpha,t)$ and return.

Otherwise, find the rightmost column $t_\alpha$ with a marking row $\alpha$.

If there exists a column $\tau$, $t_\alpha < \tau < t$ with $p$ markings, mark $(\alpha,t)$ and return.

Otherwise, mark all empty $(\alpha, \tau)$, $t_\alpha < \tau < t$, and return.

After having processed the input string R sequentially, using the above rules, the number of non-empty, marked, columns is equal to the minimum number of page pulls necessary to run the program.

The following is an example of a memory size $p$ =3 and input (reference) string ABCDEDBCBDAEEAC, of 15 elements.

| | t | | | | | | | |
|---|---|---|---|---|---|---|---|---|
| A | 1 | | | | | | 1 | 1 |
| B | | 1 | 1 | 1 | 1 | 1 | | |
| C | | | 1 | | | 1 | 1 | 1 |
| D | | | | 1 | 1 | 1 | | |
| E | | | | | 1 | | | 1 |

With regard to the above example, clearly, repetitious references, such as EE, do not cause markings for any value of $p$ and are thus redundant. Accordingly, in the further description of the invention, repetitions will be suppressed and the example that will be utilized will be ABCDEDBCBDAEAC.

The above set forth matrix is relatively easy to interpret. Thus, gaps in a row represent a page pull from the outside, and markings in a given column identify coexisting pages in memory. Gaps, within the constraint set by $p$ (memory size), can be filled with markings upon a new reference to a previously referenced page, thereby avoiding a page pull. Actually, $p$ markings in a column represent an obstacle to a filling attempt, i.e., the gap is permanent. It is to be noted that the columns of $p$ markings are, in general, constructed with a delay.

With this representation resulting from the operation of the MIN algorithm, however, it is difficult to compare and then interpret matrices generated for different $p$ values, since the columns are generally unaligned with each other and the input string. Thus, for the above example and $p=5$, a single column would be generated, with all positions marked, while the matrix associated with $p=1$ has as many columns as there are page references to the output, while each column has only one marking.

In accordance with the invention, the foregoing MIN algorithm is modified. As modified, when the next reference is presented, there are marked ($\alpha$, $t$) for all cases. Since, prior to this new reference, ($\alpha$, $t$) has been, by definition, empty, matrices for all memories become aligned with the input string and t can be considered to be the index of time to the page reference string R. The next reference is $x_t$, with the $t$-th column associated with it. The addition then to the above rules is the marking ($\alpha$, $t$) in the last step. There are now shown hereinbelow all five matrices, i.e., $p = 1, \ldots, 5$ in the example being utilized employing the modified rules.

umn never exceeds the value of $p$, but can be less. The minimum number of pulls necessary to run the program is then equal to the number of markings not preceded on the left by another marking but by a gap.

The five matrices shown immediately hereinabove are now superimposed. However, there cannot be used the uniform marking, i.e., the numeral 1, since there would result an inconclusive figure identical to that of $p=5$ which is the union of all five matrices. Extending the range of symbols for marking, there are therefore introduced the new numerals 2, 3, 4, . . . , observing the order of integers which they represent.

In addition to the already presented rules of the algorithm according to the invention, there are now required rules for guiding the use of numerals when marking, such as, the preserving of information about all cases even after superimposition. In order to illustrate the construction rules, the procedure is as follows:

1. The old numeral 1 is employed in the matrix for $p=1$ whereby the procedure for this case is then unchanged, and there will be a 1 in as many columns as there are references processed. No other numeral is employed.

2. It is determined next that no column contains duplicate numerals. With this determination it is desired to achieve the goal of being able to distinguish between cases of different $p$-values after superimposition. Thus, if in a given position, matrix $p$ contains a marking but matrix ($p$-1) does not, then a numeral which has not as yet been used in the corresponding column in matrix ($p$-1) will distinguish between the two cases.

There can now be constructed the combined matrix by continuously processing the reference string. Thus, when the next reference $X_t$ is presented and it is to page $\alpha$, there is employed the numeral 1 to mark ($\alpha$, $t$). Then, there is observed the gap extending to the left of the new marking, bounded on the left either by the margin of the matrix (new reference) or by a numeral 1 (the most recent previous reference to $\alpha$). By conp = 1

| | A | B | C | D | E | D | B | C | B | D | A | E | A | C |
|---|---|---|---|---|---|---|---|---|---|---|---|---|---|---|
| A | 1 | | | | | | | | | | 1 | | 1 | |
| B | | 1 | | | | | 1 | | 1 | | | | | |
| C | | | 1 | | | | | 1 | | | | | | 1 |
| D | | | | 1 | | 1 | | | | 1 | | | | |
| E | | | | | 1 | | | | | | | 1 | | |

p = 2

| | A | B | C | D | E | D | B | C | B | D | A | E | A | C |
|---|---|---|---|---|---|---|---|---|---|---|---|---|---|---|
| A | 1 | | | | | | | | | | 1 | 1 | 1 | |
| B | | 1 | | | | | 1 | 1 | 1 | | | | | |
| C | | | 1 | | | | | 1 | | | | | | 1 |
| D | | | | 1 | 1 | 1 | | | | 1 | | | | |
| E | | | | | 1 | | | | | | | 1 | | |

p = 3

| | A | B | C | D | E | D | B | C | B | D | A | E | A | C |
|---|---|---|---|---|---|---|---|---|---|---|---|---|---|---|
| A | 1 | | | | | | | | | | 1 | 1 | 1 | |
| B | | 1 | 1 | 1 | 1 | 1 | 1 | 1 | 1 | | | | | |
| C | | | 1 | | | | | 1 | 1 | 1 | 1 | 1 | 1 | 1 |
| D | | | | 1 | 1 | 1 | 1 | 1 | 1 | 1 | | | | |
| E | | | | | 1 | | | | | | 1 | | | |

p = 4

| | A | B | C | D | E | D | B | C | B | D | A | E | A | C |
|---|---|---|---|---|---|---|---|---|---|---|---|---|---|---|
| A | 1 | | | | | | | | | | 1 | 1 | 1 | |
| B | | 1 | 1 | 1 | 1 | 1 | 1 | 1 | 1 | | | | | |
| C | | | 1 | 1 | 1 | 1 | 1 | 1 | 1 | 1 | 1 | 1 | 1 | 1 |
| D | | | | 1 | 1 | 1 | 1 | 1 | 1 | 1 | | | | |
| E | | | | | 1 | 1 | 1 | 1 | 1 | 1 | 1 | 1 | | |

p = 5

| | A | B | C | D | E | D | B | C | B | D | A | E | A | C |
|---|---|---|---|---|---|---|---|---|---|---|---|---|---|---|
| A | 1 | 1 | 1 | 1 | 1 | 1 | 1 | 1 | 1 | 1 | 1 | 1 | 1 | |
| B | | 1 | 1 | 1 | 1 | 1 | 1 | 1 | 1 | | | | | |
| C | | | 1 | 1 | 1 | 1 | 1 | 1 | 1 | 1 | 1 | 1 | 1 | 1 |
| D | | | | 1 | 1 | 1 | 1 | 1 | 1 | 1 | | | | |
| E | | | | | 1 | 1 | 1 | 1 | 1 | 1 | 1 | 1 | | |

Similar to the previous matrix illustrated hereinabove, in the matrices generated in accordance with the modified rules, the number of markings in any colstrast, in the original MIN algorithm, the gap would be filled only if, for each column in the region of the gap, the count of markings would be less than some fixed value of $p$. However, according to the invention, a matrix is being constructed for all possible values of $p$, therefore, there is employed the numeral for marking which indicates, in position ($\alpha$, $t$-1), the maximum $p$-value for which the gap-filling is valid, i.e., for which markings are possible, between the two recent consecutive references, or prior to the first reference, to page $\alpha$.

Since it is desired to be ascertained, for all memory sizes, the minimum number of page exceptions necessary to run the program, the numerals have to be employed in a specific order. Thus, starting with the leftmost position of the gap, the smallest numeral, which is not yet present in that column, is used for marking. As a meaning is also attached to the numeral, i.e., that is designates the $p$-size memory capable of containing the page, a numeral once used in a gap forms a lower bound to the right in the same gap, i.e., before the numeral 1 is reached. In other words, a numeral-string 223444 is valid, for example, while a numeral-string 223443 is not. The reason for this non-decreasing sequence in the numeral string is readily apparent. Thus, in the demand paging being considered, once a page is not an element of, i.e., pushed from, memory of size $p$, only another reference to that page will pull it back into all memories smaller than or equal to $p$, including that of unit size.

A gap filling string consisting only of a single numeral a will now be termed an $a$-string. The string starting with a numeral a and terminating with a numeral $b$ is termed an $a/b$-string. The above valid string is then a 2/4-string. Further, the value of 1-s is excluded from the strings. Consequently, $a$ or $b$ never have a value of 1. There now follows a summary of the foregoing into a numeral string algorithm:

Let it be assumed that the next reference in string R,$x_t$, is to page $\alpha$.

Then mark ($\alpha$, $t$) with a numeral 1.

Starting with the rightmost non-empty position $t_\alpha$ in row $\alpha$, mark every position ($\alpha$, $\tau$), $t_\alpha < \tau < t$ with a numeral $P(\tau) = max\ (u, v)$ where $u$ = minimum missing numeral in column $\tau$ and $v$ = numeral in position ($\alpha$, $\tau$-1) and return.

The application of the immediately foregoing set of rules to the examples discussed hereinabove produces the following numeral matrix:

| | A | B | C | D | E | D | B | t<br>C | B | D | A | E | A | |
|---|---|---|---|---|---|---|---|---|---|---|---|---|---|---|
| A | 1 | 2 | 3 | 4 | 5 | 5 | 5 | 5 | 5 | 5 | 1 | 2 | 1 | |
| B | 2 | 1 | 2 | 2 | 3 | 3 | 1 | 2 | 1 | | | | | |
| C | 3 | 3 | 1 | 3 | 4 | 4 | 4 | 1 | 2 | 2 | 2 | 3 | 3 | 1 |
| D | 4 | 4 | 4 | 1 | 2 | 1 | 2 | 3 | 3 | 1 | | | | |
| E | 5 | 5 | 5 | 5 | 1 | 2 | 3 | 4 | 4 | 4 | 4 | 1 | | |
| | 2 | 3 | 4 | 5 | 2 | 3 | 4 | 2 | 3 | 5 | 4 | 2 | 3 | |

It is simple to extract the uniformly marked matrix for any given value of $p$. Such extraction can be done in the following two steps:

a. remove all $a/b$-strings (between 1-s) for which $b > p$.

b. change all of the remaining symbols to 1-s.

It can now be perceived that the combined matrix has the following properties. If the t-th reference is to page $\alpha$, then ($\alpha$, $t$) is marked with 1. In addition, the numeral (a, $t$-1), i.e., $p$, represents the minimum memory capacity (MMC) containing page $\alpha$, prior to the t-th reference. The sequence of these MMC values is displayed immediately below the numeral-matrix. There is one MMC for every reference, except for the first one which is by definition numeral 1, however, since repetitious references are eliminated, this first MMC is suppressed.

As a result, the algorithm according to the invention eliminates the look-ahead (first pass) required by the OPT algorithm discussed hereinabove, but produces all of the information generated by the MIN algorithm also discussed hereinabove. Since the numerals stand for (OPT) stack distance, the sequence of numerals in a given row is the history of pushes from memories of distinct sizes. Thus, a change from $a$ to $b$ signifies that the page is pushed from memories of size $c$, $a \leq c < b$.

The ease of constructing the matrix, as mentioned hereinabove, does not compensate for the bulkiness of the matrix, one of its dimensions being bounded only by the length of R. Since a high speed storage of this size is rarely available for automatic computation, there is provided a more compact representation which keeps just the essential information which is necessary to generate the MMC sequence, as a response to the input string R. Historical information which has been found to be rarely used in practice is suppressed.

In the numerical string algorithm, upon the presentation of the next reference, a new string is constructed which is subject to constraint by strings which had been drawn earlier. In order to achieve compactness, the constraints are summarized such that the new string is sufficiently defined and, in particular, the string's rightmost numeral, identifying the MMC output associated with the page reference, is displayed.

A simple way of doing this is to construct independently for each gap the minimum $a/b$-string (or briefly minimum string), using the rules as set forth hereinabove. In the example presented there, a next reference to either B or D would produce 4 as output, while a reference to E or A would result in 2 (a reference to C would be a repetition). The corresponding minimum strings, listed in the order of their lengths, or equivalently in the LRU (least recently used) order to past references, are:

| | | | | | |
|---|---|---|---|---|---|
| A | | | | | 2 |
| E | | | | 2 | 2 |
| D | | 3 | 4 | 4 | 4 |
| B | 3 | 3 | 4 | 4 | 4 |

Only one of the strings becomes, of course, an actual minimum string, i.e., the one which in fact is next referenced. A new set of potential outputs can then be defined. The intent is to describe the potential outputs in a manner such that, if and when the next reference is known, not only is its associated output defined but the description of the new potential outputs is available.

In order to arrive at such arrangement, it is to be noted that the minimum string for D in the example is a proper, right adjusted, substring of that for B; a similar relation exists between A and E. Next, it is observed that in the longest gap, there is for the strings only one starting numeral to choose from. In the next longest gap, there are two "free" numerals, then three and so on. In the example as mentioned above, 3 is the only choice for B's starting numeral, but 3 and 5 are both possible for D without duplicate numerals in a column. Similarly, 2, 4 and 5 are possible for E and finally all but 1 for A. Of course, independently constructed minimum strings drawn for individual gaps always start with the smallest numeral possible as shown in the above table.

There are now defined two kinds of minimum strings: the immediate minimum string IMS and the conditional minimum string CMS. The IMS of element $\alpha$ is the numeral string which is generated by the rules as stated hereinabove, if the next reference is to element $\alpha$. The string listed above for A, E, D and B are then by definition, the IMS.

A conditional minimum string, CMS, is on the other hand a minimum string whose starting numeral is not the smallest possible one, and it is either a proper right adjusted substring of an IMS or a CMS filling a longer gap or it can be constructed as a minimum string after all longer gaps are filled.

There are now listed the IMS and CMS for the example:

| | IMS | CMS | | |
|---|---|---|---|---|
| A | 2 | 3 | 4 | 5 |
| E | 22 | | 44 | 55 |
| D | 3444 | | | 5555 |
| B | 33444 | | | |

It is seen that the IMS's listed above are identical to those presented earlier. However, 5555 as a CMS for D, for example, is constructed with B's only string being assumed to have already been drawn. Other CMS's were similarly generated. It is to be noted that each string (IMS or CMS) which is not a substring in the above list is underlined, such a string being suitably termed a "primitive." Every other (not underlined) string is then a substring of some primitive.

Because of this string/substring inclusion property of IMS/CMS and by the construction rules as set forth above, there are as many primitives to draw as there are gaps. If n is the number of elements already referenced, then there are n-1 primitives. For the example, four primitives (underlined in the above list) are constructed by the following rules:

1. Take the longest gap and draw its minimum string.
2. Take the next longest gap and draw the minimum string assuming that all longer gaps are filled with IMS and CMS.
3. Repeat the previous step until all gaps are filled.

In general, the terminating numerals of the ($n$-1) primitives contain all immediate and conditional minimum output values. The listing of the primitives for the example is as follows:

| | | | | | |
|---|---|---|---|---|---|
| A | | | | | 3 |
| E | | | | 2 | 2 |
| D | | 5 | 5 | 5 | 5 |
| B | 3 | 3 | 4 | 4 | 4 |

the terminal numerals being enclosed in a block. This LRU-ordered last column formed by the primitives is defined as the p-stack of output values and is interpreted as follows: B, the least recently referenced element has only one starting numeral for a minimum (IMS) and its terminal numeral is 4, which is the next MMC — output if B is referenced next.

Next, there are two possible starting numerals for D and, by construction, the corresponding IMS and CMS terminate in 4 and 5, listed at and below D in the p-stack. Since the numeral 4 is the smaller of the two, it becomes the MMC associated with D if it is next referenced. Similarly, E has three IMS and CMS terminating in 2, 4 and 5 and therefore, the smallest, 2 becomes the output if E is referenced next. Element A's MMC would also be 2 since it is the smallest of the terminal numerals 2, 3, 4 and 5.

Thus, generally, given the p-stack of output values in the LRU order of their associated elements, the MMC-value for the next referenced element can be, for example, computed as follows:

If the next reference is the $l$-th recently referenced element, there is selected as the MMC, the smallest from the set S of numerals at or below the ($l$-1) th position in the p-stack.

In the example, if element E, the third most recently referenced element, is referenced next, then the output is 2 which is the smallest number at or below the second stack position. Similarly, the output for element D would be 4, etc.

There is now explained as to how the p-stack is manipulated in order to reflect in it the new IMS/CMS configuration after the next reference is included.

The next reference lists either an element whose IMS is primitive or else its IMS is a proper substring of either an IMS or a CMS associated with an element which was referenced earlier. Also, by definition the longest gap (that of the least recently referenced element) has an IMS which is primitive. In the example, IMS for B and E are primitives, while the IMS for D or A is a substring.

Let it be assumed that $\alpha$ is referenced next. Then, in the former case, IMS is primitive. The IMS and CMS for each element referenced earlier than $\alpha$ (or below $\alpha$ in the LRU order) are unchanged. The reason is that, by the definition of the primitive string, none of the longer IMS or CMS includes the string actually generated for $\alpha$. The IMS/CMS of elements more recently referenced than $\alpha$, however, become changed, i.e., either an IMS or a CMS is lost for each element in the range, by the actual string in row $\alpha$. This is equivalent of moving the new output value, i.e., the terminal numeral of the actual string, from its prior position to the top of the p-stack.

If in the example, E is next referenced where E's IMS is primitive, the corresponding stack transition can be illustrated as follows: (For the purpose of clarity of explanation, there are also listed the names of the elements A through E in LRU order.)

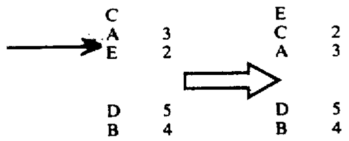

Similarly, a reference to B (also with a primitive IMS) would cause the following transition:

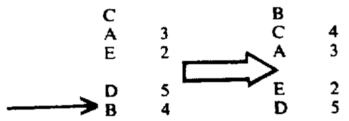

Considering now the latter case, it is somewhat more complicated since the actual string for $\alpha$ is not primitive. Clearly, the IMS/CMS configuration of some elements, earlier referenced less recently than $\alpha$, become changed since there exists an IMS properly including the actual string. The unused portion of this including string has to be extended to the right by new numerals. Under the minimum constraint, these numerals become the smallest (former) CMS of $\alpha$. This CMS of $\alpha$, in turn, may be a substring of some other IMS or CMS, causing its including string to become extended by the next smallest CMS of $\alpha$, etc., as illustrated in the following example:

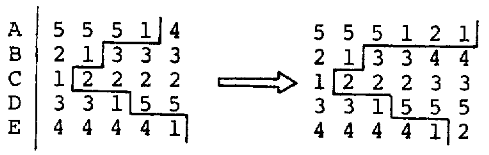

In the above depiction, the jagged lines separate the actual strings from the IMS and CMS.

It is readily verified that the last column in the right matrix correctly reflects the new output (terminal numeral) configuration of all of the IMS and CMS. The corresponding stack transition can be extracted as follows:

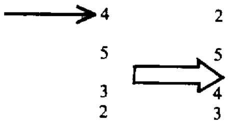

The new output is 2 which is the terminal numeral of the actual string for A. Upon transition, this numeral 2 is placed at the top of the stack thereby indicating that, from now on, and for a while, no IMS or CMS terminates in the numeral 2, except for one IMS for the topmost element E (now the second most recently referenced element). Since element C has lost its IMS of 2222, its new IMS terminates in 3 which was A's smallest CMS. However, this latter string is not primitive; therefore B loses its CMS of 333 and gets replaced by the 3344 string ending in 4, which was the next smallest CMS of A. Only the 55 string remains untouched.

There has already been described as to how there is found the output value MMC in the set S of the p-stack when the next reference is presented. It has now been seen that the updating of the new conditions requires the removal of the output value from the stack and its subsequent placement on the top. The vacated position then is to be filled with the next smallest numeral, if any, in set S of the original stack above the vacant position. This, in turn, creates a new vacant position to be filled with the next smallest in that range, if any, and so on. A more formal description of these rules follows hereinbelow.

The operation of the system according to the invention can be conceptually diagrammed as follows:

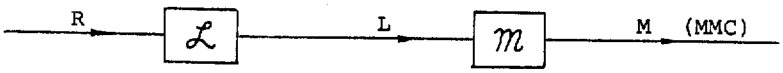

wherein $L$ is an operator which transforms sequence R of page references into sequence L of LRU positions. It keeps the already referenced pages (page names) in an LRU-stack and is defined as follows: If the page referenced next is not in the LRU-stack, the new page is placed on the top of the stack, n, the number of pages in the stack is incremented by 1, (n-1) is output and return is made. Otherwise, the page at the $k$-th position in the LRU-stack is found, this page is removed and placed on top of the stack, ($K$-1) is output, and the return is made.

M is an operator which transforms the sequence L of the LRU-positions into a sequence M of minimum memory capacities (MMC). It keeps past output values (constraints) in a modified LRU stack and is defined as follows:

If the next position, $l$ is zero, a return is made. Otherwise,

If the $l$-th position in the modified stack is empty, the numeral $(l+1)=p$ is placed on the top of the stack, $p$ is output and a return is made. Otherwise, the smallest value $p$ is found at, or below the $l$-th position on the modified stack.

If $p$ is at the $l$-th position, $p$ is removed, $p$ is placed at the top of the stack, $p$ is output, and a return is made. Otherwise, the smallest value $p'$ above $p$ is found which is at or below the $l$-th position; $p$ and $p'$ are exchanged in the modified stack and the branch is made back to the immediately preceding step.

It is to be noted that the last two steps are identical to a single pass of the so-called "bubble sort," i.e., a pairwise exchange sort, as is disclosed in the publication titled "Sorting Techniques," IBM Data Processing Techniques, Form NR, C20-1639-0, pp. 12–13.

The M-operator can thus be generally described as follows: the finding of the minimum value $p$ in the lower part of the P-stack, i.e., the elements at and below the $l$-th position, by performing a single pass of a bubble sort type and the then placing of $p$ on the top of the stack.

The correctness of the two-pass OPT algorithm is proven in the above-mentioned Mattson et al publication. The operation accomplished in accordance with the invention can be considered as a one-pass OPT, the numerals representing (OPT) stack positions.

There now follows hereinbelow, a formal description of the OPT algorithm and the novel one-pass algorithm carried out by the invention. In these descriptions it will be demonstrated that the one-pass algorithm generates the same distance string (MMC-s) as the OPT algorithm.

In this connection, as has been discussed hereinabove, in the one-pass algorithm two stacks are maintained. One of these is the LRU stack which is the list of pages referenced in the LRU order. Thus, the most recently referenced page is on top of the stack, i.e., a page $\alpha$ is above a page $\beta$ if and only if page $\alpha$ has been referenced more recently than page $\beta$.

The second stack (P) can be conveniently considered a pseudo OPT stack. It is a list of integers from which the OPT stack distance may be calculated for any page which is referenced. When a page is referenced, its position in the LRU stack is found. The OPT stack distance is the smallest integer in the P stack which is at or below the LRU stack position.

The LRU stack is updated by moving the page referenced to the top of the stack and pushing each page above it down one position.

The P stack is updated as follows: The value at the LRU position is saved and all items between it and the second position are moved down one position. The saved value is compared with the value in the next position. The larger of these values is placed in this position and the smaller value is saved. The process is continued until the bottom of the P-stack is reached. The saved value is the OPT-stack position and is placed in the second position of the P-stack.

An alternate description of the update procedure is as follows: Assuming that $k$ is the LRU stack position, all items between 2 and $k$-1 are marked. Thereafter, the next item which is marked is the one which has the minimum value from among the items which are at or below position $k$ and above the last marked item if any such item exists. This procedure is continued until item $k$ is marked. The marked item in the lowest position is the OPT stack value, i.e., position. All other marked items are shifted to the next lower marked position, and the OPT stack value is put in the second position of the P-stack. The output is the LRU stack position $k$ and the OPT-stack position (MMC).

At this point to enable comparison between the inventive algorithm and the OPT algorithm as described in the above-referred to Mattson et al paper, there is summarized the operation of the OPT algorithm.

In the operation of this algorithm, on the first pass of the page trace, the forward distance string is created, i.e., the reference string $R = X_1, X_2, \ldots, X_N$ and the forward distance string $F = F_1, F_2, \ldots, F_N$, the forward distance string effectively being the summary of the "future" of the reference string. The OPT algorithm in itself is a stack algorithm induced by a priority list. Thus, considering the stack $Q_t$ and the priority list $L_t$ at time $t$, if $X_{t+1}$ is the next referenced page, its position $k$ in stack $Q_t$ is the OPT stack distance. This next referenced page is placed in the output string and on top of the Q stack. Items above this next referenced page are rearranged as follows: The priority for the displaced page and the page in the next position are compared. The page with the highest priority (lowest priority number) is placed in this position while the other page is displaced. This continues until the next page position is $k$, then the last displaced page is placed in this position.

The priority list L is updated as follows: All priorities which are less than or equal to the forward distance $F_{t+1}$ are reduced by one and the priority for the referenced page $X_{t+1}$ is $F_{t+1}$.

Referring back to the algorithm achieved according to the invention, there has been demonstrated informally hereinabove that the MMC-values can be generated in one pass. It has also been mentioned that these MMC values are, in fact, the OPT stack distance. However, in the numeral matrix algorithm, there can be maintained a sequence of OPT-stacks which are only partially filled in, as opposed to the two-pass OPT algorithm which has no gaps but wherein stacks are maintained for all times up to the present, because of the supplying by the first pass of all of the necessary information about the future.

The tabulation which now follows immediately hereinbelow is based on the example mentioned hereinabove (reference string) without the page A. In this tabulation, only eight consecutive references are employed. In order to conform with the OPT algorithm, the ∞ symbol is defined as the output associated with the first reference to a page. In the tabulation, in the $A_t$ and $B_t$ columns, only the most recent (n+1) columns, which are non-empty, are shown for times ($t$-n), (T-n+1), . . . , ($t$-1), $t$.

| Time $t$ | Page ref. $X_t$ | OPT. Stack Positions (former numeral matrix) | Available (free) position list, $A_t$ | Unassigned page list $B_t$ | Output $MMC_t$ |
|---|---|---|---|---|---|
| 1 | B | B 1 | 0 | 0 | ∞ |
| 2 | C | B 1<br>C — 1 | 2 | B | ∞ |

-continued

| Time $t$ | Page ref. $X_t$ | OPT. Stack Positions (former numeral matrix) | Available (free) position list, $A_t$ | Unassigned page list $B_t$ | Output $MMC_t$ |
|---|---|---|---|---|---|
| 3 | D | B 1<br>C — 1<br>D — — 1 | 22<br>3 | BB<br>C | ∞ |
| 4 | E | B 1<br>C — 1<br>D — — 1<br>E — — — 1 | 222<br>33<br>4 | BBB<br>CC<br>D | ∞ |
| 5 | D | B 1<br>C — 1<br>D — — 1 2 1<br>E — — — 1 | 2244<br>333<br>2 | BBBB<br>CCC<br>E | 2 |
| 6 | B | B 1 2 2 3 3 1<br>C — 1<br>D — — 1 2 1<br>E — — — 1 | 3444<br>22<br>3 | CCCC<br>EE<br>D | 3 |
| 7 | C | B 1 2 2 3 3 1<br>C — 1 3 4 4 4 1<br>D — — 1 2 1<br>E — — — 1 | 222<br>33<br>4 | EEE<br>DD<br>B | 4 |
| 8 | B | B 1 2 2 3 3 1 2 1<br>C — 1 3 4 4 4 1<br>D — — 1 2 1<br>E — — — 1 | 2244<br>333 | EEEE<br>DDD | 2 |

Previously hereinabove there was set forth the matrix updating procedure. There now follows an interpretation of this updating procedure utilizing the OPT-stack terminology. For example, when C is referenced at time 7, the row which is designated C is filled for times 3, 4, 5, 6 and 7. For $t$=3, the only available stack position, i.e., 3, is given to C. For $t$=4, the stack position 4 has to be given as the only available one. For $t$=5, the available set is 2,4 . Thus, 4 is assigned as the smallest of the set, but not smaller than the position assigned previously. Similarly, position 4 is selected for $t$=6 from the unassigned positions, i.e., 4, 2 and 3. For $t$=7, the stack position value of 1 is assigned to C because it is the referenced page at that time. The OPT stack distance for C is the last stack position 4, prior to the reference at $t$=7.

There now follows a formal structure which establishes that the one-pass algorithm provides the same output as the two-pass OPt algorithm as disclosed in the above-referred to Mattson et al paper. To revolve this formal structure, there are first extended notations which were previously employed. The numeral matrix appears now as a partial function $H_t$. The terms $A_t$ and $B_t$ previously employed, are now formally defined. The term $k$ is any stack position, the term $\gamma_\tau$ is the $\tau$-th element of a numeral string $S(\alpha)$, at time $t_\alpha$ , where $\alpha$ is a page again being referenced. The term [$a$, $b$] is the set of consecutive integers $a$, $a$+1, . . . , $b$-1, $b$; $a < b$.

The formal structure is as follows:

Define the sequence of partial functions $H_t$ recursively as follows:

$$H_1 = \{((1, x_1), 1)\}$$

Let it be assumed that $H_t$ has been defined.

Let $\Sigma_t$ be the set of pages referenced up to time $t$ and let $n_t$ be the number of pages in $\Sigma_t$.

Define $\wedge_t(\tau) = [1,n_t] - \{k \mid ]\, \alpha\epsilon\Sigma_t(\,(\tau,\alpha),k)\epsilon H_t\}$. $B_t(\tau) = \Sigma_t - \{\alpha \mid ]\, k\epsilon[1,n_t]\,((\tau,\alpha\geqq,k)\epsilon H_t\}$.

The string $S(\alpha)$ is defined to be the sequence $\{(\,(\tau,\alpha),\gamma_\tau)\, t_\alpha < \tau \leqslant t+\}$. Where $t_\alpha$ = last time $\alpha$ was referenced. (If this is the first time $\alpha$ is referenced $t_\alpha = 0$ and $\gamma_0 = \infty$). Also define $\gamma_{t_\alpha} = 1$ and $\gamma_{t+1} = 1$; $\gamma_\tau = \min\ \{k_\tau k \geqslant \gamma_{\tau-1}$ and $k\epsilon A_t(\tau)\}$ for satisfying $t_\alpha < \tau \geqslant t$. Then $H_{t+1} = H_t \cup S(\alpha)$. Using this definition of the sequence $H_t$, there can now be proved:

Theorem 1

If $(\tau,\alpha,k)\epsilon H_t$, then $k$ is the OPT stack position for page $\alpha$ at time $\tau$. This theorem follows from

Lemma 1: If $H_t$ gives the OPT stack stable at time t, then $S(\alpha)$ determines the OPT stack entries for $\alpha = x_{t+1}$ for all times since $\alpha$ was last referenced. Proof: If $\alpha$ was not previously referenced, then its OPT stack position for all $\tau < t+1$ is $\infty$, and for $\tau = t+1$, its position is 1. If $\alpha$ was last referenced at time $t_\alpha$, then its stack position at that time was 1. The position of $\alpha$ at each time $t_\alpha < \tau \leq t$ is determined in the OPT algorithms as follows: If $\alpha$ was at stack position $\gamma_\tau$ at time $\tau$, it will remain at position $\tau_\tau$ if $\gamma_\tau$ has not been assigned to any other page at time $\tau + 1$, i.e., $\gamma_\tau$ is in the set $A_t(\tau + 1)$. Otherwise, $\alpha$ will be displaced from position $\gamma_\tau$ if $\gamma_\tau$ has been assigned to some other page, (i.e., $\gamma$ and $A_t(\tau + 1)$). In this case, its stack position will be the first unassigned stack position which is greater than $\gamma_\tau$.

The OPT algorithm may be interpreted as follows:

A page $\alpha$ whose stack position is $\gamma_\tau$ at time $\tau$ will remain at that position at time $\tau + 1$ because 1. the stack position of the page referenced at time $\tau + 1$ is less than $\gamma_\tau$ (i.e., $\alpha$ is not challenged).

or 2. if $\alpha$ is challenged, it has a higher priority than all challengers for its position. But this can happen only if $\gamma_\tau$ has not been assigned to a page with higher priority. Suppose $\alpha$ is at stack position $\gamma_\tau$ at time $\tau$. Suppose the page $\beta$ is referenced at time $\tau + 1$ and is in position $\Delta_\tau$, then if $\gamma_\tau > \Delta_\tau$, $\alpha$ will remain in position $\gamma_\tau$. The stack positions for all pages with higher priority than $\gamma_\tau$, have already been determined (by the induction hypothesis). Thus $\alpha$ will be assigned the first available position which is $\geq \gamma_\tau$. A page cannot achieve a smaller stack position than its present value. In the contests for any given stack position, the positions for all pages with higher priority than $\alpha$ have already been assigned. Thus, $\alpha$ may compete for all stack positions $\geq \gamma_\tau$, and will win the first contest in which it has a higher priority. But this will happen only for stack positions which have not been assigned. Thus, the stack position for $\alpha$ at time $\tau + 1$ is given by min $\{k | k \geq \gamma_\tau$ and $k \epsilon A_t(\tau + 1)\}$.

Q.E.D.

In the definition of the partial functions, there were introduced the sets $A_t(\tau)$ and $B_t(\tau)$ for $\tau \leq t$.

These sets are used to establish the connection to the one pass OPT algorithm. First there are listed some properties of $A_t(\tau)$ and $B_t(\tau)$.

1. $B_t(\tau) \subseteq B_t(\tau + 1)$

2. $A_t(\tau) \leq A_t(\tau + 1)|$

3. $A_t(\tau) = B_t(\tau)$

4. $A_t(\tau) < A_t(\tau + 1)| \longrightarrow A_t(\tau + 1) = A_t(\tau) v\{k\}$.

5. $|A_t(\tau)| = A_t(\tau + 1)| \longrightarrow A_t(\tau + 1) = (A_t(\tau) - \{j\}) v\{k\}$

6. (*a*) $A_t(t) = [2,n_t]$ (*b*) $B_t(t) = \Sigma_t - \{x_t\}$.

If $\alpha$ has been previously referenced

7. $A_{t+1}(\tau) = A_t(\tau) - \{\gamma\}$

8. $B_{t+1}(\tau) = B_t(\tau) - \{\alpha\}$ for $t_\alpha < \tau \leq t$

If $\alpha$ has not been previously referenced then $\Sigma_{t+1} = \Sigma_t v\{\alpha\}$ and $n_{t+1} = n_t + 1$

9. $A_{t+1}(\tau) = A_t(\tau)$ $1 \leq \tau \leq t$

10. $B_{t+1}(\tau) = B_t(\tau)$ $1 < \tau < t$

Definition of the L and P stacks

The L and P stacks are obtained from the sets $A_t(\tau)$ and $B_t(\tau)$, $\tau \geq t$ as follows:

Define $t_i$ and $\alpha_i$ for $i = 1, \ldots, n$ by the formulas $t_i = \min\{S| \ |B_t(S)| = i\}$ $i = 1, \ldots, n$ $\alpha_i \epsilon B_t(t_i) - B_t(t_i - 1)$ $i = 1, \ldots, n\text{-}1$ $\alpha_n \epsilon \Sigma_t - B_t(t_{n-1})$ It is to be noted that $\alpha_n$ is the page referenced at time $t$. For each $i = 1, \ldots, n\text{-}1$, let $S(\alpha_i)$ be the string adjoined to the partial function $H_t$ after the strings $S(\alpha_1), \ldots, S(\alpha_{i-1})$ have been adjoined and define $S^1(\alpha_i)$ to be the string $S(\alpha_i)$ truncated at time $t$. Thus $S^1(\alpha_i) = \{(j,\alpha_i,\gamma_j) \mid (j,\alpha_i,\gamma_j) \epsilon S(\alpha_i) \text{ and } j = t_i, \ldots, t\}$.

Let $X_t$ be the set $[1,t] \times \Sigma_t \times [1, n]$ *and* $G_t = X_t - H_t$.

Then $$G_t = \bigcup_{i=1}^{n-1} S^1(\alpha_i).$$

Define $P_t$ to be the set of integers $[1,n_t]$ in the order induced by the strings $S^1(\alpha_i)$. Thus $P_t(1) = 1$ $P_t(j) = k$ if and only if $(t,\alpha_{n-j+1},k)\epsilon S^1(\alpha_{n-j+1})$ for $j = 2, \ldots, n$ Also define $L_t$ to be the set of pages $\Sigma_t$ in the order induced by the sequence $\alpha_1, \ldots, \alpha_n$, i.e., in LRU order. Thus $L_t(j) = \alpha_{n-j+1}$ for $j = 1, \ldots, n$ With these definitions, there are now provided the following lemmas.

Lemma 2: If $\alpha_K \epsilon \Sigma_t$ is referenced at time $t + 1$, the output $\gamma_K$ is given by the formula $\gamma_K = \min\{k | \exists j\ (t,\alpha_j,k)\epsilon S^1(\alpha_j) \text{ and } j \leq K\} = min$ $\{P_t(j) | j \geq n - K - 1$

Lemma 3: If $P_t$ and $L_t$ correspond to the pairs $A_t$ and $B_t$, and $\alpha_K \epsilon \Sigma_t$ is the next page referenced, then the stacks $P_{t+1}{}^1$ and $L_{t+1}{}^1$ updated by the one pass OPT procedure are the same as the stacks $P_{t+1}$ and $L_{t+1}$ corresponding to the pairs $A_{t+1}$ and $B_{t+1}$.

These two lemmas establish the equivalence of the one pass OPT to the two pass OPT algorithms. This follows because for any input, the same output is obtained and the updated stacks $P_{t+1}{}^1$ and $L_{t+1}{}^1$ correspond to the partial function $H_{t+1}$.

Prior to describing the structure of the system according to the invention, it is convenient at this point to make certain observations of the invention's operation. Thus:

1. The operation of the system is a continuous process and produces the string of MMC values directly from the input without requiring look-ahead.

2. The totality of information to be stored is a table, the number of elements in the table being equal to the program size under page measure.

3. Many steps of the total operation can be conceived of as parallel operations, employing an associative memory for example.

4. The system enables on-line operation thereby eliminating the need for recording the reference string.

The computer type in which the system is most advantageously utilized is a "virtual" or "paging" machine. Accordingly, a viable replacement algorithm is beneficially employed since not all of the pages of a program which is being tested will be in main store. Thus, conceptually, the table in the system for implementing its operation, i.e., the p-stack, can consist of two parts, viz. a first or upper part having as many entries as there are page frames in main store. However, if as is usually the case, the program is larger than main store capacity therefor, the remaining, i.e., second (overflow) part of the table can be stored in back up store or in a protected area of main memory. When a true page exception occurs, the contents of the two parts of the table can be updated to reflect the new memory contents.

In accordance with the invention, an LRU (least recently used) criterion is utilized to effect the actual page management in a virtual machine. This enables the use of the above-mentioned partitioning of the table of the system since only those pages which are in main memory, i.e., occupying page frames, need have corresponding entries in the p-stack, the latter stack being updated at the data processing rate. With this arrangement, the portion of the system effecting the operation of the *M*-operator described hereinabove can operate at CPU speed and need only be large enough to represent only pages occupying main memory frames.

In the embodiment described hereinbelow, the LRU stack provided therein has been disclosed in the publication of W. F. Beausoleil, D. T. Brown, and D. E. Phelps, "Magnetic Bubble Memory Organization," IBM Journal of Research and Development, November 1972. Thus, the invention in its broadest form entails the adding on of the *M*-operator blocks which in turn extract the MMC (minimum memory capacity) string. In the embodiment, it is assumed that the environment, i.e., the data processing apparatus is a virtual machine whereby the pseudo OPT stack wherein there are contained the integers representing the minimum memory capacities (MMC) of the respective pages of the page reference string is partitioned into two components. The first component is constituted by a quantity of registers, *m*, which equals in number the amount of pages of the program which can be accommodated in primary storage and a second component wherein the page names and the MMC associated therewith (either *n-m* page names or all *n* page names of the program) are stored in some other location in the storage of the data processing apparatus such as secondary storage or a protected area of primary storage. Correspondingly, the LRU stack is similarly partitioned, i.e., a first portion of the LRU stack is constituted by a group of registers which are equal in number to the number of pages, *m*, of the program which can be accommodated in primary storage and a second portion wherein the page names and the LRU values associated therewith are in secondary storage or in some other protected area. The quantity of registers constituting the first portion of the LRU stack is equal to the quantity of registers constituting the first portion of the pseudo OPT stack. Of necessity, in the operation of the system, with *n* pages in the program, the page names in the first portion of the LRU stack at any given time, include those having LRU values of 1 to *m* and the page names in the second portion of the LRU stack and their associated LRU values include the LRU values of $m+1$ to *n*.

Since in the operation of the invention the first portion of the pseudo OPT stack does not include all of the MMC values, the other values being at some other location in storage, to enhance the simplicity and speed of operation of the invention, rather than finding the smallest MMC value below the position of the saved LRU position as set forth in the description of the algorithm hereinabove, there is instead generated the smallest missing number of those numbers to be found in position 2 to the position just above the saved LRU position. This generated smallest missing number is the lowest minimum memory capacity value which is desired and which is placed in the second position of the pseudo OPT stack with the rearranging of the other positions in the latter stack as has been described in the explanation of the algorithm and as will be described in the description of the embodiment.

Thus, the operation of the embodiment can be described in outline form as follows:

1. The *M*-operator dynamically orders all page strings to reflect the order of past references.
   a. If the page next referenced is in the LRU stack, the stack position *k* of the referenced page is presented to the *M*-operator.
   b. Otherwise, a page fault is generated. The page frame with the highest LRU-value changes content. An I/O operation is initiated and a program resident in storage is executed to update the entire information for the *M*-operator.
2. The *M*-operator effects the generation of the smallest missing number.

Reference is now made to FIG. 1 wherein there is shown a block diagram which depicts the inventive concept. In this FIG., the portion within the dashed block is intended to depict the data processing apparatus 1 which is operated as a paging machine and the *M*-operator which is the add on device, i.e., the invention. The data processing apparatus includes a central processor unit 2 which is suitably a general purpose computer which is programmable to effect those operations generally within a general purpose computer's capabilities. The data processing apparatus is shown as including the primary storage 3 and secondary storage 4 which intercommunicate with each other for exchanging, suitably via a data channel, stored information and which intercommunicate with CPU 2. To effect the exchange of information between primary storage 3 and secondary storage 4, there is provided a stage legended "programmable means for effecting page swap." Although this stage is presented as a separate entity, actually, it is intended to depict that means are contained within the data processing apparatus such as a channel or within CPU 2 which effects the execution of the I/O operation between primary and secondary storage. The stage designated 6 and legended "programmable means for updating LRU list" is also utilized as is stage 5 and is actually part of the data processing apparatus which is programmed to effect the operation set forth in the legend. Similarly, stages 7 and stage 8 which are legended "programmable means for updating OPT list" and "programmable means for handling page exception in OPT list" are included in the block diagram in FIG. 1 for the same reasons as the inclusion therein of stages 5 and 6, stages 7 and 8 also being structures in the data processing apparatus which are programmed to effect the operation set forth in their respective legends. In the diagram, stages 5, 6, 7 and 8 are shown as being controlled by CPU 2.

Stage 9 which is headed *L*-operator is shown as comprising two portions, i.e., a partial LRU list 11 and a portion 13 legended "remainder of LRU list." Portions 11 and 13 constitute the LRU list, portion 11 being in hardware means such as a stack of registers and portion 13 being located at some location in the storage of the data processing apparatus. As is recalled, the LRU list is a list of all of the page names in the program and the LRU weighting integers respectively associated with the pages. Thus, if it is assumed that there are n pages in the program, then according to the least recently used or LRU criterion, each of these pages will have an LRU weighting of a different discrete value among the values of 1 to $n$. Where the LRU list is divided into portions 11 and 13 as shown in FIG. 1 wherein portion 11 is the stack portion, then portion 11 is chosen to be capable of containing at least as many page names m and their associated LRU weighting integers as the amount of pages of the program that can be accommodated in primary storage 3. Also, if there are only $m$ out of $n$ names of pages contained in portion 11, then as will be further explained hereinbelow, the LRU weighting integers associated with the respective pages have the values included in the values of 1 to $m$, the remainder of the LRU list in storage constituting (n-m) page names which take the different discrete LRU values included within $(m+1)$ to $n$.

The stage 19 headed $M$-operator is the pseudo "OPT" list and associated circuitry. This list is shown as comprising a first component 15 which is legended "partial pseudo 'OPT' list". Portion 15 of the "OPT" list is contained in hardware and comprises a register stack, the registers forming ordered sequence of addresses 1 to m, there being present at each address, i.e., in each register, the name of the page and its associated MMC or OPT stack distance as determined by the OPT stack algorithm. The names of the pages in the portion 15 of the pseudo "OPT" list are those which are also present in the hardware portion 11 of the LRU list.

Component 17 of the OPT list can either be the remainder of the pseudo "OPT" list in storage, i.e., comprising the names and MMC integers at address positions $(m+1)$ to $n$, which are the remaining page names and their associated OPT stack distances. Alternatively, component 17 may be a total pseudo "OPT" list, i.e., containing 1 to n address positions, at each of these address positions, there being a page name and its associated OPT or MMC integer.

In the operation of the invention, when the next reference is issued from CPU 2, in the event that the page name and its associated LRU integer is present in the hardware portion 11 of the LRU list, then address position, $l$, is a conceptual dividing point of the partial pseudo "OPT" list 15, i.e., the latter is divided into address positions 1 to $(l-1)$ and $l$ to m. In the operation of the $M$-operator, the following operations occur. 1. The address $k$ among the addresses $l$ to $m$ is ascertained.

2. There are marked within the addresses included in the group $l$ to $(k-1)$ the following series of addresses, viz. $(l+a)$, $(l+b)$, $(l+c)$, ..., to $(k-1)$ if necessary, wherein $(l+a)$ is the smallest address value greater than $l$ such that $C(l+k) < C(l)$, wherein $(l+b)$ is the smallest address value greater than $(l+a)$ such that $C(l+b) < C(l+a)$, etc. wherein $C(i)$ is the value of integer, C, at address $i$.
3. The smallest missing number in the numbers included in 2 to $(C_{max}+1)$ wherein $C_{max}$ is the largest value integer, C, at addresses 2 to $(l-1)$ is generated.
4. The MMC or OPT integers at addresses 2 to $(l-1)$ are shifted down one address, i.e., these integers respectively now are at addresses 3 to $l$.

5. The generated smallest missing number is placed at address 2.
6. The MMC or OPT integers in the series of marked addresses are respectively shifted into the next address in the series, the integer in the highest value address in this series being shifted into address $k$, the integer originally at address $k$ being discarded.

The generated smallest missing number is the MMC or OPT stack number for the referenced page.

It is apparent that, when the name of the referenced page is present in portion 11 of the LRU list or portion 15 of the OPT list, the updating of the portion 15 may result in a duplication of an MMC or OPT value in the total OPT list in storage. Such list can be continually updated to eliminate these duplications or preferably the list can be updated at the time of a page exception when the total OPT list has to be addressed. There follows, therefore, a description of the operations which occur when a page exception arises, page exception being calling for a page of the program which is not in primary storage.

When such page exception occurs, programmable means for effecting the page swap 5, i.e., the page swap program is invoked, and exchange takes place between primary storage 3 and secondary storage 4 wherein the least recently used page in primary storage is placed into secondary storage and the called for page is placed into primary storage.

At the time of the occurrence of the page exception, the programmable means for updating the OPT list 7 is actuated, i.e., a program is invoked which renders the total OPT list in storage consistent, i.e., duplicate MMC or OPT integers are eliminated.

The programmable means for updating the LRU list 6 is actuated upon the occurrence of the page exception and the updating of the LRU list, i.e., the program is invoked which transfers the page name of the page placed into secondary storage into the remainder of the LRU list portion 13 where it is assigned the LRU value of $(m+1)$. The name of the called for page is placed into the hardware portion 11 of the LRU list and is assigned the LRU value of 1. Those pages in hardware portion 11 of the LRU list which had the LRU weighting of 1 to $(m-1)$ prior to the occurrence of the page exception, at this juncture have their LRU values respectively incremented by 1 to constitute the LRU weightings 2 to $m$. Concurrently, those pages in remainder of portion 13 of the LRU list which prior to the page exception had the LRU waitings of $(m+1)$ to the weightings one less than the weightings of the called for page respectively have their LRU weightings incremented by 1.

There is now actuated the programmable means for handling page exceptions in the OPT list in storage. With such OPT list in storage now brought into consistency, the total OPT list is addressed at its address position having the same value as the LRU weighting associated with the called for page prior to its being transferred to primary storage. Thereafter, there is carried out the operations on the total OPT list, the same operations as described hereinabove in connection with portion 15 of the OPT list where the referenced page name was present therein. After these operations have been performed on the OPT list in storage, there now remains the transferring of the information at address positions 1 to $m$ in the OPT list in storage to the hardware portion 15. After this operation is performed, both the LRU list and the OPT list both in hardware and in storage are completely up-to-date and conditioned for the referencing of the next page.

Hardware portion 11 of the LRU list may suitably comprise a stack of at least m registers, each of said registers being capable of at least containing the quantity of *m*. Hardware portion 15 of the pseudo "OPT" list may also suitably comprise a series of at least m registers in an ordered sequence, each of said registers being capable of containing the quantity of at least *n*, and means associated with the latter registers for enabling the shifting of the contents of one register to another.

There follows hereinbelow a description of the structure and operation of a preferred embodiment constructed in accordance with the principles of the invention. In this description, reference is first made to FIGS. 2A to 2V, taken together as in FIG. 2, wherein this embodiment is depicted in essentially block form.

Figure 2:
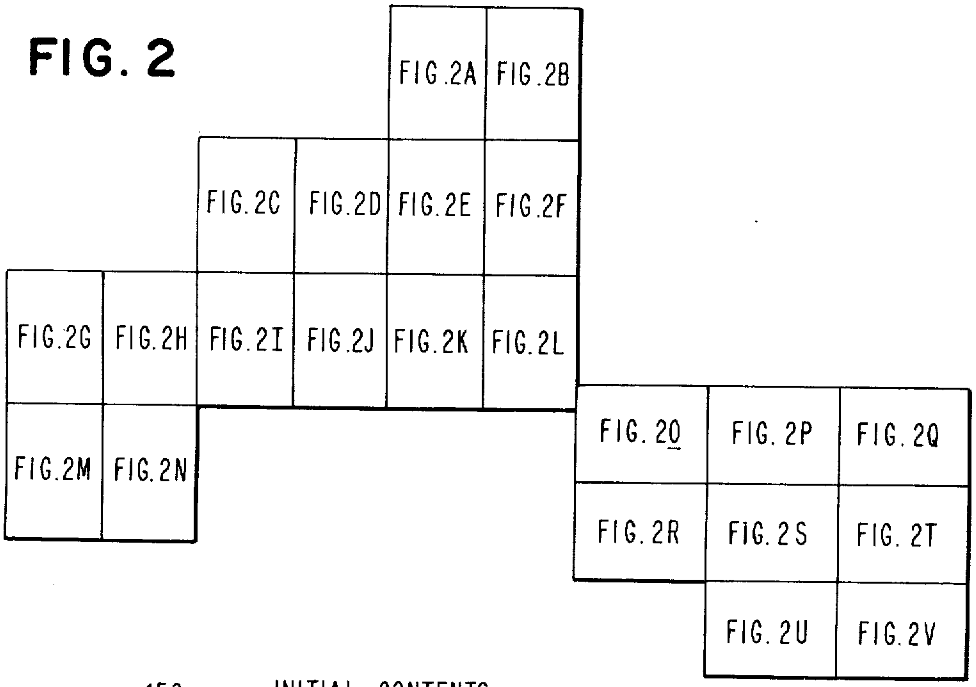
FIGS. 2A to 2V, taken together as in FIG. 2, is a block diagram of preferred embodiment constructed in accordance with the principles of the invention.
Figure 2A:
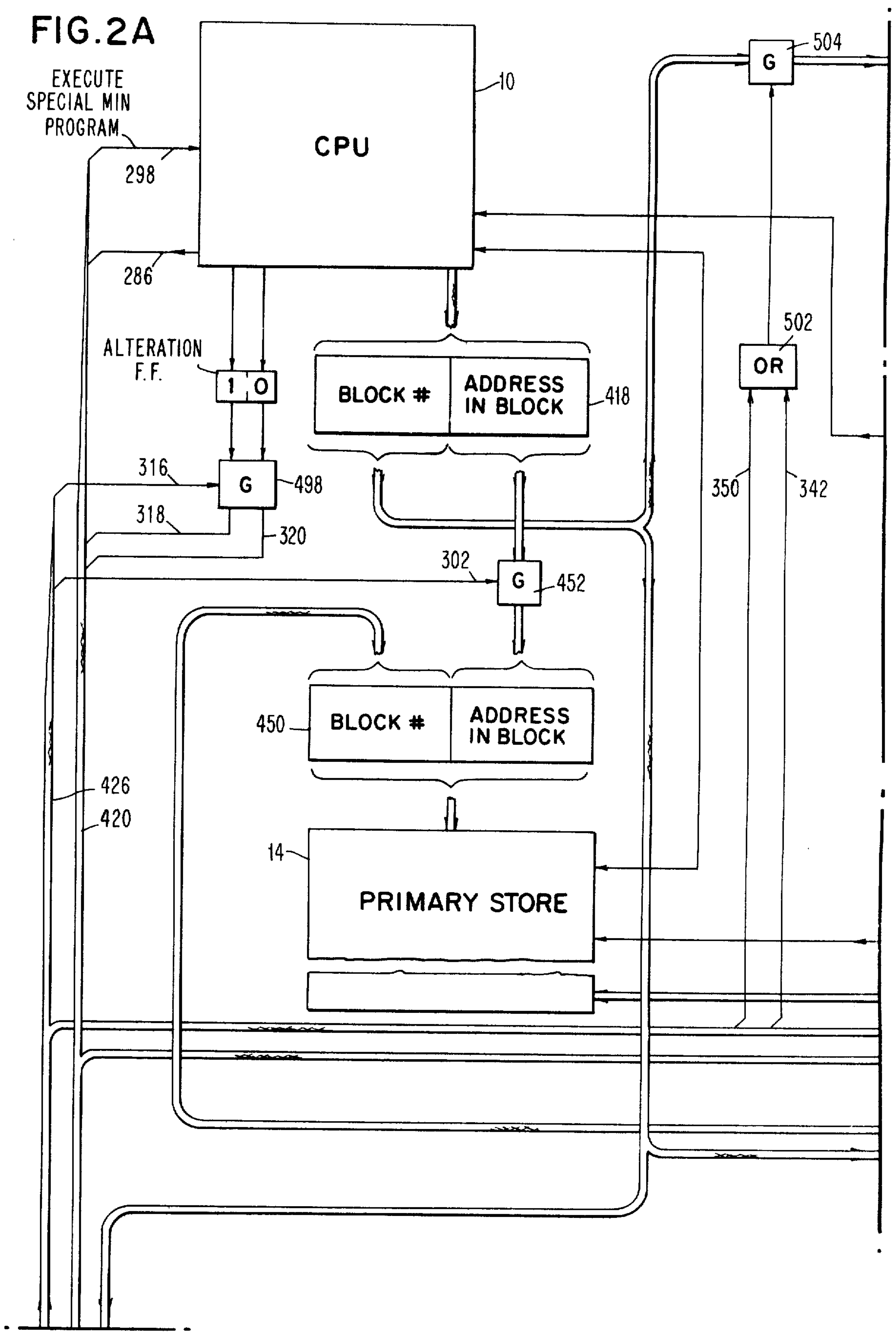
Figure 2B:
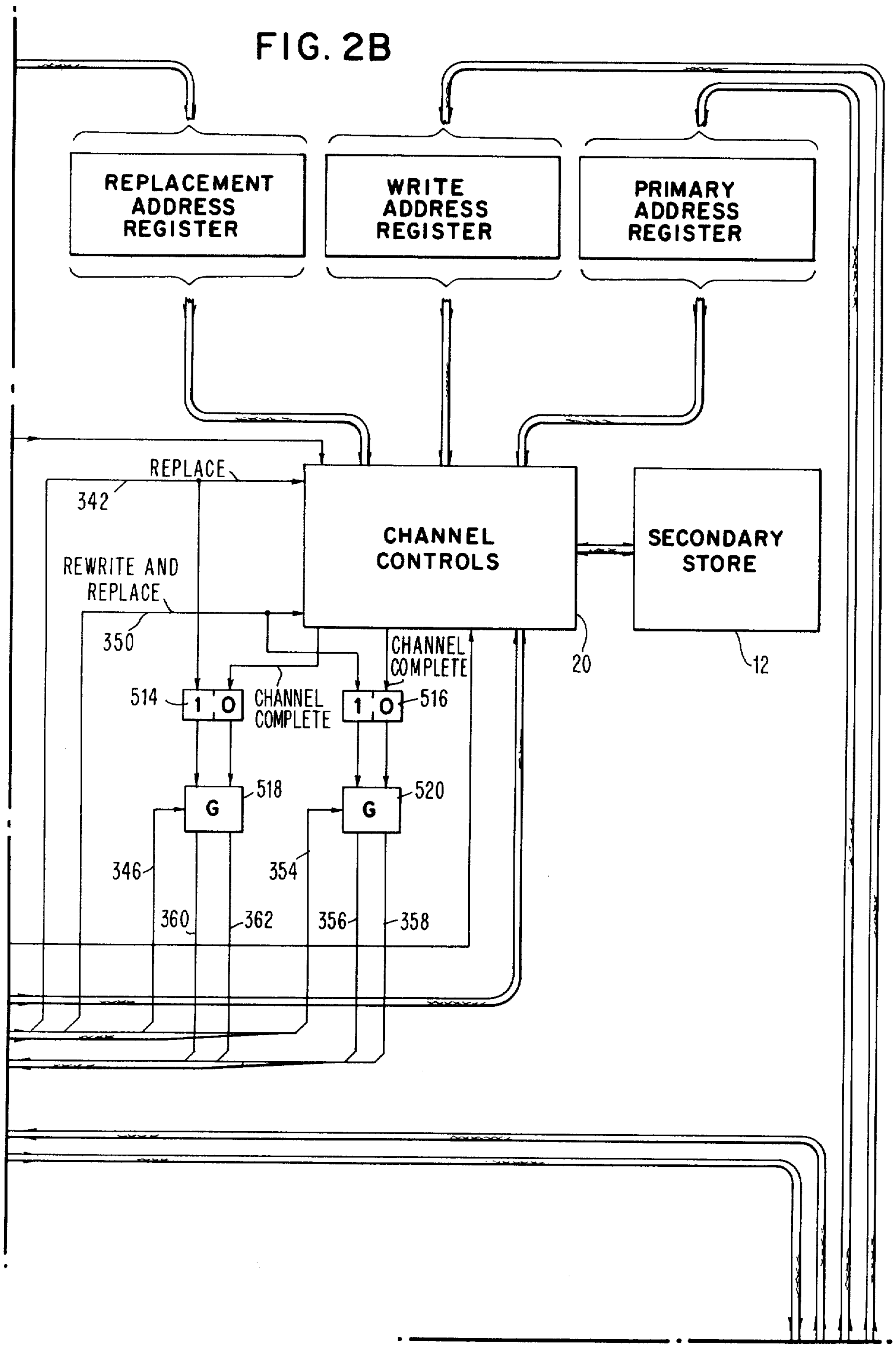
Figure 2C:
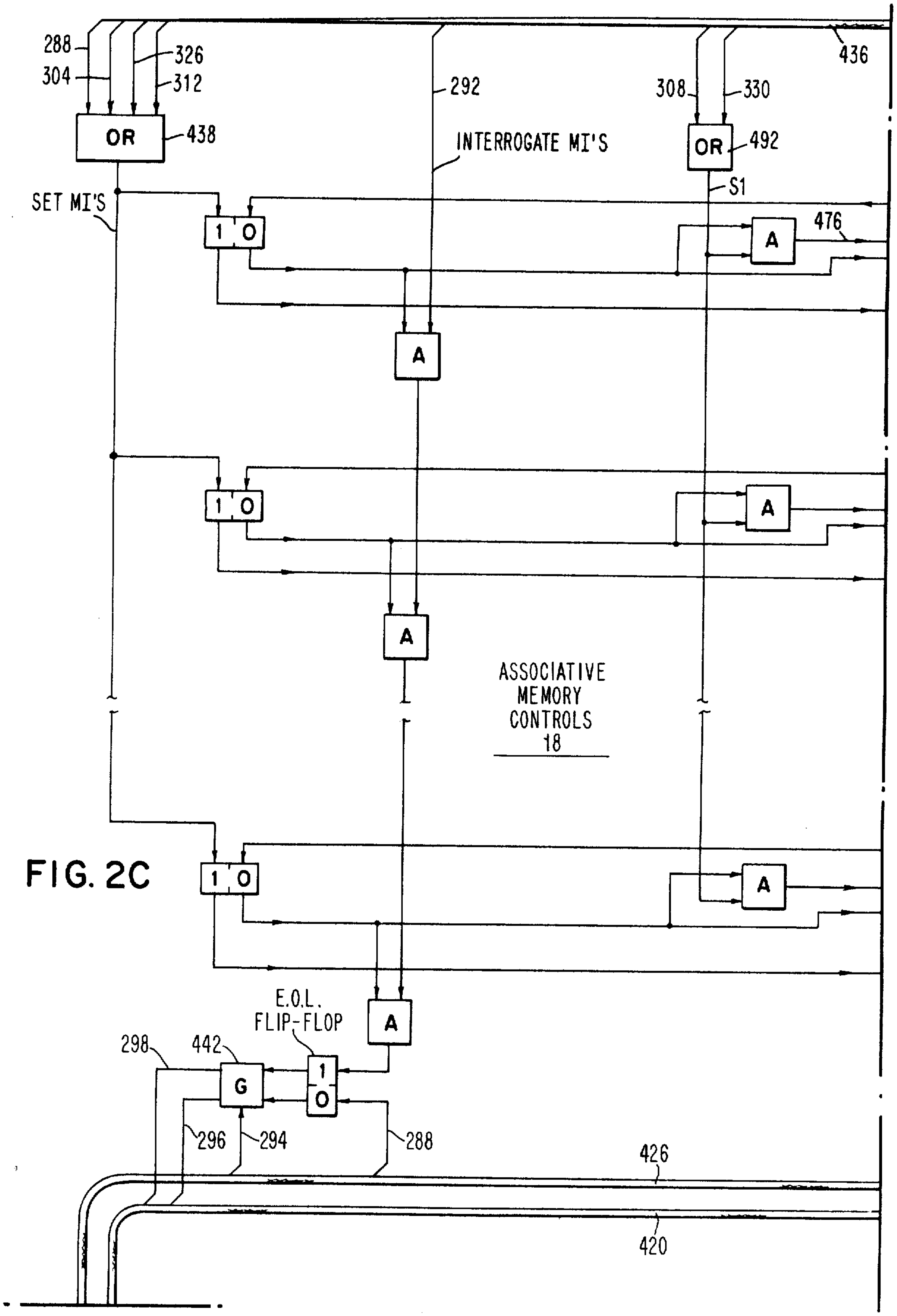
Figure 2D:
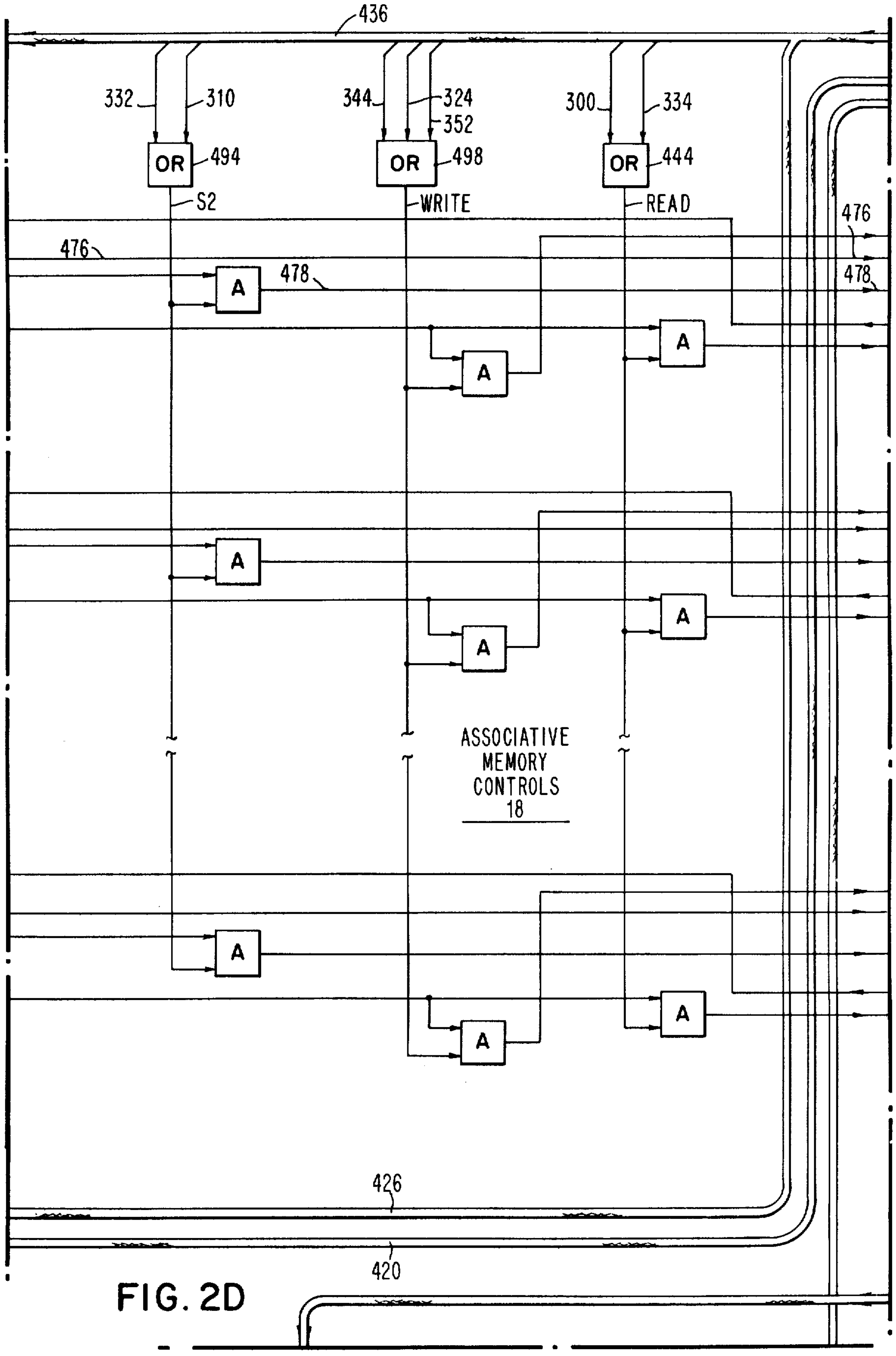

The invention is employed in conjunction with a computer and accordingly there is shown a CPU 10 (FIG. 2A), a large capacity secondary store 12 (FIG. 2B) and a high-speed, low-capacity primary store 14 (FIG. 2A). Secondary store 12 which may be a disk file, for example, is connected to primary store 14 through a channel 20 (FIG. 2B). Channel 20 includes a variety of controls and may for example be a channel such as provided in the computers manufactured by the IBM Corporation and designated numbers 360 and 370. Channel 20 is the type of device which, in addition to its other capabilities, can perform required buffering and control functions. Channel 20 accepts serially applied information from secondary store 12, assembles the bits into words, and applies these words in parallel to primary store 14. Channel 20 is also capable of accepting words in parallel from primary store 14 and of applying the bits thereof serially to secondary store 12. Channel 20 also suitably contains control circuitry for incrementing the addresses from which information is being taken or to which information is being applied and for indicating when the transfer of a block of information has been completed. An associative memory generally designated by the numeral 16 is provided (FIGS. 2E and 2F) which has an entry for each of the block positions in primary store 14. Each of these entries contains five fields which as will be further explained hereinbelow are illustrated in memory data register 446 (FIGS 2K and 2L). These fields from left to right are a one bit A field (alteration field) which is set when the corresponding block in primary store 14 has its contents altered; a one bit R (reference) field which is set each time the corresponding block in primary store 14 is utilized and is reset when all of the entries in associative memory 16 have their R field set; and ID field which identifies the program in CPU 10 in which the block in the associated position in primary store 14 is associated with; the block address in secondary store 12 for the block in the corresponding block position in primary store 14; and the block address in primary store 14 which the entry corresponds to. The rightmost field of each entry in associative memory 16 may be read only; the other fields in associative memory 16 are altered from time to time.

Figure 2E:
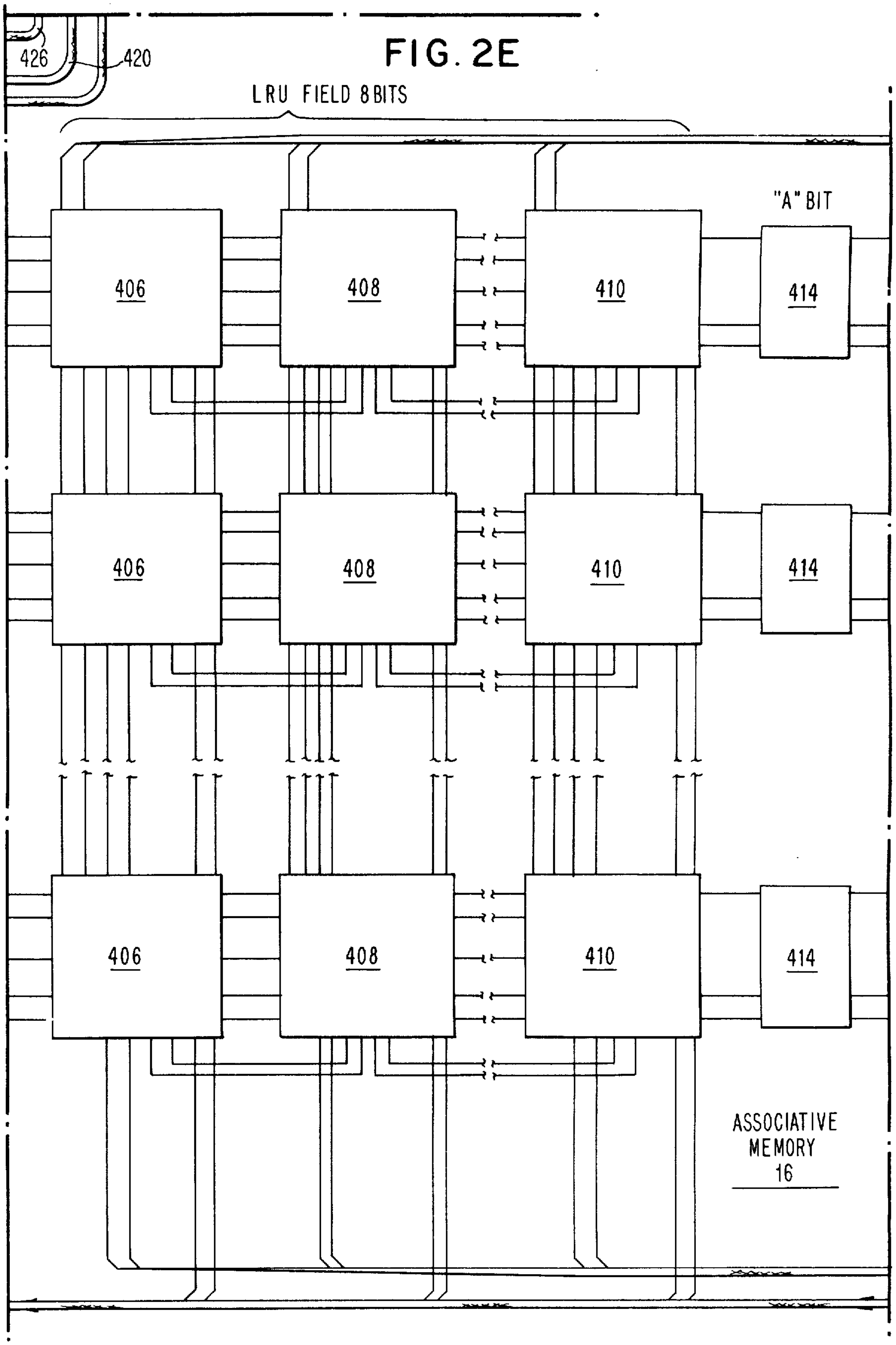
Figure 2F:
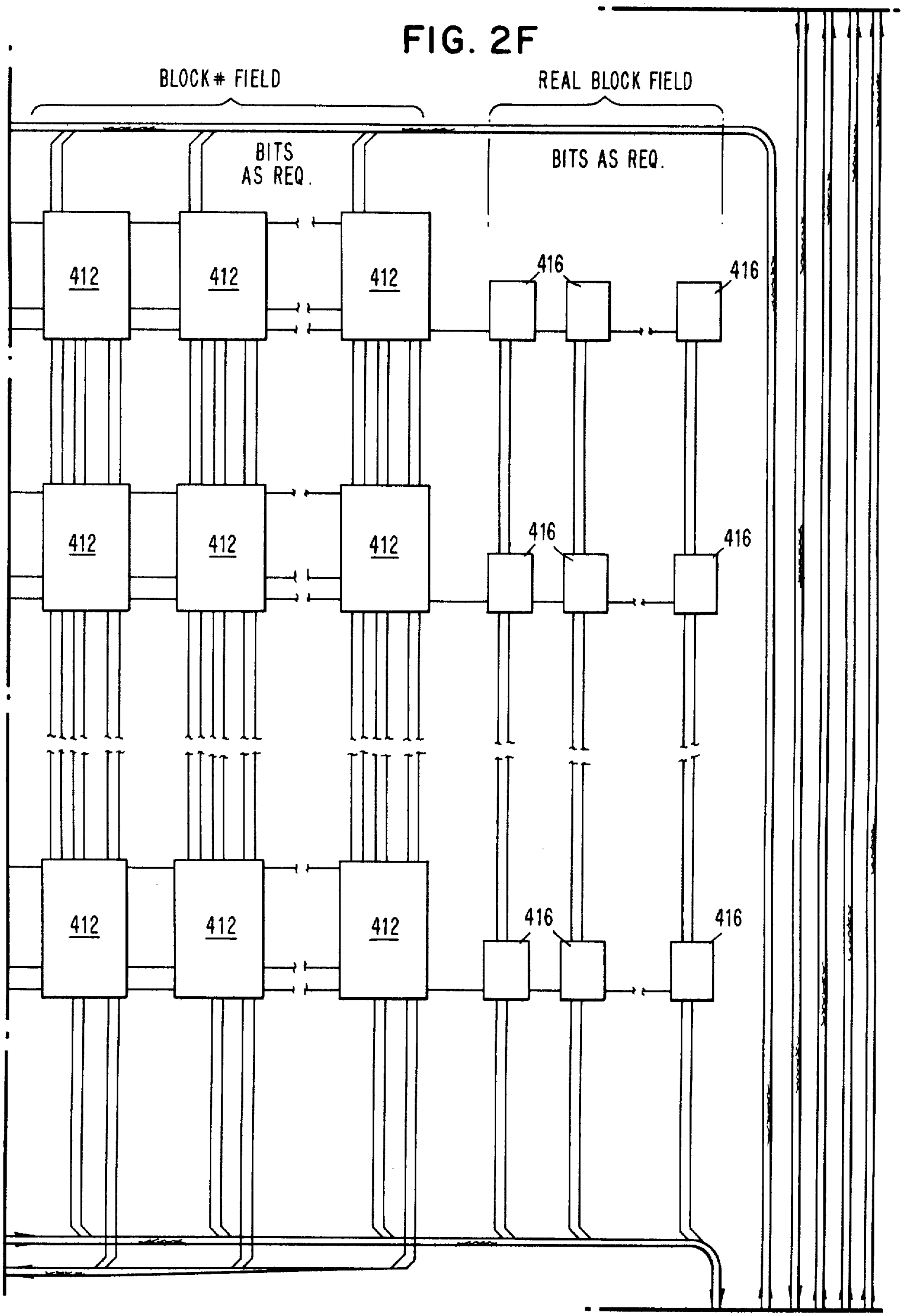
Figure 5:
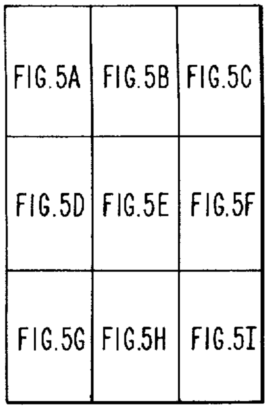
FIGS. 5A to 5I, which are taken together as in FIG. 5, are identical to FIGS. 4A to 4I of FIG. 4, there being traced in this FIG. the circuits through the MIN box in performing the second phase of the arithmetic example shown in FIG. 9.

Referring to FIGS. 2E and 2F wherein there is shown the associative memory, those elements designated by the numeral 412 may suitably be the same as those disclosed in FIG. 5 of U.S. Pat. No. 3,317,898 to H. Hellerman for "Memory System," issued May 2, 1967 and assigned to the assignee of this invention, i.e., the IBM Corporation. Those elements designated with the numeral 412 are associative memory read/write storage elements. The memory elements designated with the numeral 414 in associative memory may also suitably be units such as depicted in FIG. 5 of the above referred to Hellerman patent but need not contain the associative feature. This is because they are utilized merely as read and write storage elements. The memory elements in associative memory 16 designated with the numeral 416 may suitably be the same as those disclosed in FIG. 8 of the above referred to Hellerman U.S. Pat. No. 3,317,898.

Continuing further with the description of FIG. 2, that portion contained in FIGS. 2G to 2J constitute the argument register and argument mask 22. The circuitry and controls associated with the associative memory data register 446 are generally found in FIGS. 2J to 2L. That portion of associative memory 16 legended LRU field constitutes the LRU box, the LRU (least recently used) criterion being employed in the embodiment. The remainder of associative memory 16 in FIGS. 2E and 2F may suitably be termed the "mapping device."

Figure 2G:
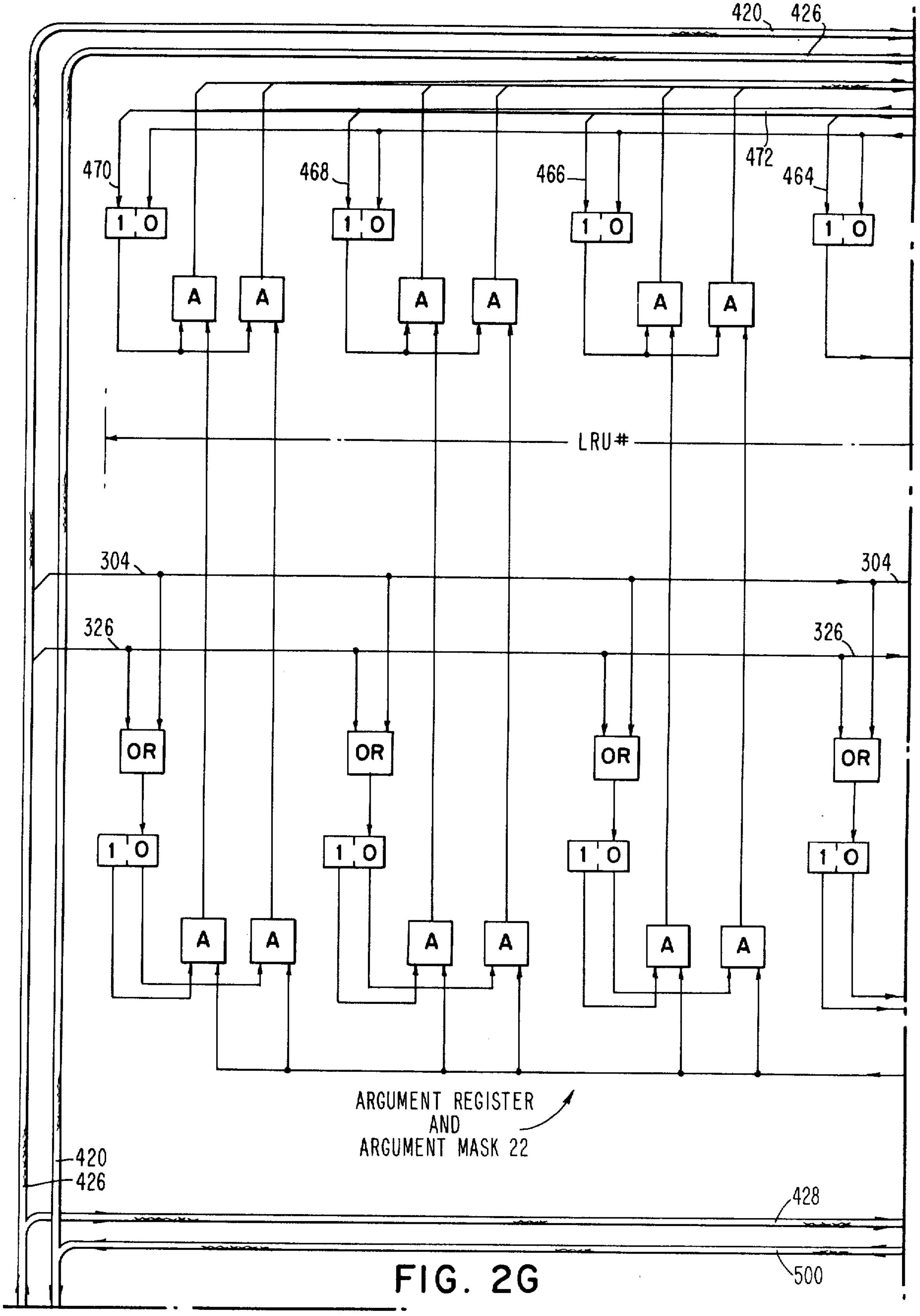
Figure 2H:
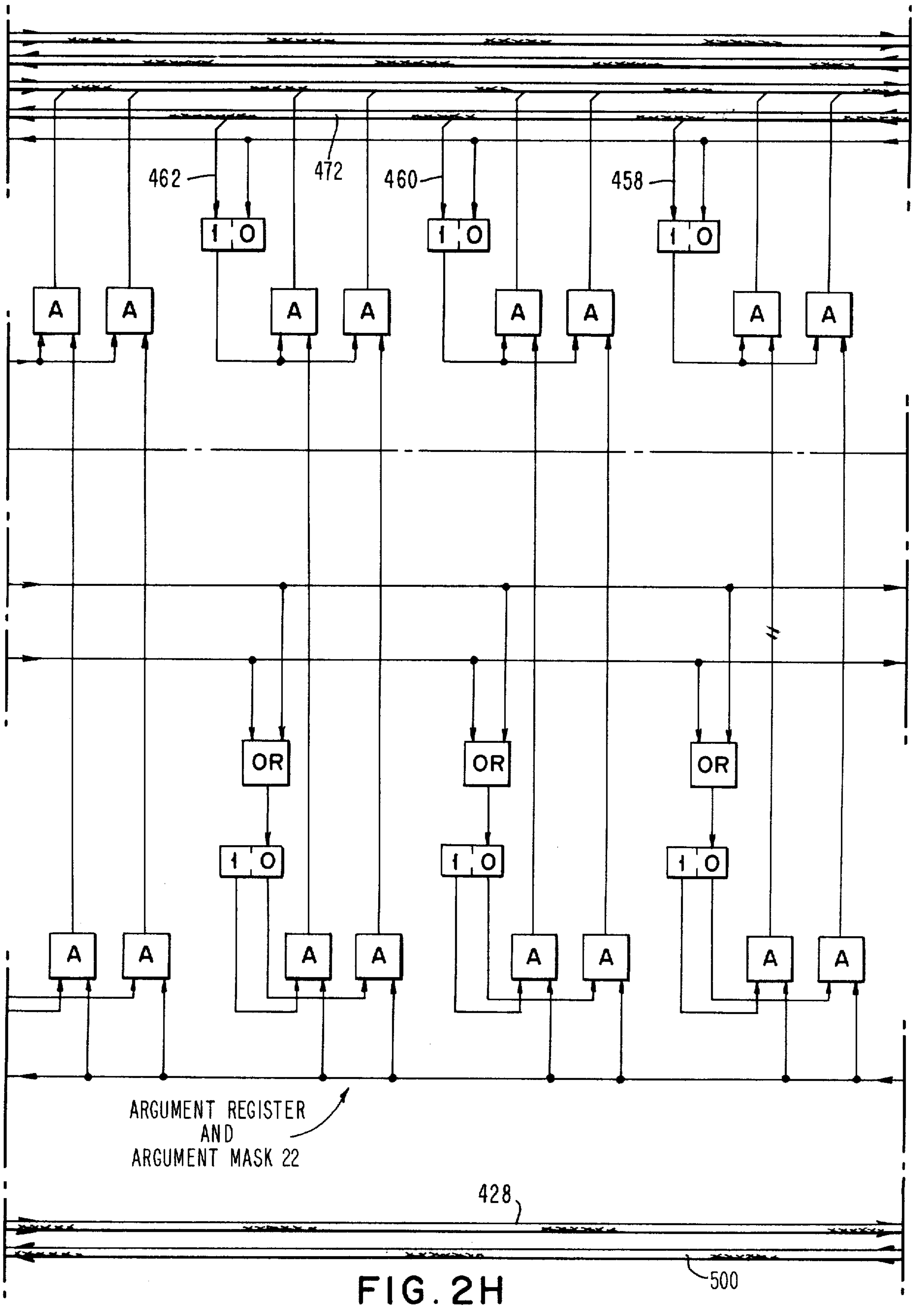
Figure 2I:
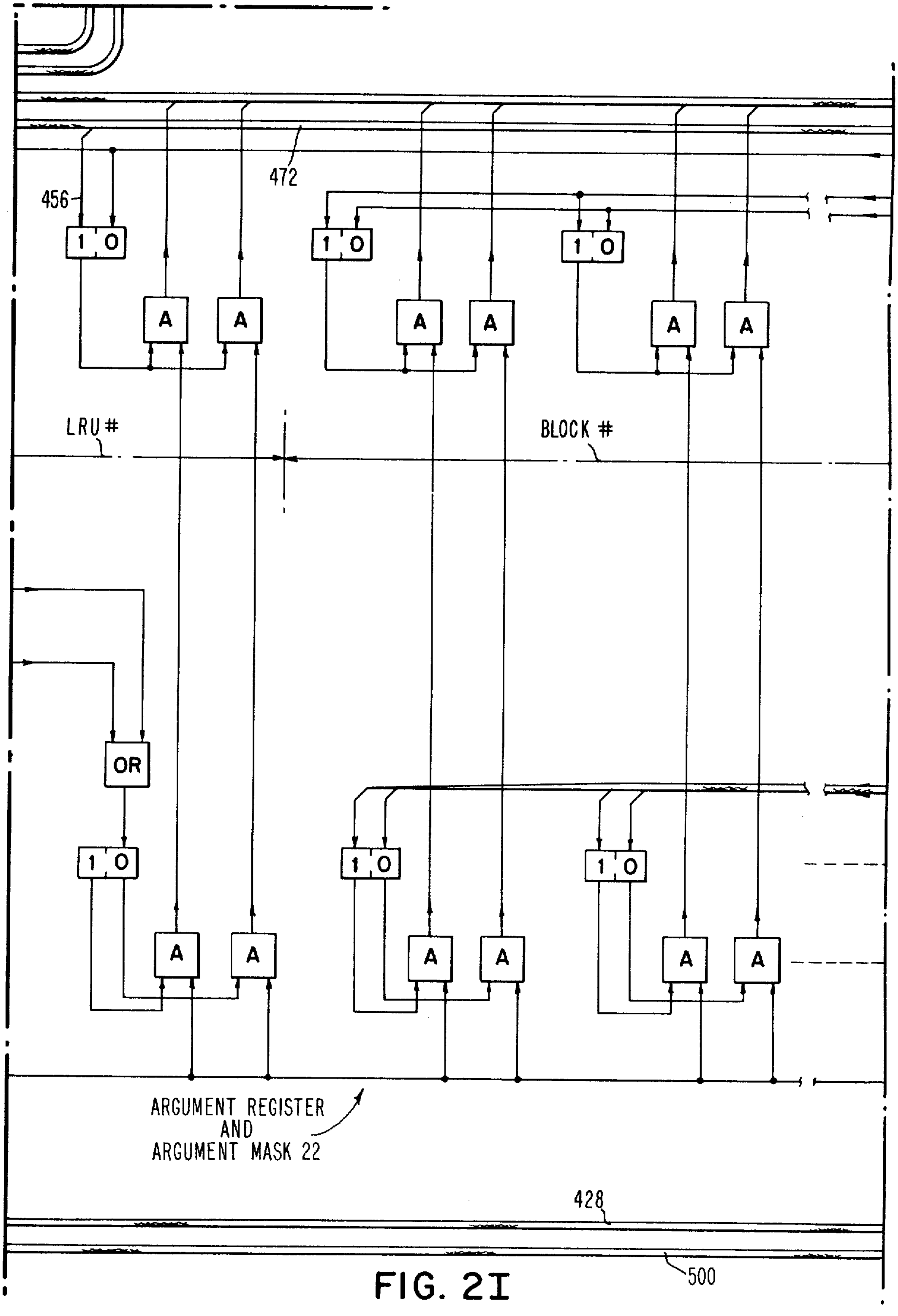
Figure 2J:
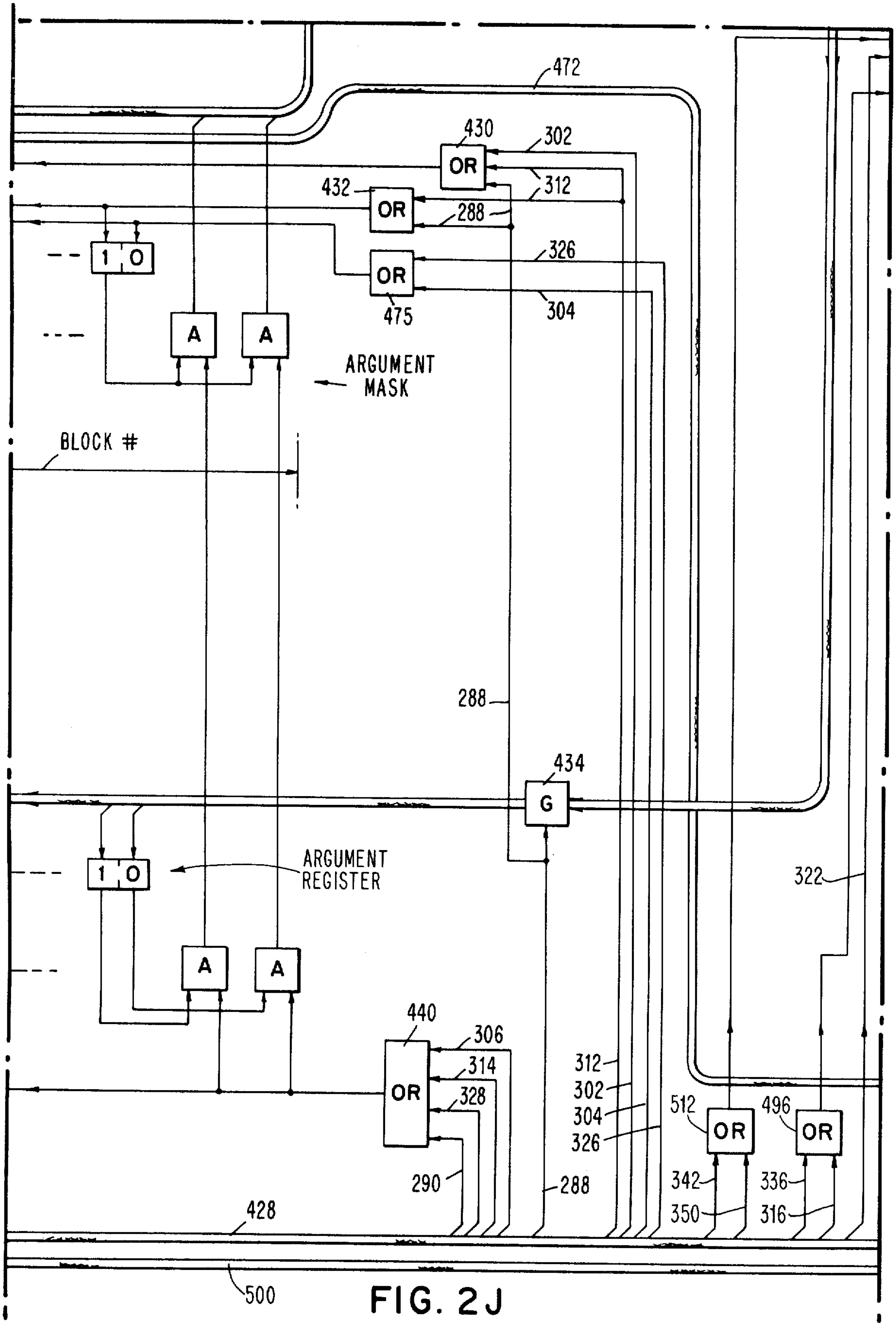
Figure 2K:
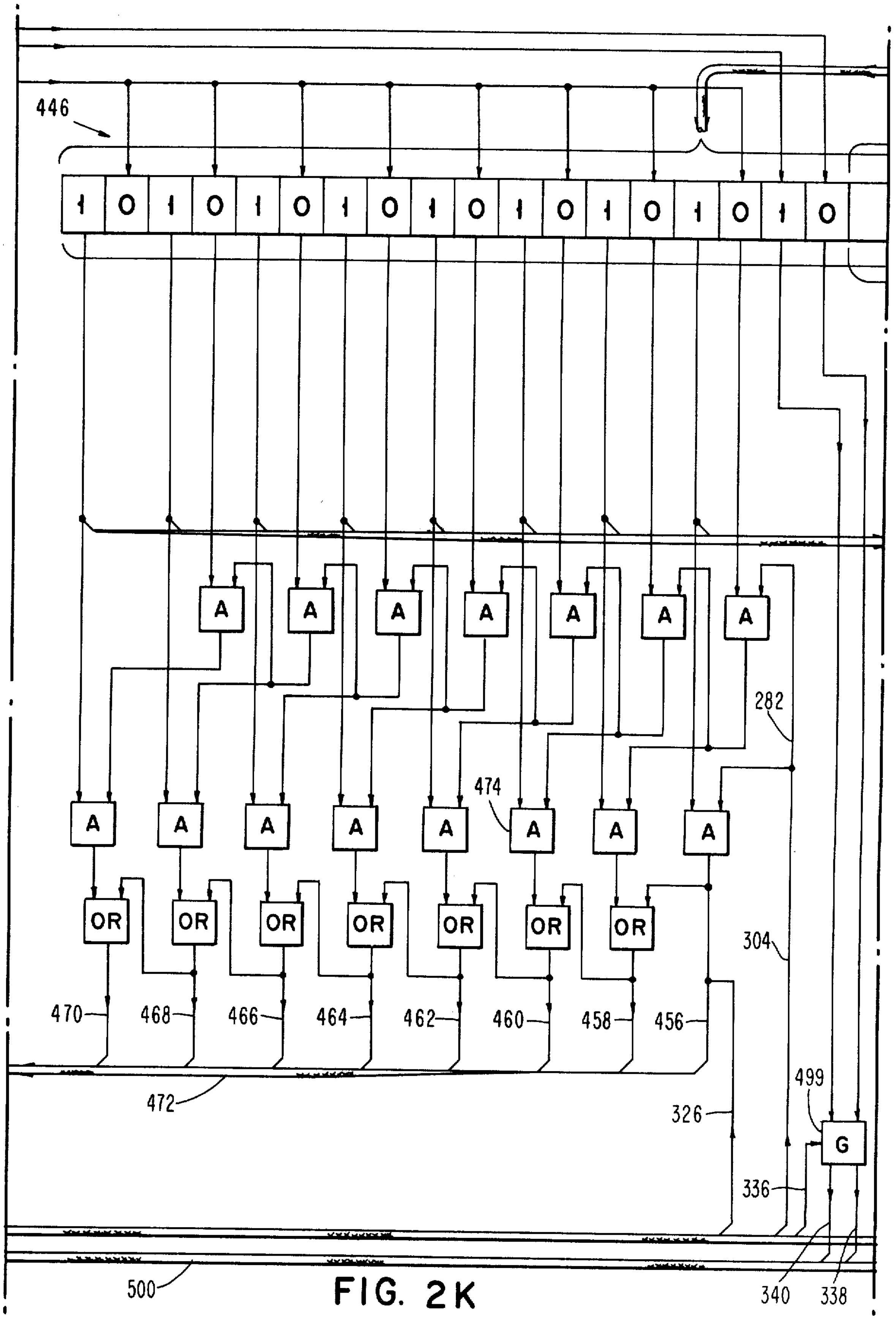
Figure 2L:
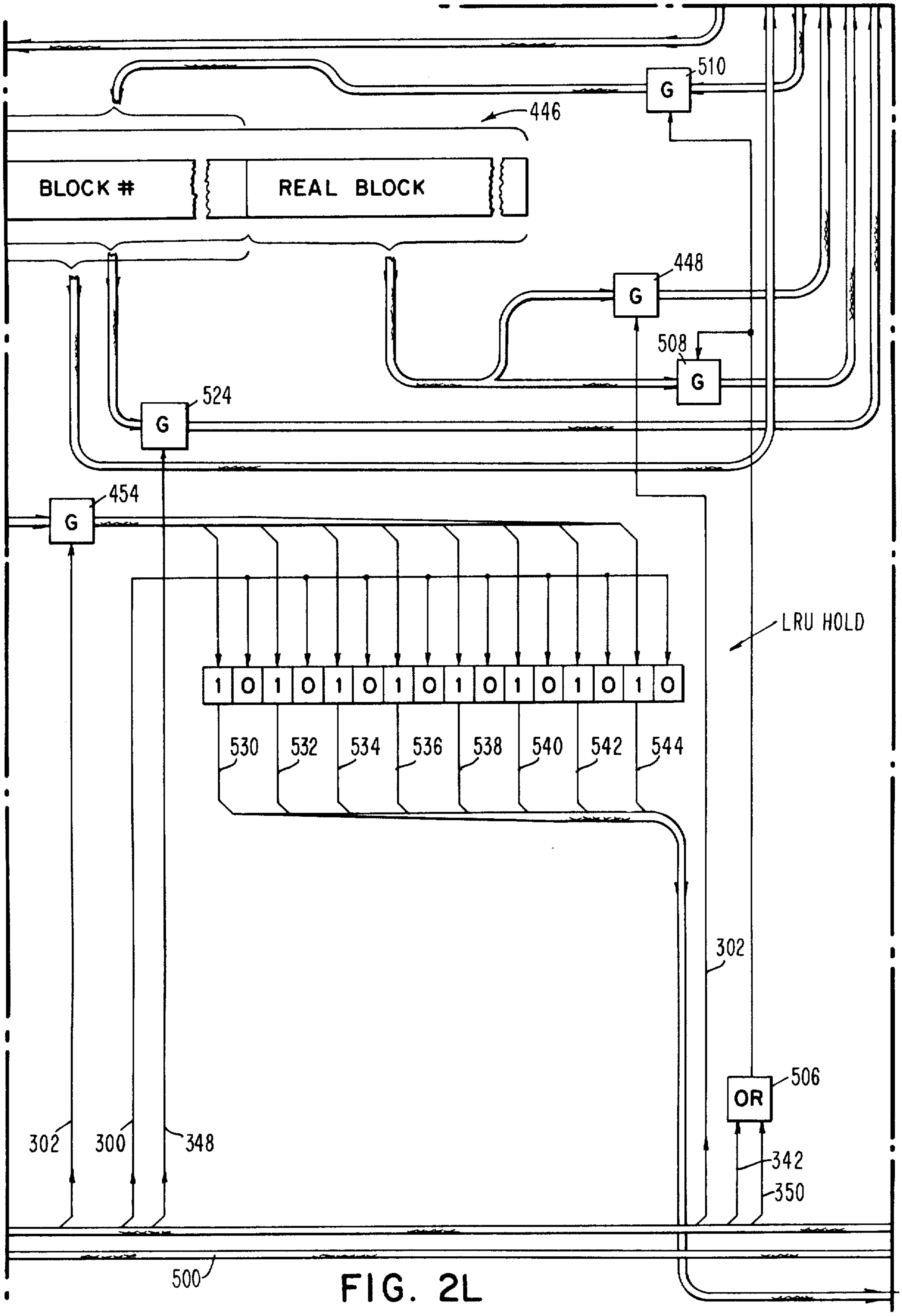
Figure 2M:
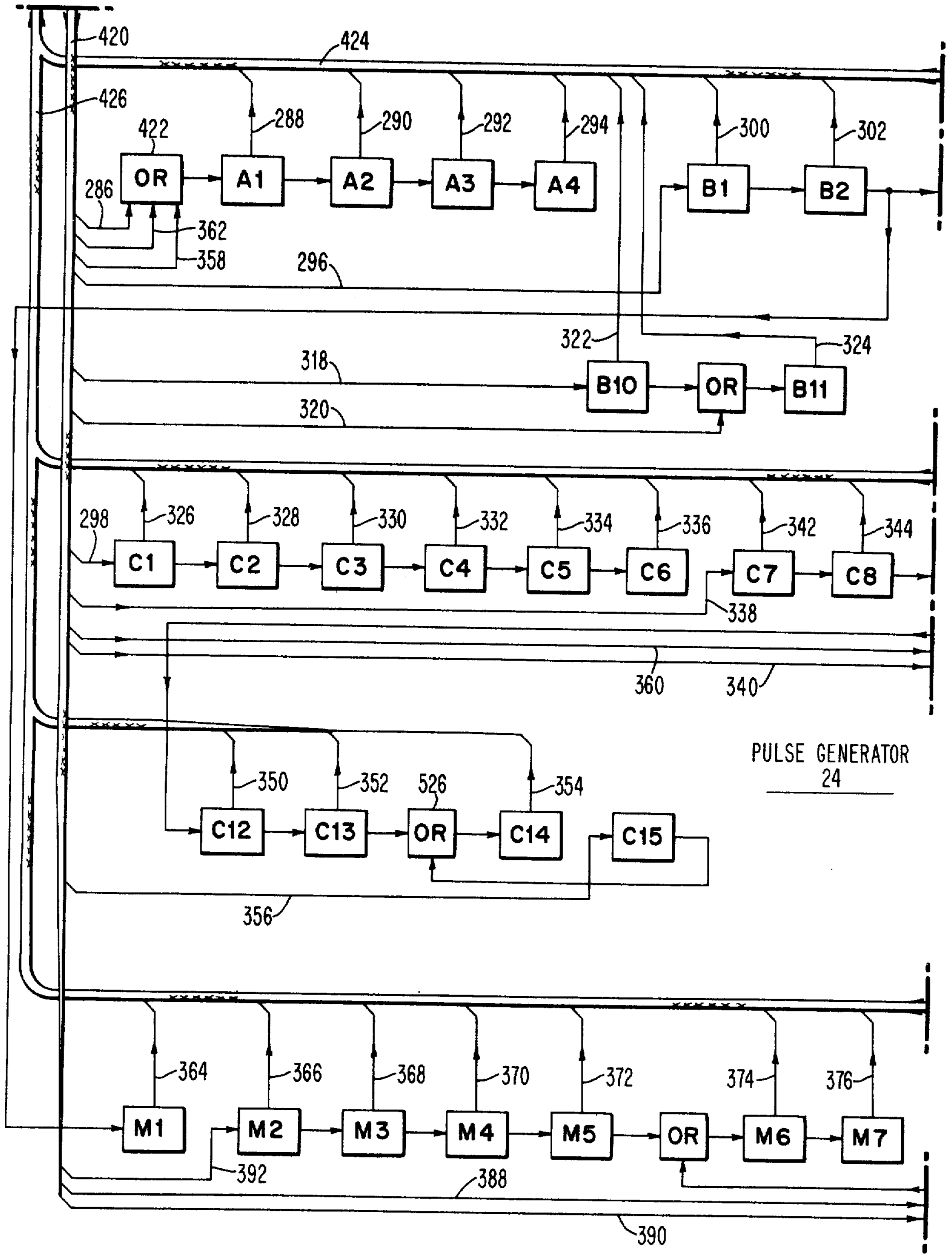
Figure 2N:
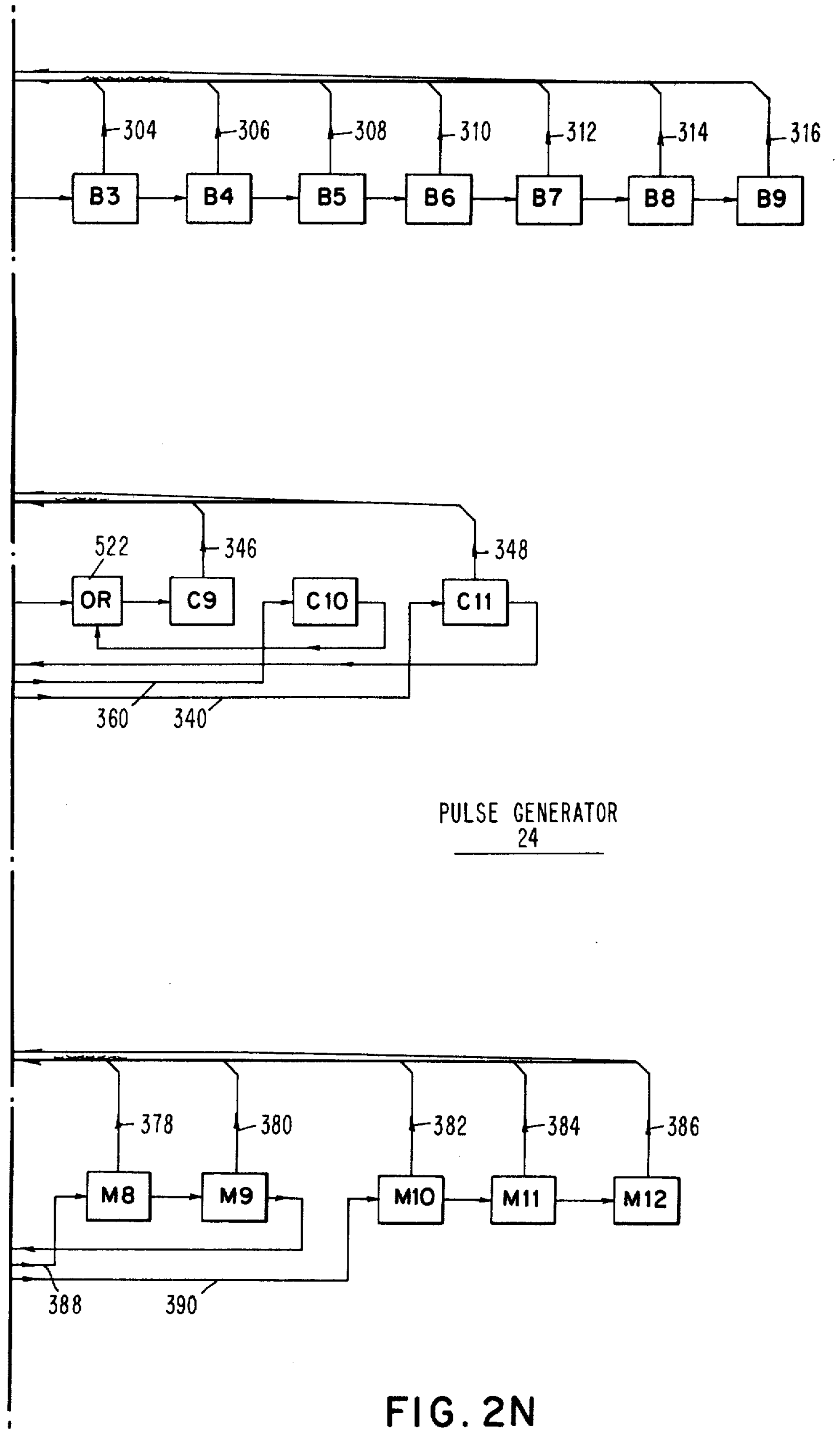

The circuitry contained in FIGS. 2M and 2N, i.e., pulse generator 24, is the clock which controls the system according to the invention. This generator comprises a plurality of monostable multivibrators which generate respective signals when they are set. When a monostable multivibrator is switched from its set to its reset state, i.e., when the monostable multivibrator "times out," it generates another signal generally. As will become apparent hereinbelow, it is the "set" signal which is utilized in the timing control of the system. However, the signal which is generated upon the "timing out" of a monostable multivibrator may also be used.

Figure 2P:
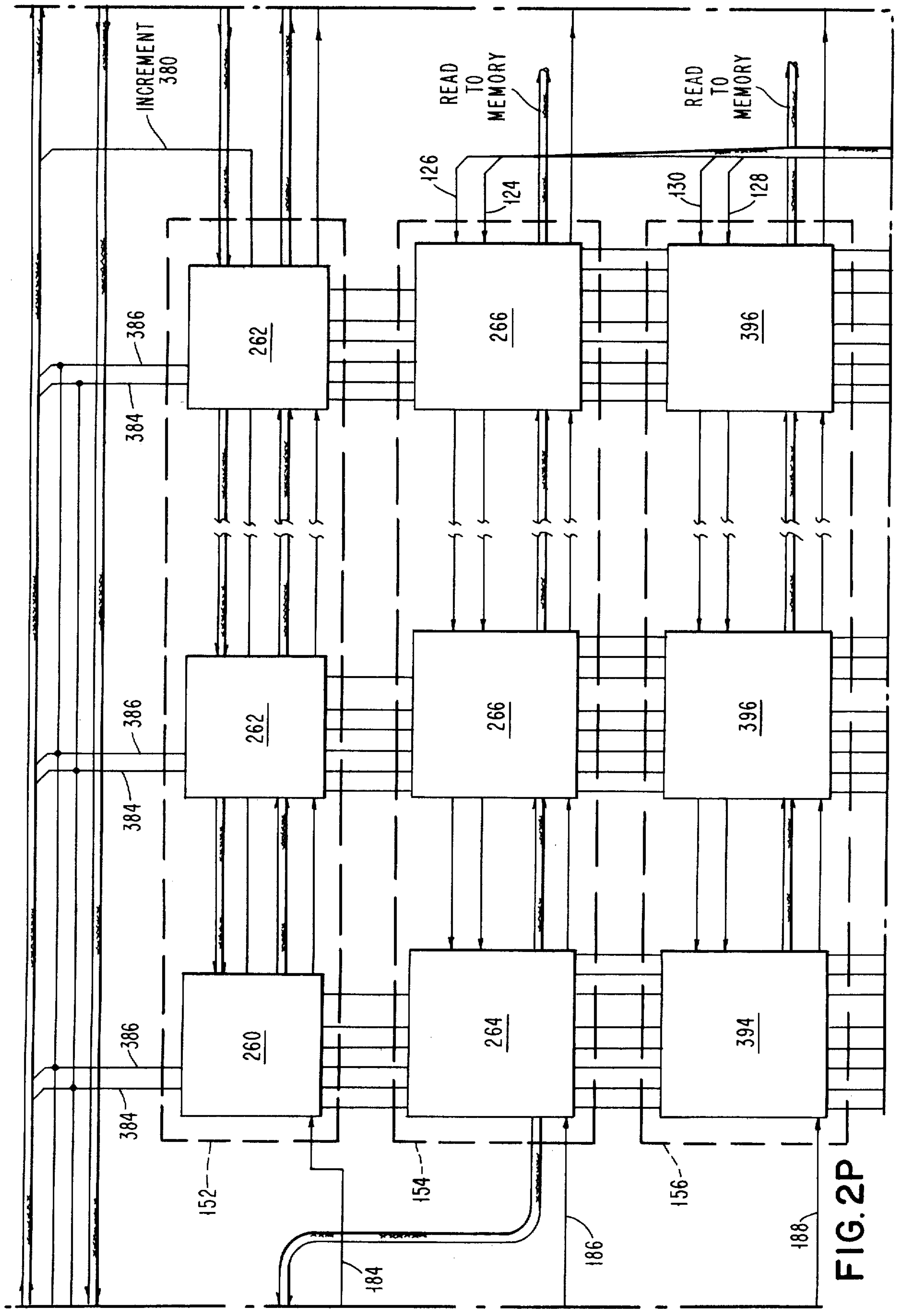
Figure 2Q:
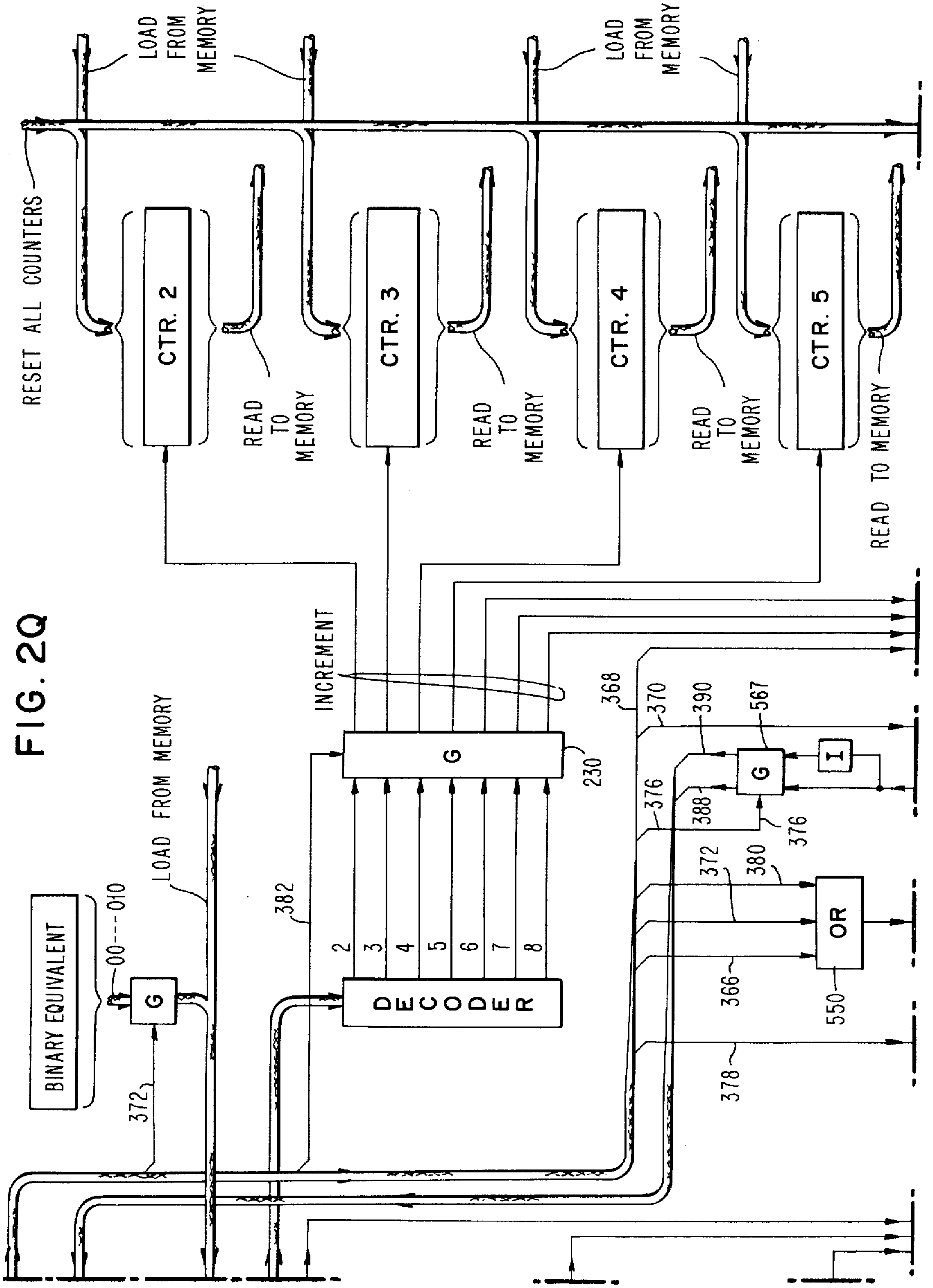
Figure 2R:
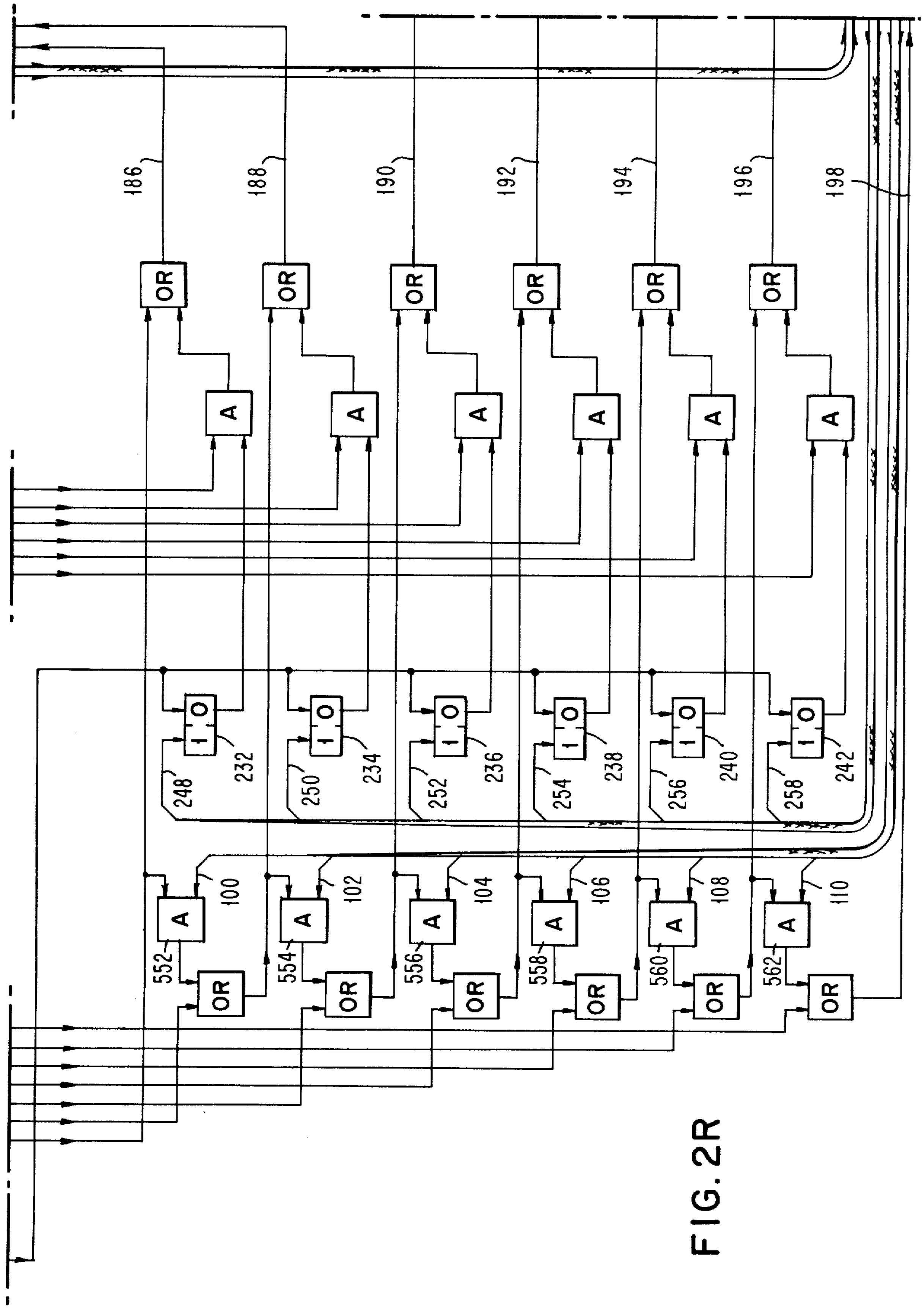
Figure 2S:
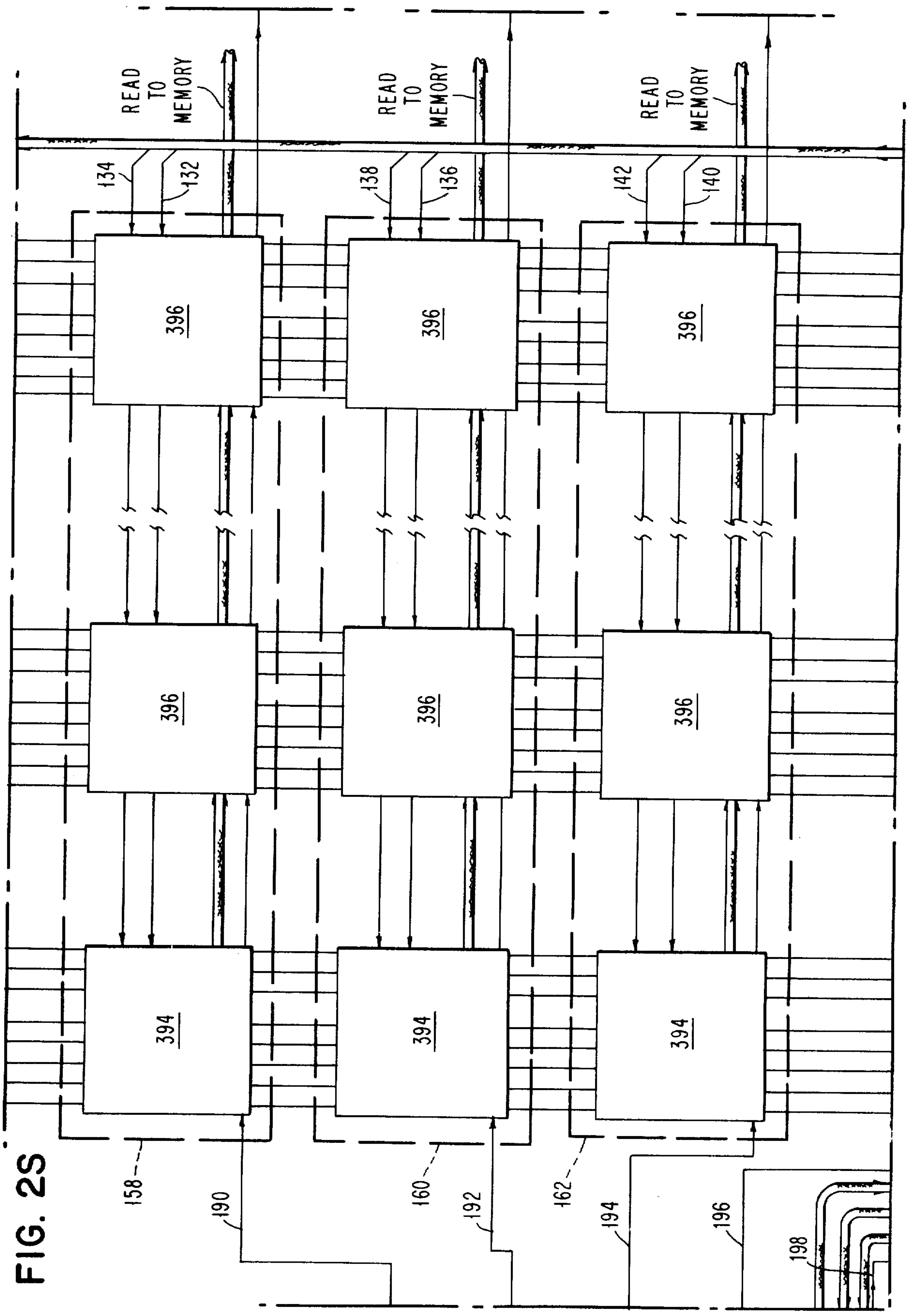
Figure 2T:
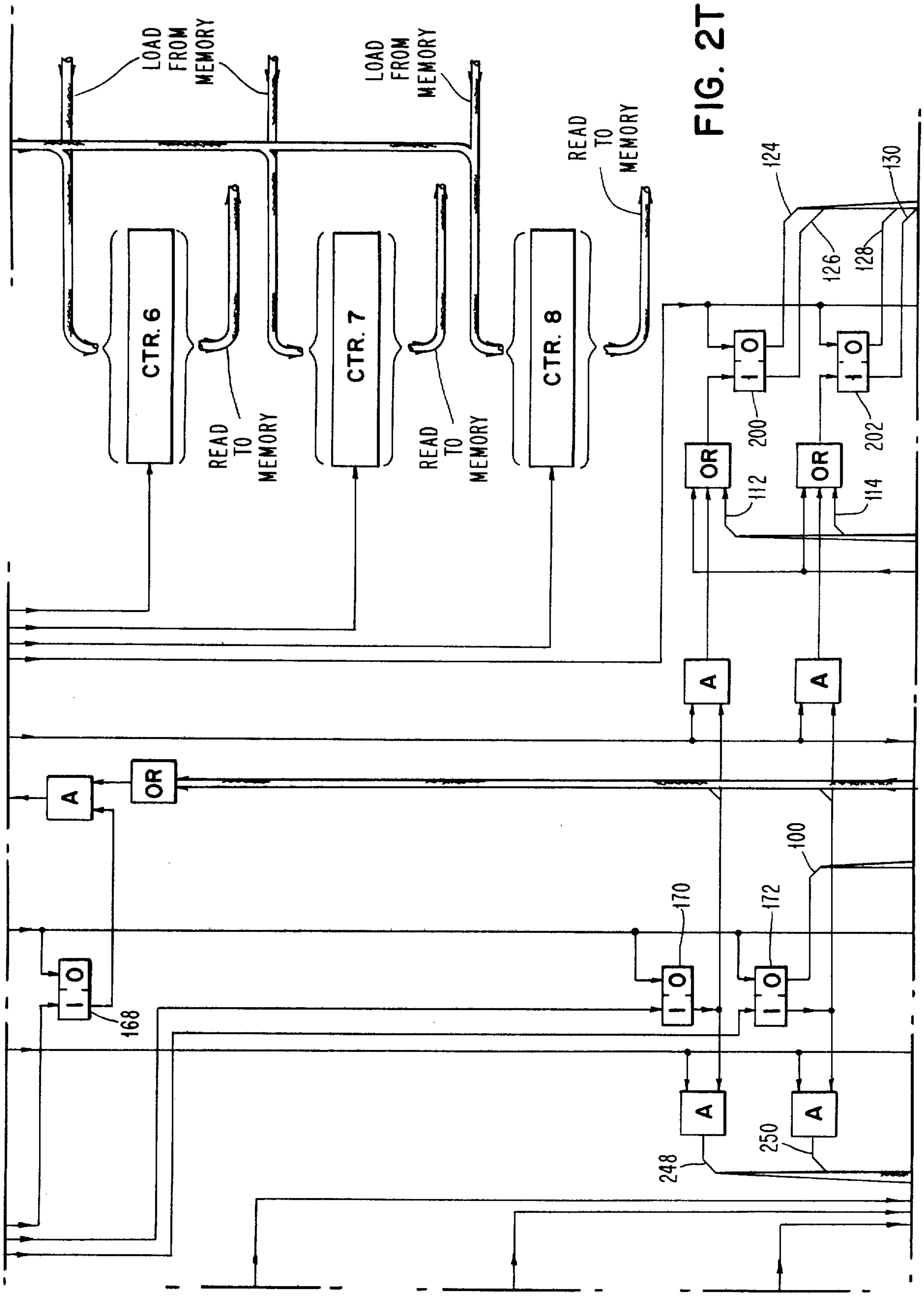
Figure 2U:
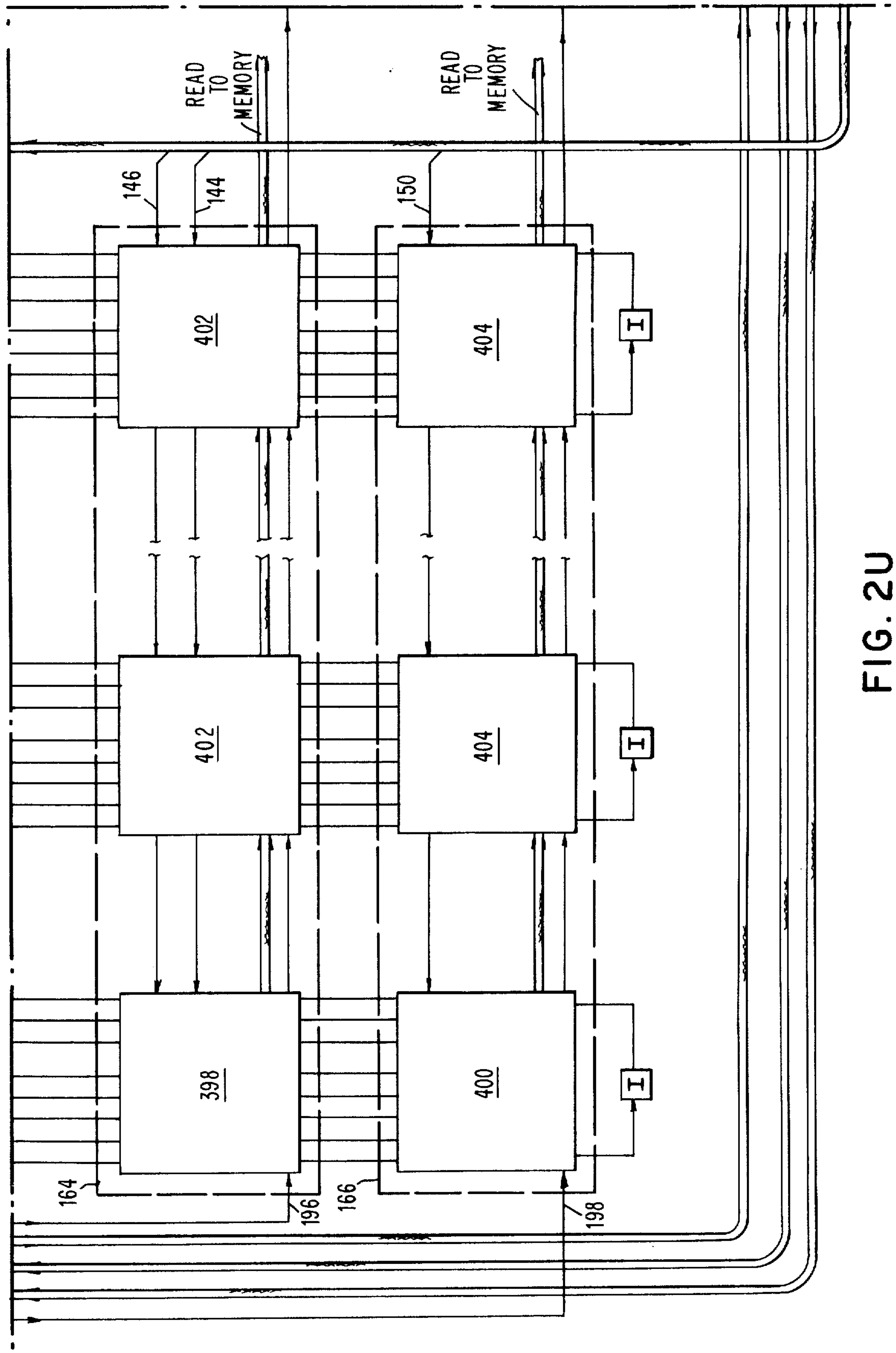

In FIGS. 2O to 2V, there is depicted the "MIN" box which effects the "MIN," i.e., the *M*-operator, operation as described hereinabove. The MIN box receives its inputs from the "LRU" number as provided from the circuitry shown in FIGS. 2G to 2J and also from pulse generator 24. It is noted that the MIN box is constituted by eight registers designated numbers 152, 154, 156, 158, 160, 162, 164, and 166 (FIGS. 2P, 2S and 2U). These registers are capable of performing the binary sort technique as disclosed in U.S. Pat. No. 3,191,156 to R. I. Roth, entitled "Random Memory With Ordered Readout," issued June 22, 1965, and assigned to the IBM Corporation. These registers are also capable of being selectedly shifted as disclosed in the patent application of R. I. Roth for "Selective Shift Register," filed June 2, 1972, Ser. No. 258,968, and assigned to the IBM Corporation.

In considering the operation of the system shown in FIG. 2 when CPU 10 requests a memory access, it loads a register 428 and concurrently provides a pulse on a line 286. Line 286 terminates in a cable 420 and the pulse thereon is applied to an OR circuit 422 which sets monostable multivibrator A1 (FIG. 2M) to provide the set signal on line 288. Line 288 terminates in cable 424 whereby the latter signal is conveyed to pass through an OR circuit 430, the signal emerging from OR circuit 430 setting the flip-flops constituting the "LRU" field of argument mask 22 to all binary zeros. The set signal for monostable multivibrator Al on line 288 also is applied to an OR circuit 432, the output of OR circuit in this situation setting those flip-flops constituting the "BLOCK NUMBER" of the argument mask to all binary 1's. The signal on line 228 is also applied to a gate 434 to effect the gating of the "BLOCK NUMBER" from register 418 (FIG. 2A) to the "BLOCK NUMBER" filed of the argument register in FIG. 2I. Finally, the signal on line 288 is also conveyed via cable 424 and then cable 436 to an OR circuit 438 (FIG. 2C) to set the match indicators (FIGS. 2C and 2D) in associative memory controls 18 to their 1 states. The signal on line 288 also resets the EOL (end-of-line) flip-flop to its 0 state.

When monostable multivibrator A1 goes "off," i.e., times out, a signal is produced which sets monostable multivibrator A2, the latter signal appearing on a line 290. Line 290 terminates in cable 424 and the signal on line 290 is conveyed via cables 424, 426 and 428 to an OR circuit 440 whereby the consequent output of OR circuit 440 is the associate pulse. It is to be realized that, at this juncture, it is desired to associate on the "BLOCK NUMBER" to ascertain whether this block number is in the associative memory. As is well known and as is explained in the above referred to patent to H. Hellerman, the match indicator flip-flops shown in FIGS. 2C and 2D are switched to their reset state for each word where a mismatch occurs and only in the case of a match does a match indicator flip-flop remain in its 1, i.e., set state.

When monostable multivibrator A2 goes "off," i.e., times out, a signal is produced which sets monostable multivibrator A3 to produce its set signal on a line 292. Line 292 terminates in cable 424 and the set signal from monostable multivibrator A3 is conveyed via cables 424, 426 and 428 to interrogate the match indicator flip-flops, i.e., to ascertain whether they are in their set or reset states. In the event that all of the match indicator flip-flops are in their reset states, then the EOL flip-flop is set to its 1 state signifying that no match exists in the associative memory. However, if the EOL flip-flop is not switched to its set state by the signal from monostable multivibrator A3, this signifies that their is a match in the associative memory.

When monostable multivibrator A3 goes "off," a signal is produced which turns "on" monostable multivibrator A4 to thereby produce its set signal on line 294. Line 294 terminates in cable 424 and the signal present thereon is conveyed via cables 424 and 426 to be applied to a gate 442 (FIG. 2C) to enable the testing for the state of the EOL flip-flop. If the EOL flip-flop is in its 1 state, a pulse appears on line 298. However, if the EOL flip-flop is in its 0 state, then a pulse appears on line 296. Lines 298 and 296 both terminate in cable 420. The pulse on line 296 is employed to turn "on" the monostable multivibrator B1. A pulse on line 298 is employed to turn"on" the monostable multivibrator C1 in pulse generator 24. For convenience of explanation, in the description of the system depicted in FIG. 2, it is assumed that a match exists in the associative memory and, accordingly, there is described the events which ensue when the pulse appears on line 296.

Thus, when monostable multivibrator B1 is turned "on" to provide its set signal on a line 300, this signal is conveyed via cables 424, 426 and 436 to an OR circuit 440. At this point, the output of OR circuit 440 effects the reading of the matching word in the associative memory to the memory data register 446 (FIGS. 2K and 2L). The signal on line 300 is also conveyed via cables 424, 426 and 428 to reset the LRU hold register to its all zero state.

When monostable multivibrator B1 turns "off," a signal is produced which turns "on" a monostable multivibrator B2, the set signal produced thereby appearing on a line 302 which terminates in cable 424. The signal on line 302 is conveyed via cables 424, 426 and 428 to actuate a gate 448 (FIG. 2L) to gate the "real block" from register 446 to the left portion of register 450 (FIG. 2A). The signal on line 302 is also conveyed via cables 424 and 426 to be applied to a gate 452 (FIG. 2A) to effect the gating of the "address in block" from register 418 to the right portion of register 450. The signal on line 302 is also conveyed via cables 424, 426 and 428 to an OR circuit 430 (FIG. 2J) to effect the resetting of the LRU field of the argument mask to all zeros. The signal on line 302 is also applied to a gate 454 (FIG. 2L) to gate the LRU number to the LRU hold register. As will become further apparent hereinbelow, because the LRU number is now in the LRU hold register (FIG. 2L), such LRu number can now be used as an input to the MIN box and its sequence can proceed in parallel with that of the mapping device. Accordingly, when monostable multivibrator B2 turns "off," the signal produced thereby turns "on" a monostable multivibrator B3 and a monostable multivibrator M1. The operation of the monostable multivibrators designated M will be described further hereinbelow.

When monostable multivibrator B3 is turned "on," the set signal appearing on line 304 which terminates in cable 424, is conveyed via cables 424, 426 and 436 to OR circuit 438, the output of OR circuit 438 at this juncture effecting the setting of the match indicator flip-flops to their 1 states. The signal on line 304 is also applied via cables 424 and 428 and line 304 to line 282. At this juncture, it is to be noted that the leftmost eight bits of the memory data register 446 are reserved for the LRU number. The latter is represented by a 1 out of 8 number. For example, an LRU number of 1 would be represented as 10000000. The number 2 would be represented by 01000000, etc. up to the number 8 which would be represented as 00000001.

It is to be noted in FIG. 2K that the top row of AND circuits directly to the left of line 282 are enabled from the 0 side of each of the eight flip-flops in the LRU number. The bottom row of AND circuits directly to the left of line 282 are enabled from the 1 sides of these flip-flops. It is apparent that a pulse on line 282 will propagate to the left until the first 1 is encountered and, at this juncture, the circuit will extend downwardly on one of the lines in the group designated 456, 458, 460, 462, 464, 466, 468 and 470. For example, if the LRU number were to be 6, AND circuit 474 would be enabled and a pulse would appear on line 460. Because of the OR circuits at the left of line 460, all of lines 426, 464, 466, 468 and 470 would be activated. The active states of the latter lines would be conveyed via cable 472 to set the six leftmost flip-flop of the argument mask (FIGS. 2G and 2H) to 1.

The pulse on line 304 passes through OR circuit 475 (FIG. 2J) to reset the "BLOCK NUMBER" field of the argument mask to all 0's. The pulse on line 304 is also operative to reset the LRu field of the argument register to all 0's (FIGS. 2G, 2H and 2I).

When monostable multivibrator B3 goes "off," a signal is produced thereby on line 306, such signal being conveyed via cables 424, 426 and 428 to an OR circuit 440 (FIG. 2J), the output of OR circuit 440 being the associate pulse.

The association pulse effects the resetting of the match indicators for all words in the associative memory which have LRU numbers equal to or less than the .RU number in data register 446. This operation is ›erformed at this juncture because all of the LRU num›ers have to next be incremented. In this connection, it s to be noted that shift pulses which are applied (FIGS. !C and 2D) are enabled by the reset state of the match ndicator flip-flops. The shifting operation occurs with nemory elements 406, 408 and 410.

Figure 3A:
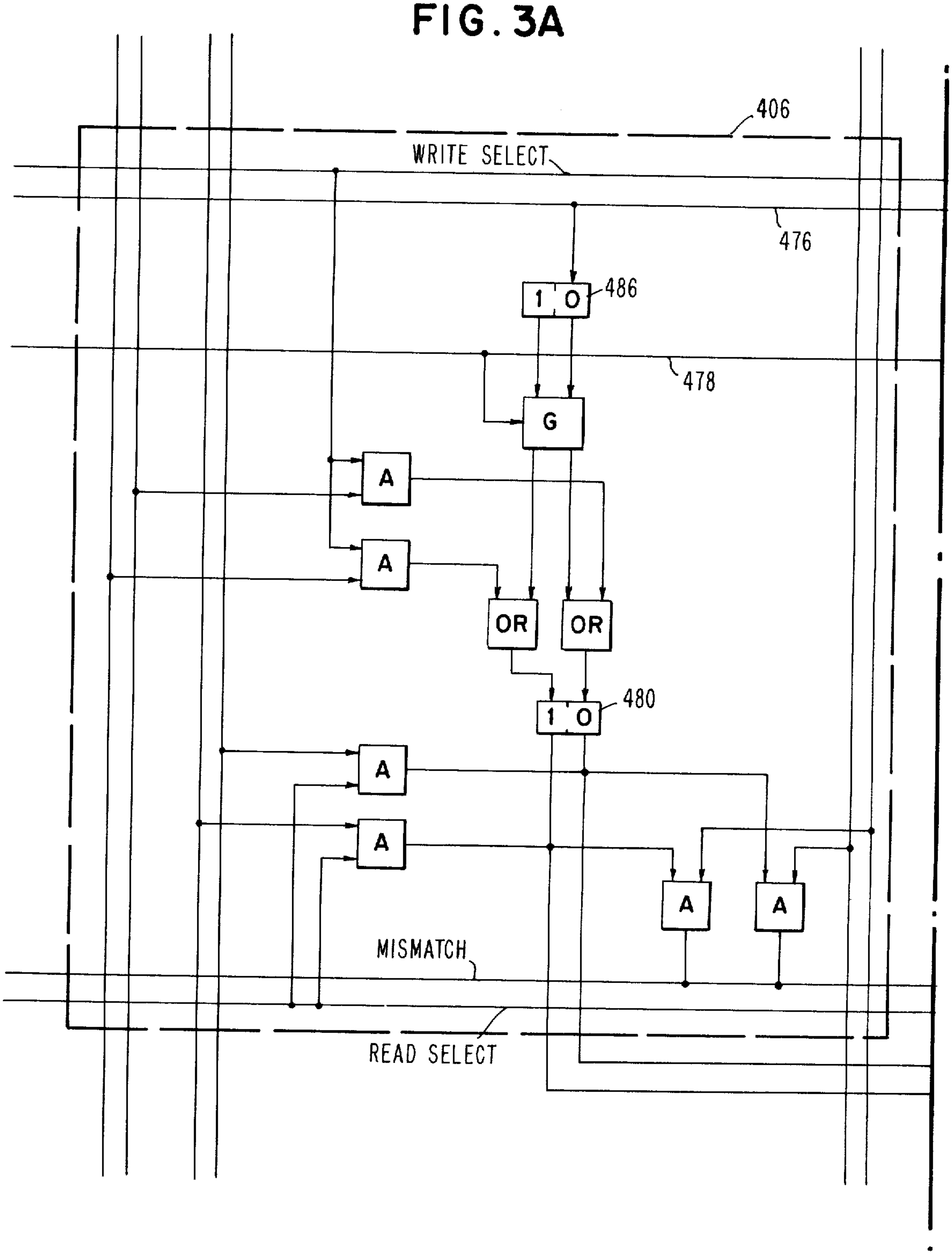
FIGS. 3A to 3D, taken together as in FIG. 3, are illustrative examples of the stages in the MIN box, i.e., the OPT stack, depicted in FIG. 2.
Figure 3:
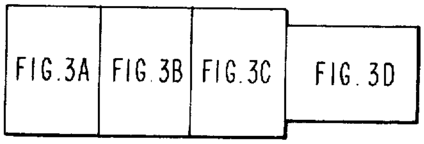
Figure 3B:
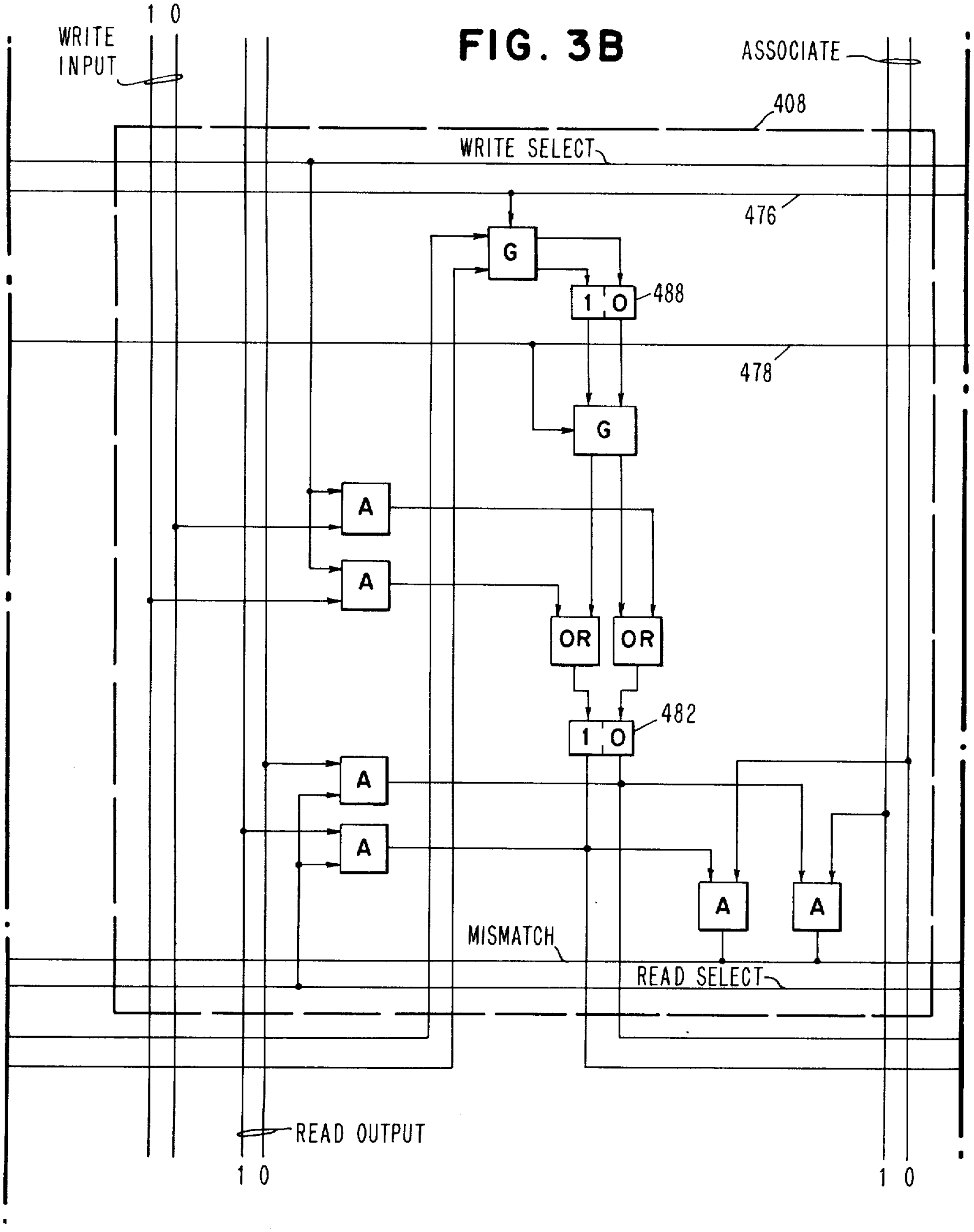
Figure 3C:
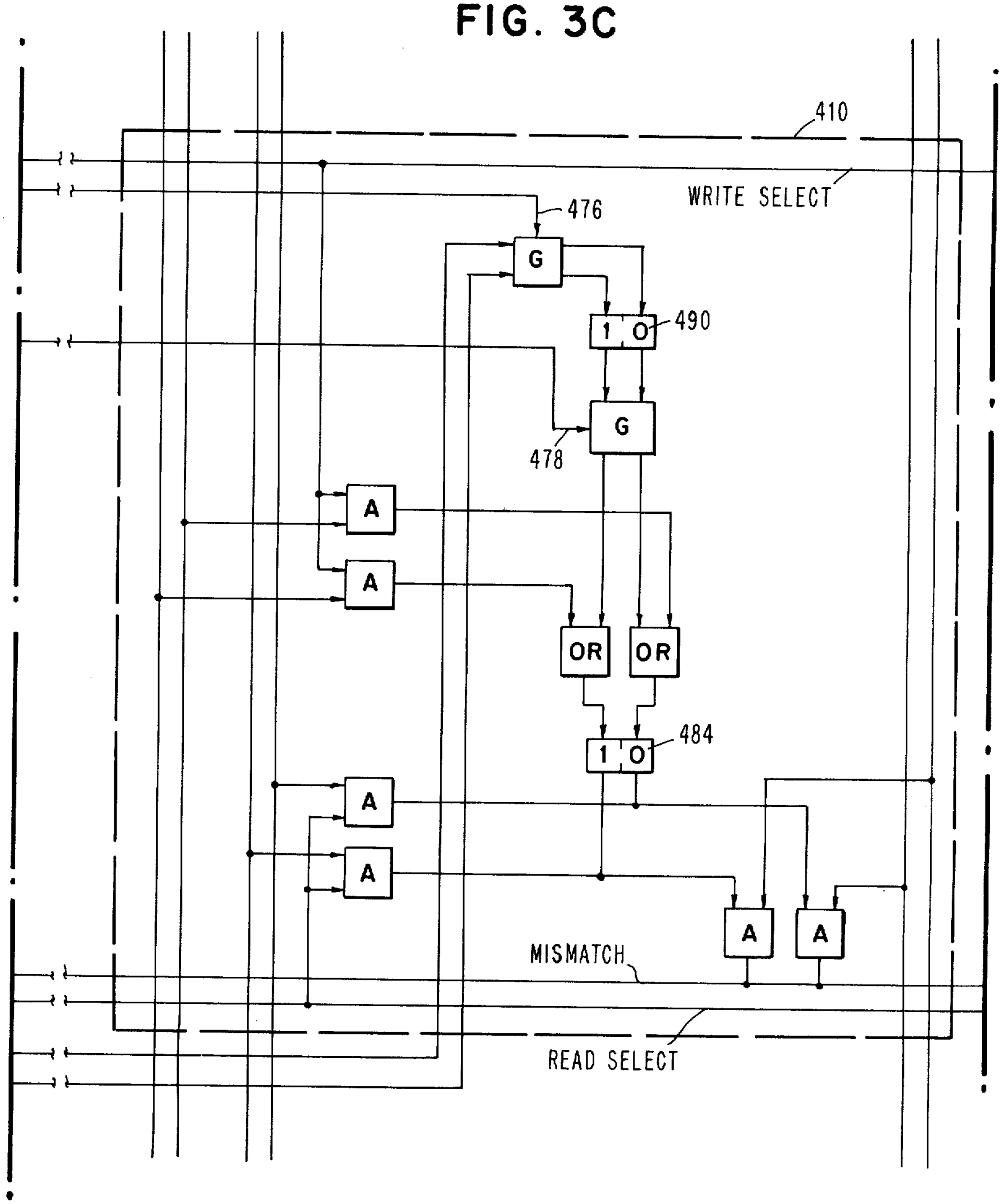
Figure 3D:
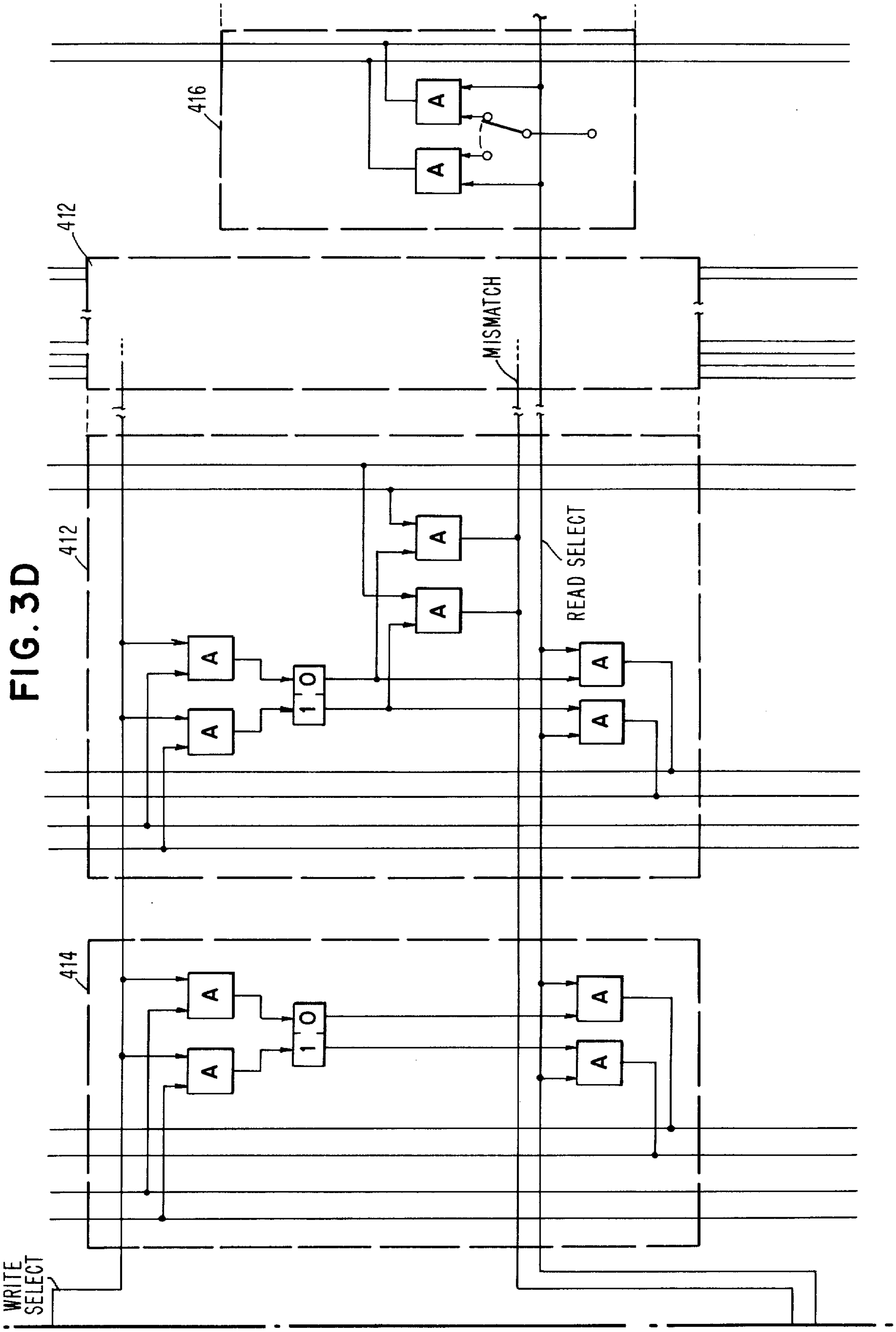

To understand the shifting operation, reference is nade to FIGS. 3A, 3B and 3C. In FIG. 3A, there is ;hown an embodiment of memory element 406. In this ›lement, flip-flop 480 is the information bit and flip'lop 486 is provided to inject zeros from the left. The 'irst shift pulse is applied to line 476 which sets flip-flop 486 to its 0 state. In FIG. 3B wherein there is shown a suitable embodiment of a memory element designated by the numeral 408, the information bit is flip-flop 482 and flip-flop 488 is an intermediate flip-flop. This first shift pulse on line 476 gates the contents of flip-flop 480 (FIG. 3A) to flip-flop 488 (FIG. 3B). In FIG. 3C wherein there is shown a suitable example of a memory element designated with the numeral 410, the information bit is flip-flop 484 and flip-flop 490 is an intermediate flip-flop. At the occurrence of this first shift pulse on line 476, there are gated the contents of flip-flop 482 (FIG. 3B) to flip-flop 490 in memory element 410 (FIG. 3C). The second shift pulse now appears on line 478 which in memory element 406 (FIG. 3A) gates the contents of flip-flop 486 to flip-flop 480. Similarly, the second shift pulse on line 478 in memory element 408 (FIG. 3B) gates the contents of flip-flop 488 to flip-flop 482 and in memory element 410 (FIG. 3C), the second shift pulse which is on line 478 gates the contents of flip-flop 490 to flip-flop 484. In this manner, the single 1 in the LRU number is shifted one position to the right. It is to be noted that a 0 is always entered into the leftmost position.

When monostable multivibrator B4 goes "off," a signal is produced which turns "on" monostable multivibrator B5, this "on" signal appearing on line 308 which terminates in cable 424. The signal on line 308 is conveyed via cables 424, 426 and 436 to OR circuit 492, the output at this juncture from OR circuit 492 being the first shift pulse.

When monostable multivibrator B5 goes "off," the signal produced thereby turns "on" monostable multivibrator B6 to produce a signal on wire 310 which is conveyed via cables 424, 426 and 436 to an OR circuit 494, the output of OR circuit 494 at this point being the second shift pulse.

When monostable multivibrator B6 turns "off," the monostable multivibrator B7 is turned "on" to produce a signal on line 312, this signal being conveyed via cables 424, 426 and 436 to an OR circuit 438, the output of OR circuit 438 setting the match indicator flip-flops to their 1 states. The signal on line 312 also is applied to an OR circuit 430, the output of OR circuit 430 being operative to reset the LRU field of the argument mask to all zeros. Finally, the signal on line 312 is applied to OR circuit 432, the output of OR circuit 432 setting the "BLOCK NUMBER" field of the argument mask to all ones.

When monostable multivibrator B7 goes "off," the resulting signal produced thereby turns "on" a monostable multivibrator B8 to produce a signal on line 314, the signal on line 314 being conveyed via cables 424, 426 and 428 to an OR circuit 440 (FIG. 2J) to produce the associate pulse. The purpose of the association at this time is to reset all match indicators except the one which is associated with the word in the associative memory which contains the same block number as the block number in register 446. This same block number concurrently exists in the argument register.

When monostable multivibrator B8 goes "off," a monostable multivibrator B9 is turned "on" to produce a signal on line 316 which is conveyed via cable 428 to an OR circuit 496, the output of OR circuit 496 setting the LRU field of register 446 to 10000000. It is to be noted that, when CPU 10 requests a memory access, it also furnishes information as to whether the block is to be altered. Such information furnishing takes the form of effecting the setting of the alteration flip-flop (FIG. 2A) to its 1 state if the block is to be altered or setting the alteration flip-flop to its 0 state if the block is not to be altered. A signal on line 316, produced during the "on" time of monostable multivibrator B9, is also applied to gate 498 (FIG. 2A), to ascertain the state of the alteration flip-flop. If the latter flip-flop is in its 1 state, a pulse appears on line 318. However, if the alteration flip-flop is in its 0 state, then a pulse appears on line 320. Lines 318 and 320 terminate in cable 420. A pulse on line 318 is employed to turn "on" monostable multivibrator B10 and the pulse on line 320 is employed to turn "on" monostable multivibrator B11.

If it is necessary to set the A bit of register 446 to its 1 state, a pulse on line 332 accomplishes that purpose. The pulse on line 324 is applied to an OR circuit 498, the output of OR circuit 498 at this juncture effecting the writing of the contents of register 446 back into the associative memory.

Up to this point in the description of the embodiment of the invention, there has been illustrated the operation of the mapping device and the LRU box when the block number which is called for is in the associative memory. As has been mentioned, the LRU number of the selected word is always set to 1 and the LRU numbers which are less than the selected word in the associative memory are incremented by 1.

There now follows a description of the operation of the mapping device and the LRU box when the desired block number is not in the associative memory. In this situation, a page exception occurs which is detected by the signal on line 294, the latter signal being employed to test for the state of the EOL flip-flop. The set, i.e., 1 state of the EOL flip-flop causes a signal to appear on line 298, such signal turning "on" monostable multivibrator C1. The set state of monostable multivibrator C1 produces a signal on line 326 and hence on line 456. Because of the operation of the series connected OR circuits, the set signal of monostable multivibrator C1 also appears on lines 458, 460, 462, 464, 466, 468 and 470 and is operative to set the LRU field of the argument mask (FIGS. 2G-2J) to all 1's. The signal on line 326 also is applied to OR circuit 475 and is operative to reset the "BLOCK NUMBER" field of the argument mask to all 0's. In addition, the signal on line 326 effects the setting of the LRU field of the argument register to 00000001. Further, the signal on line 326 is applied to an OR circuit 438, the consequent output of OR circuit 438 effecting the setting of the match indicator flip-flops to their 1 states. At this juncture, the circuits are now set up to associate on an LRU number of eight because this is the word in the associative memory that must be replaced with a new block.

When monostable multivibrator C1 goes "off," the signal consequently produced thereby turns on a monostable multivibrator C2 to produce a signal on line 328.

The signal on line 328 is applied to an OR circuit 440, the consequent output of OR circuit 440 functioning as the associate pulse. The result of the association effected by the latter associate pulse is to reset all of the match indicators in the associative memory with the exception of that match indicator which is associated with the word having the LRU value of eight. It now becomes necessary to increment LRU numbers which have values less than eight.

When monostable multivibrator C2 goes "off," the consequent signal produced thereby turns "on" a monostable multivibrator C3 to produce a signal on line 330. The signal on line 330 is applied to an OR circuit 492 (FIG. 2C), the consequent output of OR circuit 492 being operative as a first shift pulse.

When monostable multivibrator C3 goes "off," the consequent signal produced thereby turns "on" a monostable multivibrator C4 to produce a signal on a line 332. The signal on line 332 is applied to an OR circuit 494 (FIG. 2D), the consequent output of OR circuit 494 functioning as the second shift pulse.

When monostable multivibrator C4 goes "off," the signal produced thereby turns "on" a monostable multivibrator C5 to produce a signal on line 334. The signal on line 334 is applied to an OR circuit 444, the consequent output of OR circuit 444 effecting the reading of the matching word from the associative memory to data register 446.

When monostable multivibrator C5 goes "off," the signal produced thereby turns "on" a monostable multivibrator C6 to produce a signal on line 336. The signal on line 336 is applied to an OR circuit 496 (FIG. 2J), the consequent output of OR circuit 496 being operative to set the LRU section of register 446 to 10000000. In addition, the signal on line 336 is applied to a gate 499 (FIG. 2K) to effect the testing of the state of the A bit in register 446. If this test ascertains that the A bit is equal to 1, a signal appears on line 340. However, if the A bit is equal to 0, a signal appears on line 338. Lines 338 and 340 terminate in cables 500 and 420. The signal on line 338 is employed to turn "on" a monostable multivibrator C7 and the signal on line 340 is utilized to turn "on" the monostable multivibrator C11.

Let it be assumed that the A bit is equal to 0 whereby the signal appears on line 338 to turn "on" the monostable multivibrator C7 to thereby produce a signal on line 342. The signal on line 342 is applied to an OR circuit 502 (FIG. 2A), the output of OR circuit 502 being applied to a gate 504, the actuation of gate 504 thereby effecting the gating of the "BLOCK NUMBER" from register 418 to the "REPLACEMENT ADDRESS REGISTER." The signal on line 342 is also applied to an OR circuit 506 (FIG. 2L), the output of OR circuit 506 being applied to a gate 508, the actuation of gate 508 effecting the gating of the contents of the "REAL BLOCK" field of register 446 to the "PRIMARY ADDRESS REGISTER" (FIG. 2B). The signal on line 446 is also applied to a gate 510 (FIG. 2L) the actuation of gate 510 being operative to gate the "BLOCK NUMBER" from register 418 (FIG. 2A) to the "BLOCK NUMBER" field of register 446. Further, the signal on line 342 is applied to an OR circuit 512, the consequent output of OR circuit 512 effecting the resetting of the A bit of register 446 to 0. In addition, the signal on line 342 is applied to the "replace" input to channel controls 20 (FIG. 2B). Finally, the signal on line 446 sets flip-flop 514 (FIG. 2B) to its 1 state.

When monostable multivibrator C7 goes "off," a monostable multivibrator C8 is turned "on" to produce a signal on line 344. The signal on line 344 is applied to an OR circuit 498 (FIG. 2D), the consequent output of OR circuit 498 effecting the writing of the contents of data register 446 into the proper location in the associative memory.

When monostable multivibrator C8 goes "off," the signal produced thereby is transmitted through an OR circuit 522 to turn "on" a monostable multivibrator C9 to produce a signal on line 346. The signal on line 346 is applied to a gate 518 (FIG. 2B), the actuation of gate 518 being operative to test for the state of flip-flop 514. In this connection, if flip-flop 514 is in its 1 state, a signal appears on a line 360. However, if flip-flop 514 is in its 0 state, then a signal appears on line 362.

A signal on line 360 is employed to turn "on" a monostable multivibrator C10 and the signal on line 362 is passed through an OR circuit 422 to turn "on" monostable multivibrator A1. The "on" signal from monostable multivibrator C10 is used for delay only and when monostable multivibrator C10 times out, there is produced a signal which passes through an OR circuit 522 to again turn "on" monostable multivibrator C9.

Considering again the situation when gate 498 (FIG. 2D) is actuated by the signal on line 366, if the A flip-flop is in its 1 state at this time, a signal appears on line 340 which turns "on" monostable multivibrator C11 to produce a signal on line 348. The signal on line 348 is applied to a gate 524 (FIG. 2L), the actuation of gate 524 effecting the gating of the contents of the "BLOCK NUMBER" field of data register 446 to the "WRITE ADDRESS REGISTER" (FIG. 2B).

When monostable multivibrator C11 goes "off," the consequent signal produced thereby turns "on" a monostable multivibrator C12 which produces a signal on line 350. The signal on line 350 is applied to an OR circuit 502 (FIG. 2A), the output of OR circuit 502 being applied to a gate 504, the actuation of gate 504 effecting the gating of the "BLOCK NUMBER" from register 418 to the "REPLACEMENT ADDRESS REGISTER". The signal on line 350 is also applied to an OR circuit 506, the consequent output of OR circuit 506 actuating a gate 508, the actuation of gate 508 being operative to gate the "REAL BLOCK" field of register 446 to the "PRIMARY ADDRESS REGISTER" (FIG. 2B). In addition, the signal on line 350 is applied to a gate 510 (FIG. 2L), the actuation of gate 510 effecting the gating of the "BLOCK NUMBER" from register 418 (FIG. 2A) to data register 446 (FIGS. 2K and 2L). Further, the signal on line 350 is applied to OR circuit 512, the consequent output of OR circuit 512 being operative to set the A bit of register 446 to its 0 state. A signal on line 350 is also applied to the "REWRITE AND REPLACE" input to channel controls 20 (FIG. 2B). Finally, the signal on line 350 also sets flip-flop 516 (FIG. 2B) to its 1 state.

When monostable multivibrator C12 goes "off", the consequent signal produced thereby turns "on" a monostable multivibrator C13 to produce a signal on line 352. The signal on line 352 is applied to OR circuit 498, the output of OR circuit 498 being operative to effect the writing of the contents of data register 446 (FIGS. 2K and 2L) into the associative memory.

When monostable multivibrator C13 goes "off," the signal consequently produced thereby is passed through an OR circuit 526 to turn "on" a monostable multivibrator C14 to produce a signal on line 354. The signal on line 354 is applied to a gate 520 (FIG. 2B), the actuation of gate 520 effecting the testing of the state of flip-flop 516. In this test, if flip-flop 516 is found to be in its 1 state, a signal appears on line 356. However, if flip-flop 516 is in its 0 state, a signal appears on line 358. A signal on line 356 is used to turn "on" a monostable multivibrator C15. A signal on line 358 passes through an OR circuit 422 and is employed to turn "on" monostable multivibrator A1. Monostable multivibrator C15 is employed for delay only and, when it turns "off," a signal is produced which passes through OR circuit 526 and turns "on" monostable multivibrator C14.

There has now been described the operation of the mapping device and the LRU box when a page exception occurs. It is to be noted that in this operation, the control returns to the sequence of signals which is initiated with the turning "on" of monostable multivibrator A1 and this sequence can now be effective since the required block is present at this juncture in primary store. At this juncture, the page causing the page exception is now in primary storage.

It is to be recalled from the description set forth hereinabove that, when monostable multivibrator B2 goes "off," a signal is produced which turns "on" monostable multivibrator M1 to produce a signal on line 364, the signal on line 364 being applied to an AND circuit 528. The LRU number is indicated by the active state of one of the lines 530, 532, 534, 536, 538, 540, 542, and 544. The active state of line 530 indicates an LRU number of 1. It is to be noted that if line 530 is active, an AND circuit 528 is not enabled, whereby no output appears on line 392. If line 532 is active, this signifies an LRU number equal to 2. If the register 154 (FIG. 2P) also contains the number 2, line 546 is active and an AND circuit 548 is enabled to produce an output, such output also preventing AND circuit 528 from producing an output on line 392. If line 530 is not active, and if one or both of lines 532 and 546 are not active, AND circuit 528 produces an output on line 392, this signal on line 392 being employed to turn "on" the monostable multivibrator M2. With this arrangement, accordingly, no M signal sequence beyond the signal produced by monostable multivibrator M1 occurs if there is no output on line 392.

Figure 20:
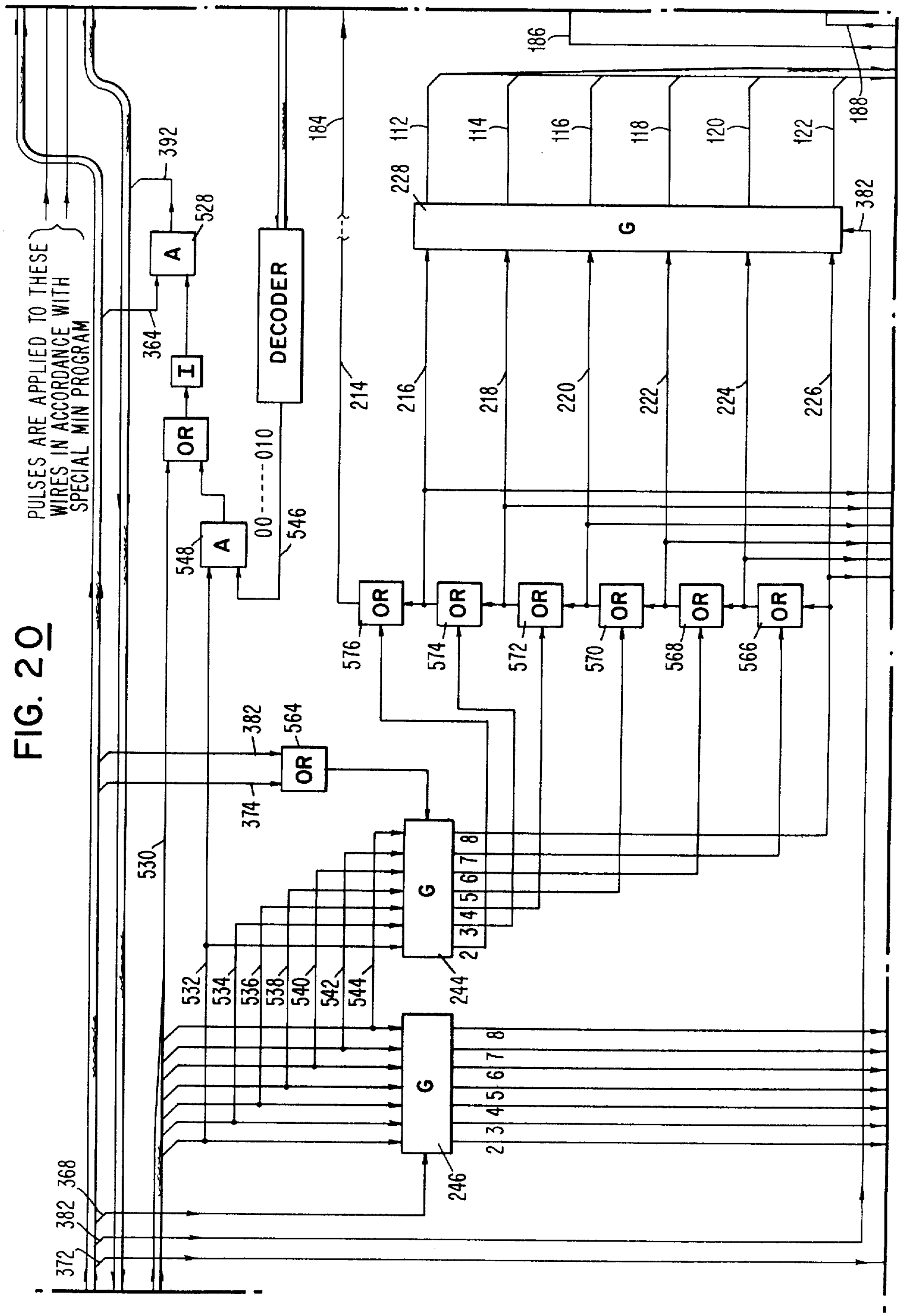
Figure 2V:
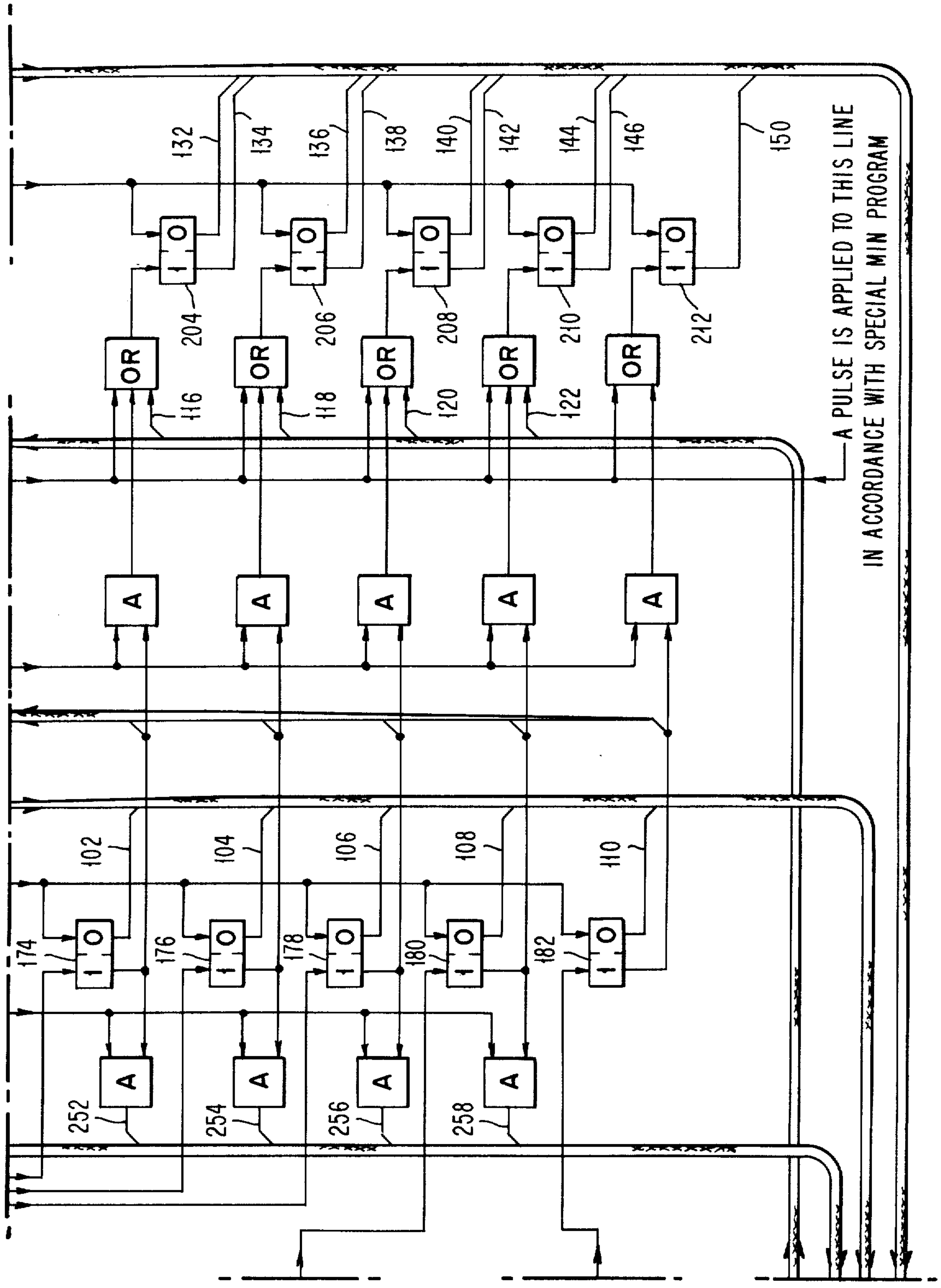

The signal on line 366 is applied to an OR circuit 550 (FIG. 2Q) to reset flip-flops 168, 170, 172, 174, 176, 178 180 and 182 to their 0 states. When monostable multivibrator M2 goes "off," the signal produced thereby turns "on" a monostable multivibrator M3 to produce a signal on line 368, the signal on line 368 being applied to gate 246 (FIG. 20). The enabling of gate 246 effects the applying of any LRU number within the range of two to eight to line 186, 188, 190, 192, 194, 196 and 198 (FIG. 2R). The signal on line 368 is also employed to reset flip-flops 200, 202, 204, 206, 208, 210 and 212 to their 0 states (FIGS. 2T and 2V). It is to be noted that the AND circuits 552, 554, 556, 558, 560 and 562 are all enabled by the active states of the lines 100, 102, 104, 106, 108 and 110 respectively. Thus, for example, if the LRU number happens to be 4 which signifies the active state of line 536, line 190 (FIG. 2R) becomes active and lines 192, 194, 196 and 198 also become active because of the series arrangement of the AND circuits 556, 558, 560 and 562. With this arrangement, registers 158, 160, 162, 164 and 166 are included in the initial sort to find the smallest number in this set of registers. If, for example, register 164 contains the smallest number in this set, flop-flop 180 is set to its 1 state.

Line 108 thereby becomes inactive and AND circuit 560 is disabled. This action signifies that registers 164 and 166 (FIG. 2U) are now removed from the sort process and the next sort involves registers 158, 160 and 162. Thus, if register 162 contains the smallest number of registers 158, 160 and 162, then flip-flop 178 is set to its 1 state and line 106 is rendered inactive. Thereby, AND circuit 558 is disabled and the bottom three registers, viz. registers 162, 164 and 166 are removed from the sort leaving registers 158 and 160. If it is assumed that register 160 contains the smallest number of registers 158 and 160, then flip-flop 176 is set to its 1 state and line 104 is deactivated. This event causes AND circuit 556 to become disabled thereby leaving only register 158 in the sort. It is apparent that if register 158 is the only register left in the sort, it perforce contains the smallest number because there is only one number to be sorted. Consequently, flip-flop 174 is set to its 1 state and line 102 becomes inactive to thereby disable AND circuit 554. With this illustrative example, the results of the appearance of the signal on line 368 is to set flip-flops 180, 178, 176 and 174 to their 1 states.

When monostable multivibrator M3 goes "off," a signal is produced thereby which turns "on" monostable multivibrator M4 to produce a signal on line 370. The signal on line 370 is operative to transfer the 1 setting of the group of flip-flops 170, 172, 174, 176, 178, 180 and 182 to the group of flip-flops 200, 202, 204, 206, 208, 210 and 212. As will be further shown hereinbelow, the group of flip-flops 200, 202, 204, 206, 208, 210 and 212 constitute the mask for the selective downward shift of the registers shown in FIGS, 2P, 2S and 2U.

When monostable multivibrator M4 goes "off," the resultant signal produced thereby turns on monostable multivibrator M5. The "on" state of monostable multivibrator M5 provides a signal on line 372 which is employed to reset to their 0 states, flip-flops 232, 234, 236, 238, 240 and 242 (FIG. 2R). The signal on line 372 is also applied to an OR circuit 550, the consequent output of OR circuit 550 resetting flip-flops 168, 170, 172, 174, 176, 178, 180 and 182 (FIGS. 2T and 2V) to their 0 states. The signal on line 372 is also operative to gate the binary equivalent of the integer 2 to register 152 (FIG. 2P).

The MIN box is now set up to find the smallest missing number in the registers above the one that corresponded to the LRU number. For example, if at this juncture, the LRU number were to be four, this would signify that the registers 158, 160, 162, 164 and 166 (FIGS. 2S and 2U) would be included in the sorts as described hereinabove. The registers 156 and 154 are included in the operation which finds the smallest number in this set of registers. Since the smallest number that could be considered is the number 2, such number is the value loaded into register 152.

At this point, it becomes necessary to ascertain whether either of registers 154 and 156 also contains the number 2. If this number is not contained in registers 154 and 156, then the number 2 is the smallest missing number. If it were to be assumed that register 154 contained the number 2 and register 156 contained the number 3, then, of course, there would be a duplicate condition existing in registers 152 and 154. In such situation, it would be necessary to increment the contents of register 152 to the number 3 and then again perform the test. However, since, at this time, it is known that register 156 contains the number 3, accordingly, again there is a duplication. Therefore, register 152 is incremented to 4. After such incrementation, the test succeeds because the number 4 is the smallest missing number of the group consisting of the numbers 2 and 3. It is of course realized that this signifies that the number 1 is excluded from this determination.

When monostable multivibrator M5 goes "off," the signal produced thereby turns "on" monostable multivibrator M6 to produce a signal on line 374. The signal on line 374 is applied to an OR circuit 564 (FIG. 2O), the output of OR circuit 564 enabling gate 244. Considering the example as described hereinabove, line 536 is active. Accordingly, the active state of line 536 will cause an output to be produced from OR circuit 572, such output activating lines 218, 216 and 214. The signal on line 214 appears on line 184, the signal on line 216 appears on line 186 and the signal on line 218 appears on line 188. Consequently, the registers 156, 154 and 152 are included in the initial sort for the smallest missing number. The flip-flop 168 (FIG. 2T) is set to its 1 state. If either of the registers 154 or 156 also contain the number 2, then one or the other of flip-flops 170 or 172 (FIG. 2T) is also set to its 1 state.

When monostable multivibrator M6 goes "off," a monostable multivibrator M7 is turned "on" to produce a signal on line 376. The signal on line 376 is applied to gate 566 (FIG. 2Q). If there are duplicate numbers, a signal appears on line 388. However, if there are no duplicate numbers, a signal appears on line 390. A signal on line 388 is employed to turn "on" monostable multivibrator M8 and a signal on line 390 is employed to turn "on" monostable multivibrator M10. Thus, assuming that there were duplicate numbers currently present, monostable multivibrator M8 is turned "on" and a signal appears on line 378. The signal on line 378 is applied to the series of AND circuits (FIGS. 2Q, 2T an 2V) which transfer the 1 setting of the flip-flop in the group of flip-flops 170, 172, 174, 176, 178, 180 and 182 (FIGS. 2T and 2V) that were set to 1 because of a duplicate number to the group of flip-flops designated by the numerals 232, 234, 236, 238, 240 and 242 respectively (FIG. 2R). This operation removes the duplicate number which might have existed, for example, in either register 154 or 156 from the next sort because if, for example, either flip-flop 232 or flip-flop 234 being set to 1, either line 186 or line 188 would be deactivated.

When monostable multivibrator M8 goes "off," a monostable multivibrator M9 is turned "on" to produce a signal on line 380 which is applied to OR circuit 550 (FIG. 2Q). The consequent output of OR circuit 550 resets flip-flops 168, 170, 172, 174, 176, 178, 180 and 182 to their 0 states. The signal on line 380 is also employed to increment register 152 (FIG. 2P).

When monostable multivibrator M9 goes "off," a signal is produced thereby which turns "on" monostable multivibrator M6. This signal is operative to effect the repeating of the sort for the smallest missing number and if the test for duplicate numbers indicates that there is no duplicate number, then monostable multivibrator M10 is turned "on" to produce a signal on line 382. The signal on line 382 is employed to enable gate 228 (FIG. 2O) and gate 244 (FIG. 2O). In the above described example, where the LRU number is 4, the effect of enabling gates 228 and 244 is to transfer the active states on lines 216 and 218 to lines 112 and 114 (FIG. 2O). The active states of lines 112 and 114 set flip-flops 200 and 202 to their 1 states. With the latter action, there is completed the setting up of the mask flip-flops, viz. flip-flops 200, 202, 204, 206, 208, 210 and 212 (FIGS. 2T and 2V). The mask flip-flops control the selective shift down of the contents registers (FIGS. 2P, 2S and 2U). Thus, for example, it is to be noted that lines 124 and 126 (FIG. 2T) extend to register 154. Lines 128 and 130 extend to register 156, etc. The signal on line 382 is also applied to a gate 230 (FIG. 2Q) in order to increment one of the counters (FIG. 2Q), i.e., the counter which corresponds to the smallest missing number.

There now remains the applying of the two shift pulses. The first shift pulse is provided by the signal which is produced on line 384 when the monostable multivibrator M11 goes "on." Thereafter, the second shift pulse is provided on line 386 and is produced when the monostable multivibrator M12 turns "on."

FIGS. 3A to 3D, taken together as in FIG. 3, respectively depict suitable embodiments of stages 406, 408, 410, 412, 414 and 416 and how they are connected.

Figure 4:
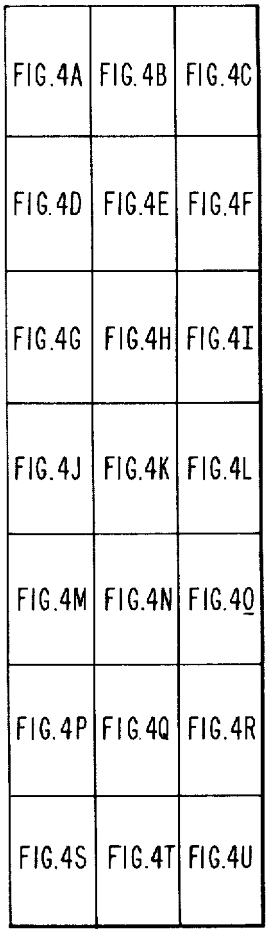
FIGS. 4A to 4U, taken together as in FIG. 4, constitute a block diagram of the MIN box or OPT stack, there being traced in this FIG. the circuits through the MIN box in performing the first phase of the arithmetic example shown in FIG. 9.
Figure 6:
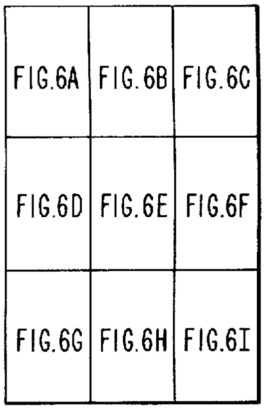
FIGS. 6A to 6I, which are taken together as in FIG. 6, are identical to FIGS. 5A to 5I, there being traced in this FIG., the circuits through the MIN box in performing the third phase of the arithmetic example shown in FIG. 9.
Figure 8:
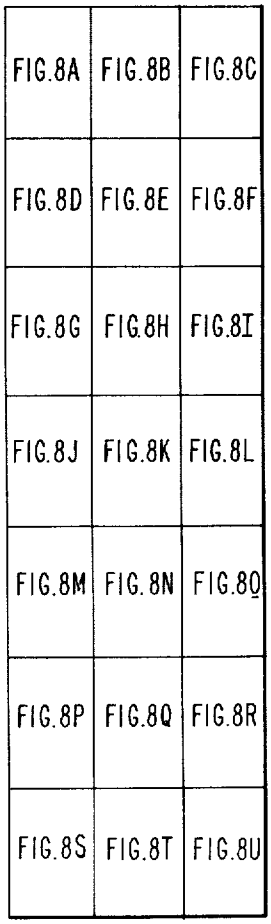
FIGS. 8A to 8U, which are taken together as in FIG. 8, are identical to FIGS. 4A to 4U, there being traced in this FIG., the circuits through the MIN box in performing the final phase of the arithmetic example shown in FIG. 9.
Figure 7:
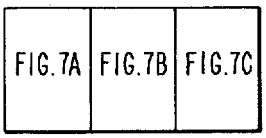
FIGS. 7A to 7C, which are taken together as in FIG. 7, are identical to FIGS. 4A to 4C, 5A to 5C and 6A to 6C, there being traced in this FIG., the circuits through the MIN box in performing the fourth phase of the arithmetic example shown in FIG. 9.
Figure 4A:
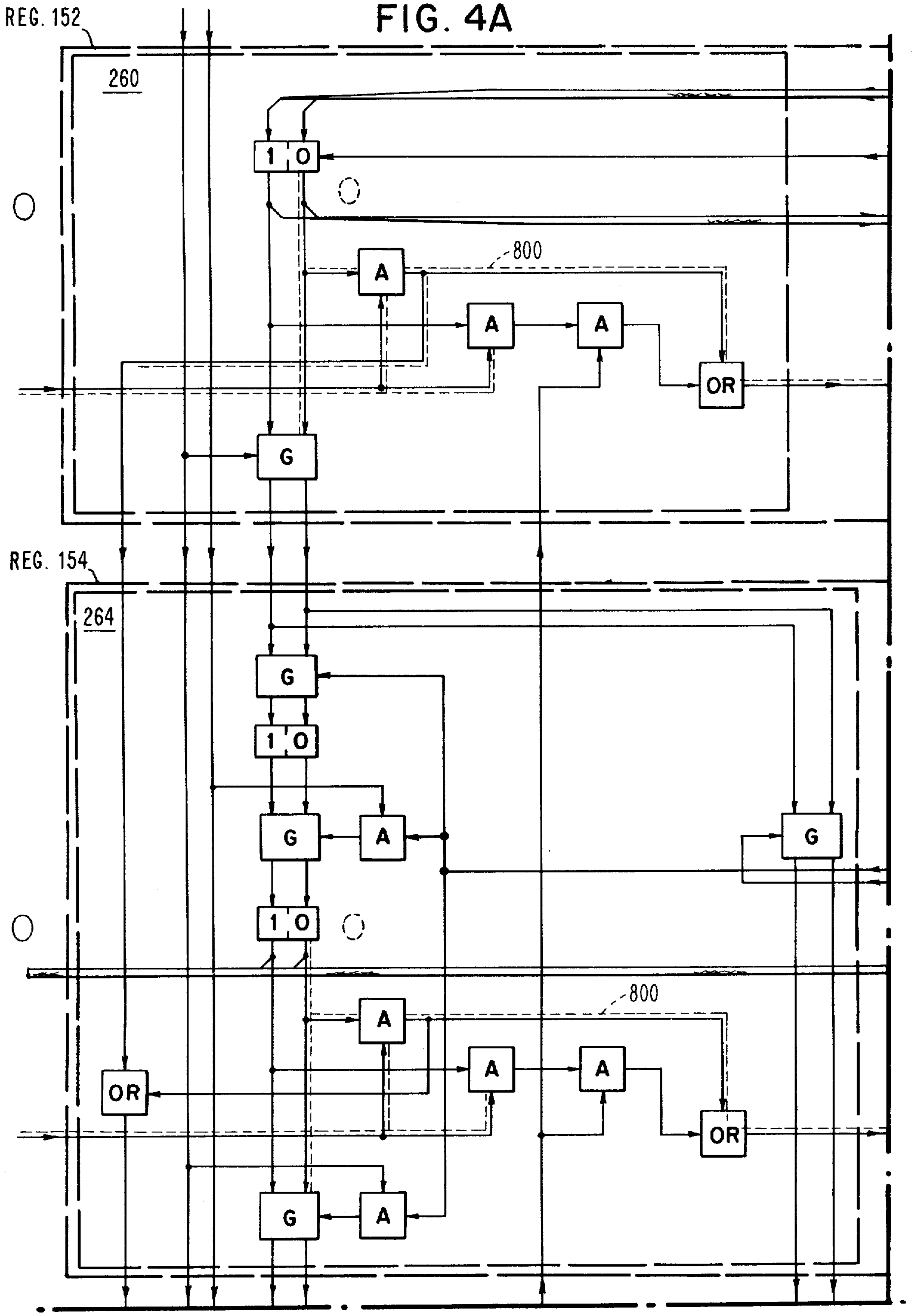
Figure 4B:
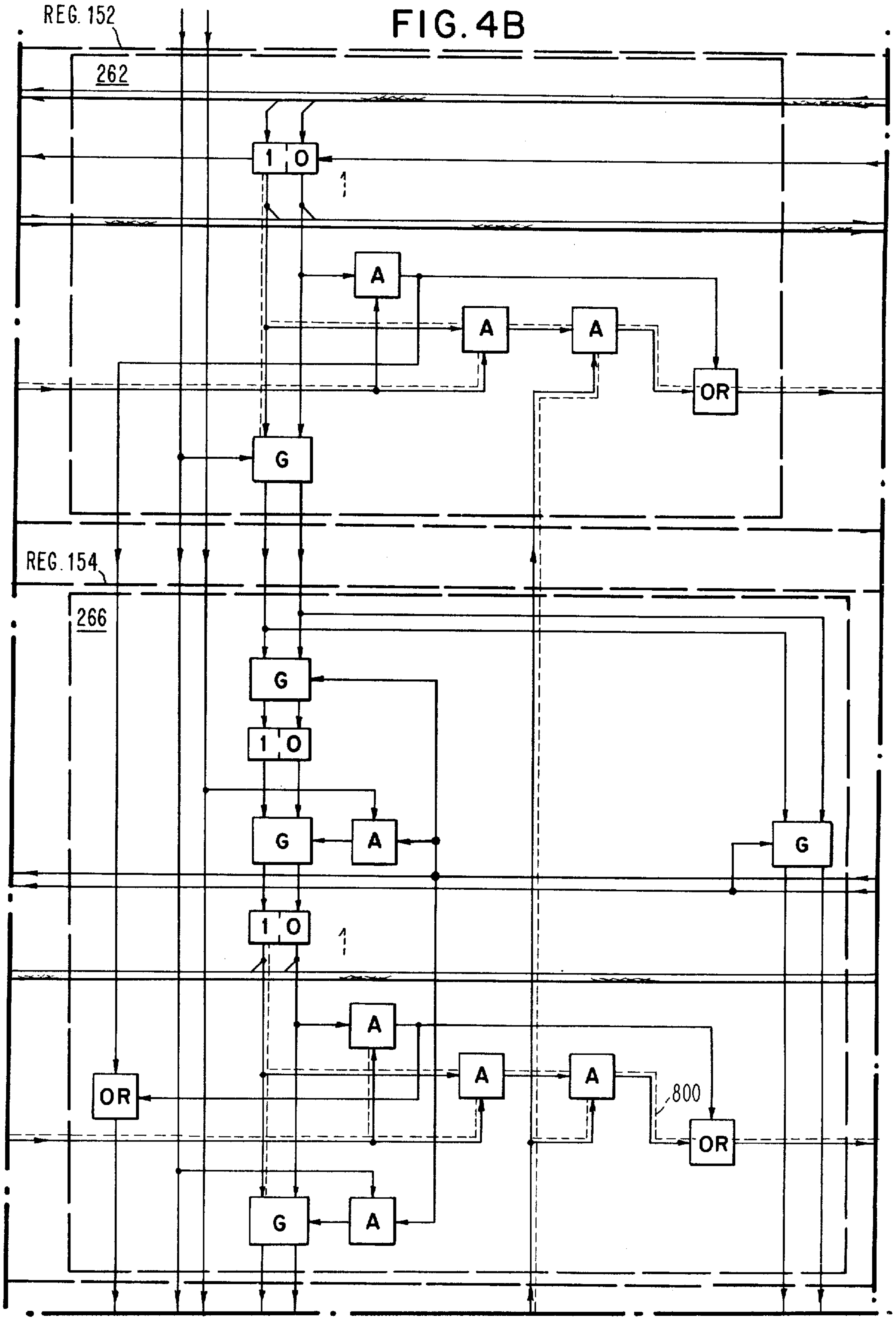
Figure 4C:
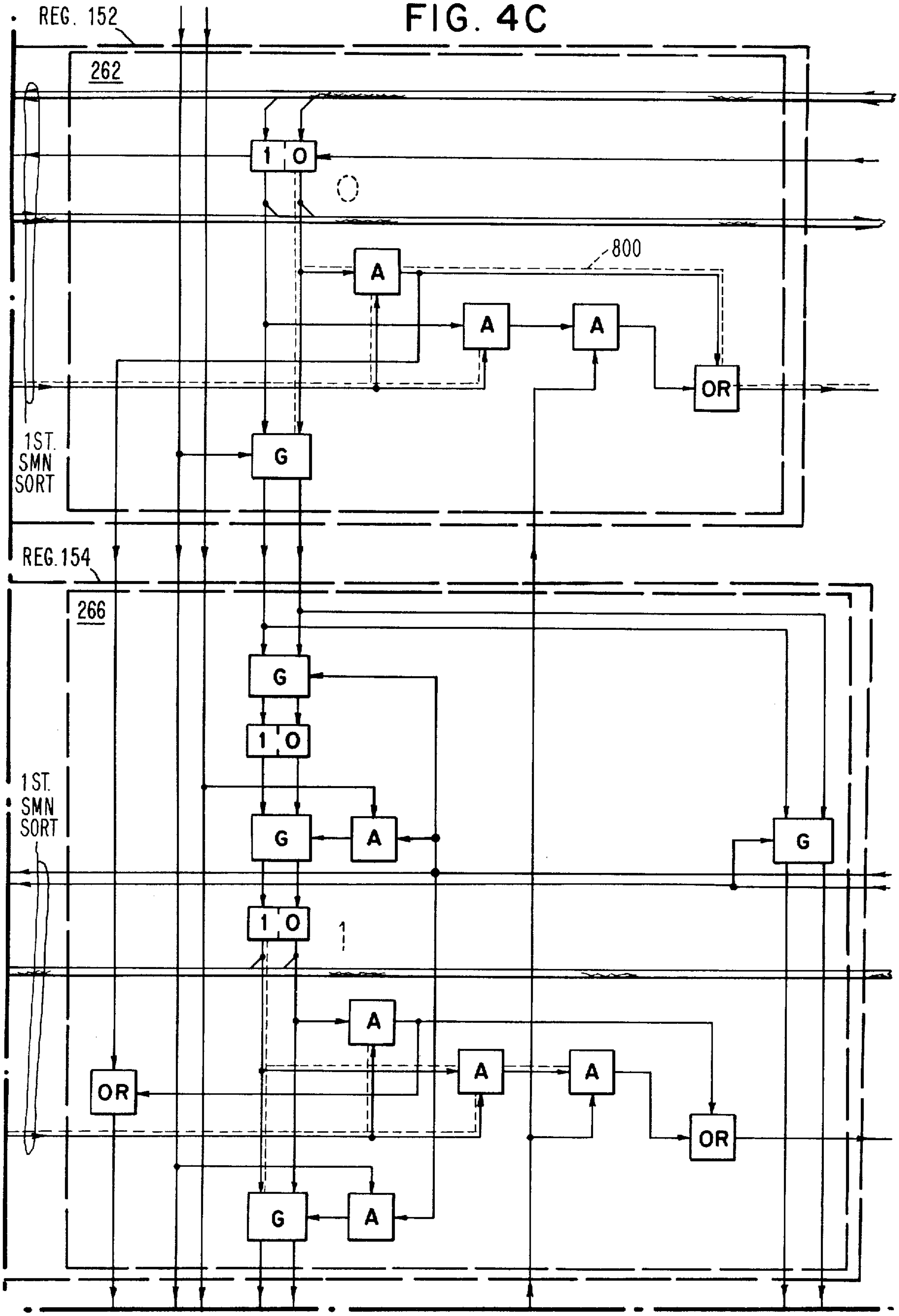
Figure 4D:
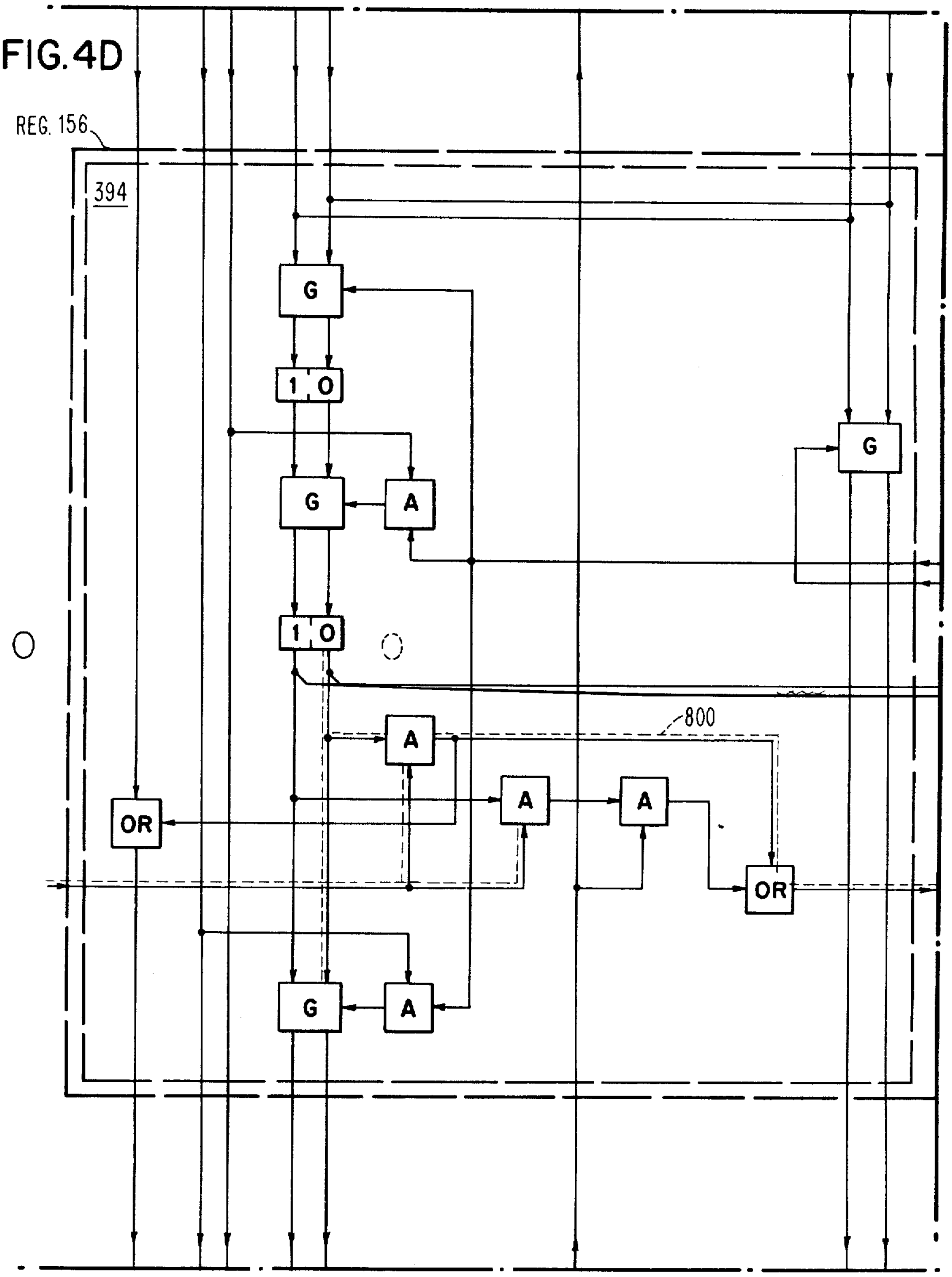
Figure 4E:
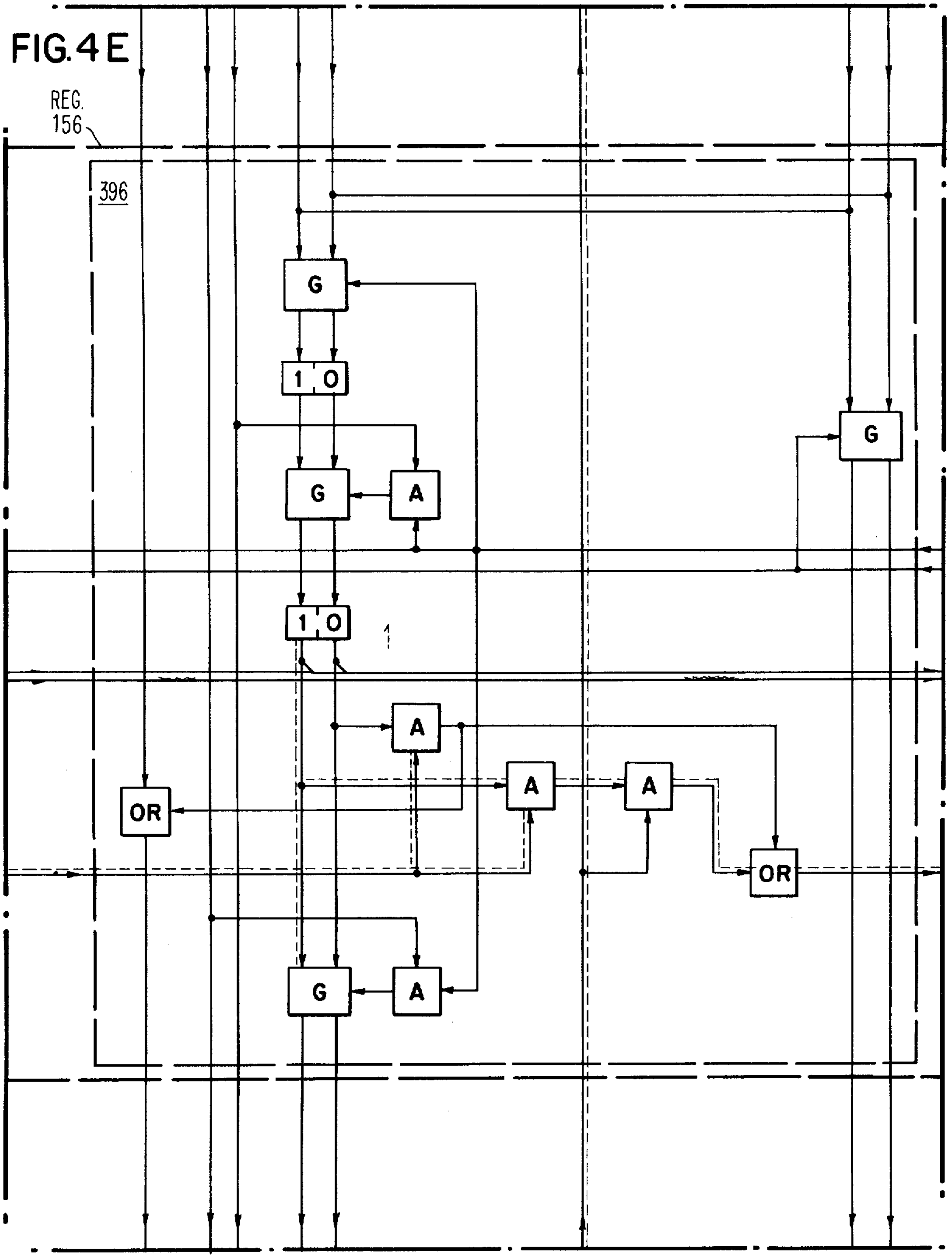
Figure 4F:
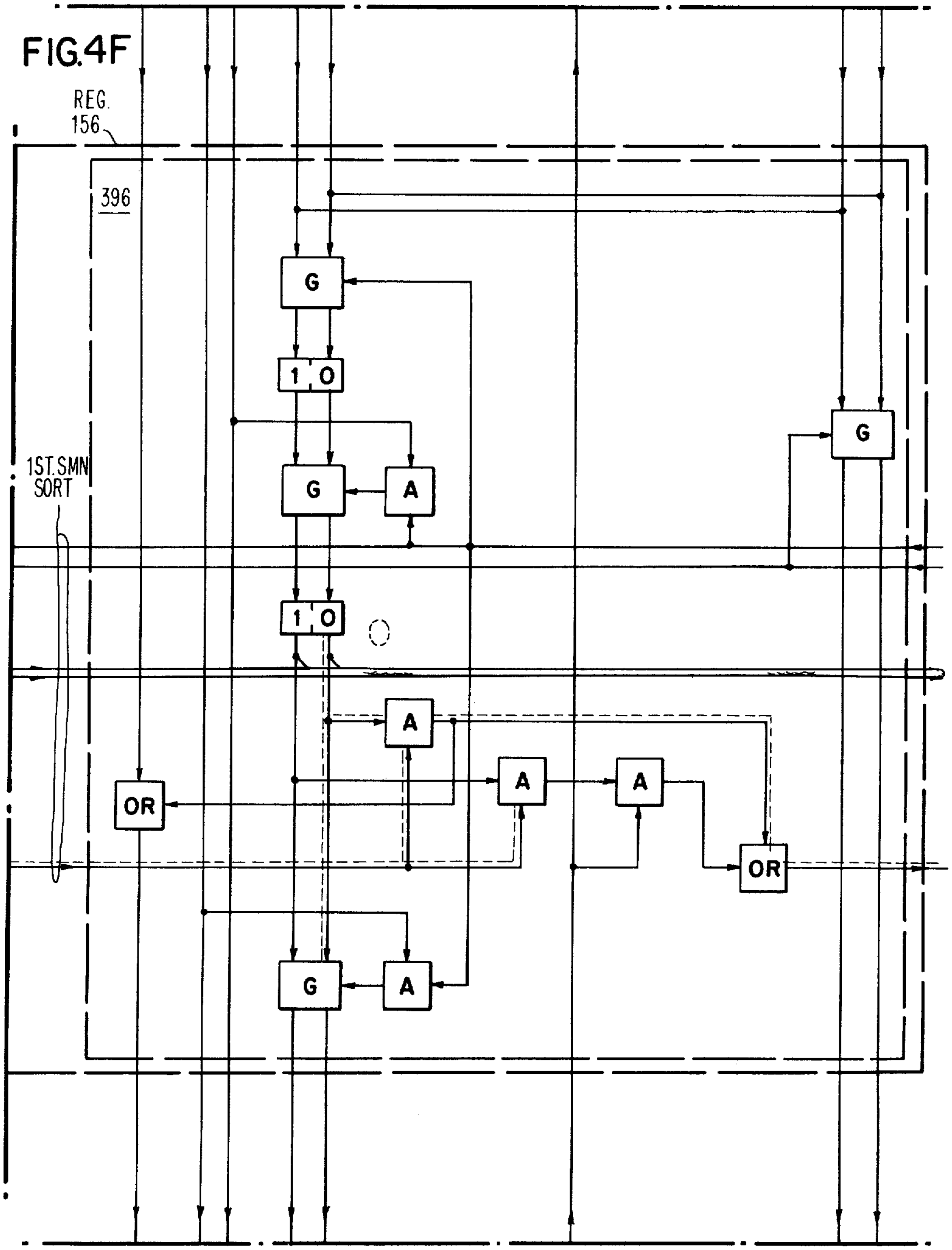
Figure 4G:
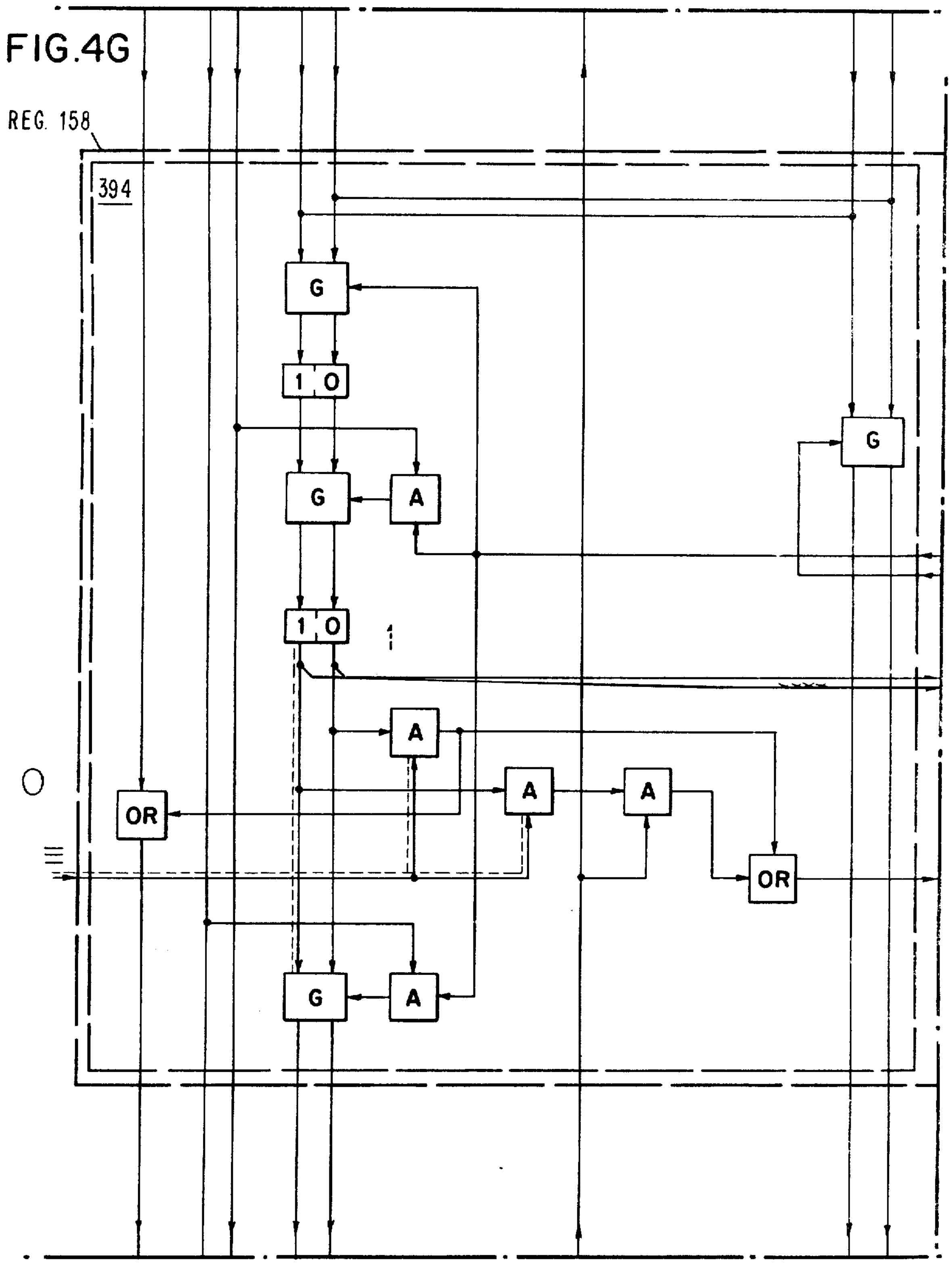
Figure 4H:
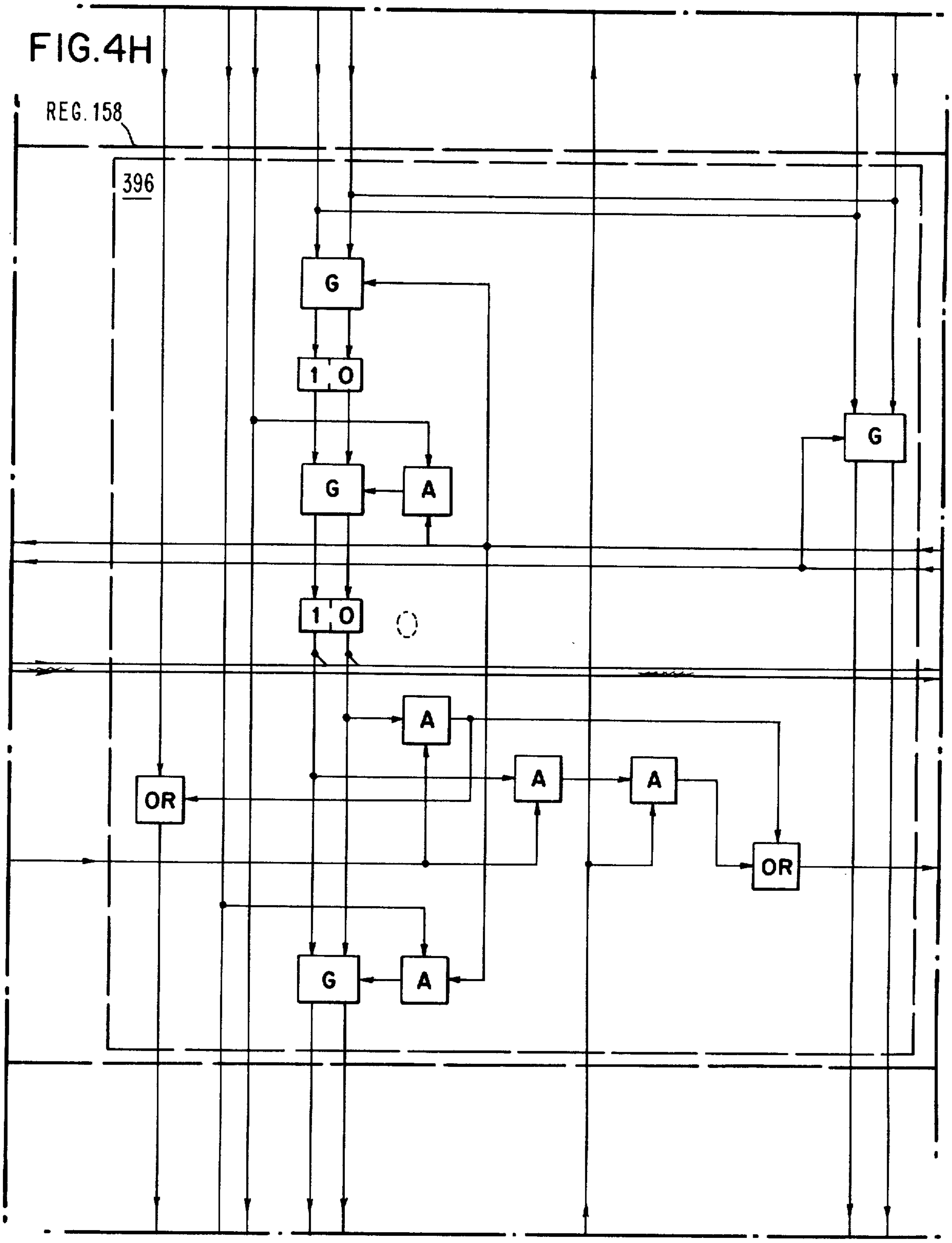
Figure 4I:
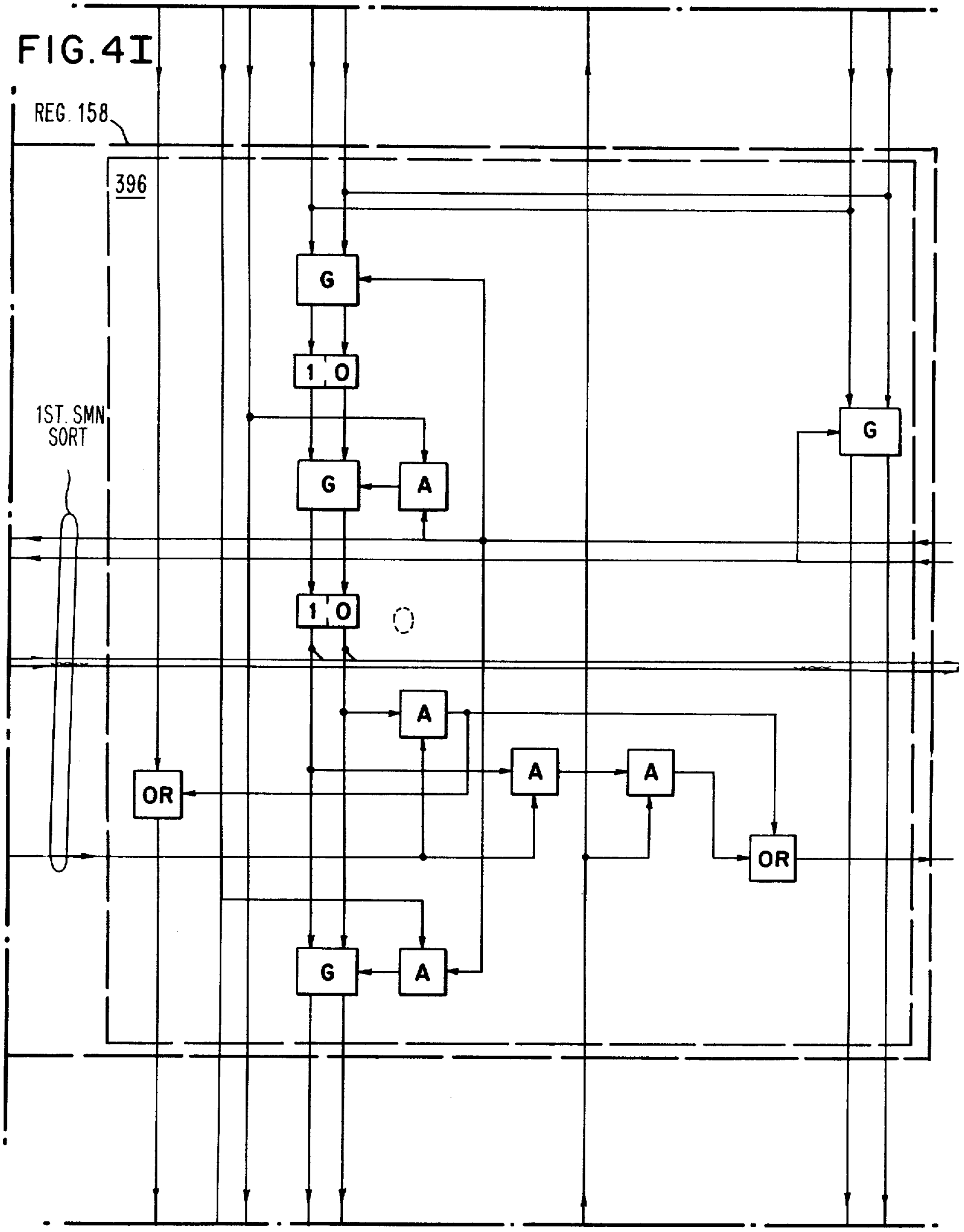
Figure 4J:
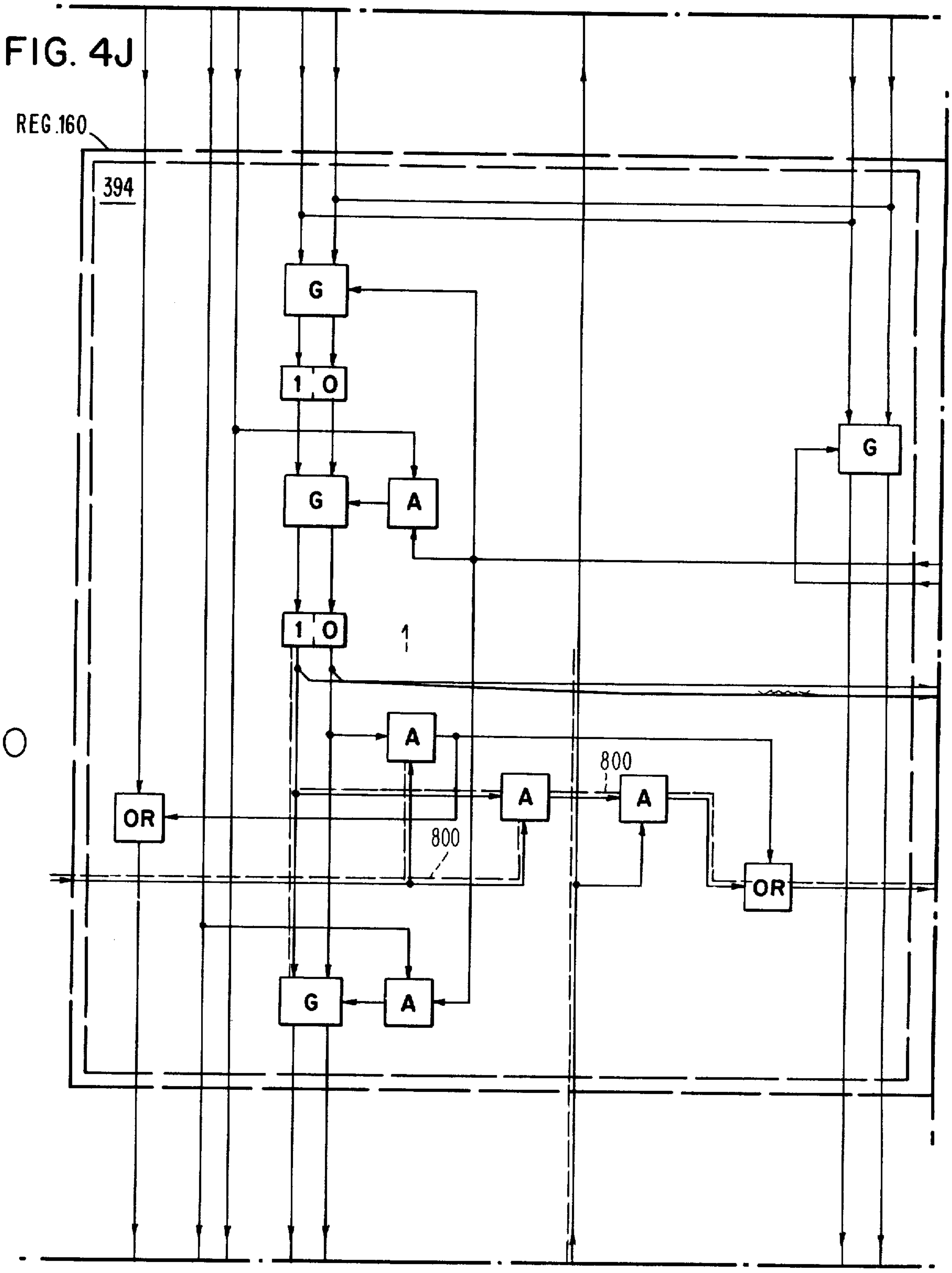
Figure 4K:
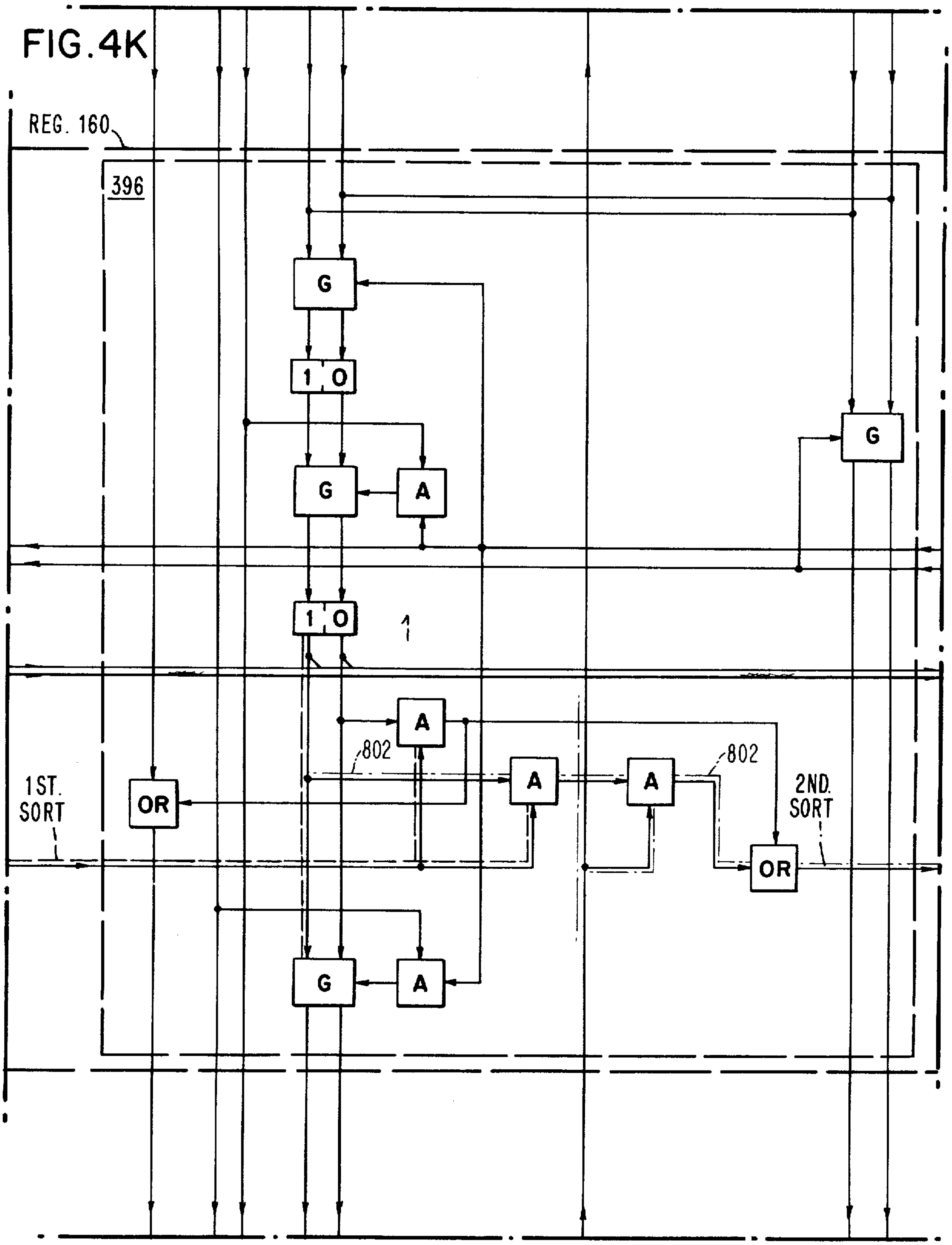
Figure 4L:
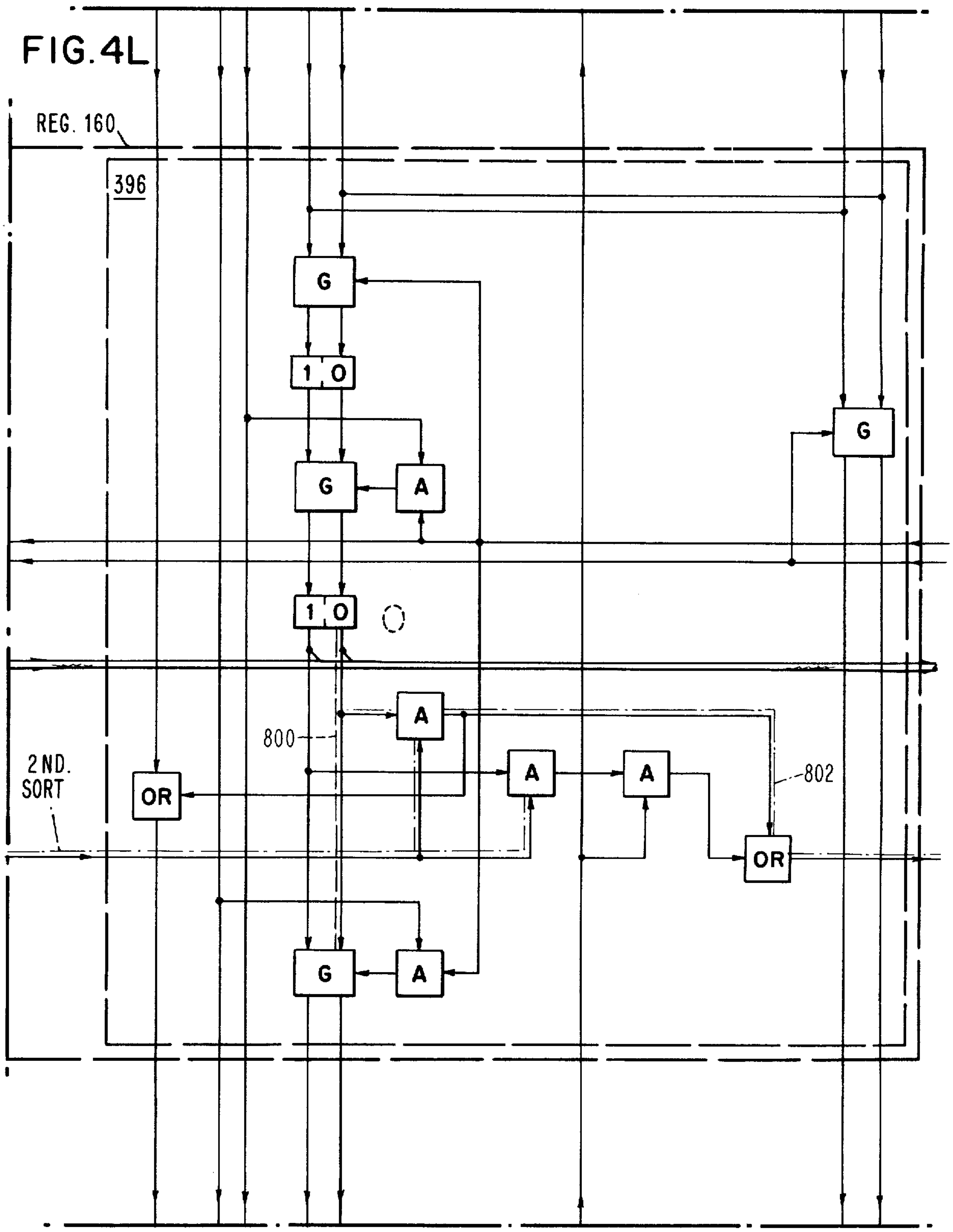
Figure 4M:
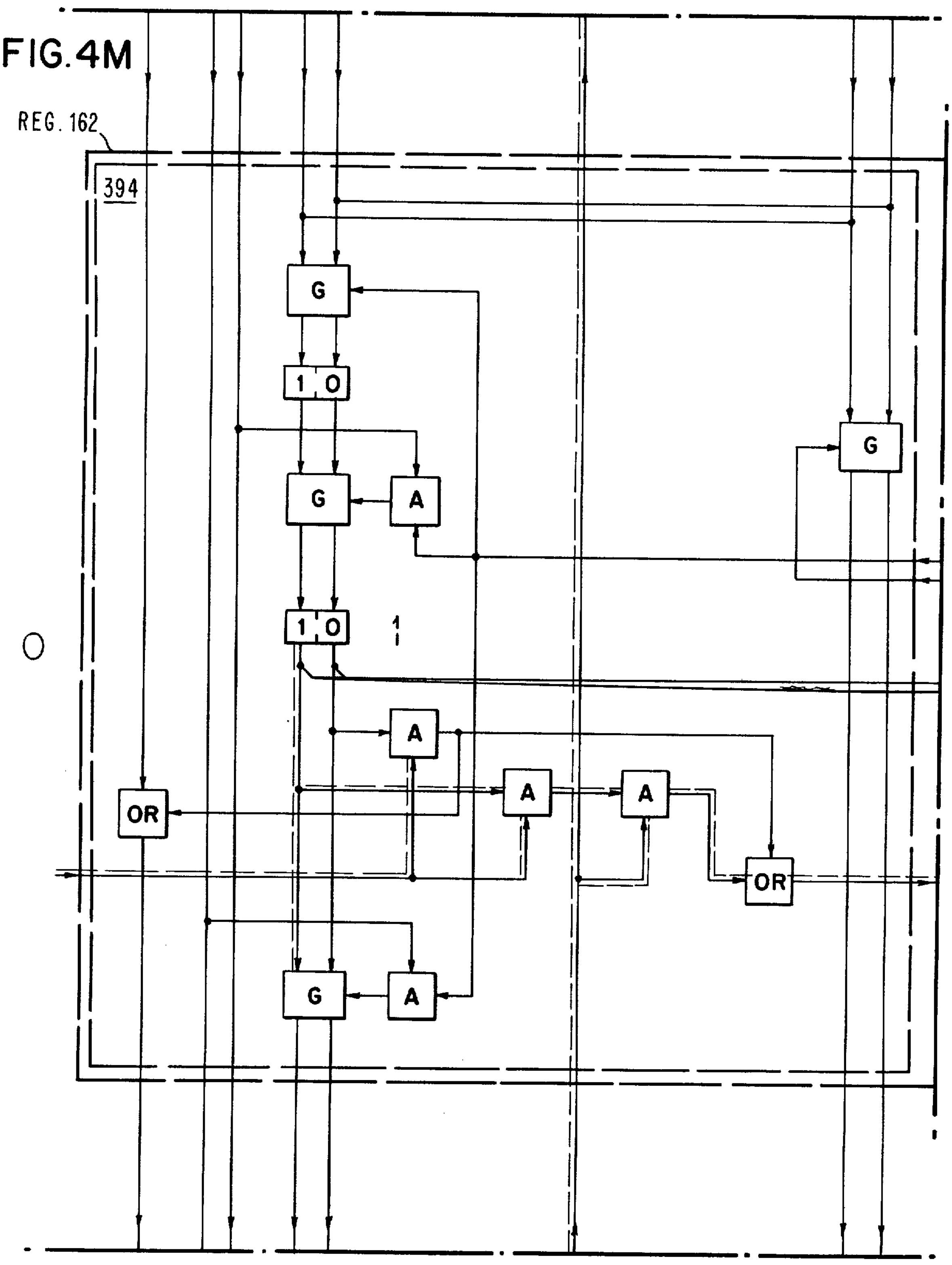
Figure 4N:
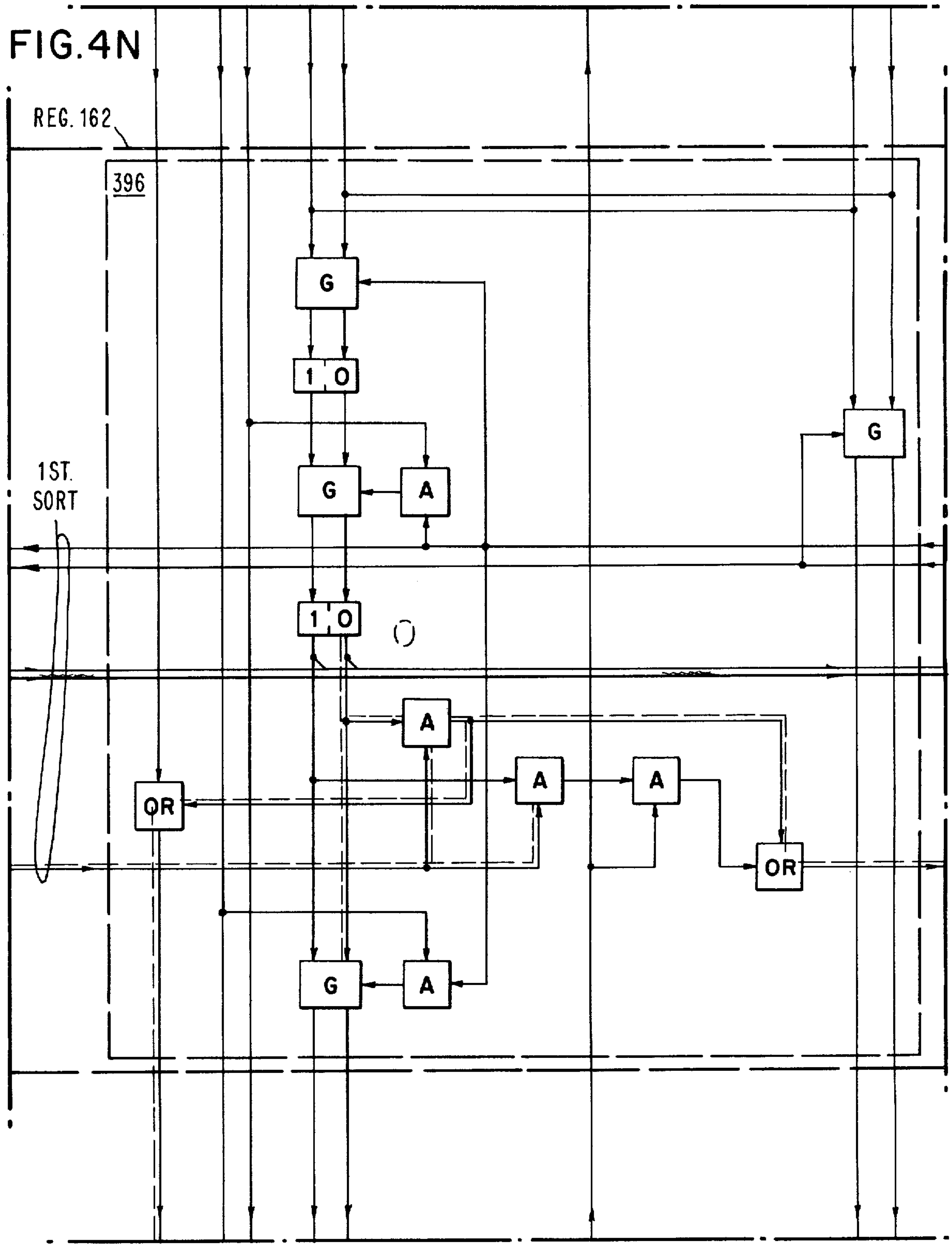
Figure 40:
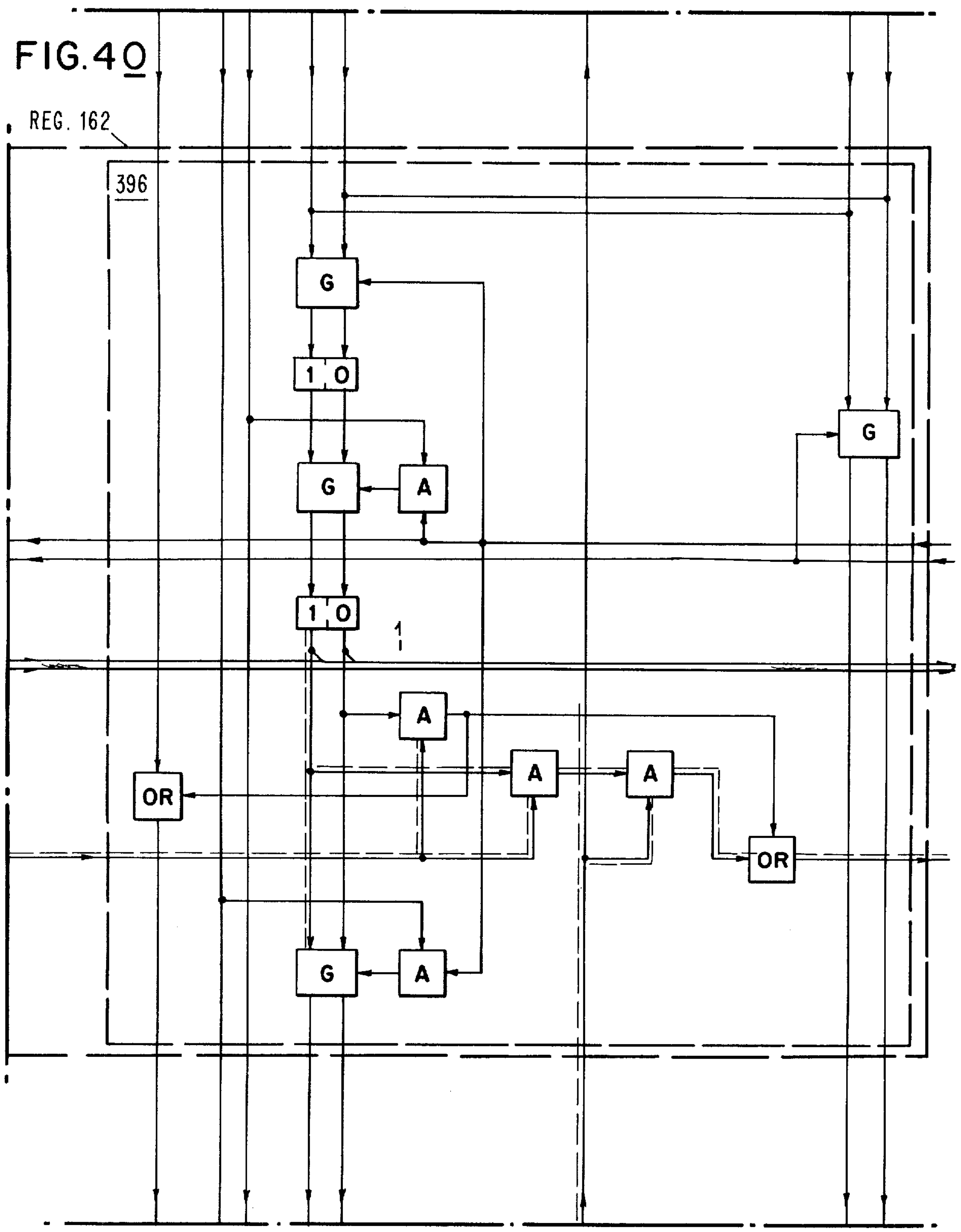
Figure 4P:
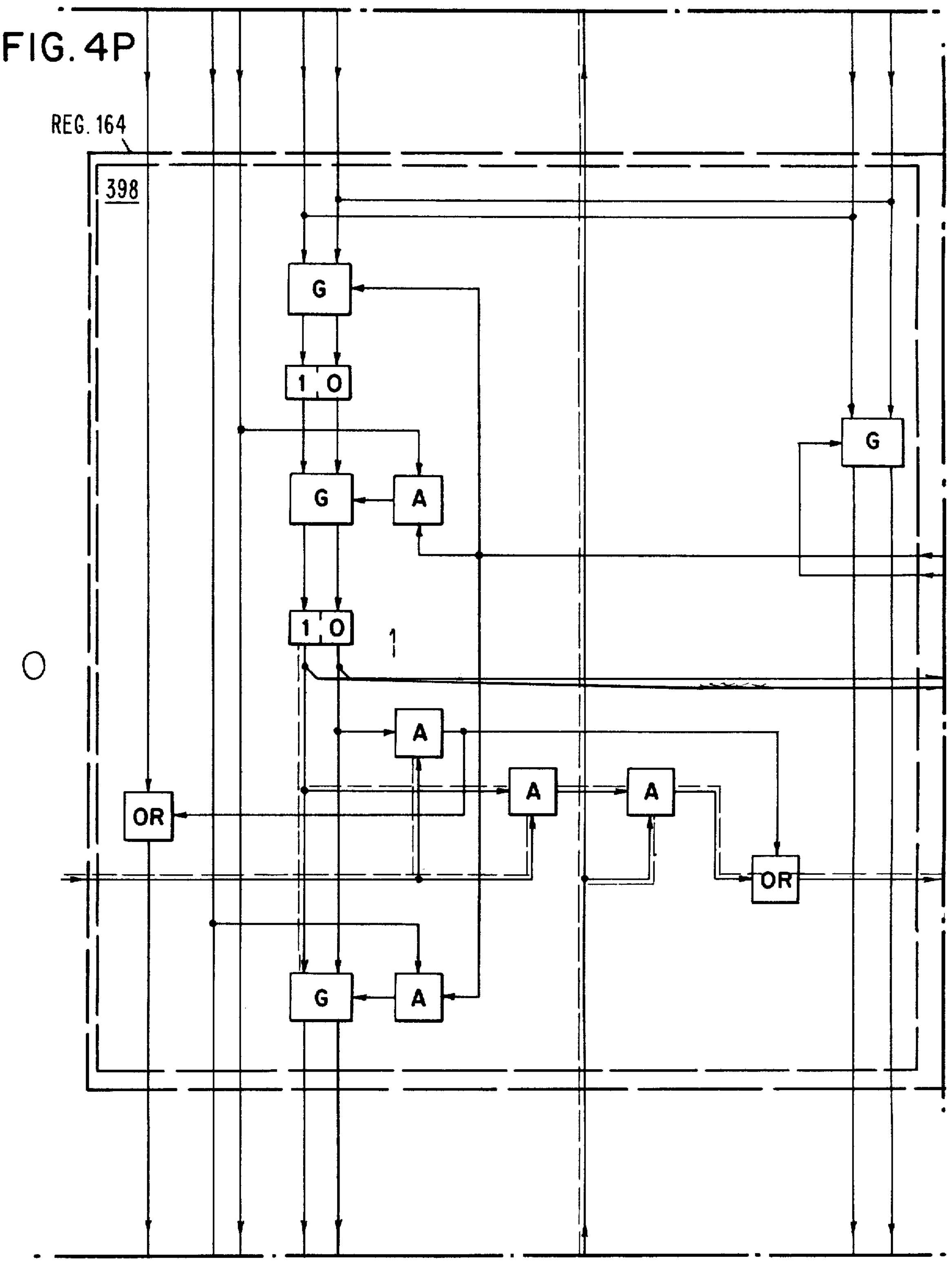
Figure 4Q:
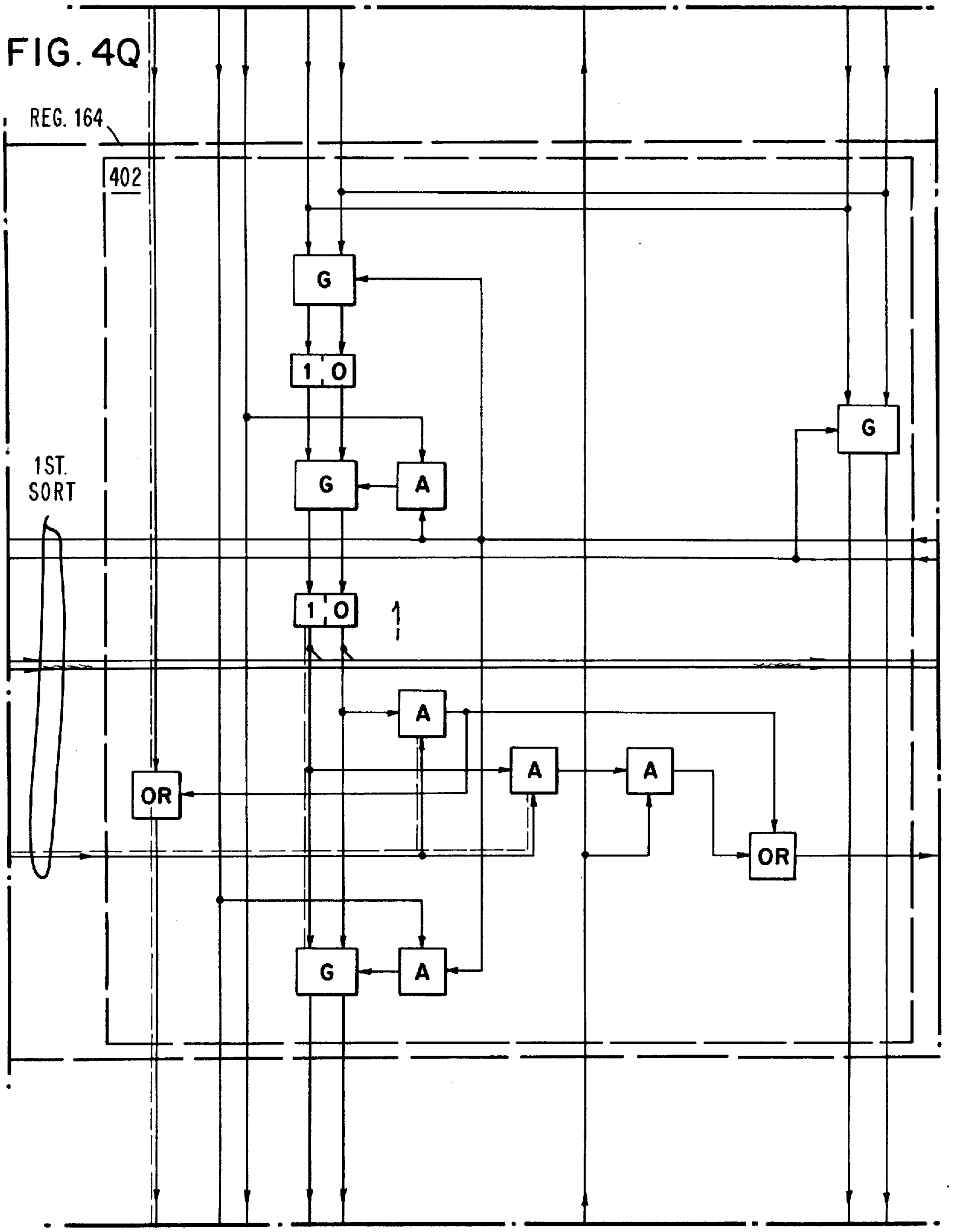
Figure 4R:
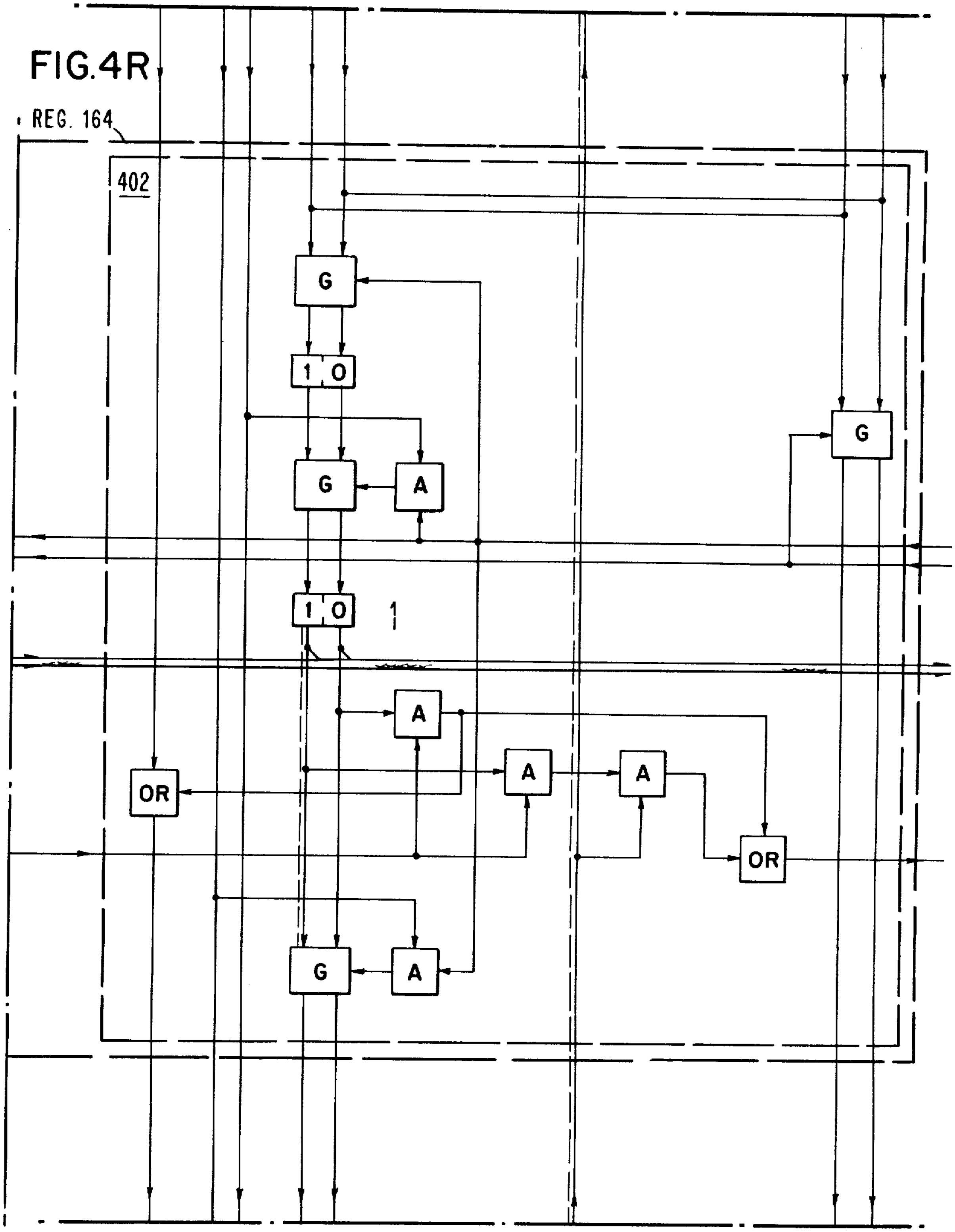
Figure 4S:
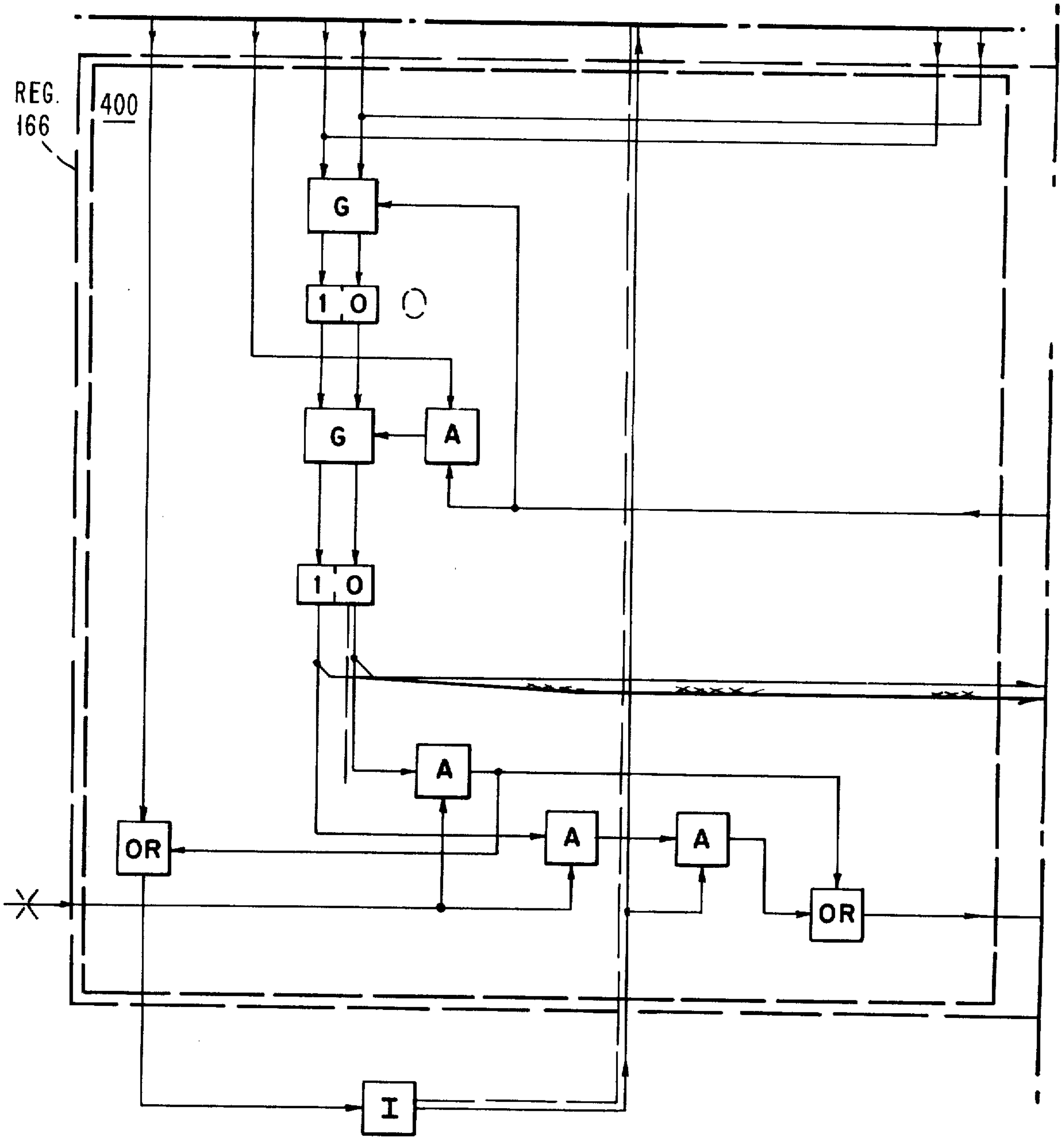
Figure 4T:
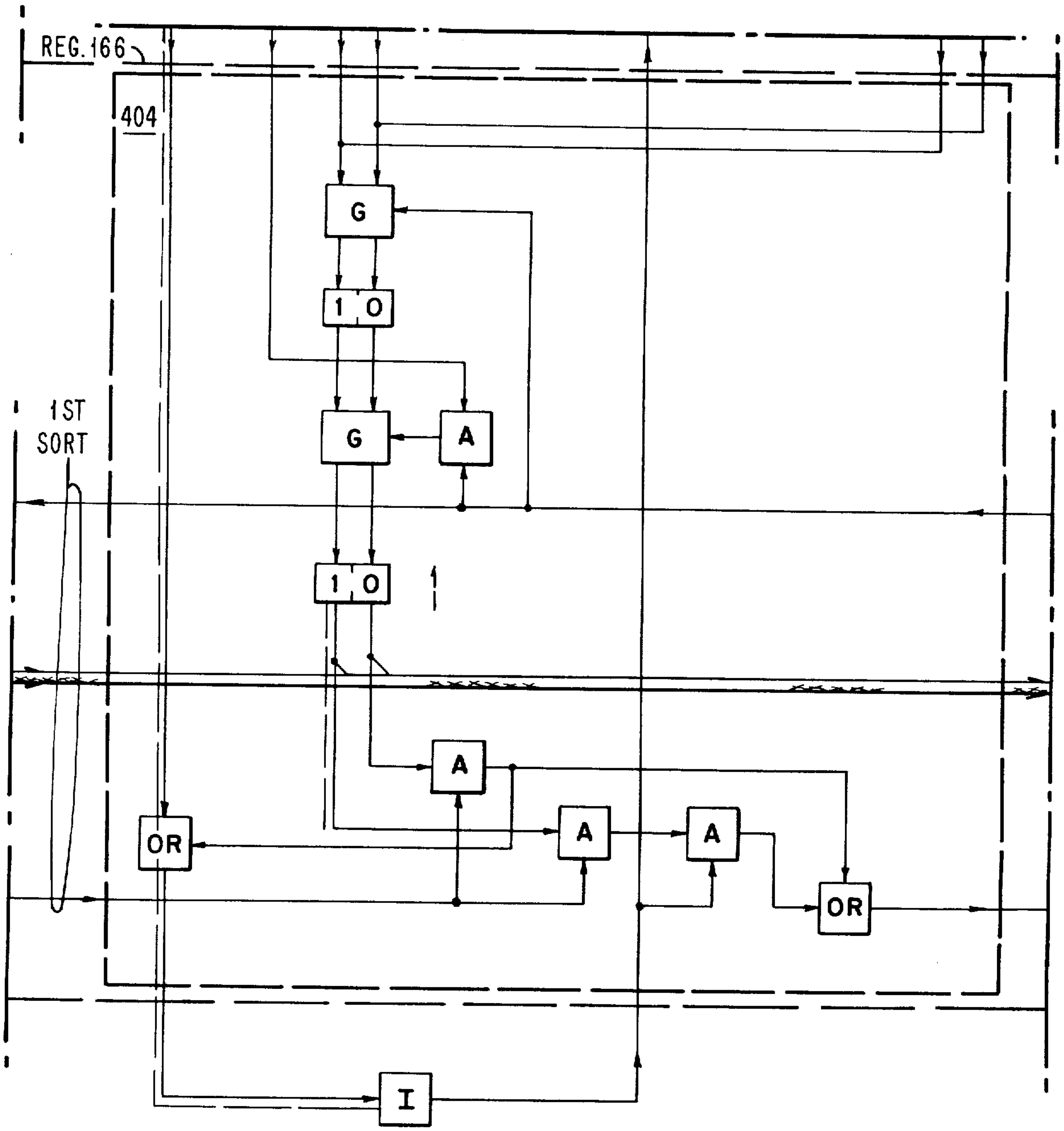
Figure 4U:
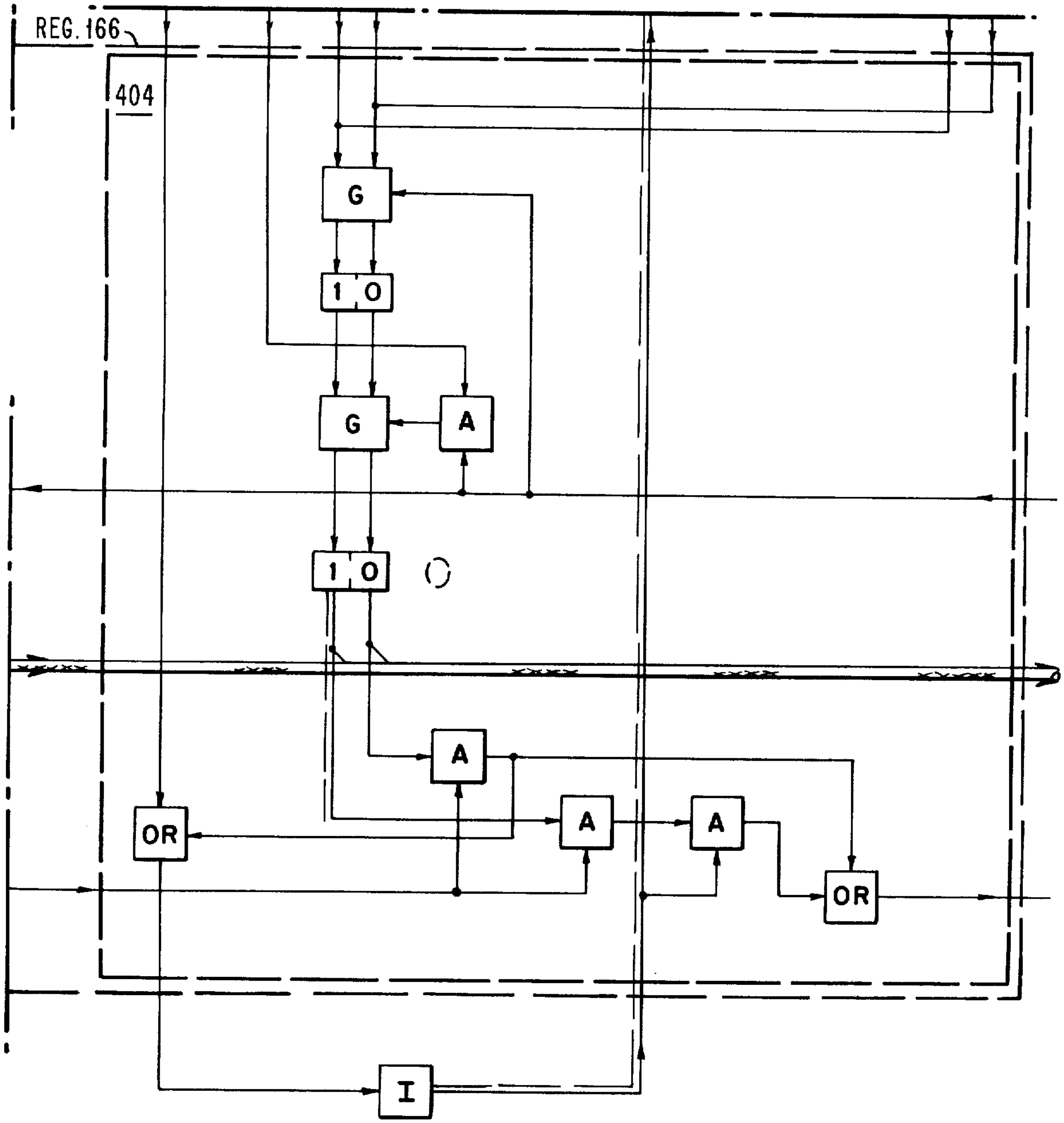
Figure 5A:
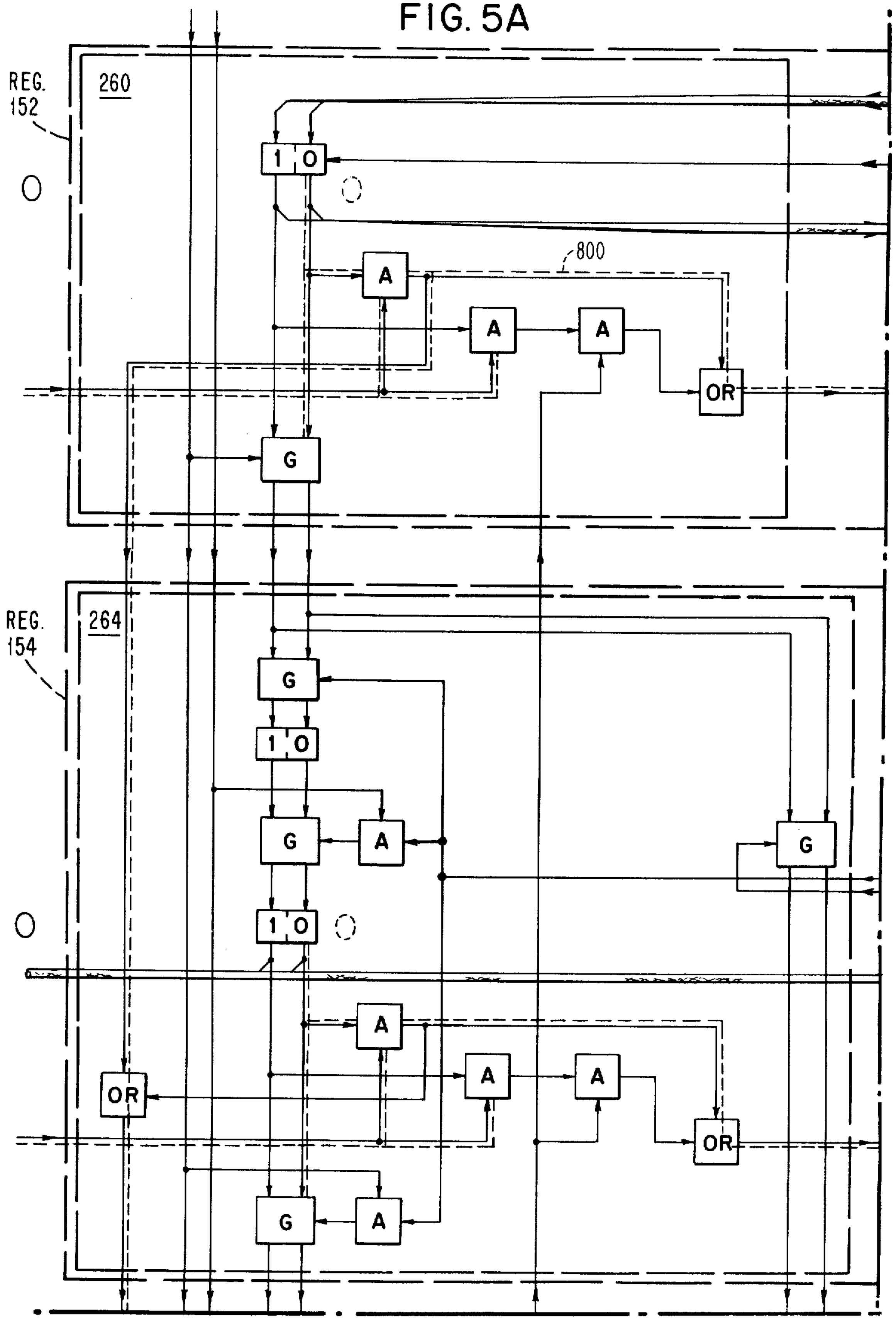
Figure 5B:
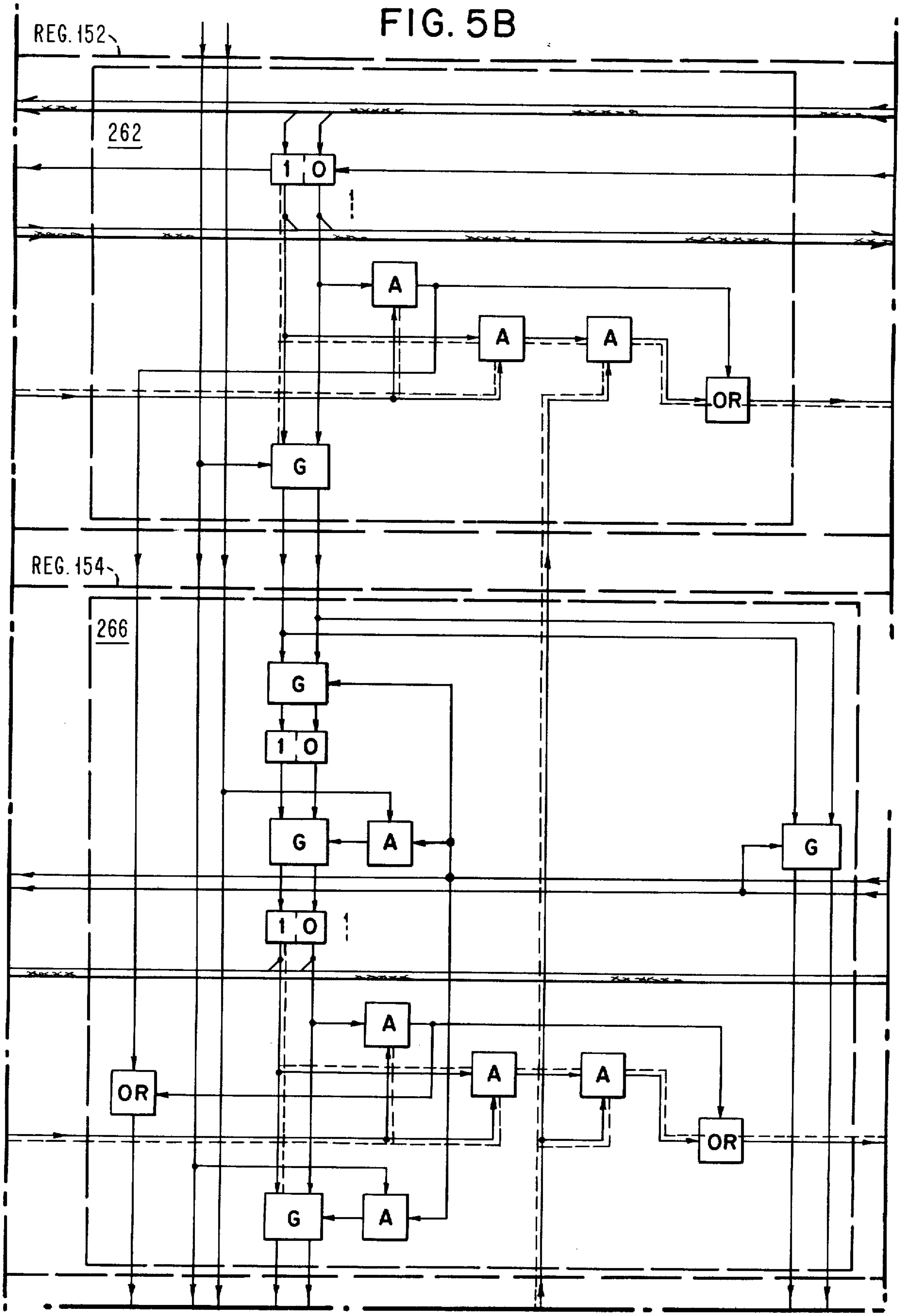
Figure 5C:
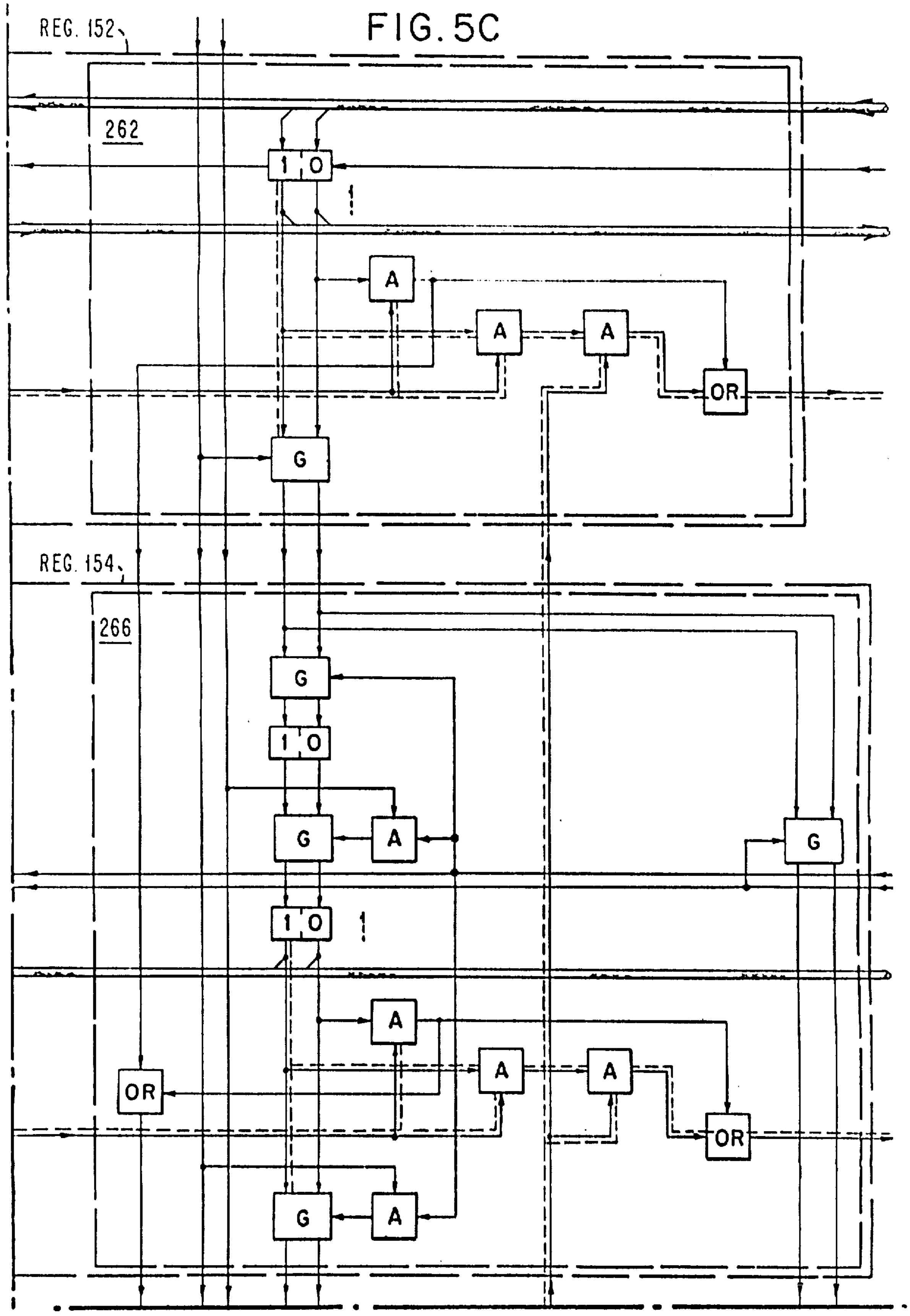
Figure 5D:
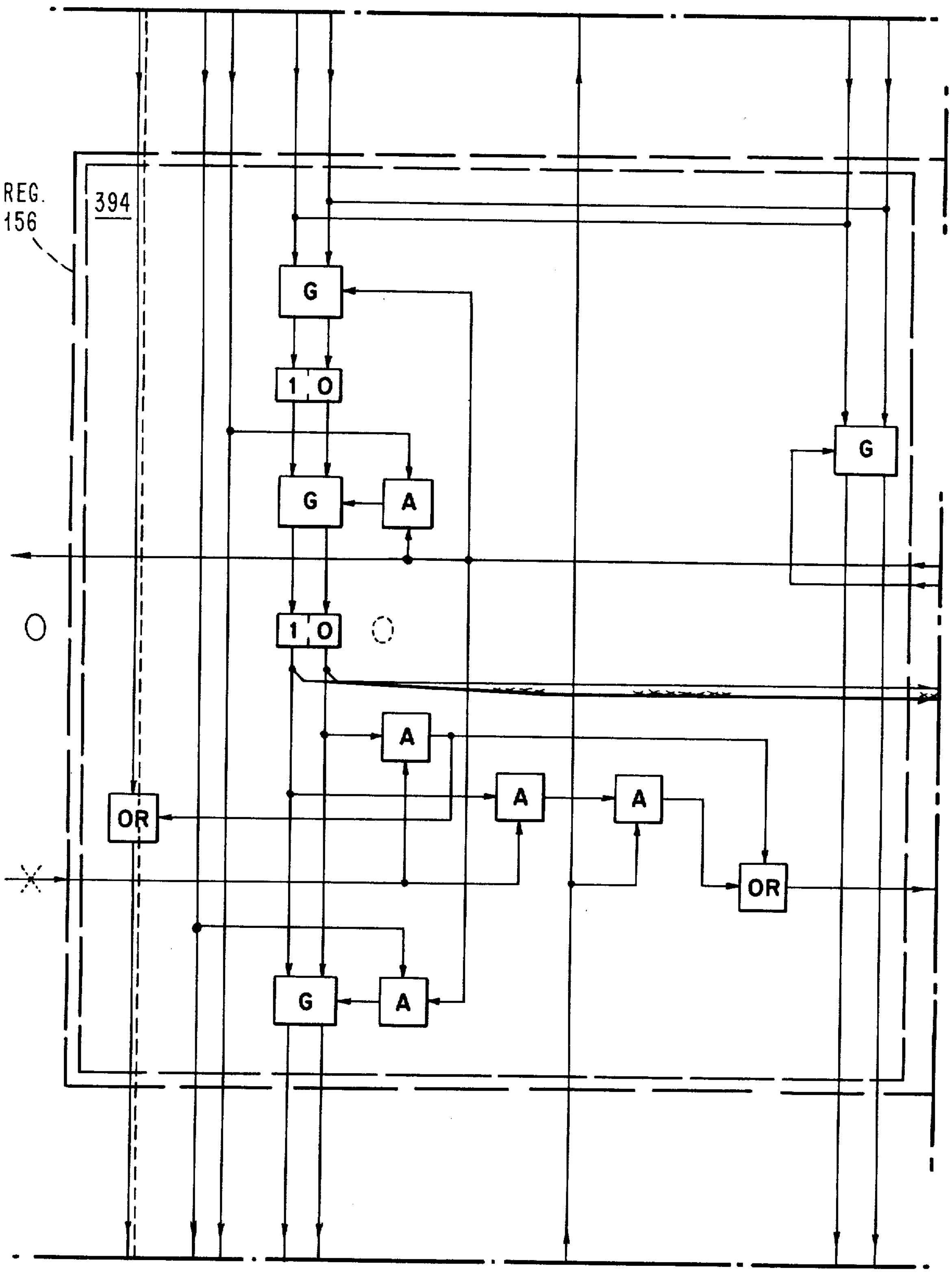
Figure 5E:
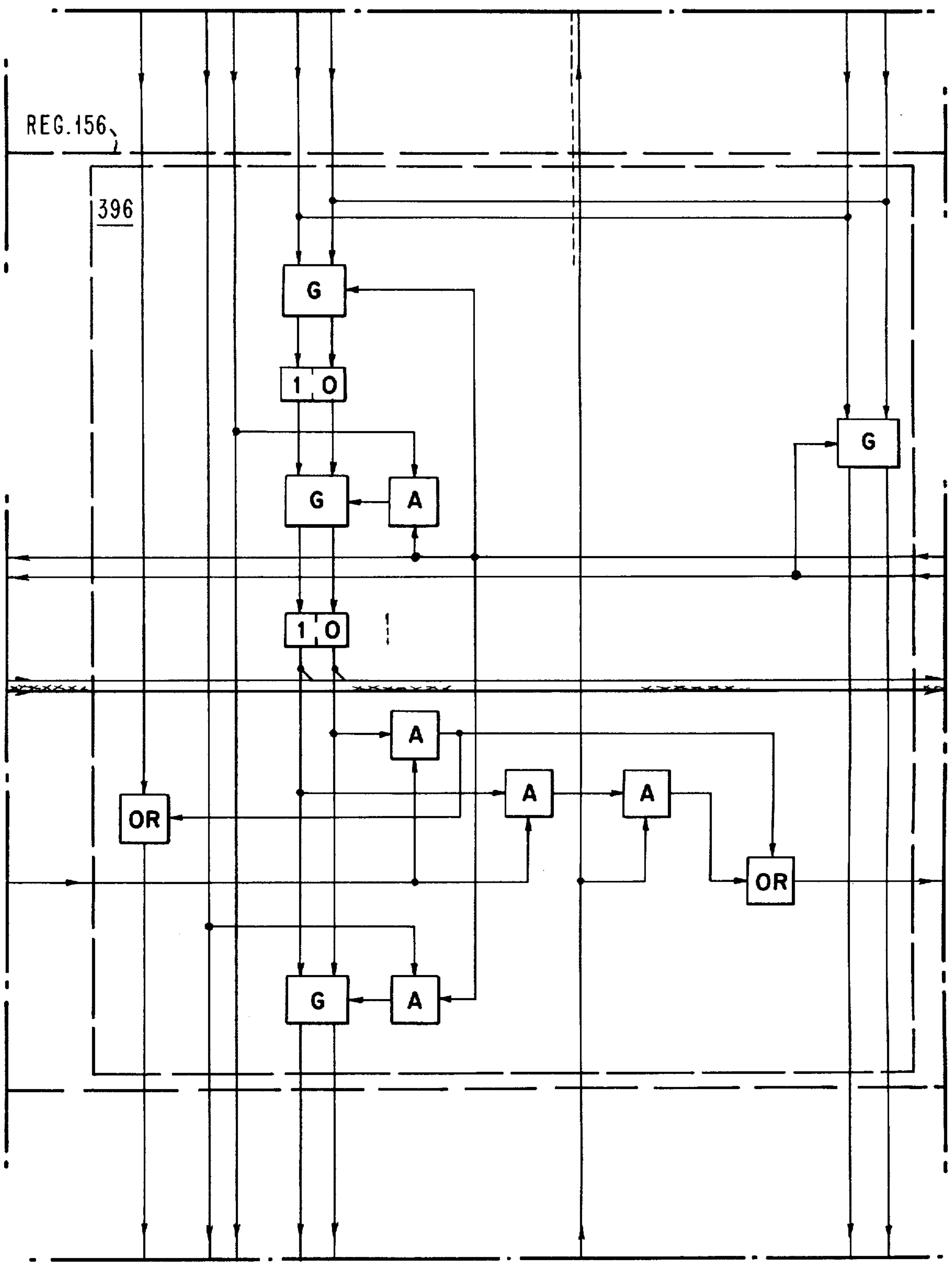
Figure 5F:
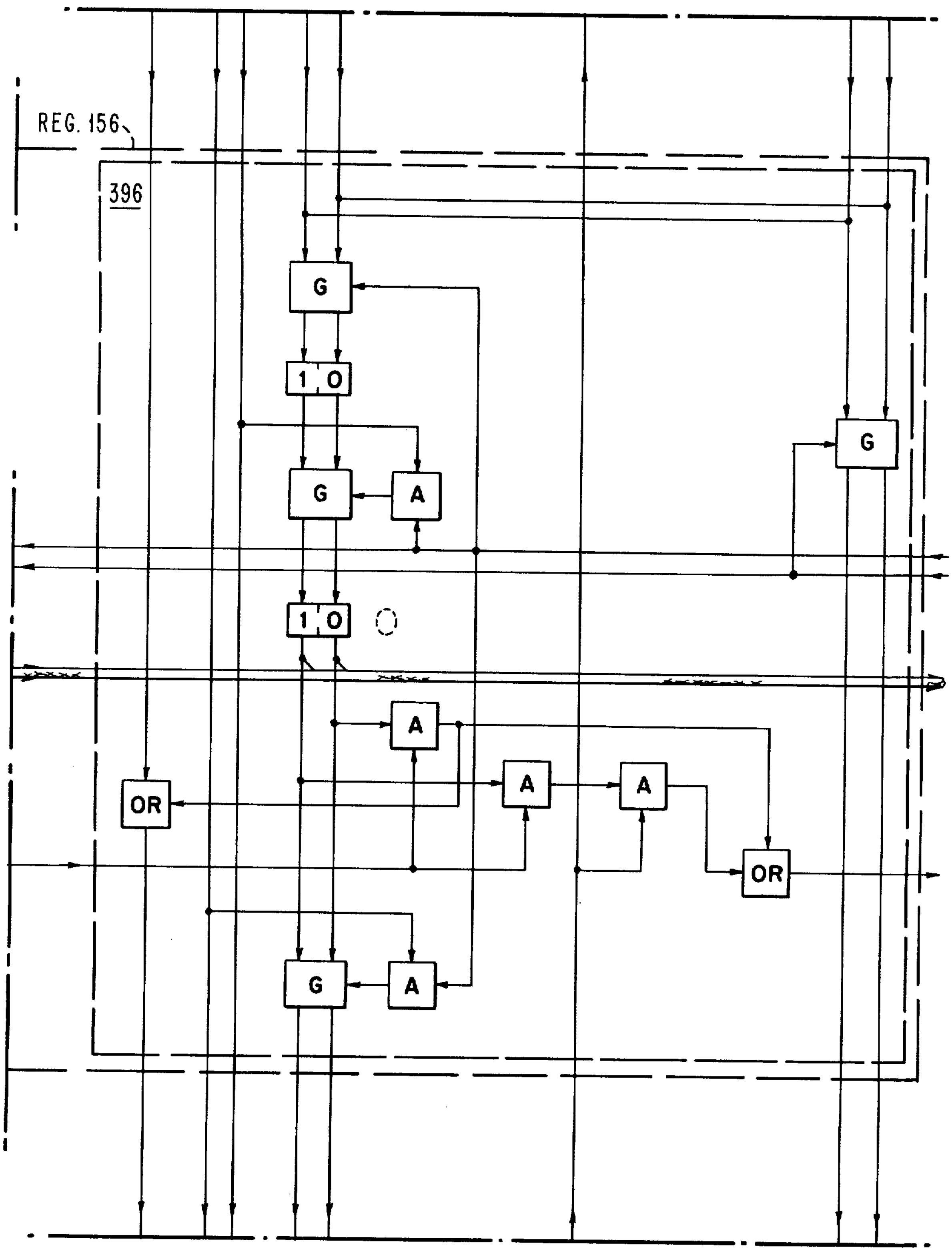
Figure 5G:
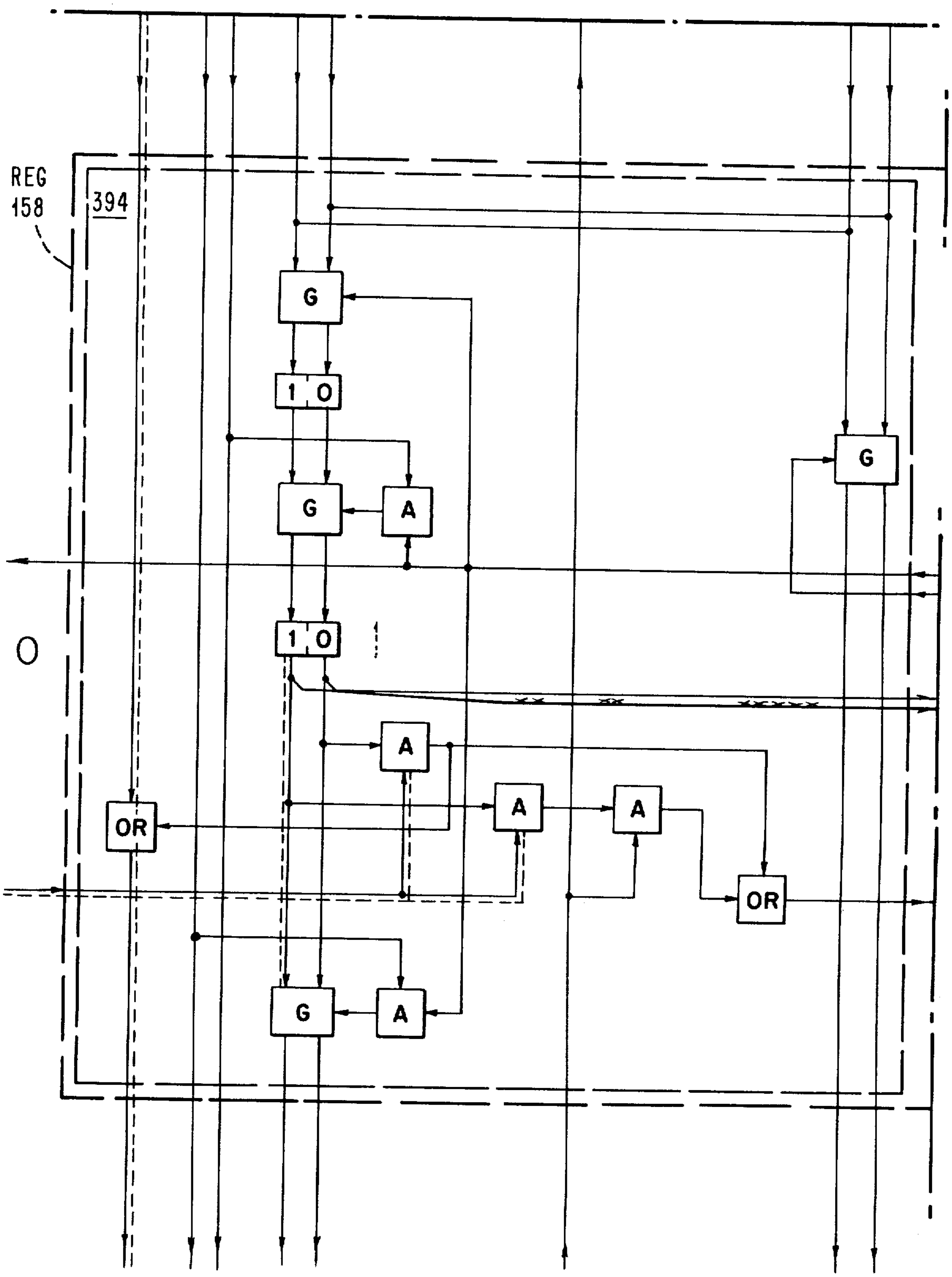
Figure 5H:
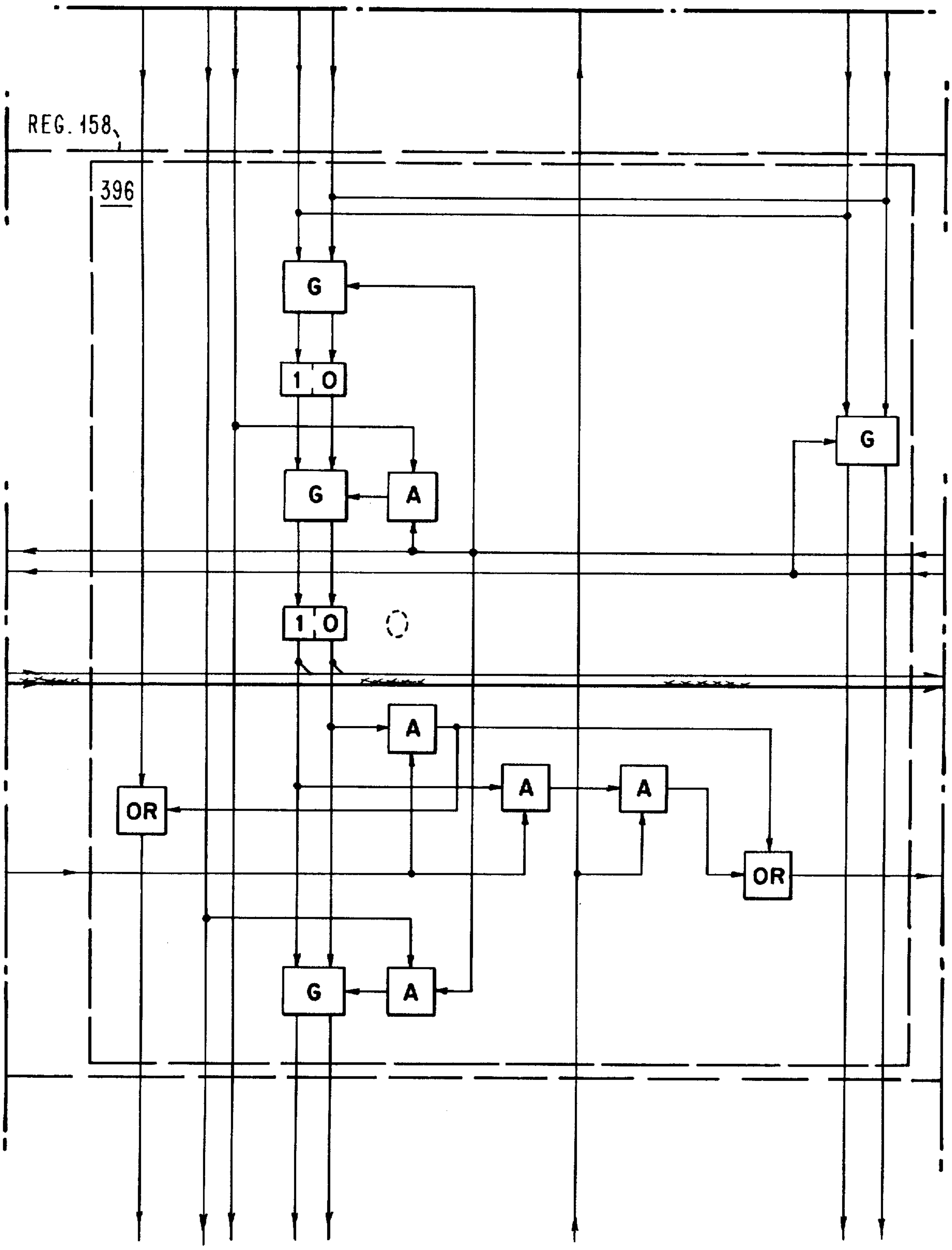
Figure 5I:
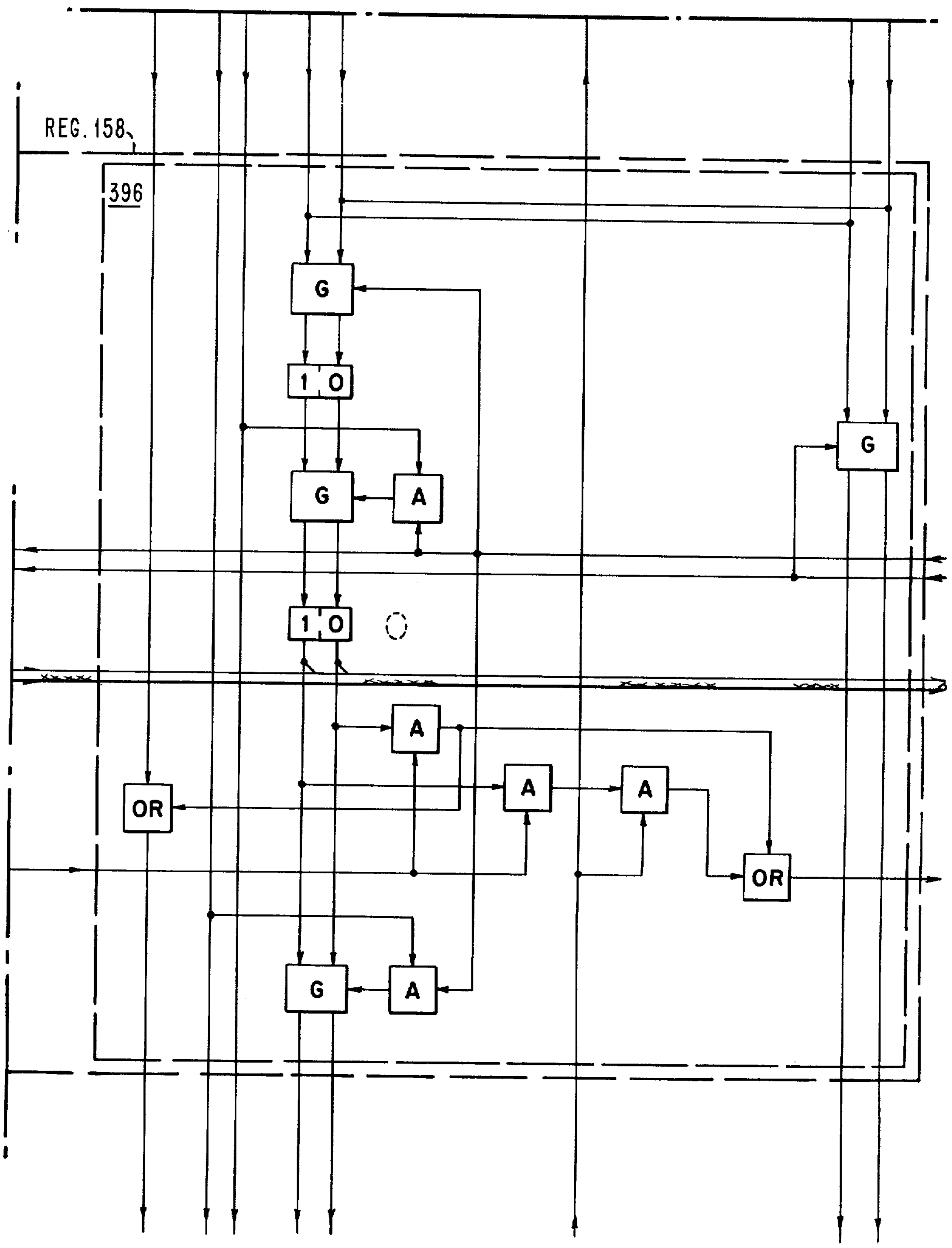
Figure 6A:
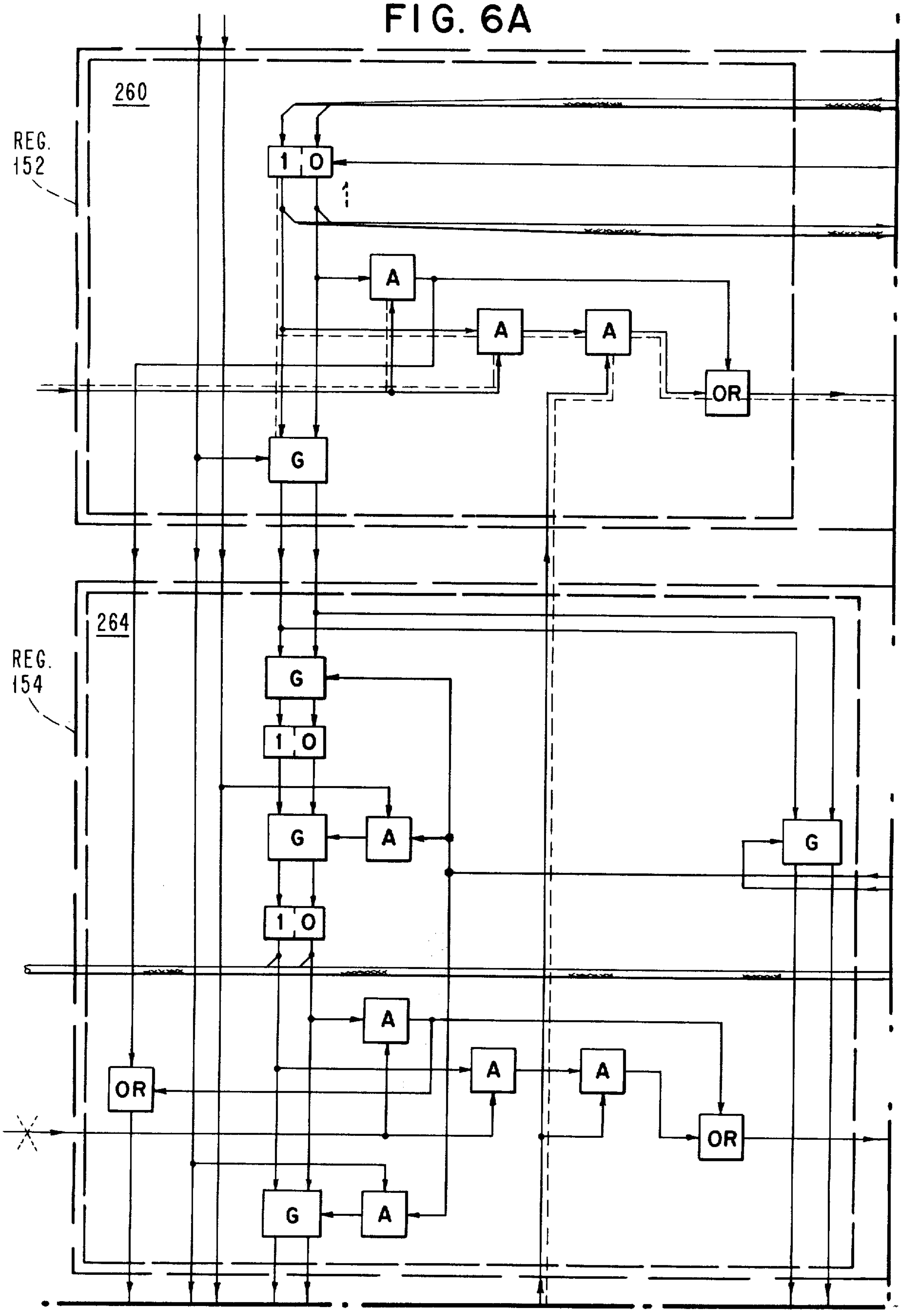
Figure 6B:
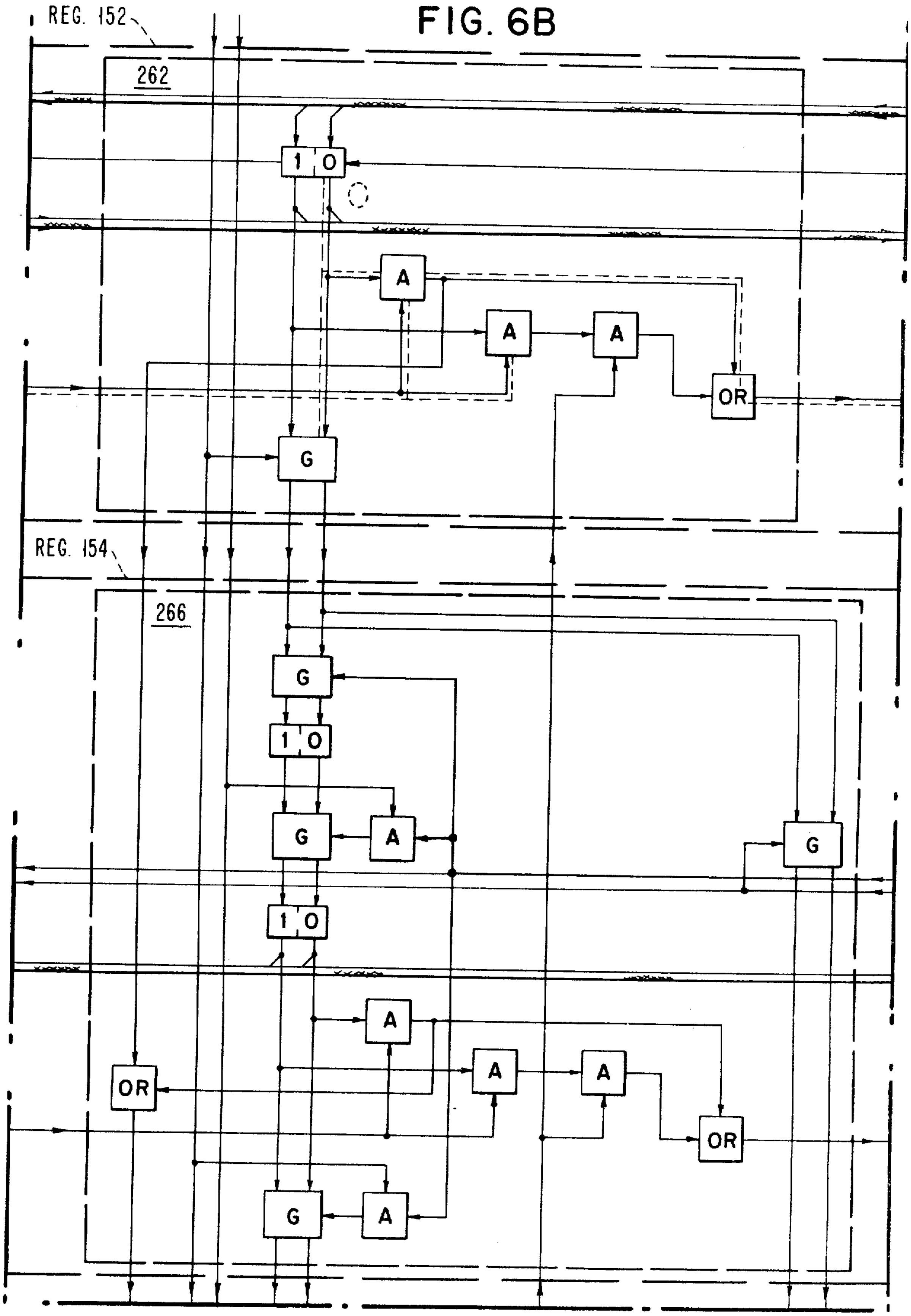
Figure 6C:
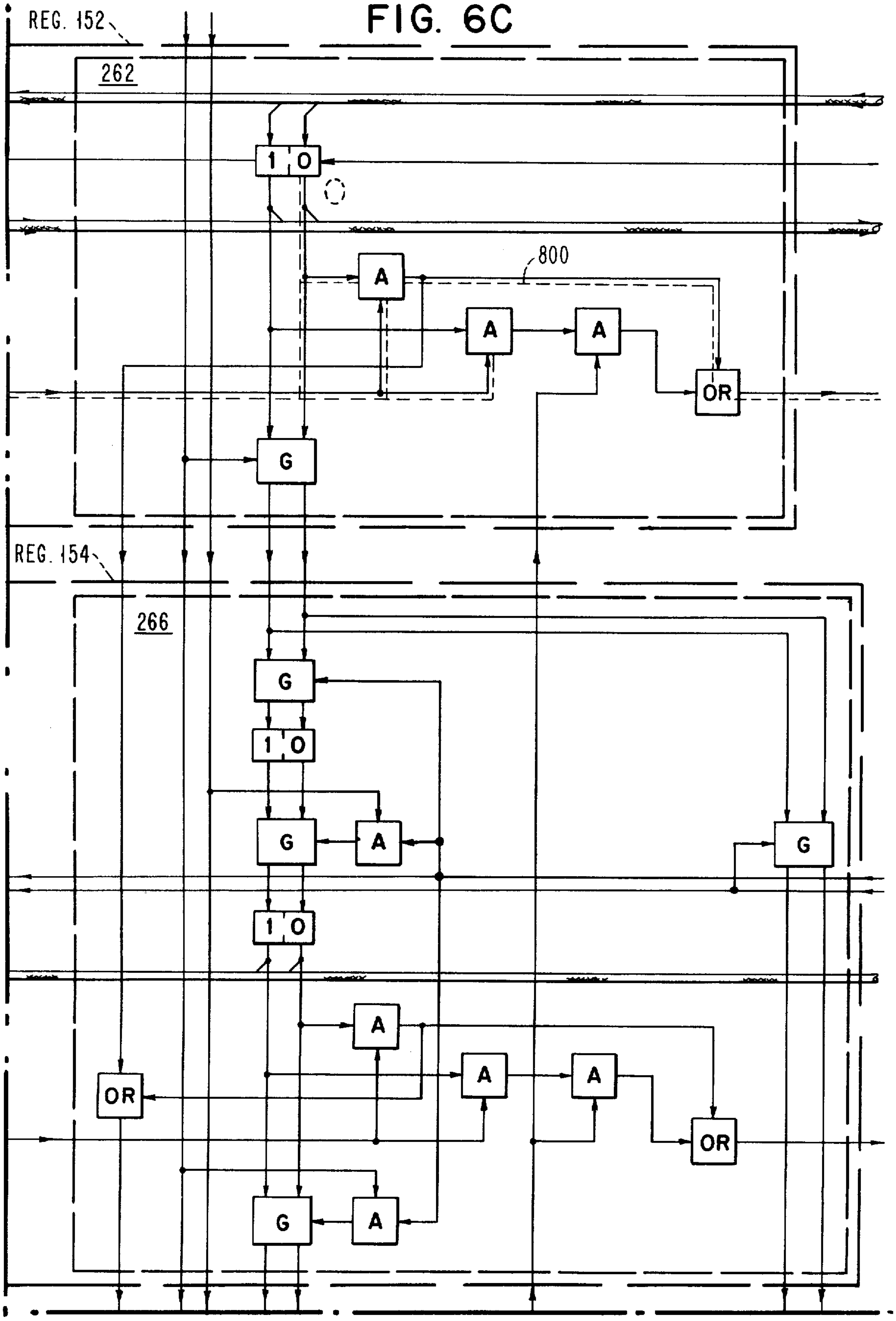
Figure 6D:
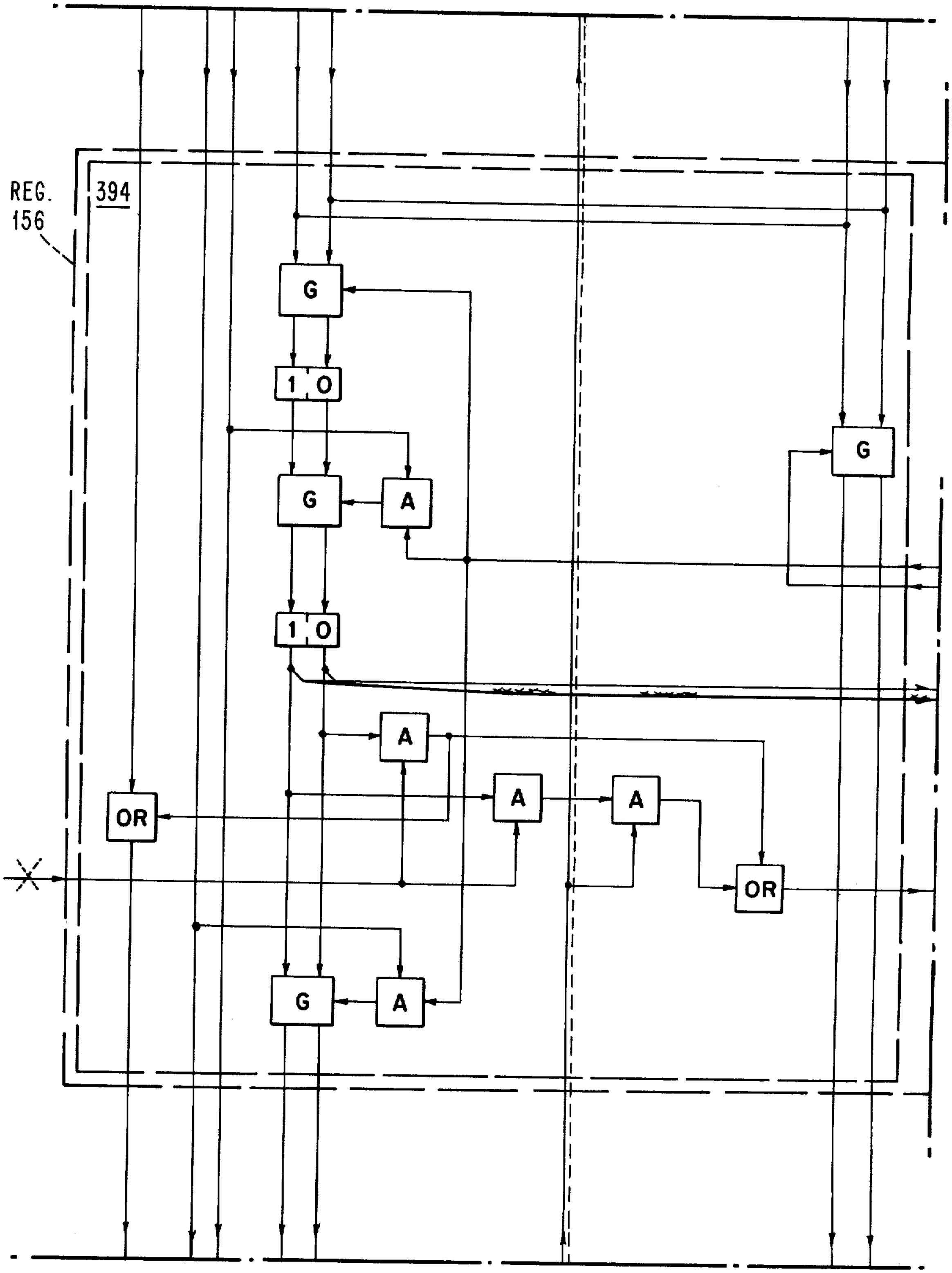
Figure 6E:
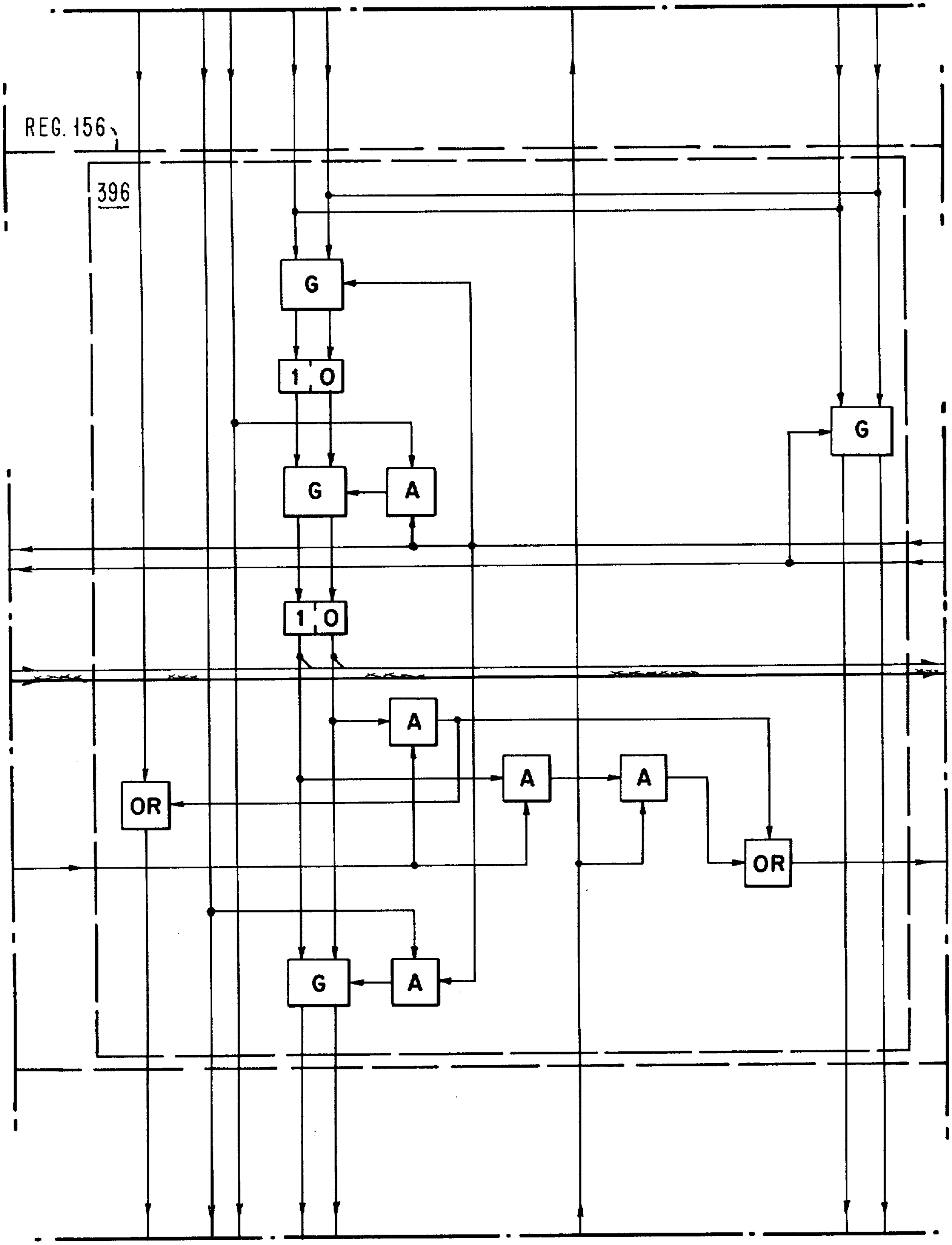
Figure 6F:
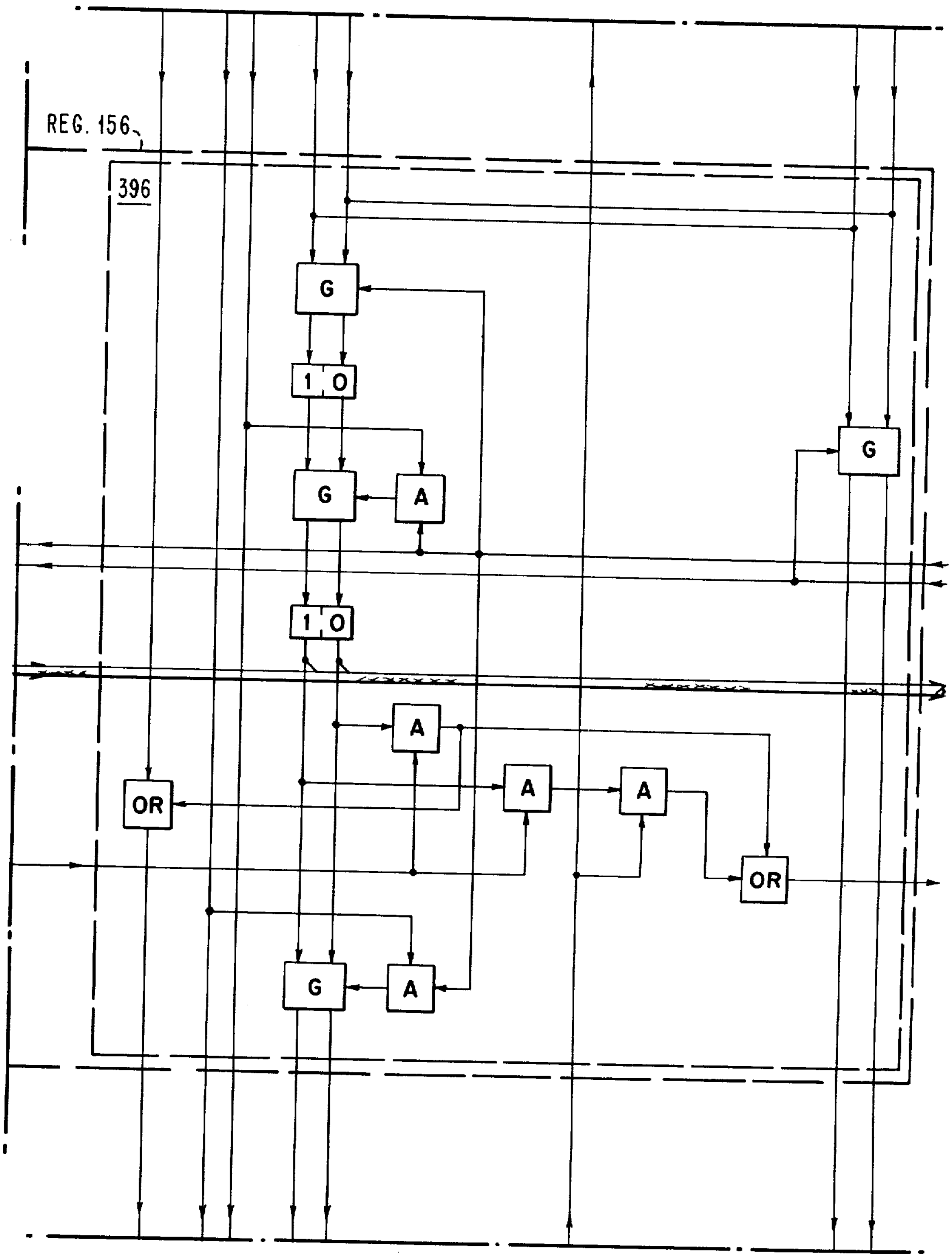
Figure 6G:
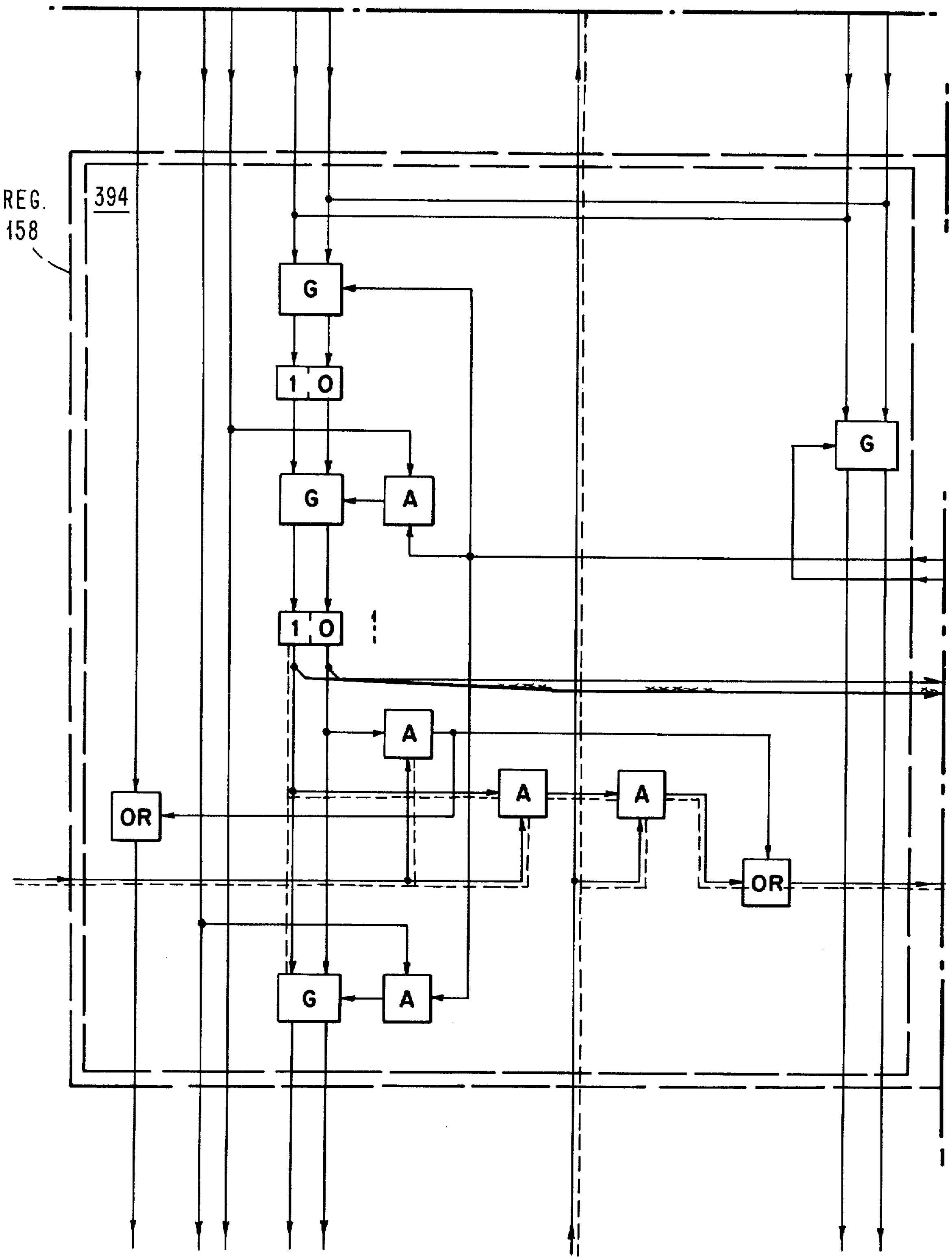
Figure 6H:
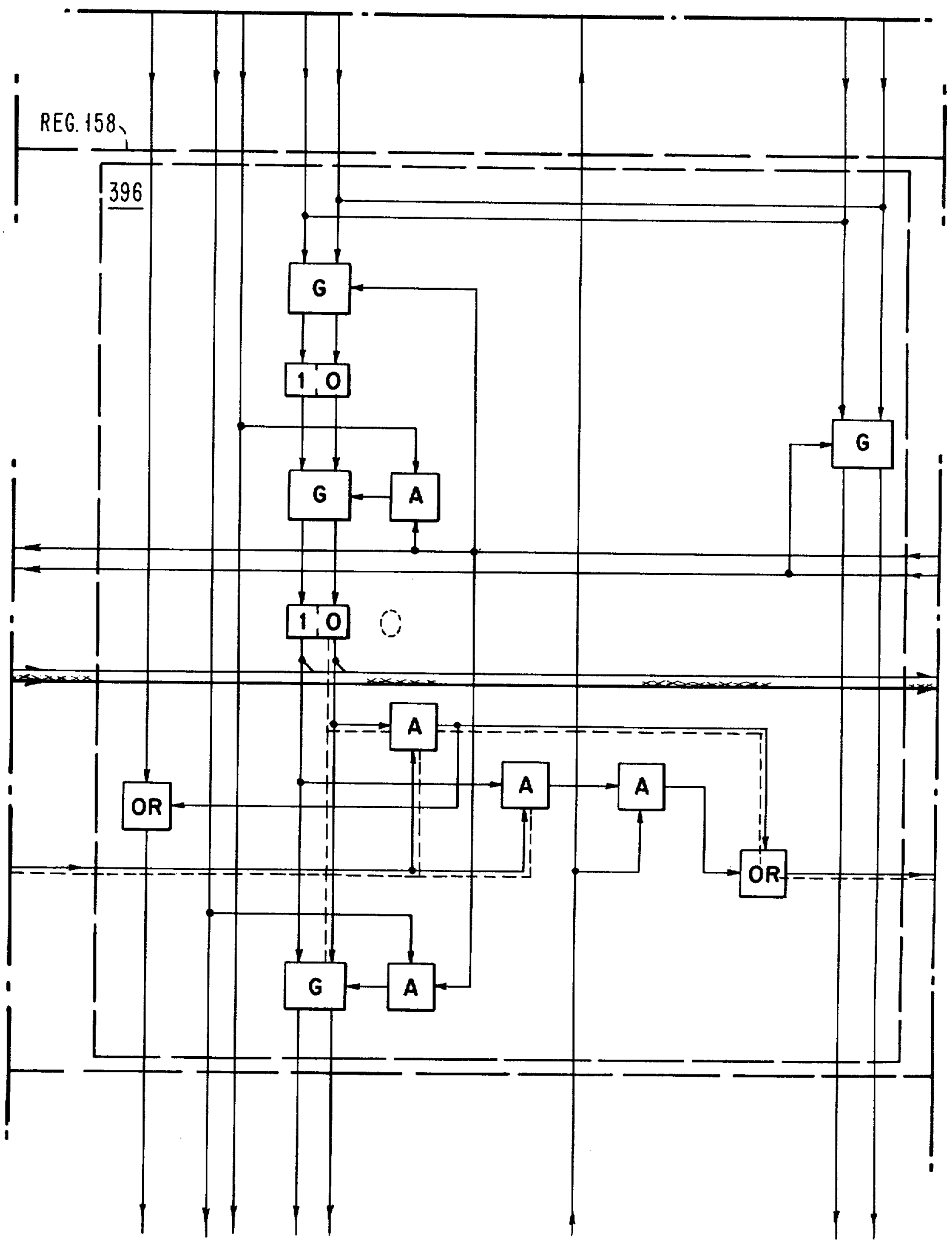
Figure 6I:
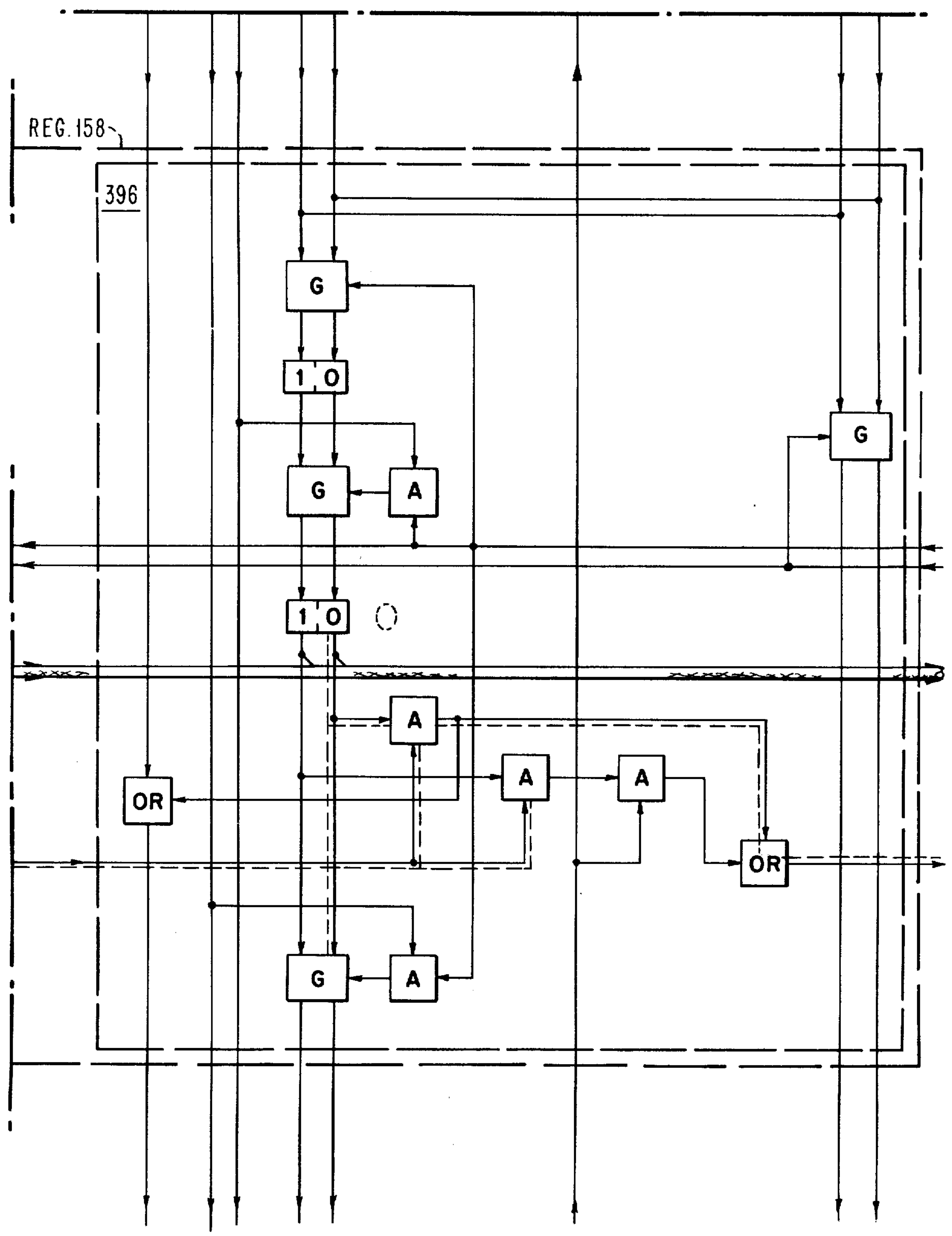
Figure 7A:
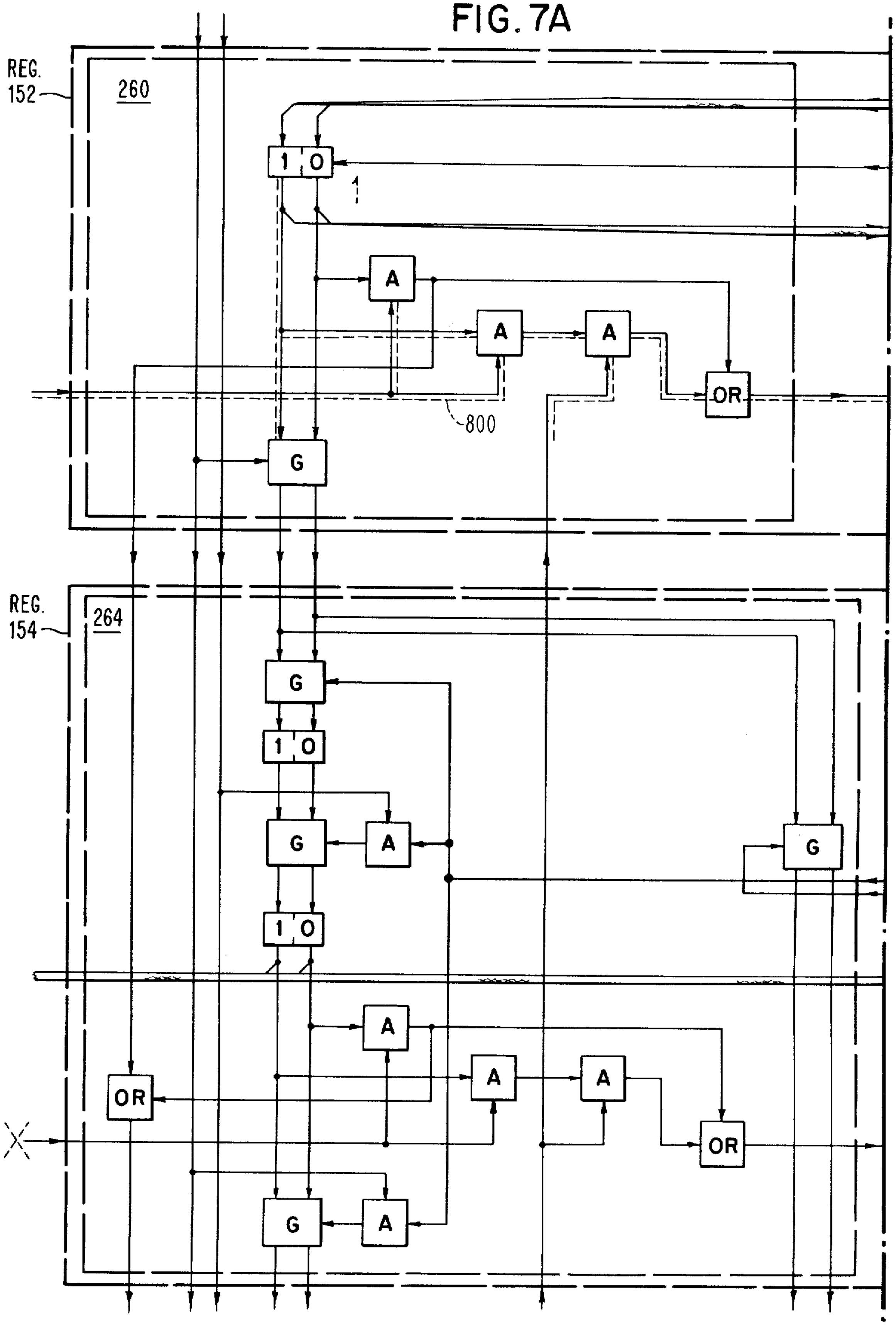
Figure 7B:
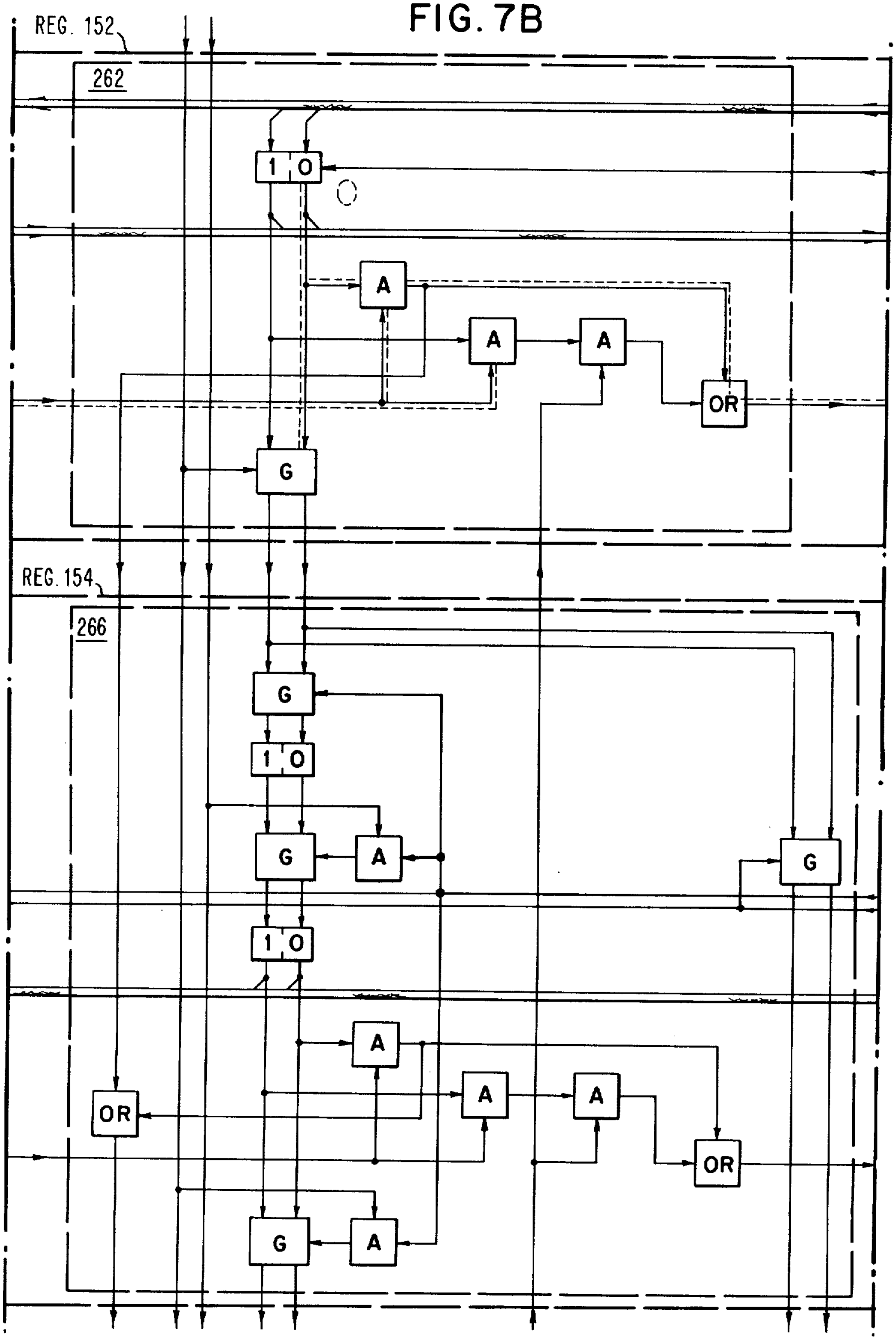
Figure 7C:
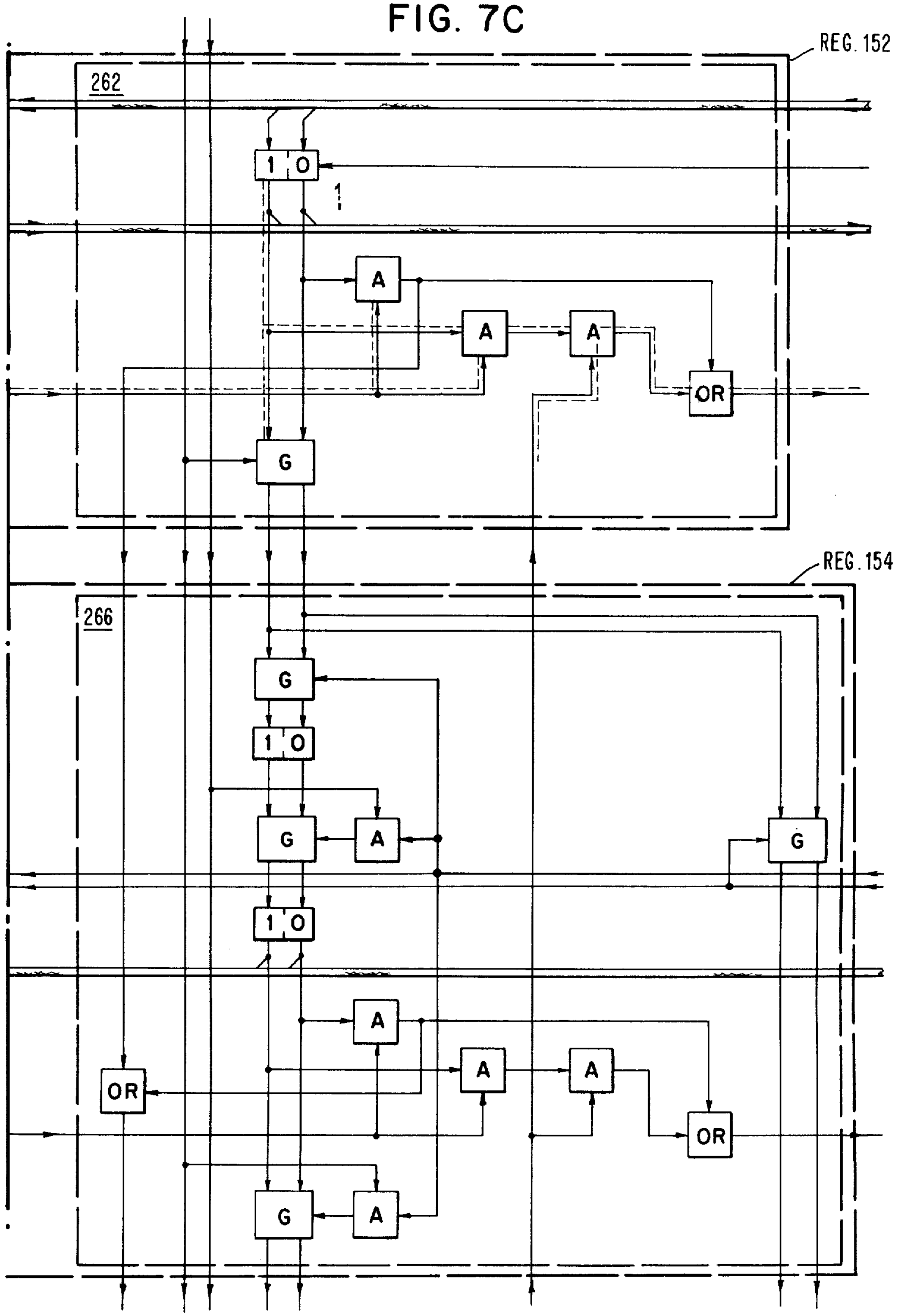
Figure 8A:
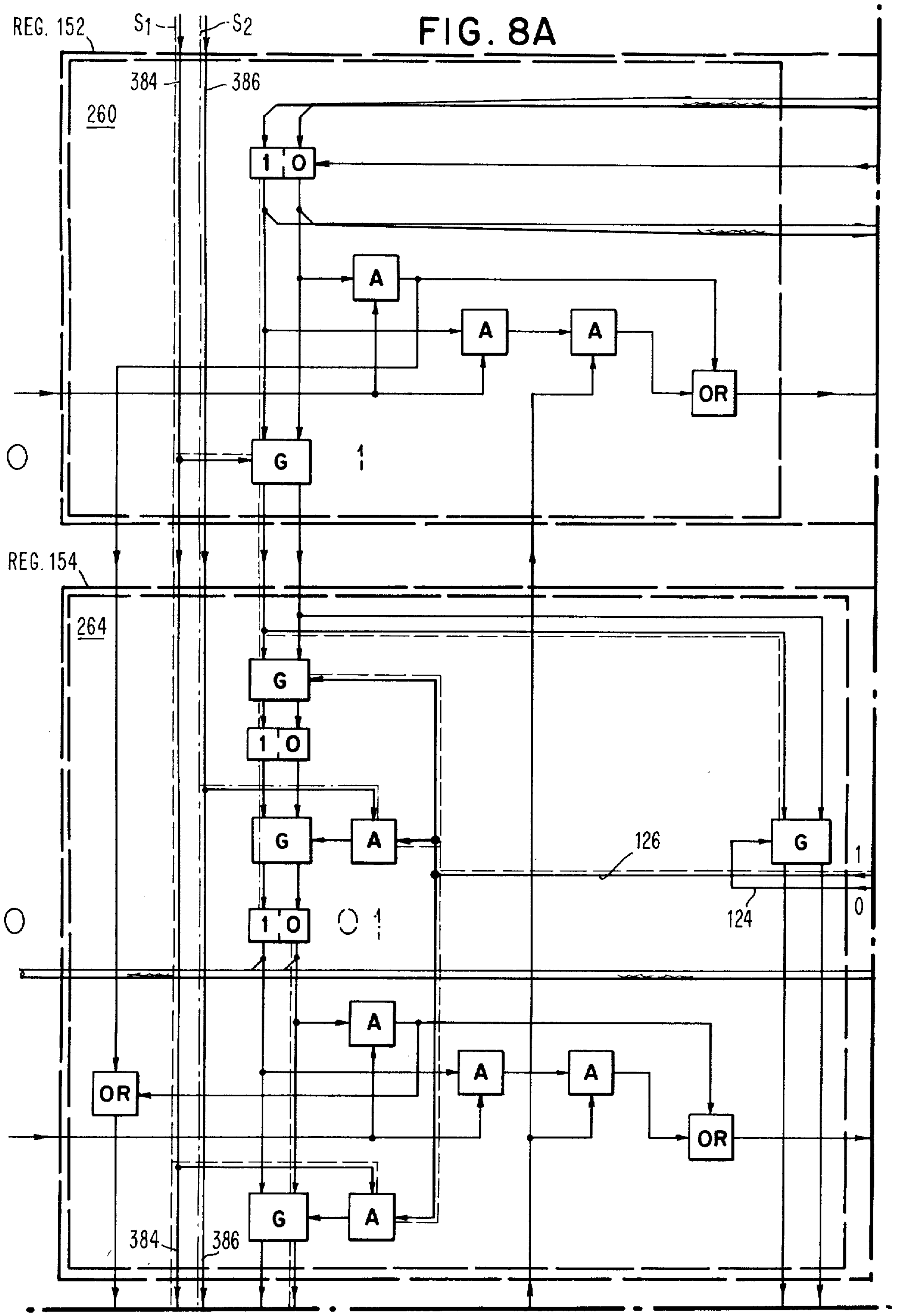
Figure 8B:
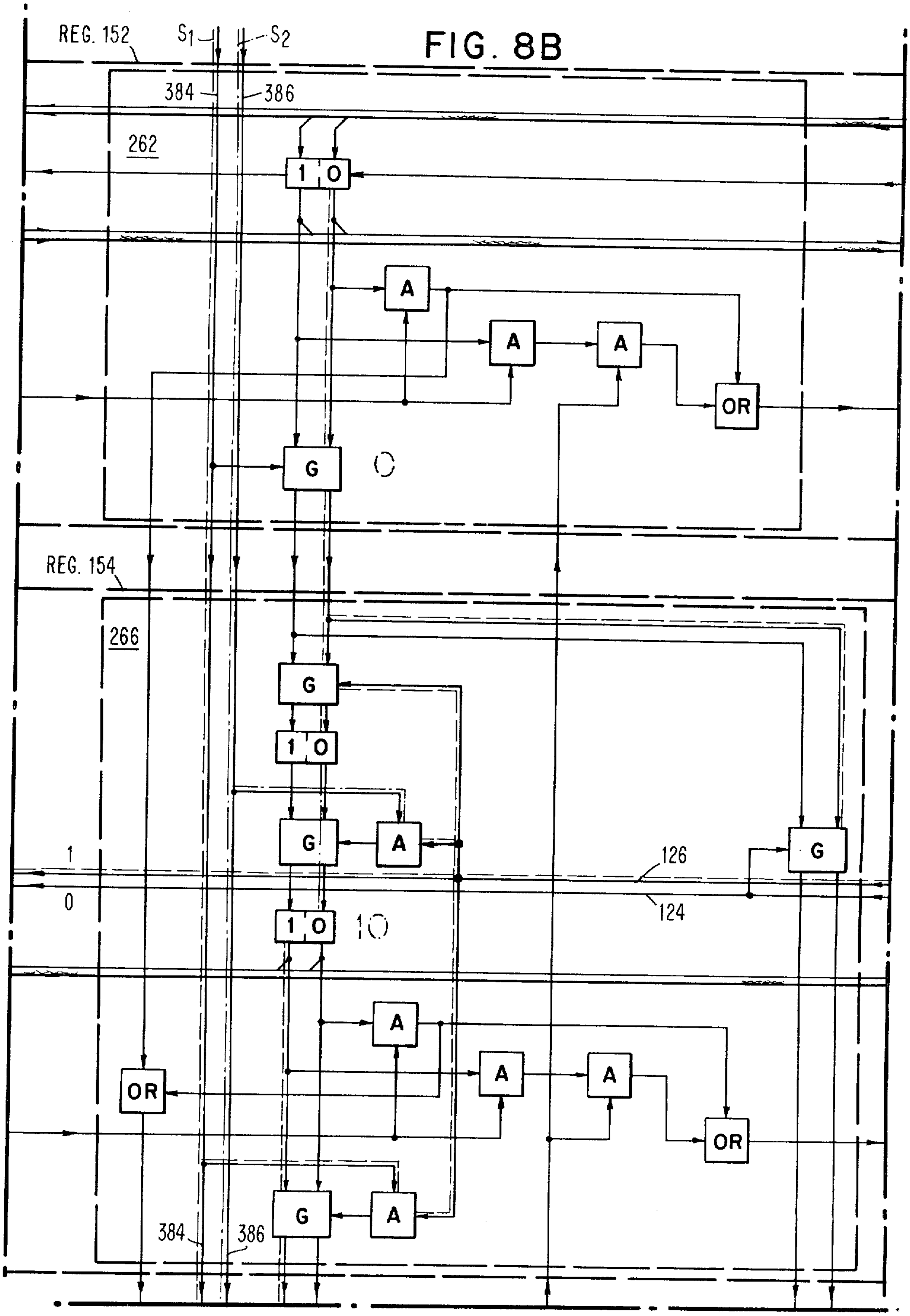
Figure 8C:
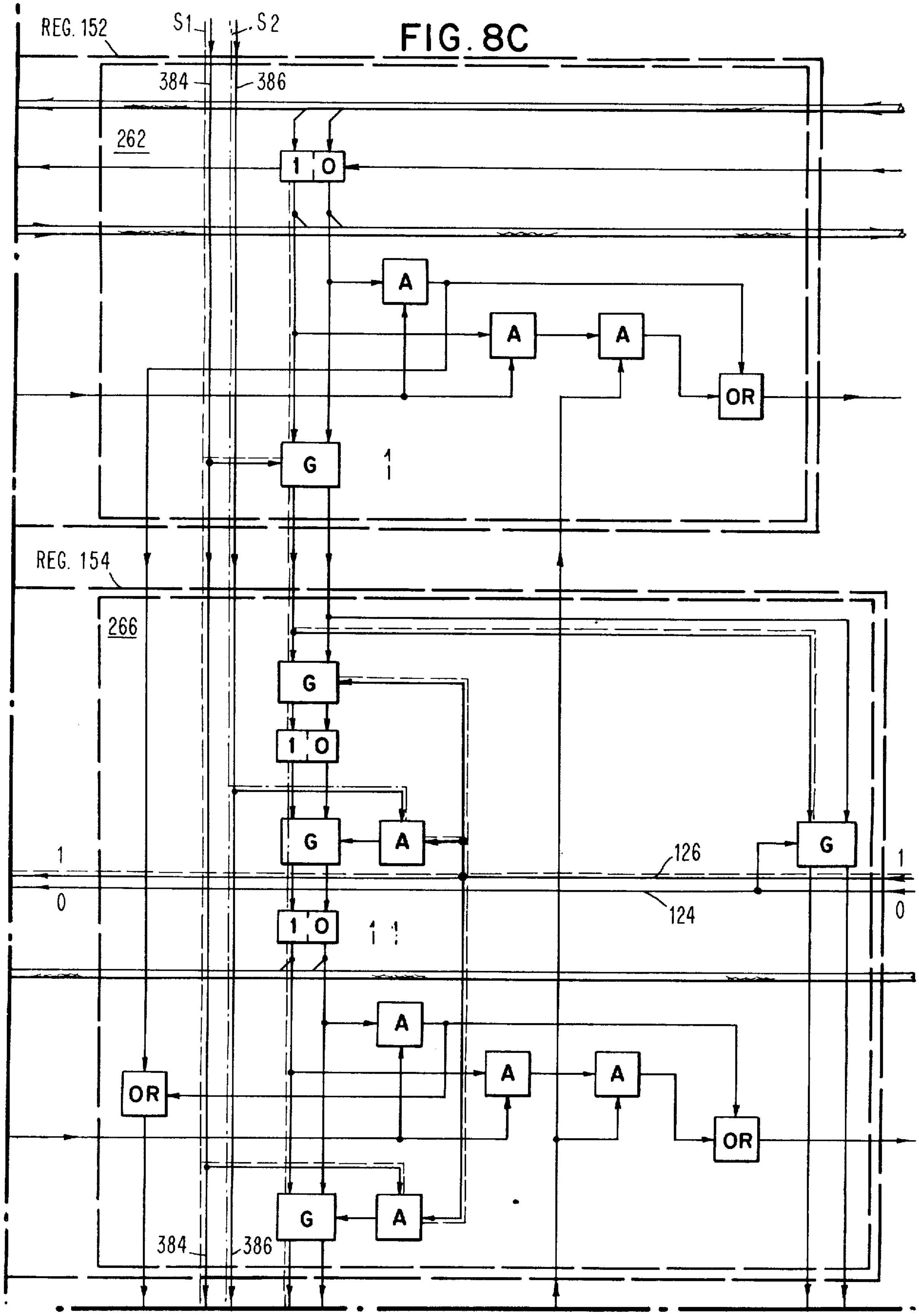
Figure 8D:
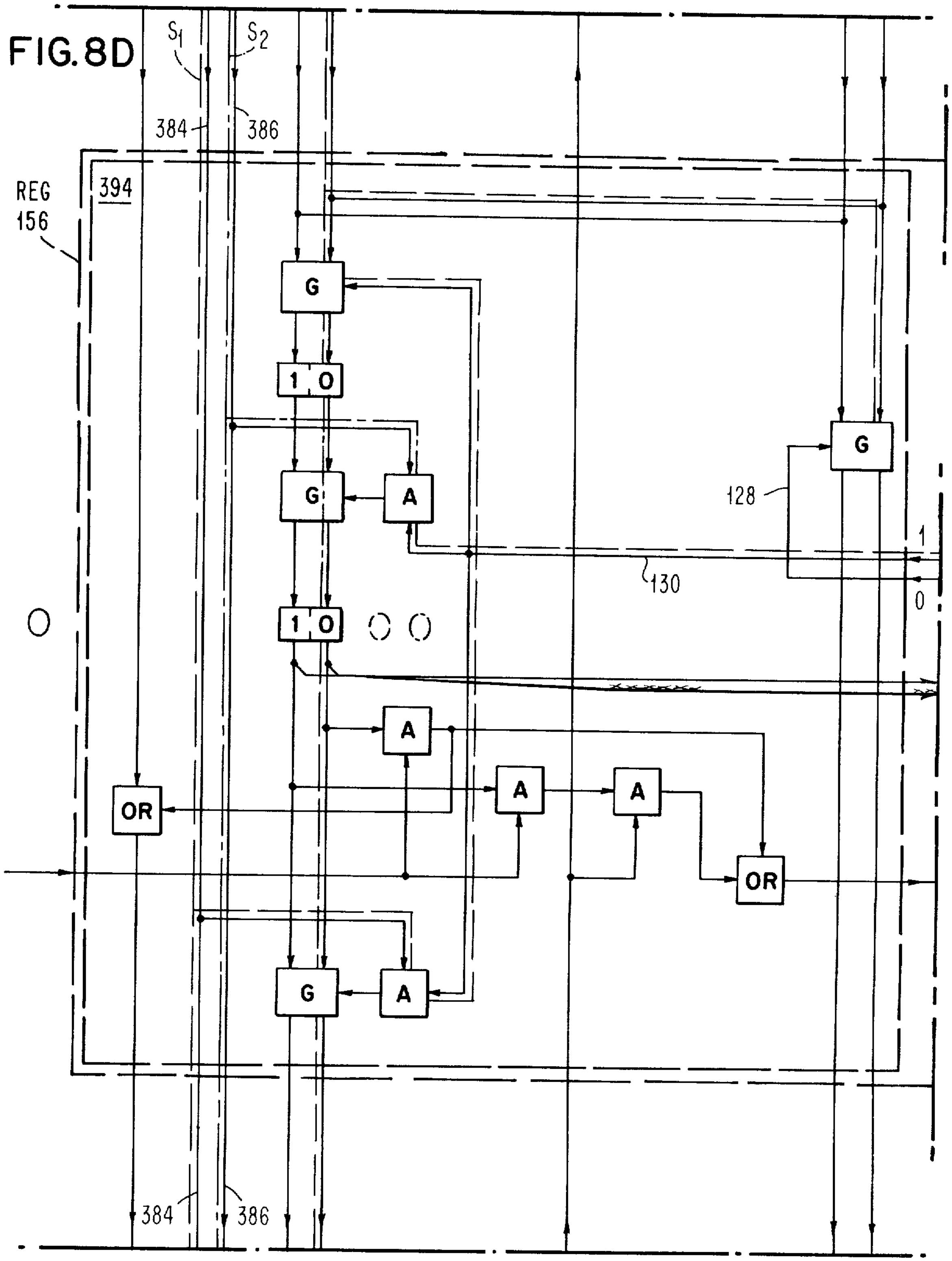
Figure 8E:
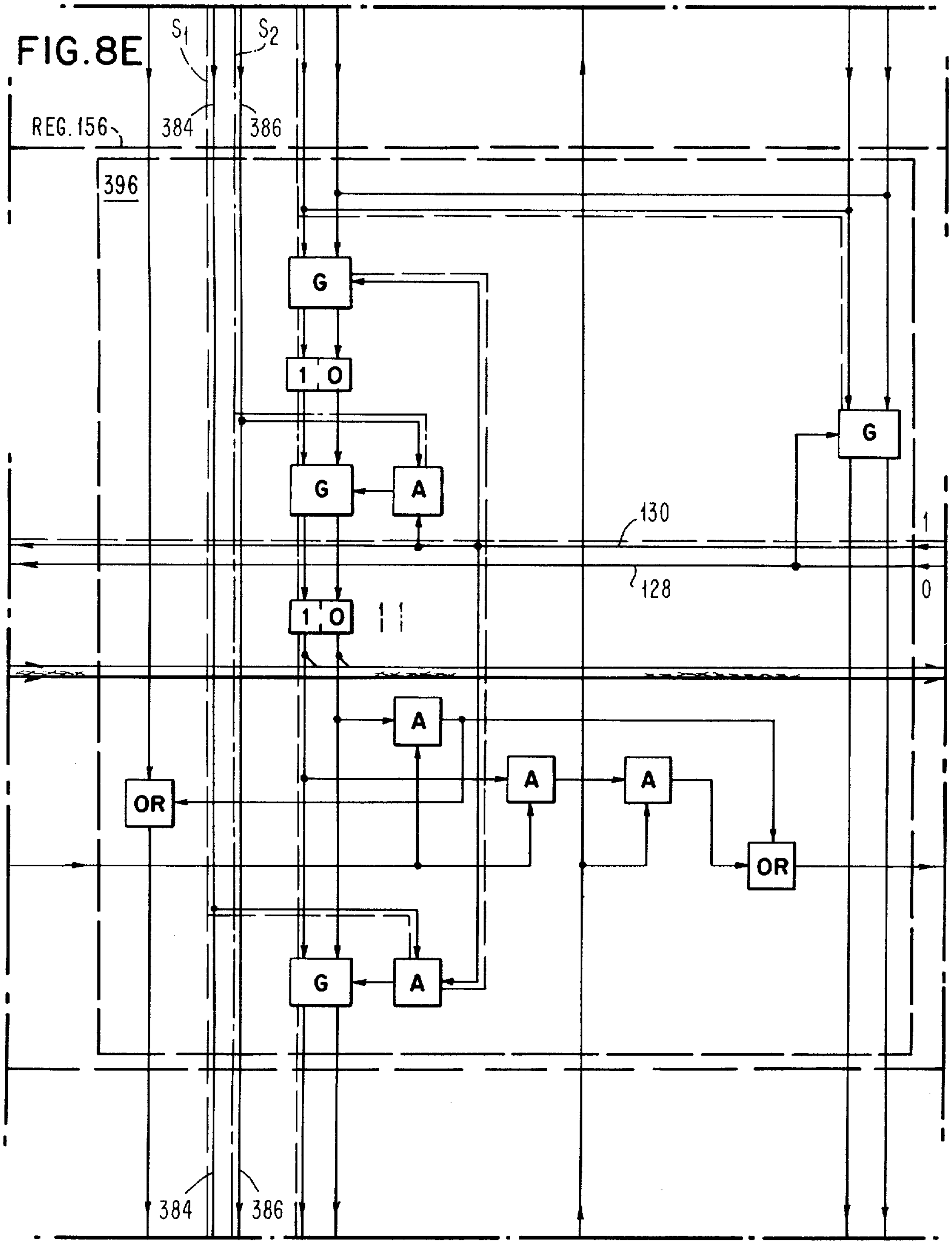
Figure 8F:
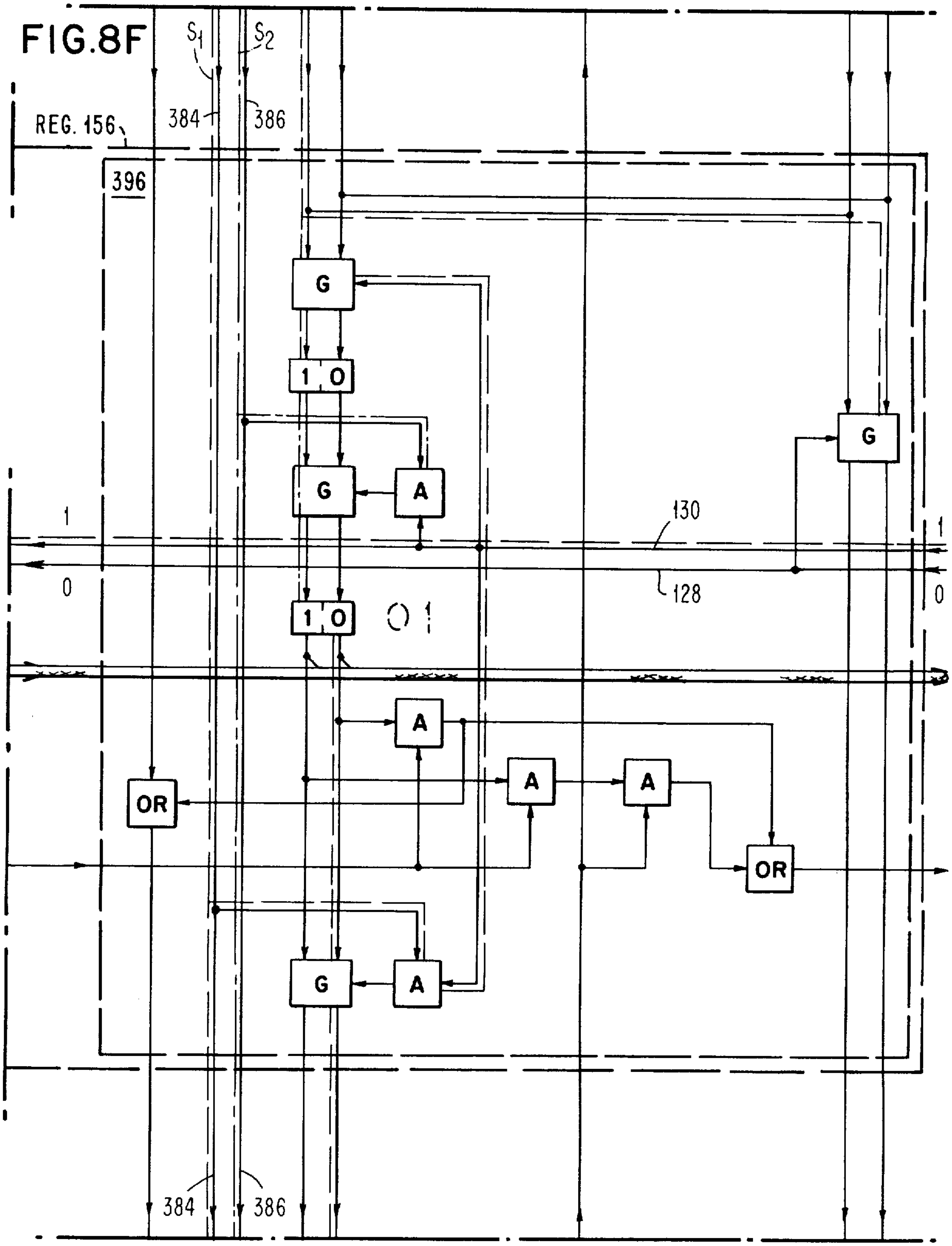
Figure 8G:
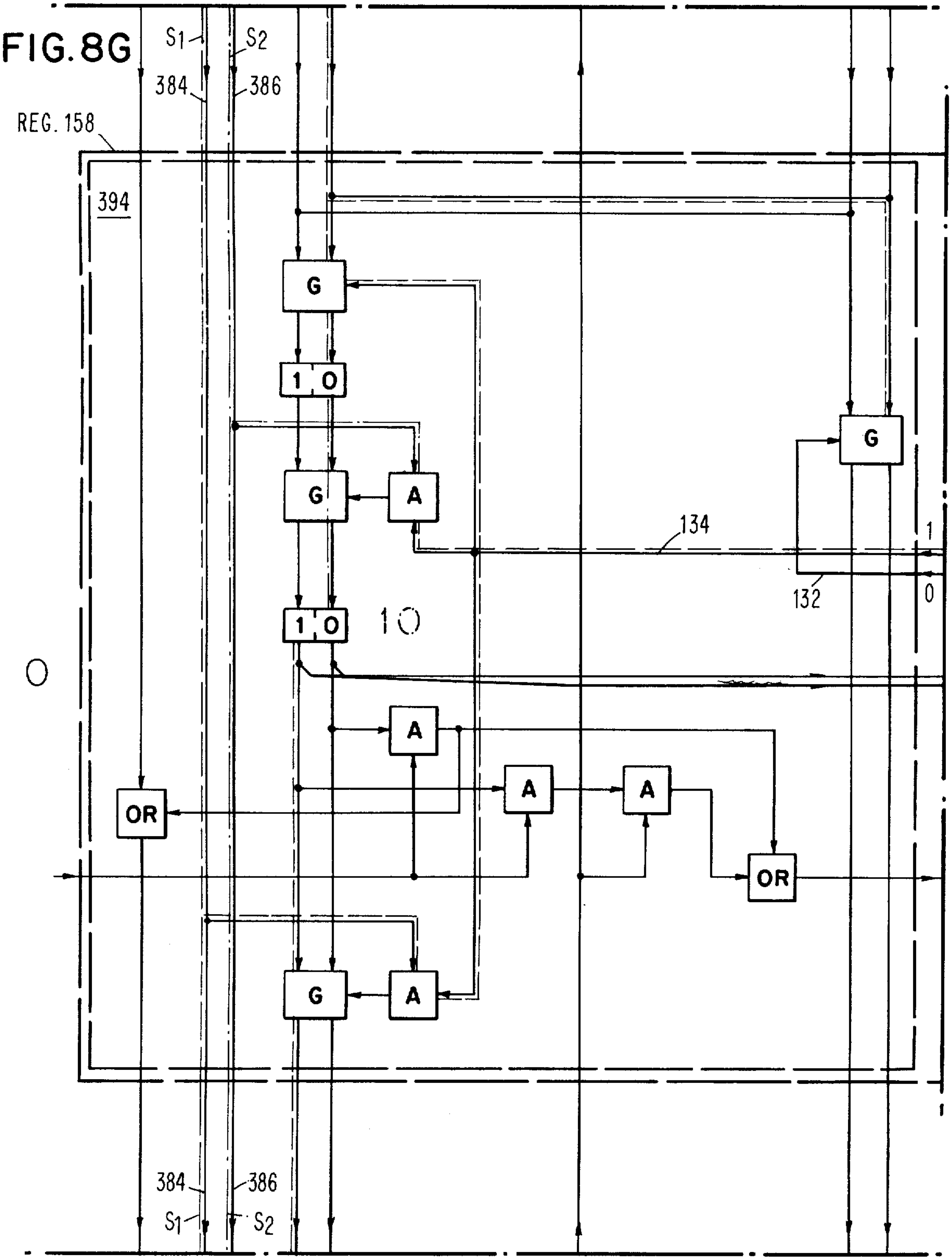
Figure 8H:
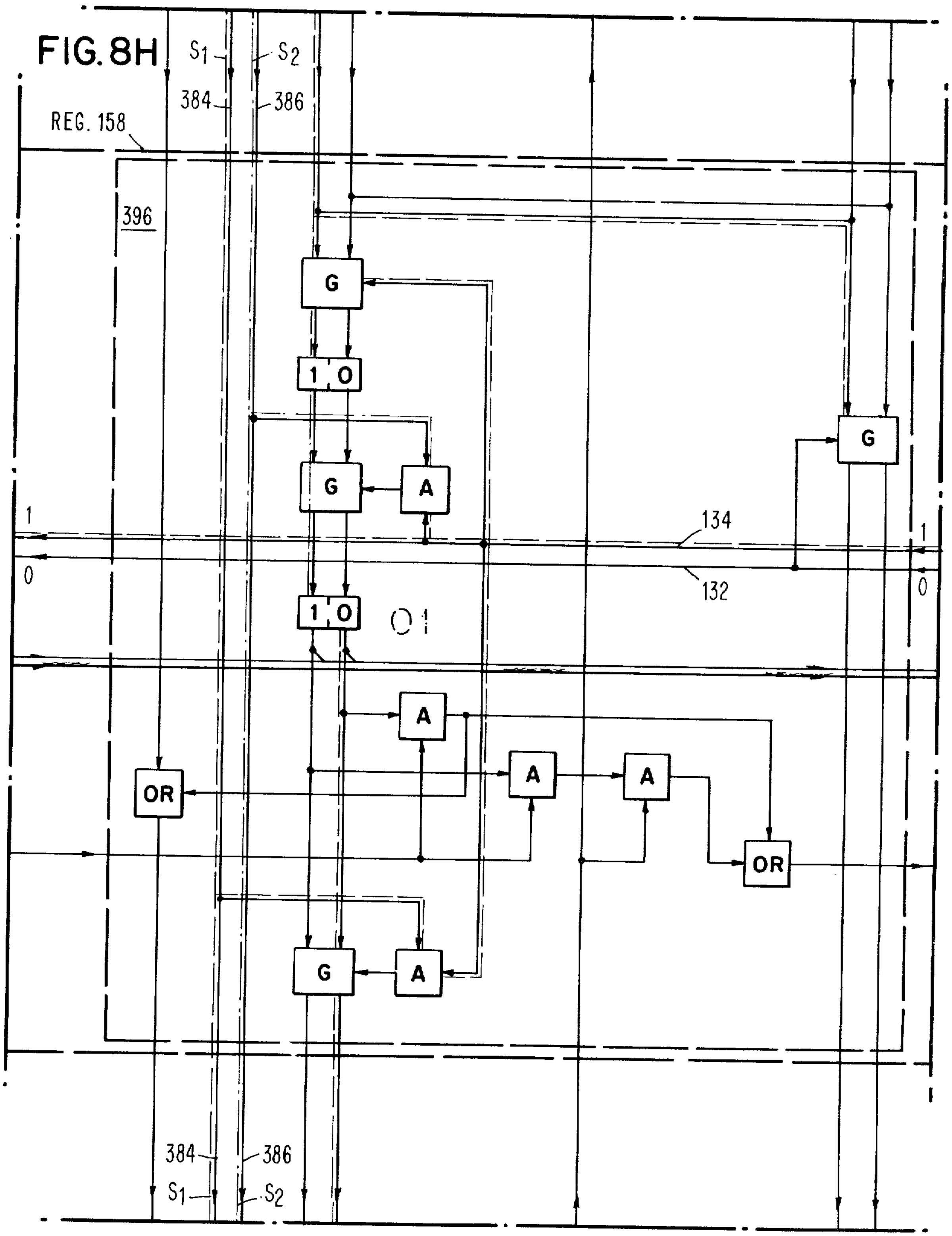
Figure 8I:
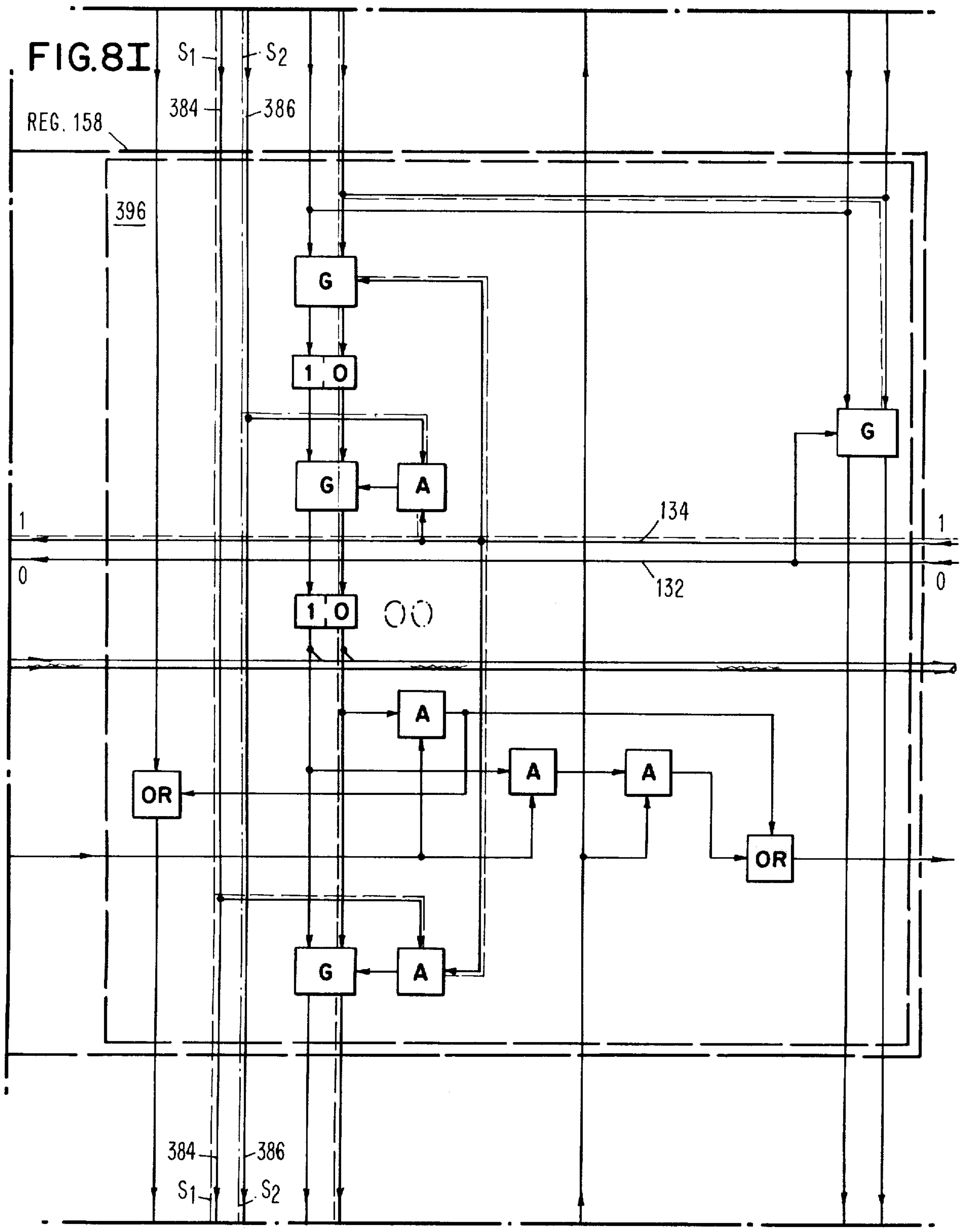
Figure 8J:
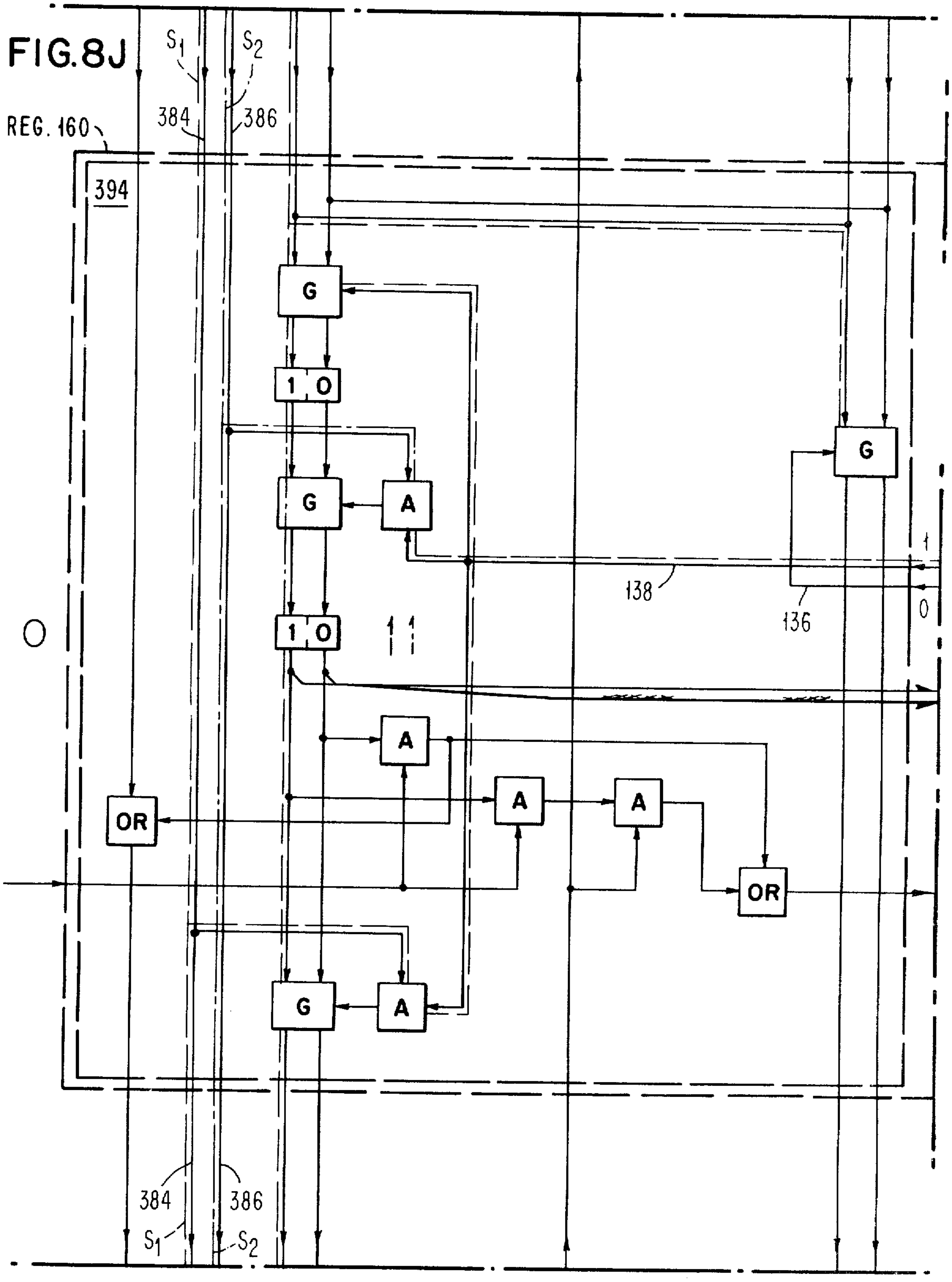
Figure 8K:
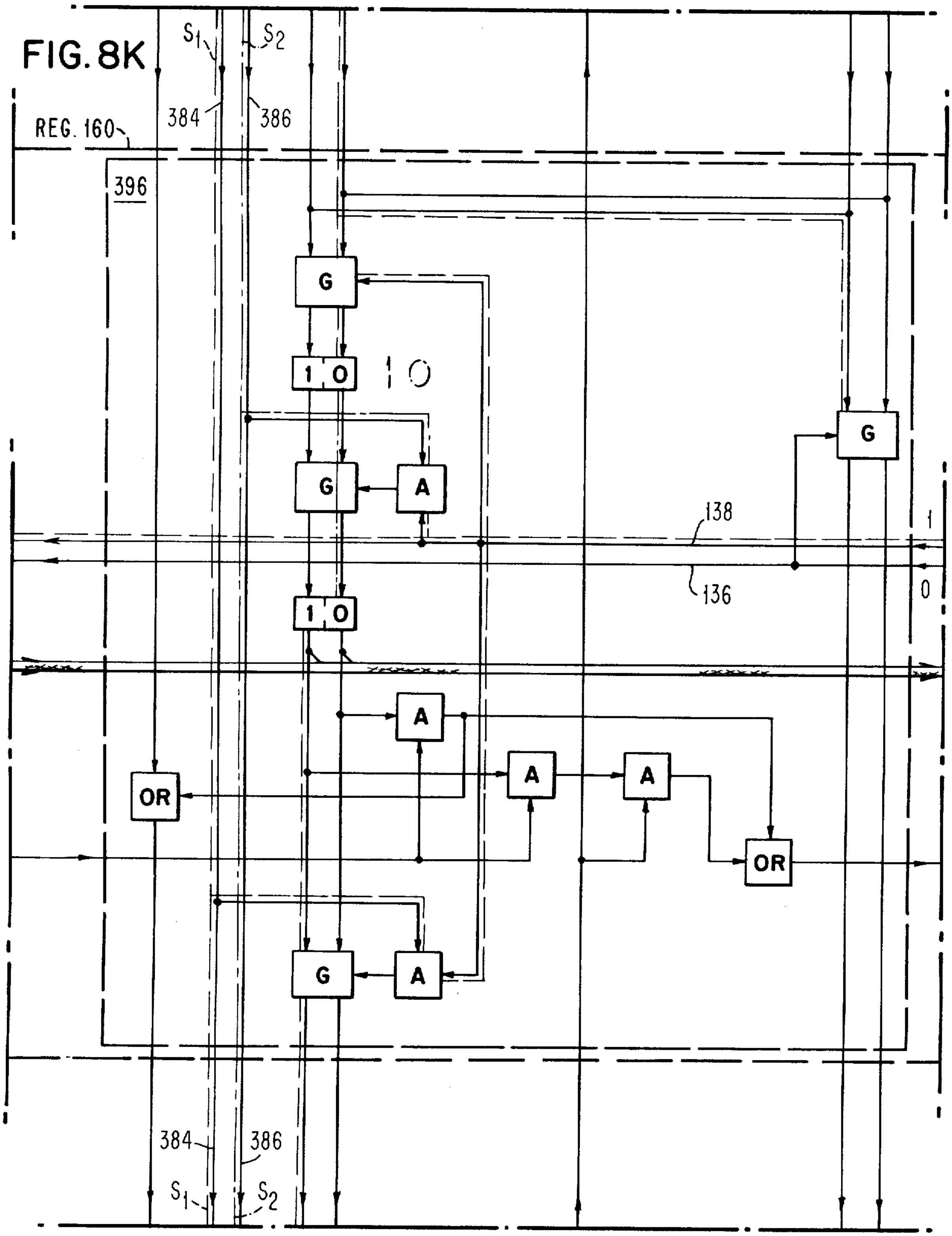
Figure 8L:
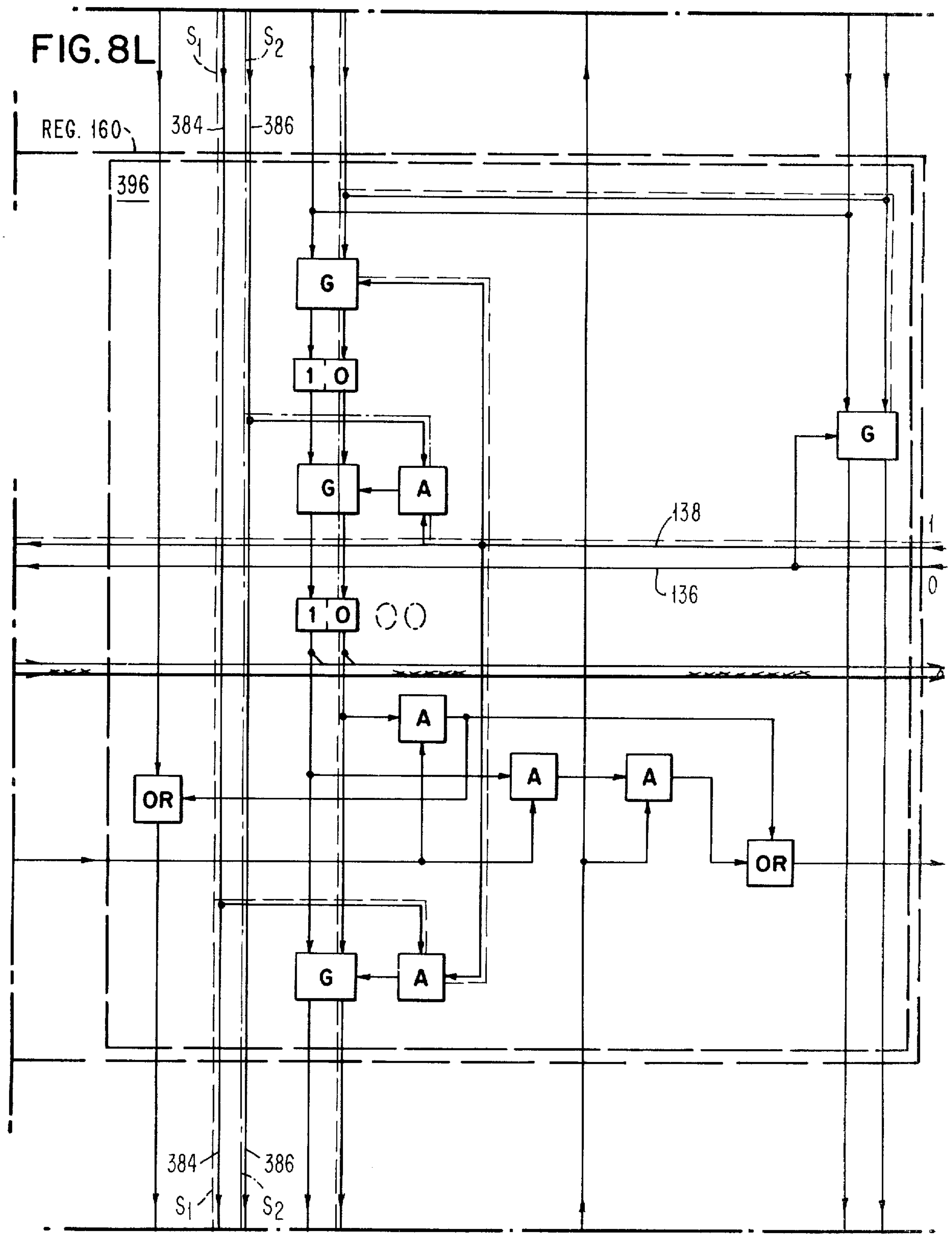
Figure 8M:
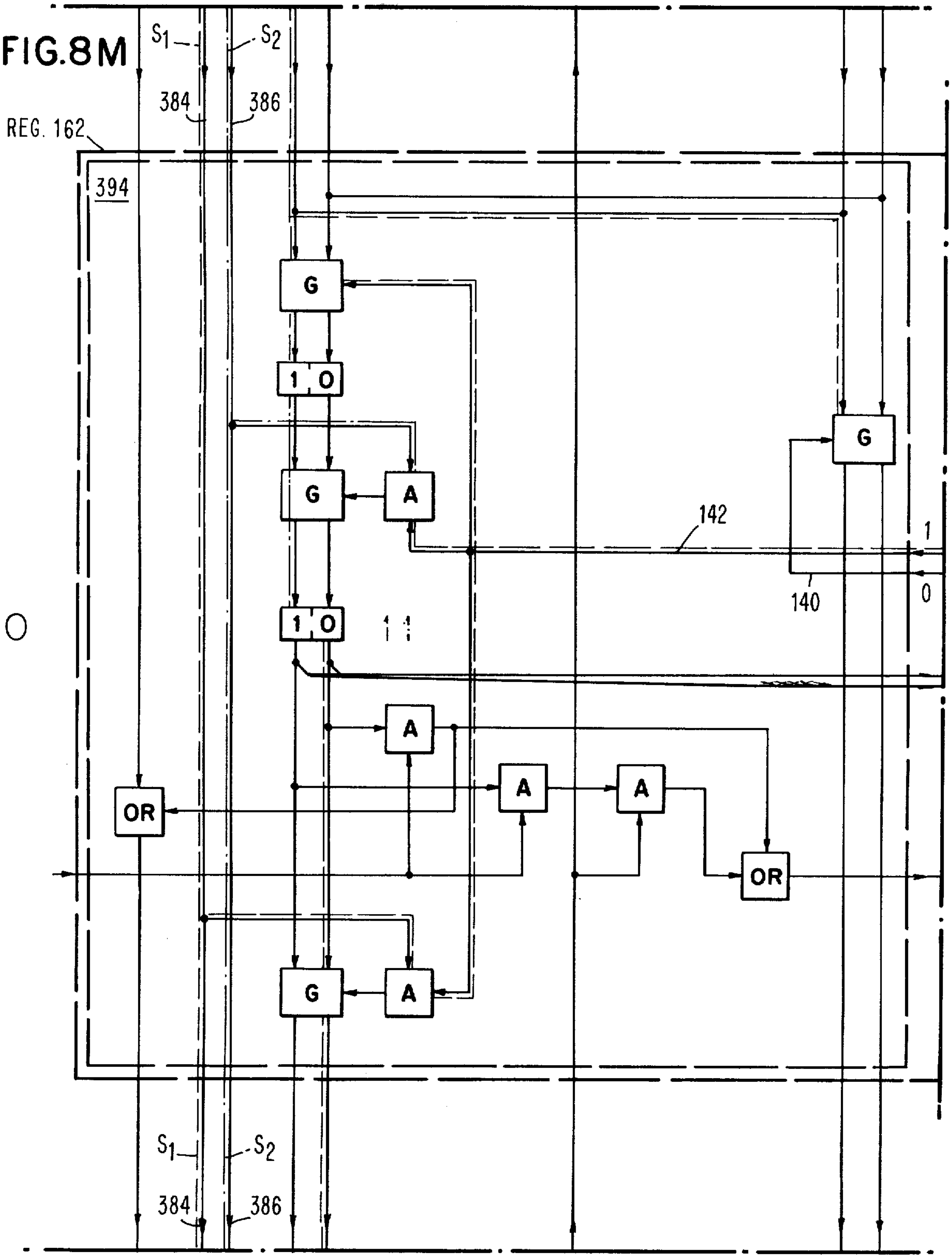
Figure 8N:
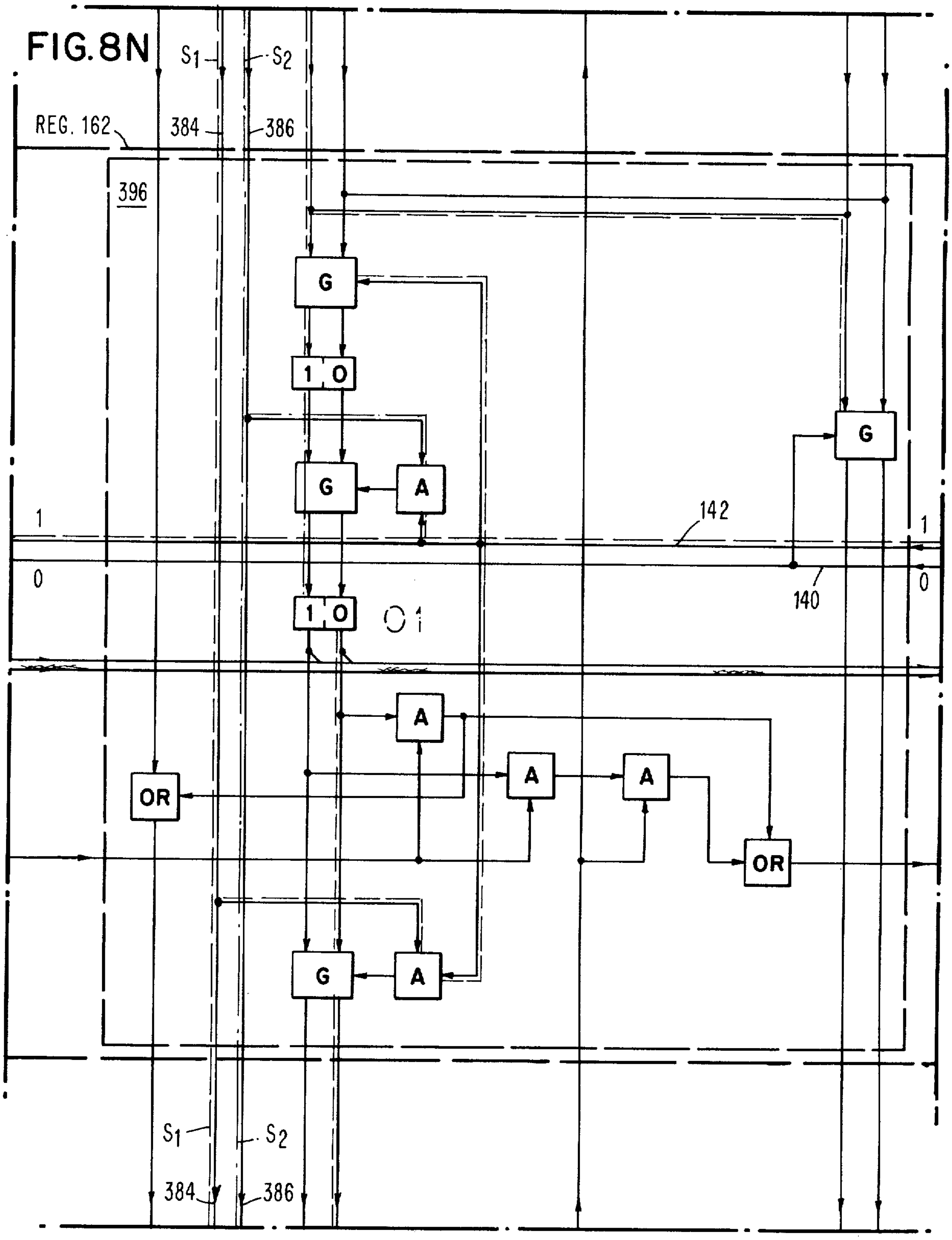
Figure 80:
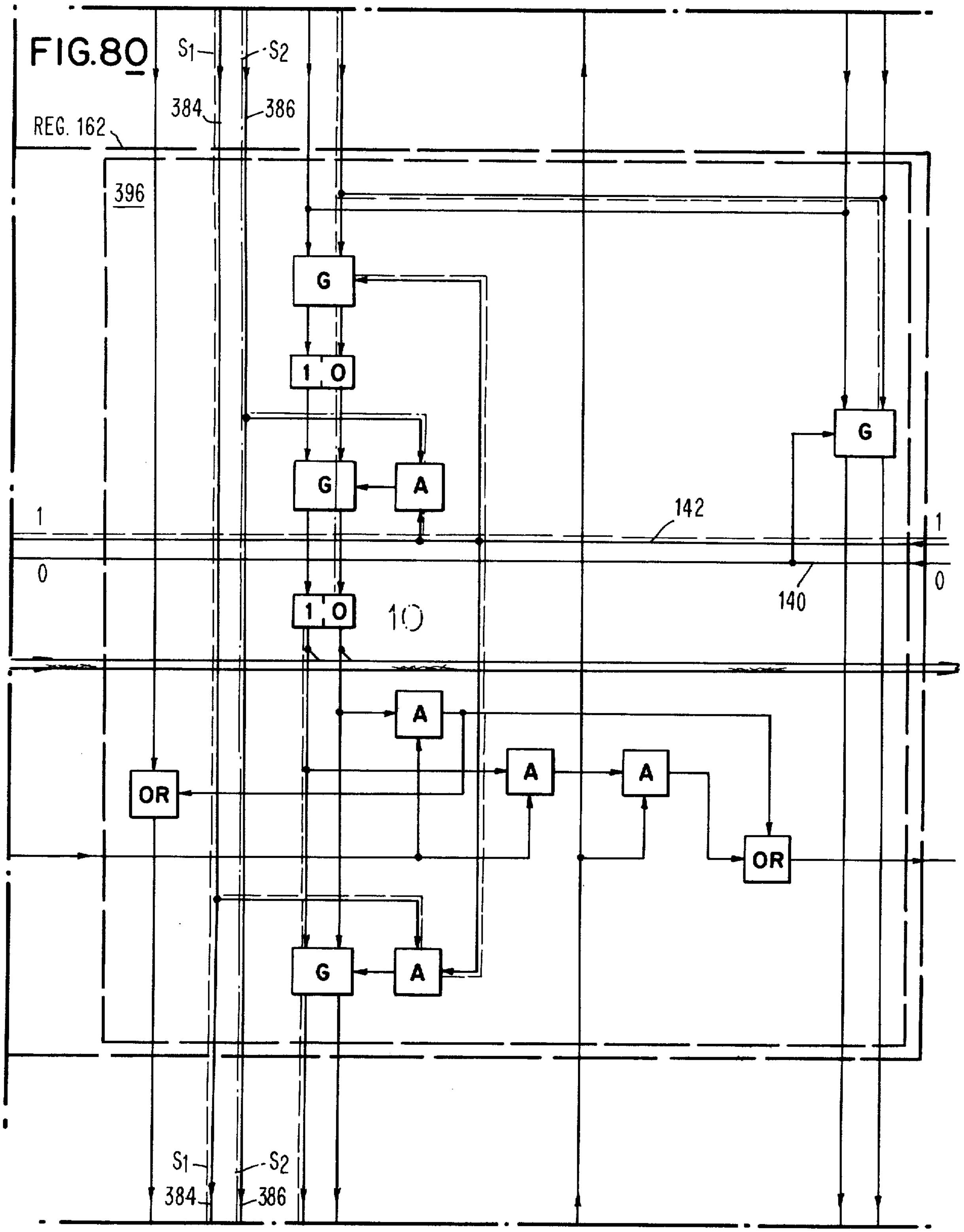
Figure 8P:
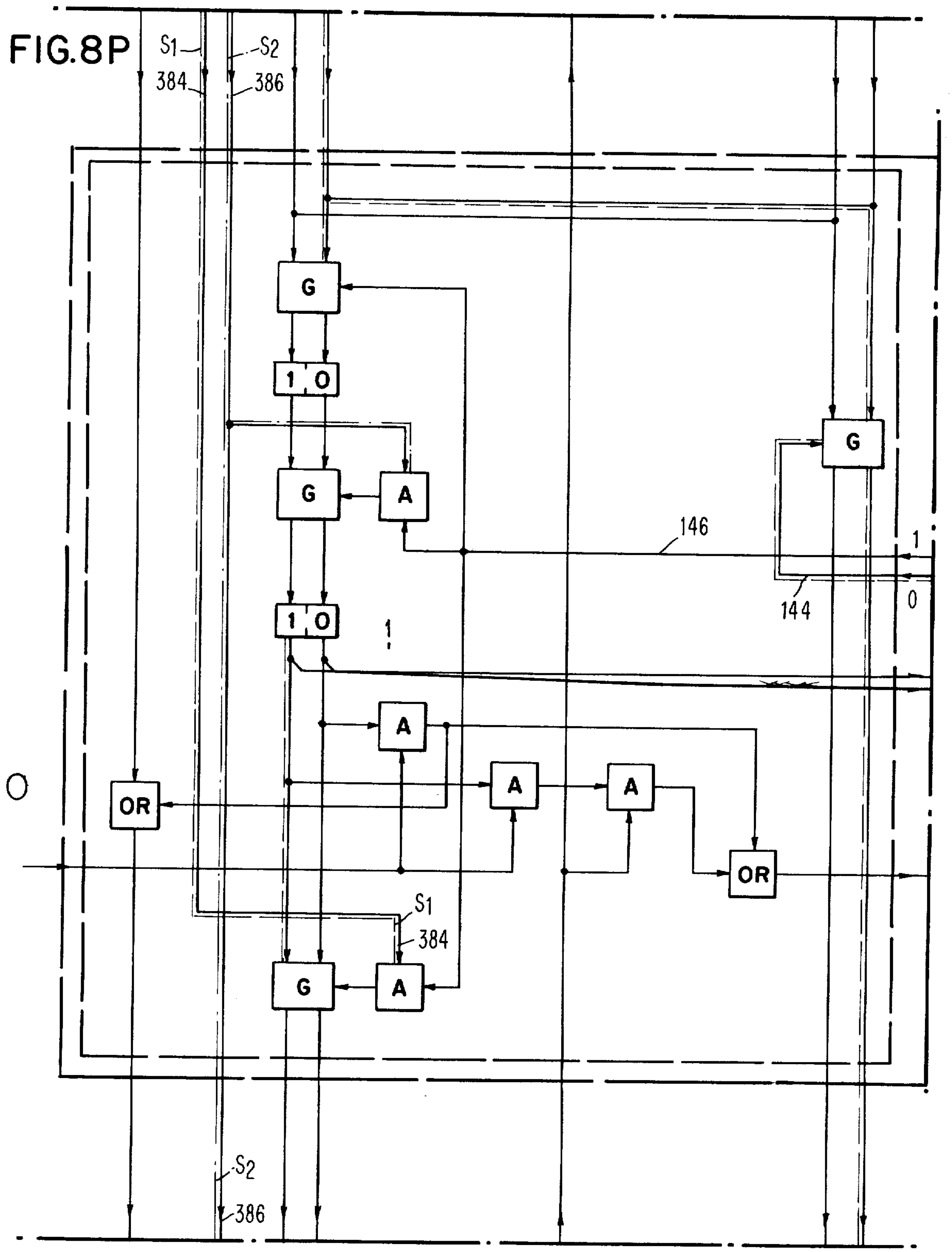
Figure 8Q:
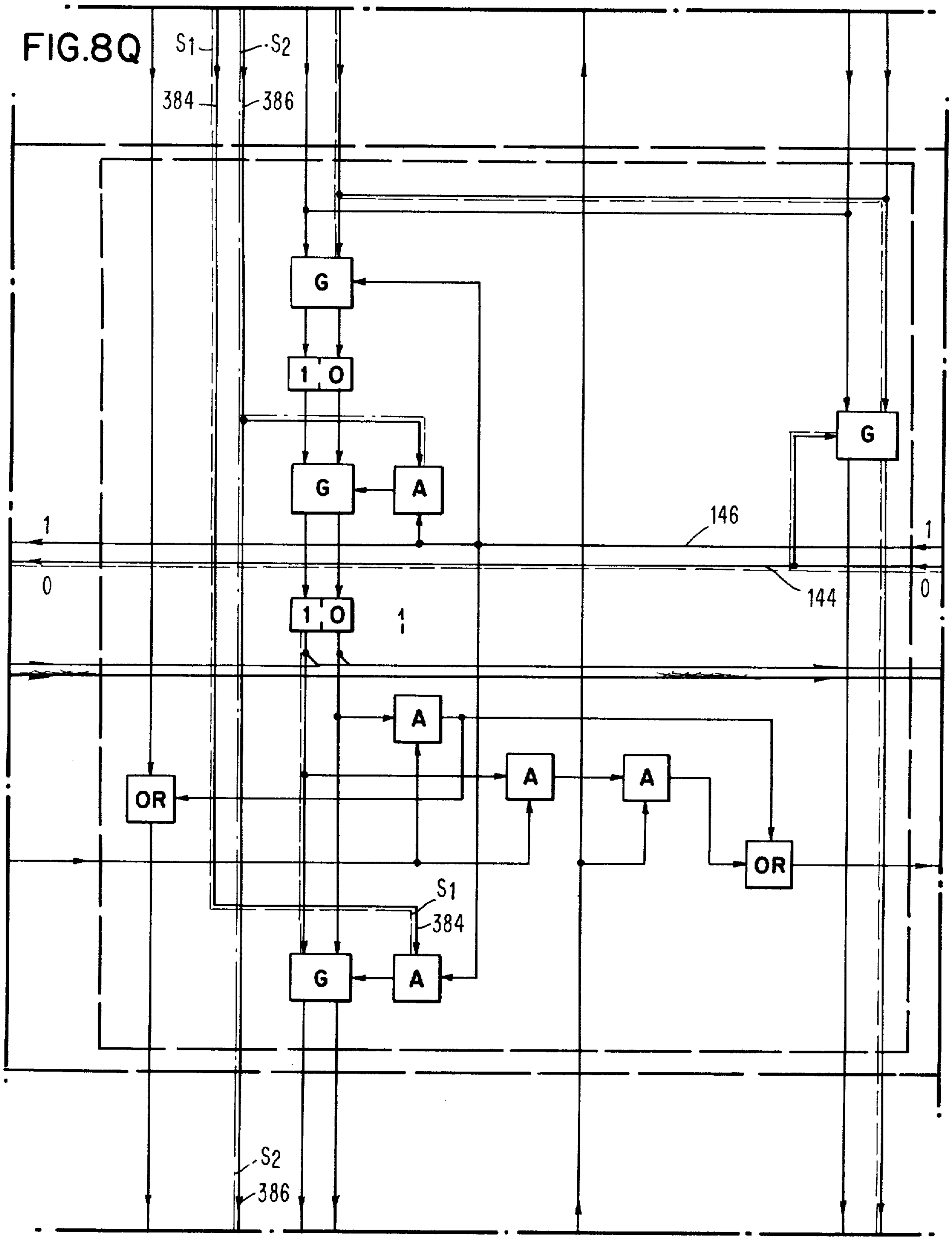
Figure 8R:
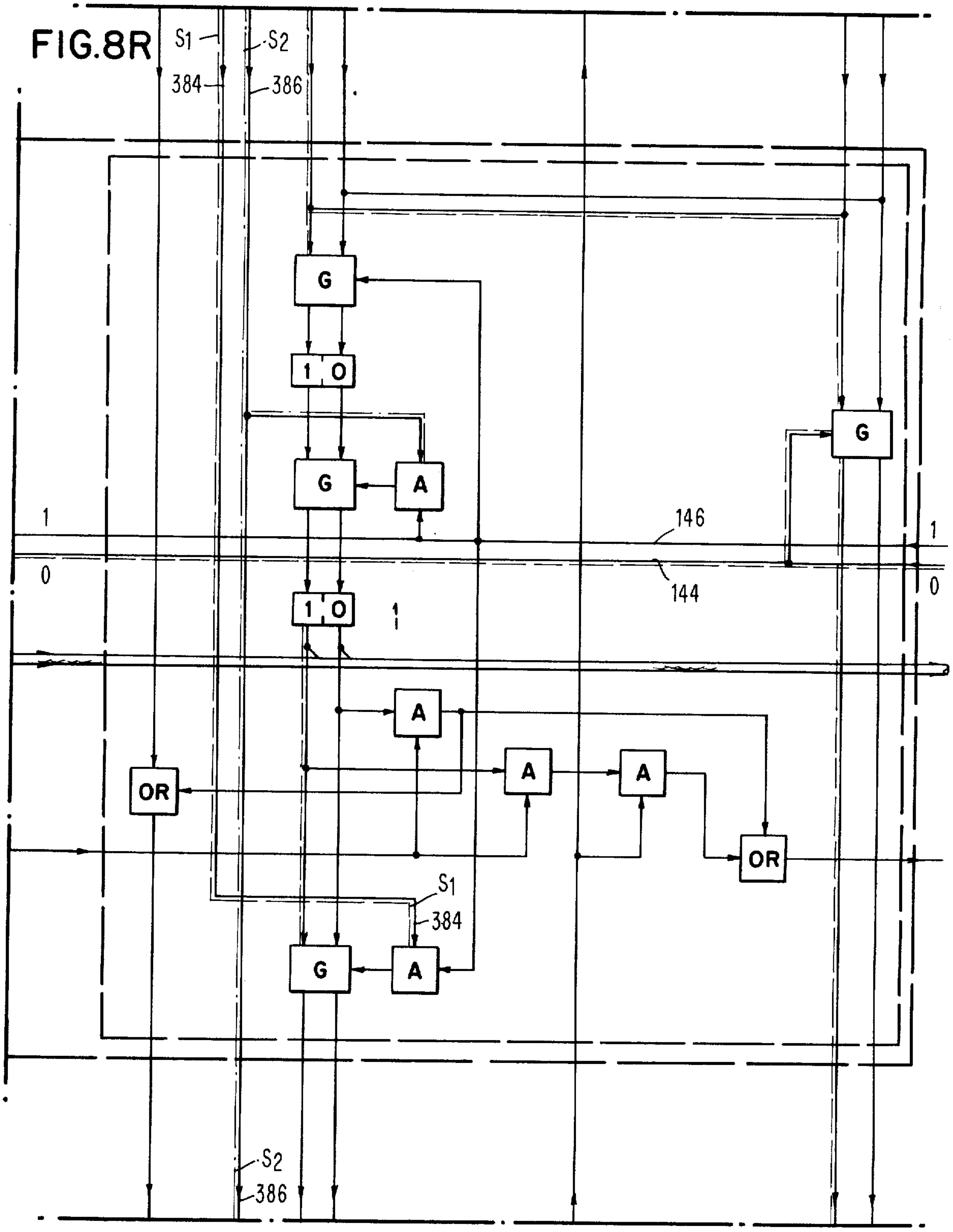
Figure 8S:
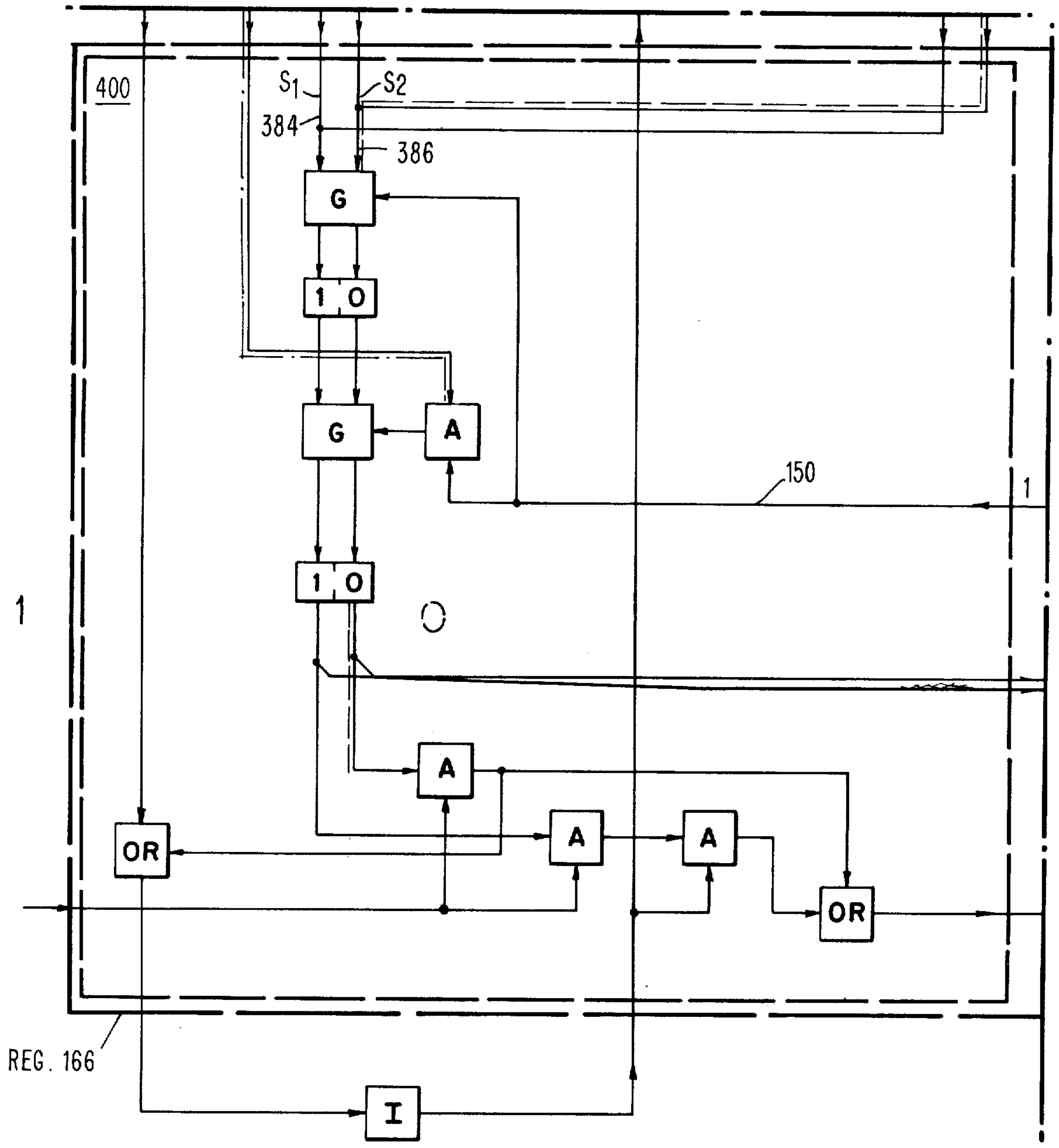
Figure 8T:
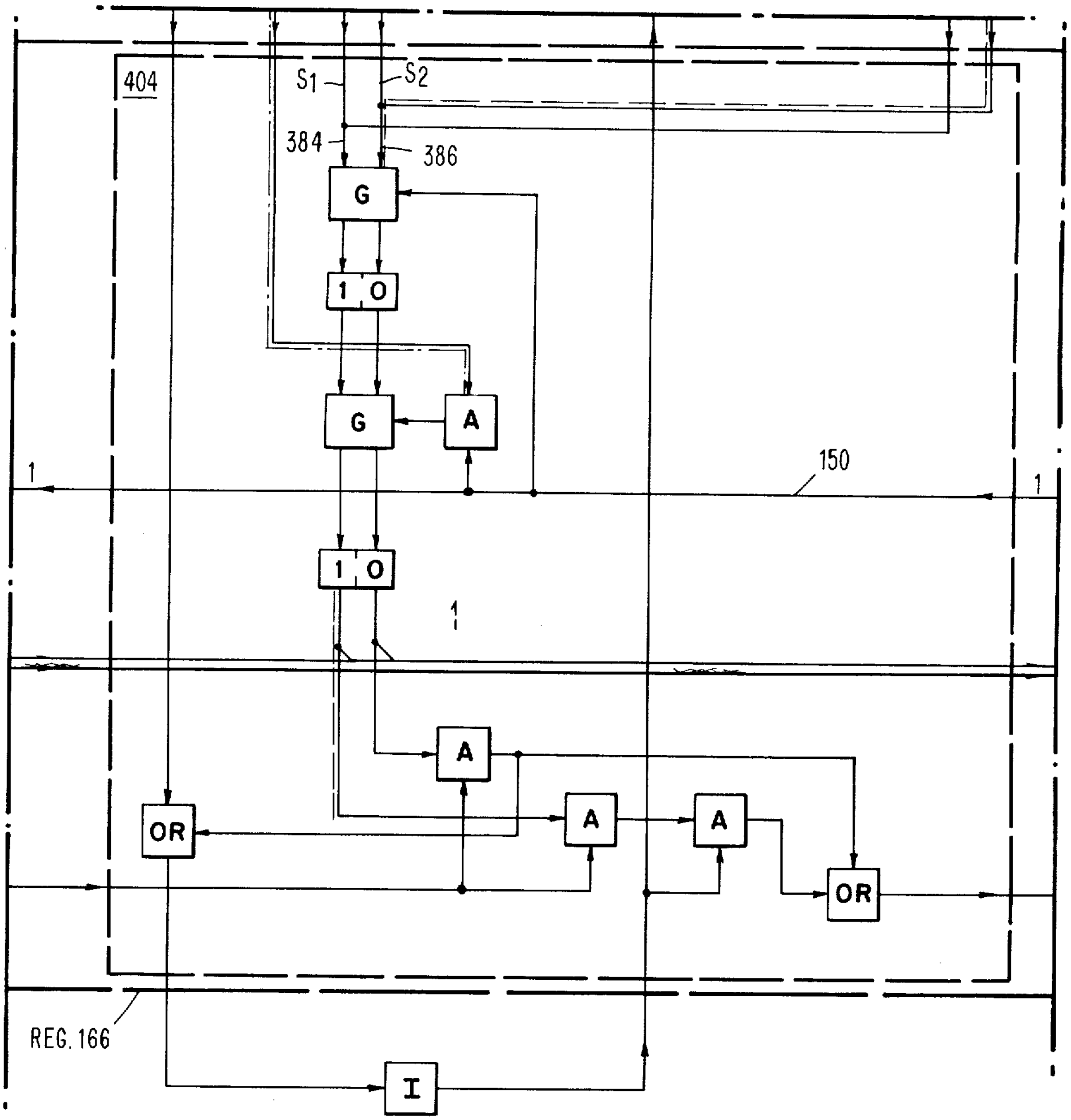
Figure 8U:
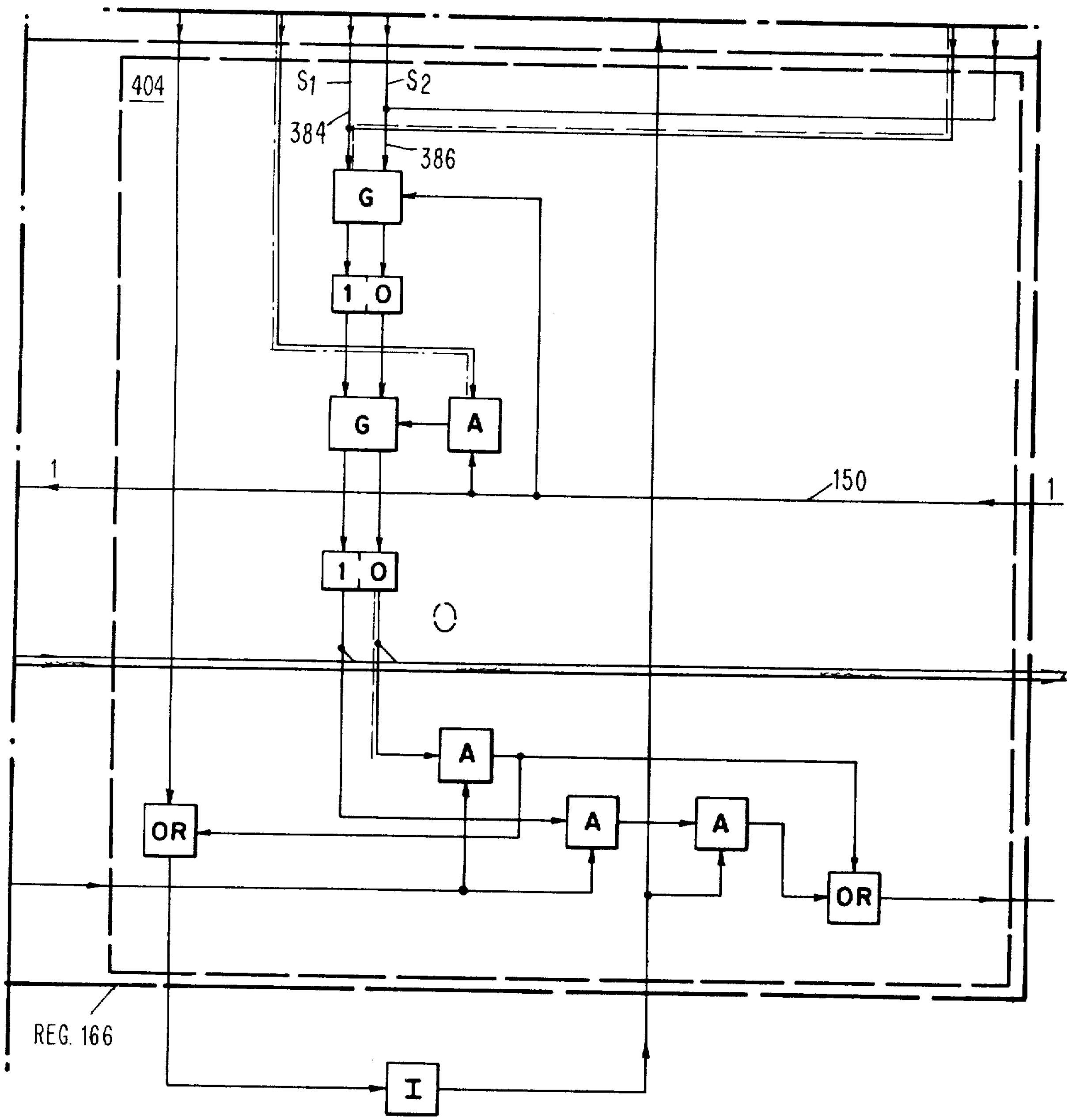

There is now presented a typical arithmetic example which illustrates the operation of the MIN box. For the description of this operation, reference is made to FIGS. 4A-4U, taken together as in FIG. 4, FIGS. 5A-5I, taken together as in FIG. 5, FIGS. 6A-6I, taken together as in FIG. 6, FIGS. 7A-7C, taken together as in FIG. 7, FIGS. 8A-8U, taken together as in FIG. 8, and FIG. 9. FIGS. 4 and 8 are identical. FIGS. 5 and 6 are identical to the 4A to 4I and 8A to 8I portions of FIGS. 4 and 8. FIG. 7 is identical to the 4A to 4C, 5A to 5C, 6A to 6C and 8A to 8c portions of FIGS. 4, 5, 6 and 8 respectively. FIGS. 4, 5, 6, 7 and 8 show the circuit paths through the MIN box to perform the arithmetic example shown in FIG. 9.

Figure 9:
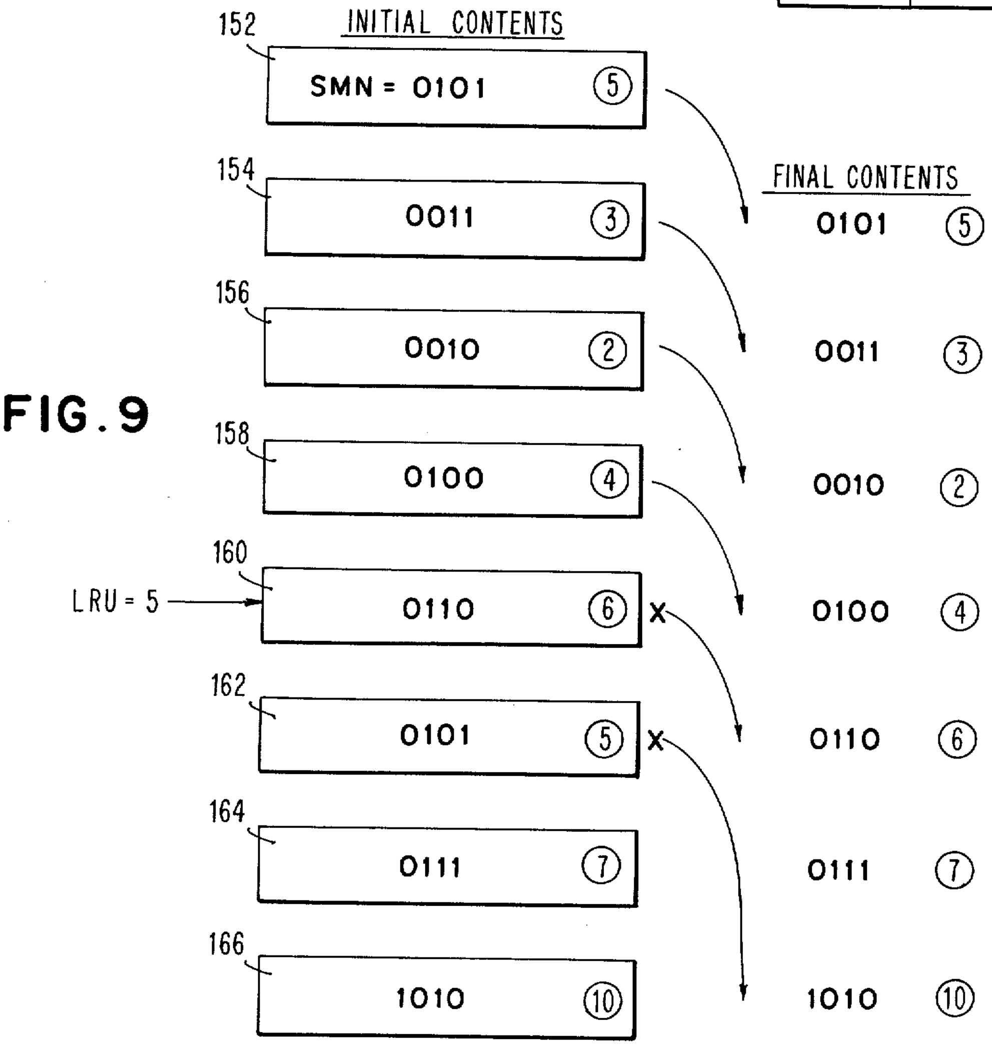
FIG. 9 illustrates an arithmetic example for explaining the operation of the MIN box according to the invention.

Referring now to FIG. 9, it is assumed that register 154 contains the number 3, register 156 contains the number 2, register 158 contains the number 4, register 160 contains the number 6, register 162 contains the number 5, register 164 contains the number 7, and register 166 contains the number 10. It is also assumed that LRU input is 5 thereby signifying that register 160 is addressed. The first sort, therefore, includes register 160 and the registers below it, i.e., those having the higher designating numbers, viz. registers 162, 164 and 166. The smallest number in this group of registers is 5 and is contained in register 162. When the system ascertains this situation, registers 162, 164 and 166 are removed from the sort and only register 160 is left. Of necessity, the number in register 160 is the smallest number in the set comprising only one register, viz. register 160.

It now becomes necessary to find the smallest missing number not contained in the three registers 158, 156 and 154 directly above register 160. Such smallest missing number is found by repeated trails, starting with the number 2 which is loaded into register 152 (it is recalled that the number 1 is not a candidate for the smallest missing number). With the loading of number 2 into register 152, registers 158, 156, 154 and 152 are included in the first sort, this sort indicating that registers 152 and 156 both contain the number 2. Therefore, register 156 is now removed from the group of registers being used and the contents of register 152 are incremented by 1 whereby its contents equal 3. Thereafter, there follows the second sort and as a result thereof again there is indicated that there are duplicate numbers since registers 152 and 154 both contain the number 3.

Accordingly, register 154 is next removed from the sort and the contents of register 152 are again incremented by 1 to equal 4. There now follows the third sort for the smallest missing number. In this case, it is seen that both register 152 and register 158 contain the same number, i.e., 4. Consequently, register 158 is removed from the sort and register 152 is incremented to 5. The ensuing fourth sort using 5 in register 152 succeeds because there are no duplicates of this number is registers 154, 156 and 158.

Reference is now made to FIG. 4 wherein it is to be noted that there are only three columns shown, for convenience of depiction and explanation of operation. It is, of course, to be realized that in an actual system, there would be more than three columns. Also, the example illustrated hereinabove in connection with FIG. 9 employs only four bits and only the bottom register 166 contained a 1 in the high order. Consequently, the example as described could be illustrated employing just three columns and being considered only with the three low order bits.

As has been previously explained, if the LRU number is 5, the registers involved in the first sort are 160, 162, 164 and 166. On FIG. 4, the sorting currents are shown coming in from the left by the dashed lines 800 (FIGS. 4, 5, 6 and 7). There is no sorting current entering register 166 because it was blocked by the high order 1 in that number. The sort current that emerged on the right is the dashed line which extends to register 162 and this is the sorting current that sets flip-flop 178 (FIG. 2V). The first sort sets flip-flop 178. Line 106 is deactivated whereby lines 194, 196 and 198 are removed from the sort.

The second sort concerns itself only with register 160 and there the sorting current is shown initially by a dashed line 800 and then by a dot-dashed broken line 802 which exits on the right, line 802 setting flip-flop 176 (FIG. 2V). The second sort sets flip-flop 176. Line 104 is deactivated. This, is turn, takes lines 192, 194, 196 and 198 out of the sort. The M4 pulse sets flip-flops 206 and 208.

The first sort for the smallest missing number (SMN) is achieved by setting register 152 to the binary number 0010, i.e., the binary code representing the decimal number 2. The registers which are involved in this first sort for the smallest missing number are registers 158, 156, 154 and 152. Flip-flops 168 and 172 are set. As shown in FIG. 4, a dashed line 800 traverses all of register 156 and all of register 152 thereby indicating that the number in register 156 is a duplicate of the number in register 152 whereby it is necessary to increment the number in register 152 and to go to the second sort for the smallest missing number.

The incrementing of register 152 and the second sort for the SMN is depicted in FIG. 5. Flip-flops 168 and 170 are set. in FIG. 5, it is seen that the sorting current which is depicted by the horizontal dashed lines 800 passes through both registers 154 and 152 indicating that the number in register 154 is a duplicate of the number in register 152 whereby it is again necessary to increment the number in register 152 to 4 and to proceed with the third smallest missing number sort.

The incrementing of the number in register 152 to 4 and the third smallest missing number sort is depicted in FIG. 6. Flip-flops 168 and 174 are set. In FIG. 6, it is to be noted that the sorting current which is depicted by the horizontal dashed lines 800 emerges both on registers 158 and 152 thereby indicating that the number in register 158 is the duplicate of the number in register 152. Consequently, it is again necessary to increment the number in register 152, i.e., to 5, and to go to the fourth smallest missing number sort. SUch incrementing in fourth sort is depicted in FIG. 7. Flip-flop 168 is set.

In FIG. 7, it is to be noted that because there is only one register left in the sort, the current, i.e., dashed line 800, has to emerge at the right of register 152. It is, of course, realized that this would not be true if there were larger numbers in the other registers. It is true in this situation since, in the example employed, all of the other registers have been removed from the sort prior to this last or fourth smallest missing number sort.

Before proceeding with the selected shiftdown, the contents of the registers as shown in FIGS. 2P, 2J and 2U, it is recalled that gate 228 is enabled by the pulse on line 382 to effect the setting of flip-flops 200, 202 and 204 to their 1 states. Thus, for the selected shift operation, all of the mask flip-flops with the exception of the two bottom ones are set to their 1 states, the two bottom flip-flops being in their 0 states.

Referring to FIG. 8, the states of these mask flip-flops are indicated by designating numerals at the right of FIGS. 8C, 8F, 8I, 8L, 8Q, 8K and 8U. It is to be noted that these designating numerals which start at the top are 126, 124, 130, 128, etc. are from the flip-flops 200, 202, 204, 206, 208, 210 and 212 as shown in FIGS. 2T and 2V. The active state of these lines is indicated by a dashed line in FIG. 8. For example, from the top on FIG. 8, the mask flip-flops are all in their 1 states down to and including register 162. The mask flip-flops for registers 164 and 166 are in their 0 states. However, the bottommost register, i.e., register 166, is not needed for the shift operation (and is not shown in FIG. 8).

The first shift pulse indicated by the dashed line, is applied to lines 384. It is to be noted that register 152 contains only one flip-flop register element. The other registers 154, 156, 158, 160, 162, 164 and 166 comprise two flip-flops. As depicted in FIG. 8, the one of these two flip-flops near the top of the register element is an intermediate storage flip-flop and the flip-flop which is below the center is the storage flip-flop for the information bit. The purpose of the first shift pulse is to shift information from the storage flip-flop to the immediate storage flip-flop directly below it or to route it to the bypass path in order to skip registers. Actually, the only bypassing that takes place in the described example is that in connection with register 164.

It is seen that the information from the bits in register 162 extends via the dashed lines downwardly and then across to the bypass lines through the gate and down through the gate under the top of the register element of register 166. However, in accordance with the example, the information from register 162 does not enter register 166 because line 150 is not active. The information in register 162 disappears. The information in registers 164 and 166 does not change and the information in the registers above 162 all move down one position respectively, i.e., the contents of register 160, enter register 162, the contents of register 158 enter register 80, the contents of register 156 enter register 158, the contents of register 154 enter register 156, and the contents of register 152 enter register 154.

The second shift from the intermediate flip-flops to the storage flip-flops is indicated by the dot-dashed line at which time line 386 is activated.

The following tabulation sets forth the relationship of the operations under the control of the A clock.

| Monostable Multivibrator | Turn "On" Conditions | Function(s) Performed When "On" | Function(s) Performed When Turning "Off" |
|---|---|---|---|
| A1 | Memory access request by CPU (signal on line 286) The "0" state of the rewrite and replace flip-flop 516. | The resetting of the "LRU" field of the argument mask of all "0's". The setting of the "BLOCK NUMBER" of the argument mask to all "1's". The gating of the "BLOCK NUMBER" from register 418 to the "BLOCK NUMBER" field of the argument register. The setting of the match indicators to their "1" states. The resetting of the EOL flip-flop to its "0" state. | The turning "on" of monostable multivibrator A2. |
| A2 | The turning "off" of monostable multivibrator A1. | Produces the associate signal for associating on the "BLOCK NUMBER". | The turning "on" of monostable multivibrator A3. |
| A3 | The turning "off" of monostable multivibrator A2. | The interrogation of the match indicator flip-flops, i.e., the setting or the not setting of the EOL flip-flop to its "1" state. | The turning "on" of monostable multivibrator A4. |
| A4 | The turning "off" of monostable multivibrator A3. | The testing for the state of the EOL flip-flop. | |

The following tabulation sets forth the relationship of the operations under the control of the B clock.

| Monostable Multivibrator | Turn "On" Conditions | Function(s) Performed When "On" | Function(s) Performed When Turning "Off" |
|---|---|---|---|
| B1 | The "0" state of the EOL flip-flop. | The reading of the matching word in the associative memory to the memory data register 446. The resetting of the "LRU" hold register to its all "0" state. | The turning "on" of monostable multivibrator B2. |
| B2 | The turning "off" of monostable multivibrator B1. | The gating of the "real" block from the memory data register to the left-hand portion of the memory address register 450 of primary store. The gating of the "address in block" from register 418 to the right-hand portion of memory address register 450. The resetting of the LRU field of the argument mask to all "0's". The gating of the LRU number from the memory data register to the LRU hold register. | The turning "on" of monostable multivibrator B3. The turning "on" of monostable multivibrator M1. |
| B3 | The turning "off" of monostable multivibrator B2. | The setting of the match indicator flip-flops to their "1" states. The setting of the | The turning "on" of monostable multivibrator B4. |

-continued

| Monostable Multivibrator | Turn "On" Conditions | Function(s) Performed When "On" | Function(s) Performed When Turning "Off" |
|---|---|---|---|
| | | left-hand portion of the LRU field of the argument mask to same number of "1's" as the LRU number in the associative memory MDR (memory data register). The resetting of the "BLOCK NUMBER" field of the argument mask to all "0's". The resetting of the LRU field of the argument register to all "0's". | |
| B4 | The turning "off" of monostable multivibrator B3. | The providing of the associate pulse to reset the match indicators for all words in the associative memory which have LRU numbers equal to or less than the LRU number in data register 446. | The turning "on" of monostable multivibrator B5. |
| B5 | The turning "off" of monostable multivibrator B4. | The providing of the first shift pulse. | The turning "on" of monostable multivibrator B6. |
| B6 | The turning "off" of monostable multivibrator B5. | The providing of the second shift pulse. | The turning "on" of monostable multivibrator B7. |
| B7 | The turning "off" of monostable multivibrator B6. | The setting of the match indicator flip-flops to their "1" states. The resetting of the LRU field of the argument mask to all "0's". The setting of the "BLOCK NUMBER" field of the argument mask to all "1's". | The turning "on" of monostable multivibrator B8. |
| B8 | The turning "off" of monostable multivibrator B7. | The providing of the associate pulse. | The turning "on" of monostable multivibrator B9. |
| B9 | The turning "off" of monostable multivibrator B8. | The setting of the LRU field of associative memory data register to 10000000. The testing for the state of the alteration flip-flop. | |
| B10 | The "1" state of the alteration flip-flop. | The setting of the A bit of the associative memory data register to its "1" state. | |
| B11 | The "0" state of the alteration flip-flop. | The writing of the contents of the associative memory data register back into the associative memory. | |

The following tabulation sets forth the relationship of the operations under the control of the C clock.

| Monostable Multivibrator | Turn "On" Conditions | Function(s) Performed When "On" | Function(s) Performed When Turning "Off" |
|---|---|---|---|
| C1 | The "1" state of the EOL flip-flop. | The setting of the LRU field of the argument mask to all "1's". The resetting of the "BLOCK NUMBER" field of the argument mask to all "0's". The setting of the match indicator flip-flops to their "1" states. | The turning "on" of monostable multivibrator C2. |
| C2 | The turning "off" of monostable multivibrator C1. | The providing of the associate pulse | The turning "on" of monostable multivibrator C3. |
| C3 | The turning "off" of monostable multivibrator C2. | The providing of the first shift pulse. | The turning "on" of monostable multivibrator C4. |
| C4 | The turning "off" of monostable multivibrator C3. | The providing of the second shift pulse. | The turning "on" of monostable multivibrator C5. |
| C5 | The turning "off" of monostable multivibrator C4. | The reading of the matching word from the associative memory to the associative memory data register 446. | The turning "on" of monostable multivibrator C6. |
| C6 | The turning "off" of monostable multivibrator C5. | The setting of the LRU section of the associ-active memory data register 446 to 1000000. The testing for the state of the A bit in associative memory data register 446. | |
| C7 | The "A" bit in associative memory data register 446 is in its "0" state. | The gating of the "BLOCK NUMBER" from register 418 to the "REPLACEMENT ADDRESS REGISTER". The gating of the "REAL BLOCK" field of associative memory data register 446 to the PRIMARY ADDRESS REGISTER. The resetting of the "A" bit in associative memory data register 446 to "0" The applying of the "replace" input to the channel controls. The setting of the "replace" flip-flop 514 to its "1" state. | The turning "on" of monostable multivibrator C8. |
| C8 | The turning "off" of monostable multivibrator C7. | The writing of the contents of associative memory data register 446 into the associative memory. | The turning "on" of monostable multivibrator C9. |
| C9 | The turning "off" of monostable multivibrator C8. The turning "off" of monostable multivibrator C10. | The testing for the state of the replace-ment flip-flop 514. | |
| C10 | The replace-ment flip-flop 514 is in its "1" state. | Delay only. | The turning "on" of monostable multivibrator C9. |

-continued

| Monostable Multivibrator | Turn "On" Conditions | Function(s) Performed When "On" | Function(s) Performed When Turning "Off" |
|---|---|---|---|
| C11 | The "A" bit in associative memory data register 446 is in its "1" state. | The gating of the "BLOCK NUMBER" field of associative memory data register 446 to the "WRITE ADDRESS REGISTER". | The turning "on" of monostable multivibrator C12. |
| C12 | The turning "off" of monostable multivibrator C11. | The gating of the "BLOCK NUMBER" from CPU register 418 to the "REPLACEMENT ADDRESS REGISTER". The gating of the "REAL BLOCK" field of associative memory data register 446 to the "PRIMARY ADDRESS REGISTER". The gating of the "BLOCK NUMBER" from register 418 to the associative memory data register 446. The setting of the "A" bit of the associative memory data register 446 to its "0" state. The applying of the "REWRITE AND REPLACE" input to the channel controls. The setting of the rewrite and replace flip-flop 516 to its "1" state. | The turning "on" of monostable multivibrator C13. |
| C13 | The turning "off" of monostable multivibrator C12. | The writing of the contents of associative memory data register 446 into the associative memory. | The turning "on" of monostable multivibrator C14. |
| C14 | The turning "off" of monostable multivibrator C13. The turning "off" of monostable multivibrator C15. | The testing for the state of the rewrite and replace flip-flop 516. | |
| C15 | The "1" state of the rewrite and replace flip-flop 516. | Delay only. | The turning "on" of monostable multivibrator C14. |

The following tabulation sets forth the relationship of the operations under the control of the M clock.

| Monostable Multivibrator | Turn "On" Conditions | Function(s) Performed When "On" | Function(s) Performed When Turning "Off" |
|---|---|---|---|
| M1 | The turning "off" of monostable multivibrator B2. | If the LRU number is 1 or the LRU number is 2 and the contents of register 154 are 2, then this terminates the M clock sequence. | |
| M2 | Active line 392. | The resetting to their "0" states of flip-flops 168, 170, 172, 174, 176, 178, 180 and 182. | The turning "on" of monostable multivibrator M3. |
| M3 | The turning "off" of monostable | The applying of the LRU number in the range of 2–8 to selected one or | The turning "on" of monostable multivibrator |

-continued

| Monostable Multivibrator | Turn "On" Conditions | Function(s) Performed When "On" | Function(s) Performed When Turning "Off" |
|---|---|---|---|
| | multivibrator M2. | ones of lines 186, 188, 190, 192, 194, 196 and 198 (the enabling of gate 246). The resetting to their "0" states of flip-flops 200, 202, 204, 206, 208, 210 and 212. | M4. |
| M4 | The turning "off" of monostable multivibrator M3. | The transferring of the settings of flip-flops 170, 172, 174, 176, 178, 180 and 182 to flip-flops 200, 202, 204, 206, 208, 210 and 212 respectively. | The turning "on" of monostable multivibrator M5. |
| M5 | The turning "off" of monostable multivibrator M4. | The resetting of flip-flops 232, 234, 236, 238, 240 and 242 to their "0" states. The resetting of flip-flops 168, 170, 172, 174, 176, 178, 180 and 182 to their "0" states. The setting of the contents of register 152 to its 00–010 state. | The turning "on" of monostable multivibrator M6. |
| M6 | The turning "off" of monostable multivibrator M5. The turning "off" of monostable multivibrator M9. | The applying of the LRU number to the selected one or ones of lines 214, 216, 218, 220, 222, 224 and 226. (The enabling of gate 244.) | The turning "on" of monostable multivibrator M7. |
| M7 | The turning "off" of monostable multivibrator M6. | The determining as to whether there are duplicate numbers | |
| M8 | The ascertaining that there are duplicate numbers. | The transferring of the settings of flip-flops 170, 172, 174, 176, 178, 180 and 182 to flip-flops 232, 234, 236, 238, 240 and 242. | The turning "on" of monostable multivibrator M9. |
| M9 | The turning "off" of monostable multivibrator M8. | The resetting of flip-flops 168, 170, 172, 174, 176, 178, 180 and 182 to their "0" states. The incrementing of the contents of register 152. | The turning "on" of monostable multivibrator M6. |
| M10 | The ascertaining that there are no duplicate numbers. | The enabling of gates 228, 230 and 244. | The turning "on" of monostable multivibrator M11. |
| M11 | The turning "off" of monostable multivibrator M10. | The providing of the first shift pulse. | The turning "on" of monostable multivibrator M12. |
| M12 | The turning "off" of monostable multivibrator M11. | The providing of the second shift pulse. | |

DESCRIPTION OF THE MIN PROGRAM

There now follows a description of the programs (constituting the MIN program) that are invoked when a page exception occurs, i.e., when the referenced page is not in primary storage. The symbols employed in these programs are as follows:

TABLES

T(I,J) is a N*2 matrix wherein N is the number of pages in virtual memory. The first column of this table (J=1) is the LRU number and the second (J=2) is the OPT value, i.e., the P-number. T is ordered by virtual pages.

CTAB(I) is a table of N counters, which contains the number of occurrences of each output value I (as MMC).

MBOX(I) is a table of 2M entries: 1, . . . , M being the P-stack, and 1, . . . , M being counters. These entries receive the copies of the contents of the corresponding registers from the device, upon execution of a special instruction EXEC (2,LOC) as is further explained hereinbelow.

VARIABLES

K is the virtual address of the page causing the exception and is loaded prior to the call to PGEX.

L is the temporary LRU index.

BUFF is the temporary location of MMC.

SMN is the smallest missing number during search.

REPL contains the virtual address of the page which is being replaced. (In this connection, there is invoked EXEC(3,LOC) as is further explained hereinbelow.)

LMAX is the number of distinct pages referenced up to this point in time.

All of the foregoing variables are self-initialized except for LMAX which is initially zero.

CONSTANTS

M is the number of page frames in real memory (device size). N is the number of pages in virtual memory.

LABELS

NEWR process new reference
SETN set next smallest missing number
CONS establish consistency of tables
CURR process current reference
ULRU update LRU numbers OUTC output counters SERM search in the device (MIN box)

BUBL do a bubble sort

PROGRAMS

Program Structure

There are four subprograms, two (INIT and PGEX) are assumed to be called by the operating system associated with the data processing apparatus. The program INIT initializes the device. The program PGEX is entered at each page exception interrupt and it invokes the SERM (search in the device (MIN box)) and BUBL (do a bubble sort). The program PGEX receives the variable K as a parameter.

Functions (in the sense of the PL/I programming language)

IND(C,J) returns the index I of entry T(I,J) such that C = T(I,J)

EXEC(J,LOC) or EXEC(J) executes special hardware instructions as follows:

| J | Description of EXEC |
|---|---|
| 1 | Resets to zero the partial pseudo OPT stack and the counters in the device |

| J | Description of EXEC |
|---|---|
| 2 | Reads the contents of the device (the partial pseudo OPT stack and the counters) into the 2M consecutive locations, starting at LOC. |
| 3 | Places the virtual address of the M-th recently referenced page to LOC. |
| 4 | Pushes the partial pseudo OPT stack down by one and places at the top the number from LOC. |

Figure 10:
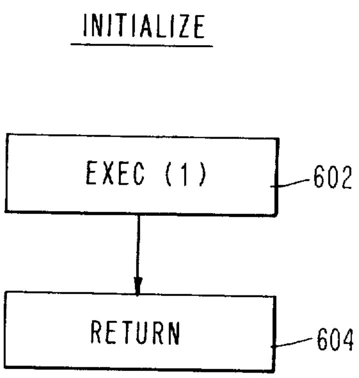
FIG. 10 is a flow chart of a routine which is invoked to reset the MIN box.

The programs are now described. Referring to FIG. 10, the initialize routine essentially consists of step 602, i.e., EXEC(1). In other words, as shown in the "Description of EXEC" above, by step 602, the P, i.e., the partial pseudo OPT stack and the counters in the device are set to zero, box 604 representing return.

When the page exception occurs, as is symbolized by block 606, the PGEX (page exception) program is entered into at the page exception interrupt. The supply K operation is the supplying of the virtual address of the page causing the exception and is loaded before the PGEX routine is invoked. By step 608, the contents of the partial pseudo OPT stack and the counters are read into two M consecutive locations starting at location LOC, i.e., MBOX. By step 610, the test is made as to whether the value of LMAX, i.e., the number of distinct pages referenced up to this point, is less than the value of M which is a constant and is the number of page frames in real memory. In the event that step 610 results in a yes, then the program moves to step 612, i.e., the processing of the new reference (NEWR). However, if step 610 results in a no, then the program moves to step 614 wherein there is executed the step EXEC(3,REPL), i.e, the virtual address of the M-th recently referenced page is placed to REPL which then contains the virtual address of the page being replaced. From step 614, the program moves to block 616 where there is first executed the step of setting T(REPL,1) to the value of M and T(REPL,2) is set equal to the value of MBOX(M). These two steps, of course, update the T(I,J) table. By step 618, the test is now made as to whether T(K,1) is greater than zero. In the event that step 618 results in a no, then the program branches back to step 612 wherein the new reference is processed (NEWR). However, if step 618 results in a yes, then the next smallest missing number is set (SETN).

Figure 11:
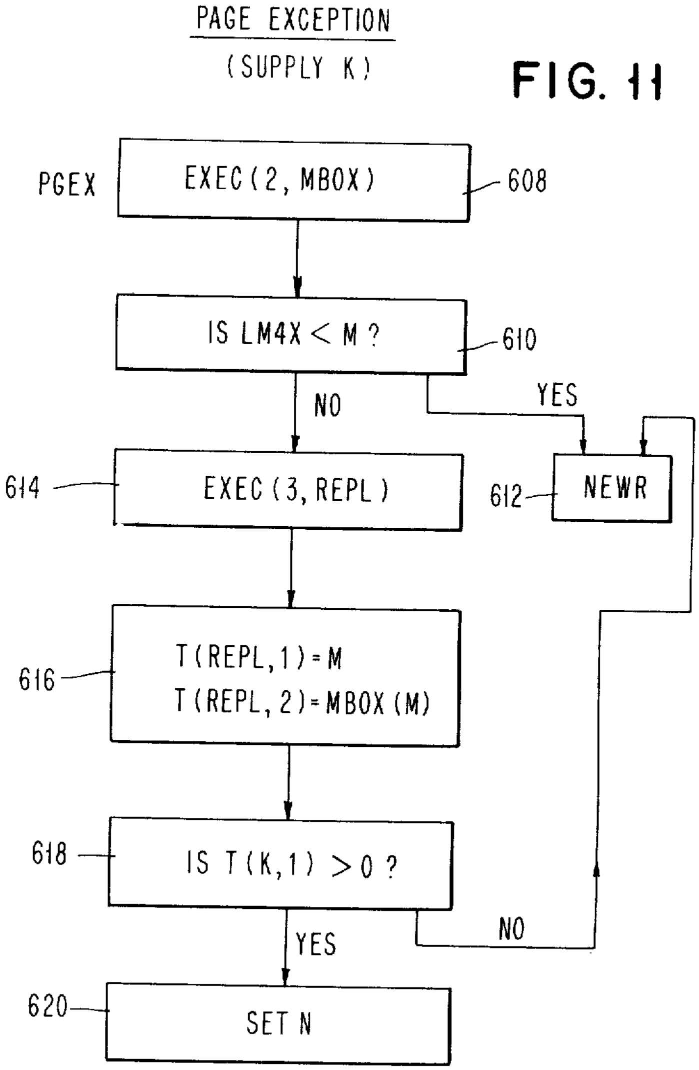
FIG. 11 is a flow chart of a routine which is invoked at the occurrence of a page exception.
Figure 15:
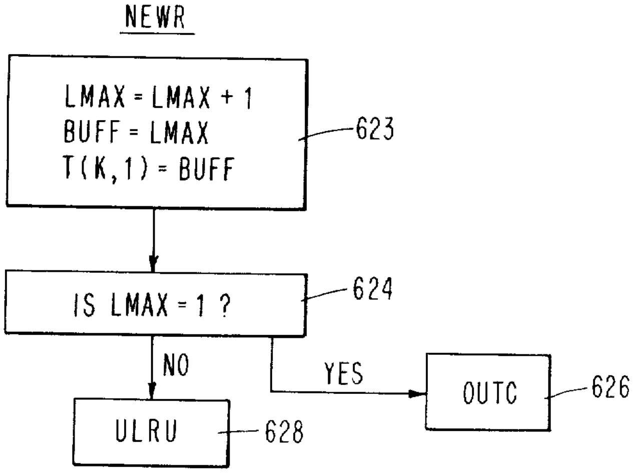
FIG. 15 is a flow chart of NEWR (process new reference) routine utilized in the flow chart of FIG. 11.

The flow chart of FIG. 15 illustrates the operation of the NEWR (process new reference) routine as utilized in step 612, the page exception routine (PGEX) as depicted in the flow chart of FIG. 11. In this NEWR routine, the LMAX term is incremented by 1, the BUFF, i.e., the temporary location of MMC, is set to the value of LMAX and the T table is updated by setting T(K,1) equala to the value of BUFF. These three steps are all shown in the flow chart in block 623. Upon the completion thereof, the routine moves to step 624 where the test is made as to whether LMAX is equal to 1. If step 624 results in a yes, then the program moves to step 626 wherein the OUTC, i.e., output counters step is executed, that is, an entry of CTAB is increased by 1. However, if step 624 results in a no, then ULRU routine of step 628 is executed, i.e., all of the LRU numbers in the LRU list are updated as has been described hereinabove in connection with the updating of the LRU stack.

Figure 12A:
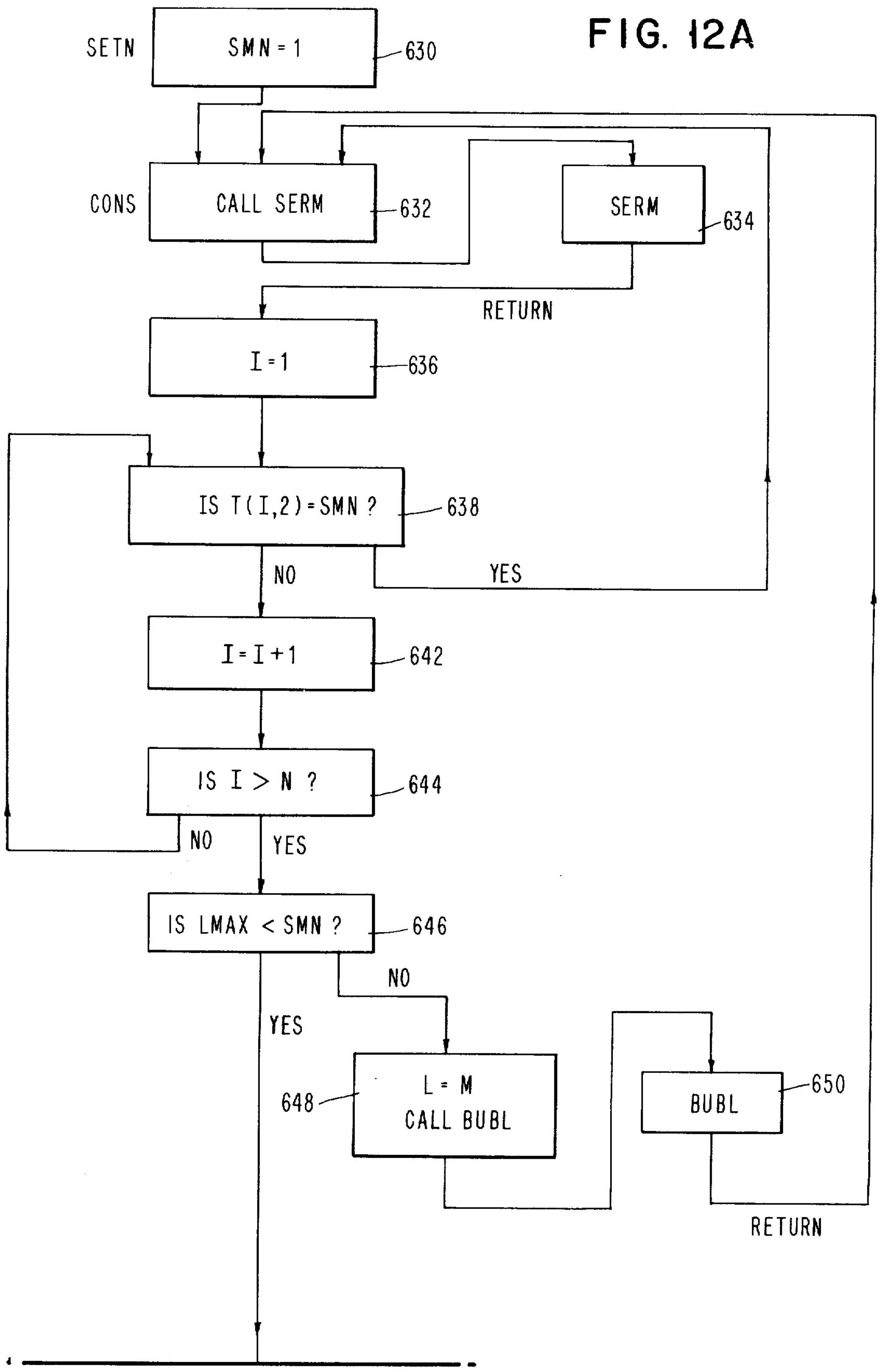
FIGS. 12A and 12B, taken together as in FIG. 12, constitute a flow chart of a routine which is invoked after the page exception routine of FIG. 11 is executed to bring the storage component of the OPT list into consistency in order to be able to process the page causing the page exception in the OPT list and to update the LRU list.
Figure 12B:
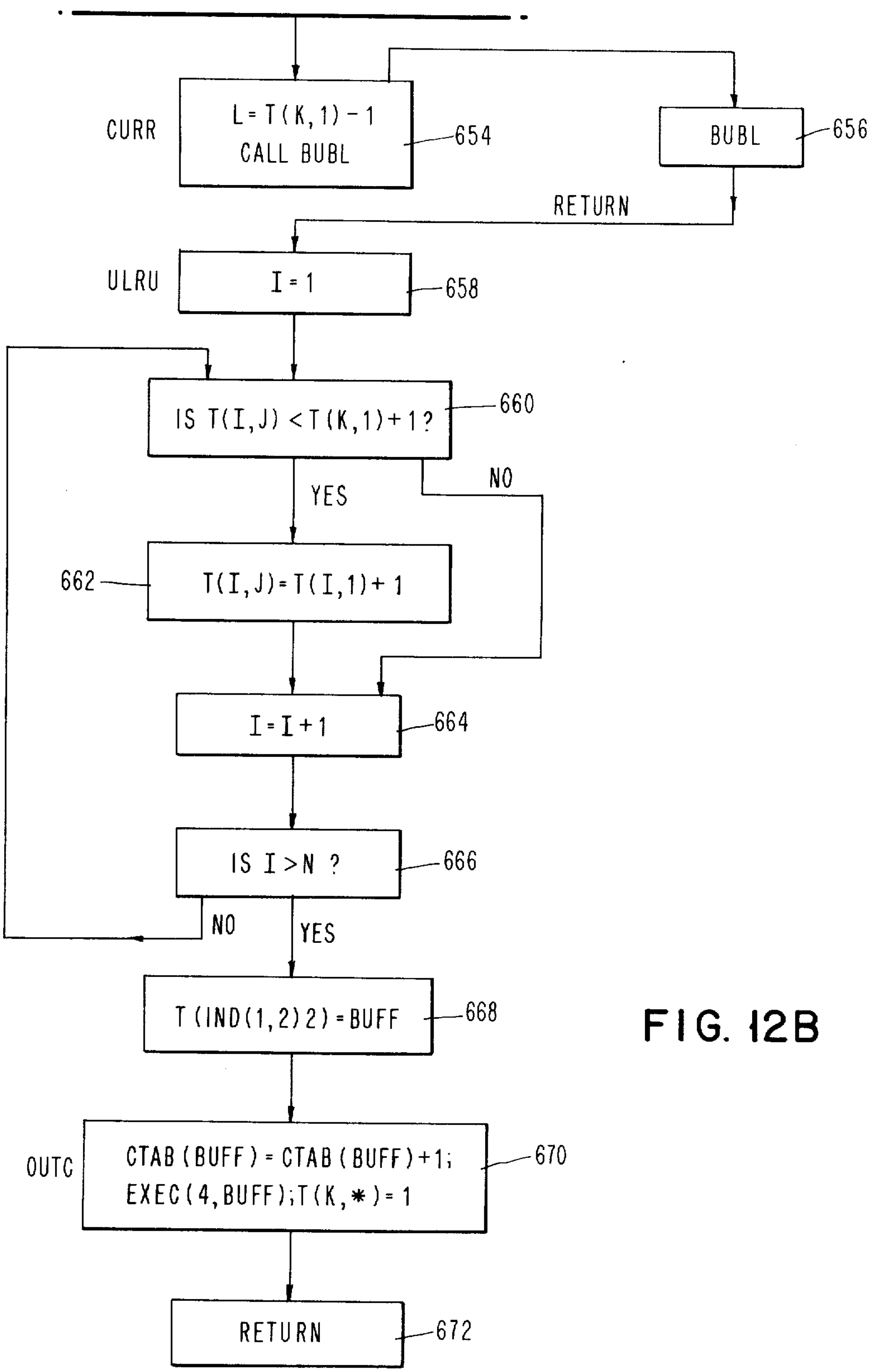

In the flow chart of FIG. 12, which is the program for bringing the total OPT list in storage into consistency and the handling of the page causing the exception, step 630 has the SETN designation, i.e., the setting of the next smallest missing number SMN to 1. By step 632, the consistency of the tables is established (CONS) by calling for the SERM routine, the search in the device (MBOX). In response to step 632, step 634, i.e., SERM, is executed and then the program returns. In step 636, I is set to 1 and, in step 638, the test is made as to whether T(I,2) is equal to SMN. This test is made to find whether the item in column 2 in the T table is equal to the value of the smallest missing number (SMN). If step 638 results in a yes, the program branches back to step 632 wherein the consistency of the tables is established (CONS). However, if step 638 results in a no, then the program moves to step 642 wherein the value of I is incremented by 1 and in step 644 the test is made as to whether the value of I exceeds the value of N, the number of pages in virtual memory. Thereafter, the program loops through steps 638, 640, 642 and 644 sequentially iteratively until step 644 results in a yes, whereupon the program moves to step 646.

In step 646, the test is made as to whether the value of LMAX is less than the value of SMN. If step 646 results in a no, the program then moves to block 648 wherein the term L (the temporary LRU index) is set to the value of M (the number of page frames in real memory) and the bubble sort (BUBL) is called for, such bubble sort being executed by step 650. The bubble sort is made in accordance with the algorithm set forth hereinabove. The program branches back to step 632 (CONS) whereby the consistency of the tables is established.

If step 646 results in a yes, then the program moves to block 654, legended CURR (process current reference), wherein the temporary LRU index, L, is set to the value of T(K,1)-1 and the bubble sort is called for, such bubble sort being executed by step 656 and the program returns.

With block 658, there is instituted the ULRU operation, i.e., the updating of the LRU list. To this end, I is set to 1. In block 660, the test is made as to whether T(I,1) is less than T(K,1). If step 660 results in a yes, then by step 662 T(I,1) is incremented by 1. The program moves to step 664 where I is incremented by 1. However, if step 660 results in a no, then the program moves directly from step 660 to step 664. In step 666, the test is made as to whether the value of I is greater than the value of N (the number of pages in virtual memory). If step 666 results in a no, the program branches back to step 660. The program iteratively passes through step 660, 662, 664 and 666 until step 666 results in a yes, whereupon the program moves to step 668. By step 668, T(IND(1,2),2) is set equal to the value of BUFF, which was set in the BUBL program. This completes the ULRU operation.

In block 670, CTAB(BUFF), i.e., the value in the CTAB table indexed by the BUFF value, is incremented by 1 and the instruction EXEC(4,BUFF) i.e., the pushing down of the OPT stack by 1 and placing on top thereof the number from the BUFF location is effected. The T table entry T(K,*), i.e., both entries of row K, is set equal to 1. Block 672 indicates the return step.

Figure 13:
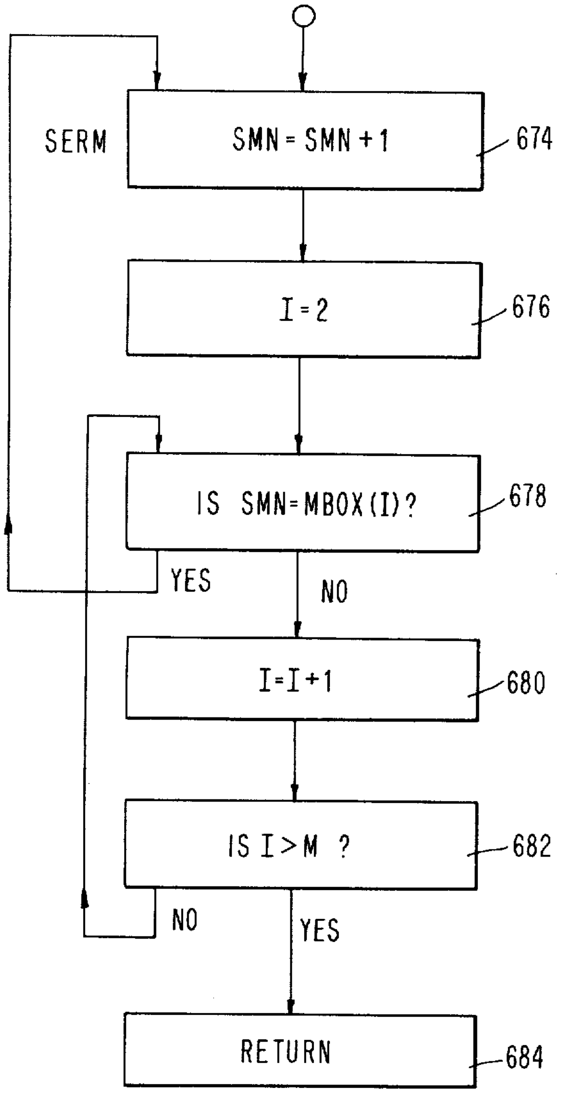
FIG. 13 is a flow chart of the MIN box search routine which is employed in the routine depicted in FIG. 12.

The program in the flow chart depicted in FIG. 13 illustrates the SERM (i.e., the search in the M-box). In this routine, by step 674, the value of SMN (the smallest missing number during search) is incremented by 1 and by step 676, the value of I is set to 2. In step 678, the test is made as to whether the value of SMN is equal to the value of MBOX(I). If step 678 results in a yes, the program branches back to step 674, the program loops through steps 674, 676 and 678 until step 678 results in a no, whereupon the program moves to step 680 where the value of I is incremented by 1. In step 682, the test is made as to whether the value of I exceeds the value of M (the number of page frames in real memory). If step 682 results in a no, then the program branches back to step 674 and steps 674, 676, 678, 680, 682 are sequentially iteratively looped through, until step 682 results in a yes, whereupon as shown by block 684 the return occurs.

Figure 14:
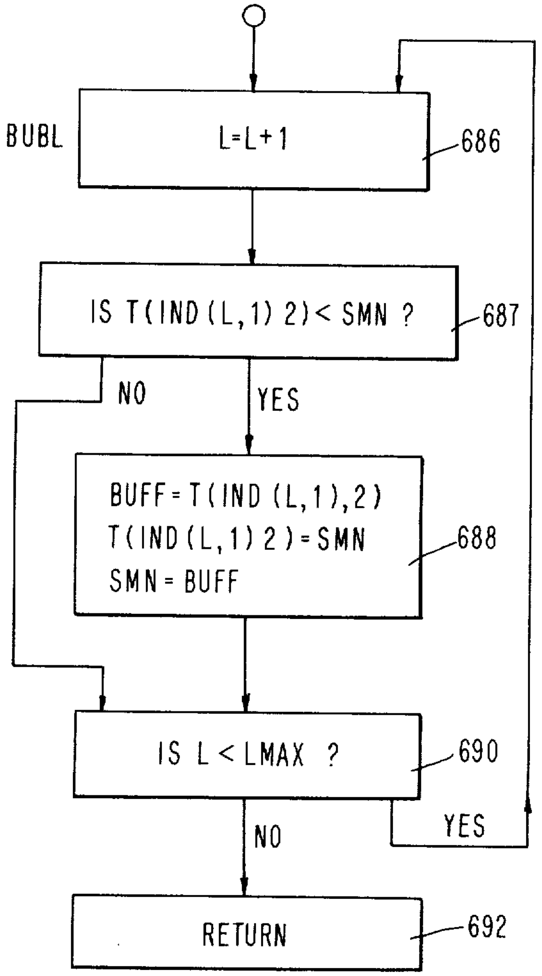
FIG. 14 is a flow chart of the BUBL (bubble sort) routine which is employed in the routine depicted in FIG. 12.

The flow chart in FIG. 14 illustrates the bubble sort (BUBL). In the first step 686 of this sort, L (temporary LRU index) is incremented by 1. By step 687, the test is made as to whether the entry in the T table, i.e., T(IND(L,1),2) is less than the value of SMN. If step 686 results in a yes, the program moves to block 688 wherein the value of BUFF, i.e., the temporary location of the MMC is set to the value of T(IND(L,1),2), the term T(IND(L,1),2) is set to the value of SMN and the value of SMN is set to the value of BUFF. The program then moves to step 690 wherein the test is made as to whether the value of L is less than the value of LMAX. In the event that step 687 were to result in a no, the program would move directly therefrom to step 690. If step 690 results in a yes, then the program branches back to step 686 and the program sequentially iteratively moves through steps 686, 687, 688 and 690 until step 690 results in a no, at which point the return is made as symbolized by step 692.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A system for use in data processing apparatus which is operated as a paging machine and wherein a program is considered as a page reference string, for determining the minimum memory capacities for the pages of said string, said data processing apparatus including means for maintaining a first list of the names of the pages of said program weighted in accordance with a least recently used (LRU) criterion, said first list being constituted by the names of said pages and LRU integers respectively therewith having one of the different discrete values of 1 to *n*, wherein n is equal to the total number of said pages in said program, said system comprising:

means for maintaining a second list of said names, said second list being constituted by an ordered sequence of *n* addresses, each of said addresses respectively having one of the different discrete values of 1 to *n*, there being located at each of said addresses, a different integer, C, associated therewith from which the minimum memory capacity (MMC) of said page can be determined, each of the integers in said second list having a different discrete value of 1 to *n*;

means responsive to said means for maintaining said second list for determining said minimium memory capacity (MMC) of a given referenced page comprising:

means responsive to the referencing of said given page for dividing said second list into a first group of addresses having the values of 1 to $(l-1)$ respectively, and a second group of addresses having the values of $l$ to $n$ respectively, wherein $l$ is equal to the integer associated with said referenced page in said first list, means responsive to said means for dividing said second list for ascertaining the address, $k$, in said second group whereat there is present the lowest value MMC integer;

means responsive to said means for ascertaining said address, $k$, for making the series of addresses in said second group which are included in the subgroup containing addresses $l$, $(l+1)$, . . . , $(k-1)$ which have the following values, viz. $(l+a)$, $(l+b)$, $(l+c)$, . . . , to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc., wherein $C(i)$ is the value of integer, C, at location $i$.

means responsive to said means for dividing said second list for generating the smallest missing number in the groiup of integers comprising 2 to $(C_{max}+1)$ wherein $C_{max}$ is the largest integer C of those contained at addresses 2 to $(l-1)$, said generated smallest missing number being the minimum memory capacity of said referenced page, means responsive to said means for dividing said second list for incrementing each of the addresses 2 to $(l-1)$ of said first group by 1 whereby they respectively have the address values of 3 to $l$, means responsive to said means for generating said smallest missing number for assigning the address value of 2 to said generated smallest missing number, and means responsive to said means for marking said series of addresses for assigning to each of the series of said marked addresses, the value of the next address in said series, the highest value address in said series being assigned the value of $k$, said integer originally at said address k being discarded.

2. In a data processing apparatus which is operated as a paging machine and wherein a program is considered as a page reference string, said data processing apparatus including, primary storage for containing a portion, $m$, of the pages of said program and secondary storage for containing the remainder, $(n-m)$, pages of said program wherein n is the total number of pages in said program, means responsive to the occurrence of a page exception for effecting the exchanging of a page in primary storage for the page in secondary storage causing said page exception, means for maintaining a first list of the names of the pages of said program weighted in accordance with a least recently used (LRU) criterion, said first list being constituted by the names of said pages and (LRU) weighting integers respectively having one of the different discrete values of 1 to $n$, associated with each of said names according to said criterion, said first list comprising a first portion comprising means for containing the names of those pages in primary storage and having LRU weightings of 1 to $m$ and the respective LRU integers associated therewith, and a second portion comprising the names of the remaining pages of said program and which have the LRU weightings of $(m+1)$ to n and their respective associated integers in a location in said storage, said data processing apparatus further including means for effecting changes of information in said first and second portions of said first list, a system for determining the minimum memory capacities (MMC) for the pages of said page reference string comprising:

means for maintaining a second list of said names, said second list being constituted by $n$ addresses, each of said addresses respectively having one of the different discrete values of 1 to $n$, there being located at each of said addresses a different one of said page names and an integer, C, associated with each of said page means from which the minimum memory capacity (MMC) of the page can be determined, each of the integers in said second list having a different discrete value of 1 to $n$, said second list comprising a first component comprising means for containing the integers, C, at addresses 1 to $m$ of said second list and a second component comprising means for maintaining said total second list in said storage;

first means responsive to said means for maintaining said second list of said names for determining said minimum memory capacity of a given referenced page comprising;

means responsive to the referencing of a page which is present in primary storage for dividing said first component of said second list into a first group of addresses having the values of 1 to $(l-1)$ respectively, and a second group of addresses having the values of $l$ to $m$, respectively, wherein $l$ is equal to the LRU weighting associated with said referenced page in said first portion of said first list, means responsive to said means for dividing said first component of said second list for ascertaining the address, $k$, in said second group whereat there is present the lowest value minimum memory capacity integer, means responsive to said means for ascertaining said address, $k$, for marking the series of addresses in said second group which are included in the subgroup containing addresses $l$, $(l+1)$, . . . , $(k-1)$ which have the following values, viz. $(l+a)$, $(l+b)$, $(l+c)$, . . . , to address $(k-l)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc., wherein $C(i)$ is the value of integer, C, at address $i$, in said second group of addresses, means responsive to said means for dividing said first component of said second list for generating the smallest missing number in the group of integers comprising 2 to $(C_{max}+1)$ wherein $C_{max}$ is the largest integer, C, of those contained at addresses 2 to $(l-1)$ in said first group of addresses, said generated smallest missing number being the minimum memory capacity of said referenced page, means responsive to said means for dividing said first component of said second list for incrementing each of the addresses 2 to $(l-1)$ of said first group by 1 whereby they respectively have the address values of 3 to $l$, means responsive to said means for generating said smallest missing number for assigning the address value of 2 to said generated smallest missing number, and means responsive to said means for marking said series of addresses for assigning to each of the series of said marked addresses, the value of the next address in said series, the highest value address in said series being assigned the value of $k$, said integer originally at said address $k$ being discarded.

3. In the data processing system as defined in claim 2 wherein, in response to the occurrence of a page exception, there is activated said means to effect an exchange between said primary and secondary storage of the page in said primary storage having the LRU weighting of m associated therewith and the page in secondary storage causing said page exception, said system further including:

means responsive to said page exception for updating said second component of said second list, said updating means effecting the operations of bringing the information at the lst to mth addresses in said second component into conformity with the information in said lst to mth addresses in said first component, the adding of any missing integer and the deleting any duplicate integer in said $(m+1)$th to nth addresses in said second component; there being actuated in response to the updating of said second component of said second list and the occurrence of said page exception to cause the page name of said page closing said exception to be placed into said first portion of said first list and assigned as LRU weighting integer of 1, the page name of said page being removed from primary storage into secondary storage being placed into said second portion with its associated LRU integer being changed from $m$ to $(m+1)$, the remaining LRU integers in said first portion, i.e., those which have the LRU integer values of 1 to $(m-1)$ immediately prior to the occurrence of said page exception being respectively incremented by 1, those LRU integers in said second portion of said first list which had the respective LRU integer values of $(m+1)$ to one less than the LRU integer value of the page causing said exception immediately prior to the occurring of said page exception being incremented by 1;

second means responsive to the updating of said second component of said second list for determining said minimum memory capacity of said page causing said page exception, said second means effecting the operations of dividing said second component into a first group of addresses having the values of 1 to $(l-1)$, respectively and a second group of addresses having the values of $l$ to $n$, respectively, wherein $l$ is equal to the LRU weighting which was associated with said page causing said exception immediately prior to the occurrence of said exception, ascertaining the address, $k$, in said second group whereat there is present the lowest value minimum memory capacity (MMC) integer, marking the series of addresses in said second group which are included in the subgroup containing addresses $l, (l+1), \ldots, (k-1)$, which have the following values, viz. wherein $(l+a)$, $(l+b)$, $(l+c)$, . . . , to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc., wherein $C(i)$ is the value of integer, C, at address $i$, in said second group of addresses, shifting the contents in addresses 2 to $(l-1)$ down by 1 respectively, generating the smallest missing number in the group 2 to $(C_{max}+1)$, wherein $C_{max}$ is the largest value integer, C, at addresses 2 to $(l-1)$ of said second component, placing said smallest missing number at address 2 of said second component, and respectively shifting the contents of said marked addresses into the next address in said series; and means responsive to said means for updating said second component of said second list for updating said first component of said second list, said last-named means effecting the operation of bringing the information at the lst to mth addresses in said first component into conformity with the information at the lst to mth addresses of said second component.

4. In data processing apparatus as defined in claim 3 wherein:

said first portion of said first list comprises a stack of at least m registers, each of said registers being capable of having contents of a value of at least m, and means for incrementing said contents of said registers; and wherein said first component of said second list comprises a stack of a quantity of at least m registers capable of having contents of at least n, and means for shifting the contents of a register in said stack into any of the other registers of said stack.

5. In a data processing operation as defined in claim 4 wherein said means for generating said smallest missing number comprises:

an additional register capable of containing any quantity from 2 to $n$, means for comparing the contents of said additional register with the respective contents of said registers of said first component at addresses 2 to $(l-1)$, whereby upon the successive comparisons of increasing values of the contents in said additional register with the numbers in the series, 2 to $(C_{max}+1)$, the value in said additional register which does not result in a finding of equality in said comparisons is said generated smallest missing number.

6. In a data processing apparatus which is operated as a paging machine and wherein a program is considered as a page reference string, said data processing apparatus including, primary storage for containing a portion, $m$, of the pages of said program and secondary storage for containing the remainder, $(n-m)$, of the pages of said program wherein n is the total of the pages of said program, and means responsive to the occurrence of a page exception for effecting the exchanging of a page in primary storage for the page in secondary storage causing said page exception, a system for determining the minimum memory capacities (MMC) for the pages of said page reference string comprising:

means for maintaining a first list of the names of the pages of said program weighted in accordance with a least recently used (LRU) criterion, said first list being constituted by the names of said pages and least recently used (LRU) weighting integers respectively having one of the differrnt discrete values of 1 to $n$, associated with each of said names according to said criterion, said first list comprising a first portion comprising means for containing the names of those pages in primary storage having associated LRU weighting integers of 1 to $m$ and the respective LRU weighting integers associated therewith, and a second portion comprising the names of the remaining pages of said program and which have the LRU weighting of $(m+1)$ to $n$ and their respective associated LRU weighting integers in a location in said storage;

means in circuit with said means for maintaining said first list for effecting changes of information in said first and second portions of said first list;

means for maintaining a second list of said names, said second list being constituted by an ordered sequence of lst to nth addresses, there being located at each of said addresses a different integer, C, from which the minimum memory capacity (MMC) of the page can be determined, each of the integers in said second list having a different discrete value of 1 to $n$, said second list comprising a first component comprising means for containing the names of the pages in primary storage and their associated MMC integers, C, at addresses 1 to $m$ of said second list and a second component comprising means for maintaining said total second list in said storage;

first means for determining said mimimum memory capacity (MMC) of a given referenced page comprising:

means responsive to the referencing of a page which is present in primary storage for dividing said first component of said second list into a first group of addresses having the values of 1 to $(l-1)$ respectively, and a second group of addresses having the values of $l$ to $m$ respectively, wherein $l$ is equal to the LRU weighting associated with said referenced page in said first portion of said first list, means responsive to said means for dividing said first component of said second list for ascertaining the address, $k$, in said second group whereat there is present the lowest value minimum memory capacity (MMC) integer, means responsive to said means for ascertaining said address, $k$, for marking the series of addresses in said second group which are included in the subgroup containing addresses $l$, $(l-1)$, . . . , $(k-1)$ which have the following values, viz., $(l+a)$, $(l+b)$, $(l+c)$, . . . , to address $(k-1)$, if necessary, wherein $(l+a)$ has the smallest address value greater than $l$ such that $C(l+a) < C(l)$, wherein $(l+b)$ has the smallest address value greater than $(l+a)$ such that $C(l+b) < C(l+a)$, etc., wherein $C(i)$ is the value of integer C at address $i$, in said second group of addresses, means responsive to said means for dividing said first component of said second list for generating the smallest missing number in the group of integers comprising 2 to $(C_{max}+1)$ wherein $C_{max}$ is the largest integer, C, of those contained at addresses 2 to $(l-1)$ in the first group of addresses, said generated smallest missing number being the minimum memory capacity of said referenced page, means responsive to said means for dividing said first component of said second list for incrementing each of said first group of addresses by 1 whereby they respectively have the address value of 3 to $l$, means responsive to said means for generating said smallest missing number for assigning the address value of 2 to said generated smallest missing number, and means responsive to said means for marking said series of addresses for assigning to each of the series of said marked addresses, the value of the next address in said series, the highest value address in said series being assigned the value of $k$, said integer originally at said address $k$ being discarded.

7. In a data processing system as defined in claim 6 wherein, in response to the occurrence of a page exception, there is actuated said means to effect an exchange between said primary and secondary storage of the page in said primary storage having the highest LRU weighting integer associated therewith and the page in secondary storage causing said page exception, said system further including:

means responsive to said page exception for updating said second list to bring the page names and their associated MMC integers into said component of said second list into conformity with said first component of said second list, and, where necessary, to remove redundant integers from and to insert missing integers into said second list;

means responsive to said page exception and the updating of said second list for updating said first and second portions of said first list, said updating including the placing of the page name of the page causing said page exception with an LRU weighting integer of 1 into said first portion of said first list, the page name of said page being removed from primary storage into secondary storage being placed into said second portion with its associated LRU integer being changed from m to $(m+1)$, the remaining integers in said first portion of said first list, i.e., those which had the LRU integer values of 1 to $(m-1)$ immediately preceding said page exception being respectively incremented by 1, those LRU integers in said second portion of said first list which, prior to the occurrence of said page exception, had the respective values of $(m+1)$ to the LRU integer value which is one less than the LRU integer value of the page causing said page exception being respectively incremented by 1;

second means responsive to the updating of said second component of said second list and the updating of said first list for determininng said minimum memory capacity of said page causing said page exception, said second means effecting, the dividing of said second component of said second list into a first group of addresses having the values of 1 to $(l-1)$, respectively, and a second group of addresses having the values of $l$ to $n$ respectively, wherein $l$ is equal to the LRU weighting which was associated with the page causing the exception immediately prior to the occurrence of the page exception, the ascertaining the address, $k$, in the second group whereat there is present the lowest value minimum memory capacity integer, the marking of the series of addresses in the second group which are included in the subgroup containing addresses, $l$, $(l+1)$, . . . , $(k-1)$, which have the following values, viz. $(l+a)$, $(l+b)$, $(l+c)$, . . . , to address $(k-1)$, if necessary, wherein $(l+a)$ has the smallest address value greater than $l$ such that $C(l+a) < C(l)$ wherein $(l+b)$ has the smallest address value greater than $(l+a)$ such that $C(l+b) < C(l+a)$, etc., wherein $C(i)$ is the value of integer, C, at address $i$, in said second group of addresses, the shifting down of one address in said first group of those MMC integers in address postion 2 to $(l-1)$, the generating of the smallest missing number in the group 2 to $(C_{max}+1)$ at addresses 2 to $(l-1)$ in said first group of said total second list wherein $C_{max}$ is the largest value integer, C, at said last-named addresses, the placing of the generated smallest missing number into address 2 of said last-named addresses, said generated smallest missing number being the MMC of said page causing said exception, and the respective shifting of the contents at the marked address positions to the next position in said series, the contents at the highest value address in said series being shifted into address, *k*, the integer originally at address, *k*, being discarded; and means responsive to the determining of the minimum memory capacity of the page causing said exception for updating the first component of said second list, said updating including the operation of inserting into the lst to mth addresses of said first component the corresponding information contained at the lst to mth addresses of said second component.

8. In a data processing apparatus as defined in claim 7 wherein:

said first portion of said first list comprises a stack of at leasat *m* registers, each of said registers being capable of having contents of the value of at least *m*, and means for incrementing said contents of said registers; and wherein said first component of said second list comprises a stack of at least *m* registers, each of said registers being capable of having contents of the value of at least *n*, and means for shifting the contents of the registers in said last-named stack into any of the other registers of said stack.

9. In a data processing apparatus as defined in claim 8 wherein said means for generating said smallest missing number comprises:

an additional register capable of containing any quantity from 2 to at least *n;* means for comparing the contents of said additional register with the respective contents of said registers of said first component representing addresses 2 to $(l-1)$, whereby upon the successive comparisons of increasing values of contents in said additional register with the numbers in the series 2 to $(C_{max}+1)$, wherein $C_{max}$ is the largest value integer, C, at addresses 2 to $(l-1)$, the value in said additional register which does not result in a finding of equality in said comparisons in said generated smallest missing number.

* * * * *